(12) United States Patent
Alnajem

(10) Patent No.: US 10,210,518 B2
(45) Date of Patent: Feb. 19, 2019

(54) RISK-LINK AUTHENTICATION FOR OPTIMIZING DECISIONS OF MULTI-FACTOR AUTHENTICATIONS

(71) Applicant: Abdullah Abdulaziz I. Alnajem, Jeddah (SA)

(72) Inventor: Abdullah Abdulaziz I. Alnajem, Jeddah (SA)

( * ) Notice: Subject to any disclaimer, the term of this patent is extended or adjusted under 35 U.S.C. 154(b) by 491 days.

(21) Appl. No.: 15/098,293

(22) Filed: Apr. 13, 2016

(65) Prior Publication Data
US 2017/0300911 A1    Oct. 19, 2017

(51) Int. Cl.
G06Q 20/40    (2012.01)
G06Q 10/06    (2012.01)

(52) U.S. Cl.
CPC ..... *G06Q 20/4014* (2013.01); *G06Q 10/0635* (2013.01); *G06Q 20/401* (2013.01); *G06Q 20/4016* (2013.01)

(58) Field of Classification Search
CPC ........ G06Q 10/00; G06Q 20/00; G06Q 30/00; G06Q 40/00
USPC ...................................................... 705/3-44
See application file for complete search history.

(56) References Cited

U.S. PATENT DOCUMENTS

| | | | |
|---|---|---|---|
| 6,330,546 B1 | 12/2001 | Gopinathan et al. | |
| 6,615,193 B1 * | 9/2003 | Kingdon | G06Q 20/06 235/379 |
| 8,019,678 B2 * | 9/2011 | Wright | G06Q 20/04 705/35 |
| 8,028,896 B2 | 10/2011 | Carter et al. | |
| 8,424,061 B2 * | 4/2013 | Rosenoer | G06F 17/30569 380/241 |
| 8,572,391 B2 | 10/2013 | Golan et al. | |
| 8,676,648 B2 * | 3/2014 | Badger | G06Q 30/02 705/14.62 |
| 8,700,003 B2 | 4/2014 | Klein | |
| 8,869,254 B2 | 10/2014 | Chen et al. | |
| 8,898,762 B2 | 11/2014 | Kang | |
| 8,935,769 B2 | 1/2015 | Hessler | |
| 8,959,032 B2 | 2/2015 | Fernandes et al. | |
| 9,202,038 B1 | 12/2015 | Allen | |
| 2005/0060263 A1 | 3/2005 | Golan et al. | |
| 2009/0152343 A1 | 6/2009 | Carter et al. | |
| 2010/0022254 A1 | 1/2010 | Ashfield et al. | |

(Continued)

*Primary Examiner* — Frantzy Poinvil
(74) *Attorney, Agent, or Firm* — James R. McDaniel; Jerry R. Potts

(57) ABSTRACT

A system for evaluating risk in an electronic banking transaction by estimating an aggregated risk value from a set of risk factors that are either dependent or independent of each other, comprising: user input means for enabling an end user to provide authentication information related to a desired electronic banking transaction; financial institution authentication means for authenticating that an end user is authorized to conduct the desired electronic transaction; risk computation means for imposing authentication requirements upon the end user in adaptation to a risk value of the desired banking electronic banking transaction; transaction session means for tracking an amount of time that the desired electronic banking transaction is taking; and financial institution transaction means for storing data related to the desired electronic banking transaction.

9 Claims, 50 Drawing Sheets

(56) References Cited

U.S. PATENT DOCUMENTS

| | | | |
|---|---|---|---|
| 2012/0030083 A1* | 2/2012 | Newman | G06Q 40/00 |
| | | | 705/35 |
| 2012/0123881 A1* | 5/2012 | Bishop | G06Q 20/10 |
| | | | 705/16 |
| 2012/0323786 A1* | 12/2012 | Kirsch | G06Q 20/0855 |
| | | | 705/44 |
| 2015/0066772 A1 | 3/2015 | Griffin et al. | |
| 2015/0095235 A1 | 4/2015 | Dua | |
| 2015/0348042 A1* | 12/2015 | Jivraj | G06Q 20/322 |
| | | | 705/44 |
| 2016/0110719 A1* | 4/2016 | Durney | G06Q 20/4014 |
| | | | 705/44 |
| 2016/0196558 A1* | 7/2016 | Mercille | G06Q 20/327 |
| | | | 705/44 |

\* cited by examiner

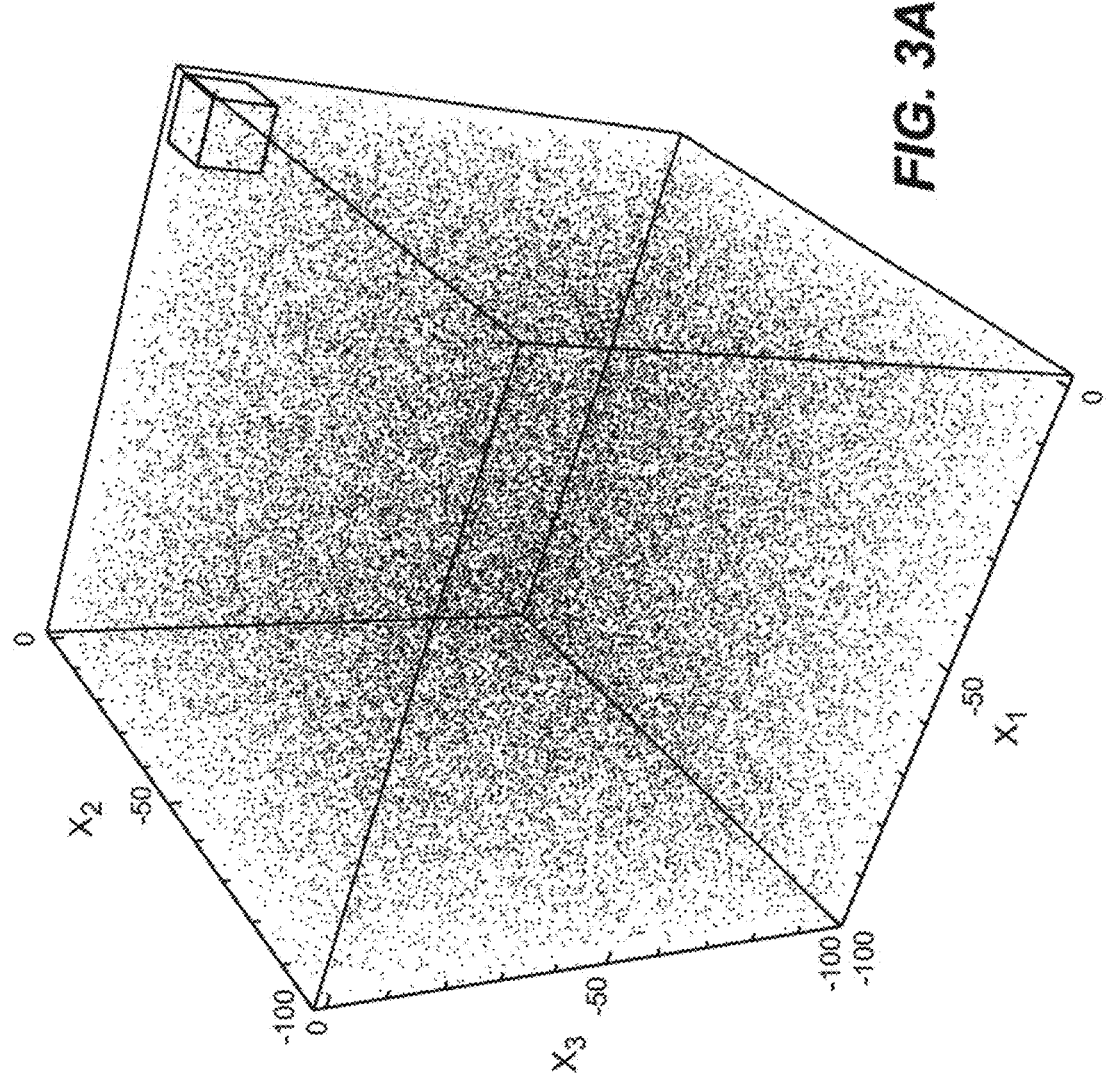

RISK-LINK AUTHENTICATION FOR OPTIMIZING DECISIONS OF MULTI-FACTOR AUTHENTICATIONS

FIELD OF THE INVENTION

This invention relates generally to data processing and more particularly, to a system that provides efficient and effective risk-linked authentication relative to real-time transaction values.

BACKGROUND OF THE INVENTION

Owing to the huge popularity of wireless devices (such as mobile phones or tablet devices), the banking sector, like many other sectors, rolls out its services to their mobile users allowing them access to electronic banking (e-Banking) services via their wireless devices. With mobile banking (m-Banking) services, a mobile user, by using a mobile application (i.e., a mobile app) running on a wireless device, may perform any banking transaction anytime and anywhere. Such an m-Banking service could be in many different forms (i.e., the so called m-Banking models), ranging from messaging, to using web browsers and those with a dedicated client-side application such as a mobile application.

M-banking services also offer banks many benefits, such as, allowing. banks to improve customer services; to reduce costs; to increase reactivity of the company; to increase market share; and to improve branding. M-banking now provides banks the opportunity to offer their services around the clock. There is no time or location constraint on their financial products and services. For example, a client could join a mutual fund account during weekends or evenings. Recent technological developments in m-Banking can also offer further opportunities to consolidate the m-Banking revolution, with, for instance, the development of the e-wallet to replace the cash-based monetary system.

While m-Banking services bring benefits to both banking users and service providers, they also open opportunities for security attacks. Attacks performed over the Internet (or other communication networks) are collectively called cyber-attacks. The open channels of wireless communications and the anonymous and pervasive nature of the Internet make these cyber-attacks against mobile financial systems such as m-Banking systems easier to perform and harder to trace. Owing to the potential monetary gains, Internet/m-Banking services are particularly attractive to cyber attackers. The US Federal Deposit Insurance Corporation (FDIC) estimated losses from fraudulent electronic funds transfers in the third quarter of 2009 at about 120 million dollars in the United States of America alone and, according to the head of the U.S. National Security Agency and U.S. Cyber-Command, cyber-attacks were estimated to increase by 44% in 2011. These figures indicate that existing security measures have need for much improvement. Therefore, it would be highly desirable to have a new and improved system for evaluating risk in an m-Banking context by estimating an aggregated risk value from a set of risk factors that are either dependent or independent of each and do so as effectively and efficiently as possible.

In addition to security issues, wireless devices are battery powered, so any security measures built into them should be computationally and energy efficient. Usability is another factor that needs to be considered, as usually the more stringent the security measures, the more is lost in terms of system usability. For instance, unnecessary multi-factor authentication for a low risk transaction such as viewing an account balance will result in reduced usability for users. On the other hand, the application of a single-factor authentication for a corporate client performing a financial transaction involving millions of dollars involves a high level of risk. Therefore, it would be highly desirable to have a new and improved system for evaluating risk in an m-Banking context by estimating an aggregated risk value in a computationally and energy efficient manner that is risk-aware and dynamic.

There have been many attempts at solving the above-mentioned problems with m-Banking systems. See for example, U.S. Pat. No. 6,330,546 to Gopinathan et al., U.S. Pat. No. 8,028,896 to Carter et al., U.S. Pat. No. 8,572,391 to Golan et al., U.S. Pat. No. 8,700,003 to Klein, U.S. Pat. No. 8,869,254 to Chen et al., U.S. Pat. No. 8,898,762 to Kang, U.S. Pat. No. 8,935,769 to Hessler, U.S. Pat. No. 8,959,032 to Fernandes et al., U.S. Pat. No. 9,202,038 to Allen, U.S. Patent Application 20050060263 to Golan et al., U.S. Patent Application 2009/0152343 to Carter et al., U.S. Patent Application 20100022254 to Ashfield et al., U.S. Patent Application 2015/0066772 to Griffin et al., and U.S. Parent Application 2015/0095235 to Dua. While the use of such systems in m-Banking systems may have been generally satisfactory, there is nevertheless a need for a new and improved data processing system for evaluating risk in an m-Banking context by estimating an aggregated risk value in a computationally and energy efficient manner that is effective, risk-aware and dynamic.

It is a purpose of the present invention to fulfill this and other needs in the art in a manner more apparent to the skilled artisan once given the following disclosure.

BRIEF SUMMARY OF THE INVENTION

A first aspect of the present invention is a system for evaluating risk in an electronic banking transaction by estimating an aggregated risk value from a set of risk factors that are either dependent or independent of each other, comprising: user input means for enabling an end user to remotely provide authentication information related to a desired electronic banking transaction; financial institution authentication means for authenticating that an end user is authorized to conduct the desired electronic transaction; risk computation means for imposing authentication requirements upon the end user in adaptation to a risk value of the desired banking electronic banking transaction based in part upon a location of the end user; transaction session means for tracking an amount of time that the desired electronic banking transaction is taking; and financial institution transaction means for storing data related to the desired electronic banking transaction.

In one embodiment of the first aspect of the present invention, the user input means further comprises: browser means for interacting with the financial institution authentication means; end user input means for entering authentication data related to the desired electronic banking transaction; display means for displaying the authentication data related to the desired electronic banking transaction; and supplemental authentication means for further authentication of the end user.

In another embodiment of the first aspect of the present invention, the display means further comprises a global positioning means.

In yet another embodiment of the first aspect of the present invention, the supplemental authentication means is selected from a group of supplemental authentication means comprising: a hard token authentication means; a face recognition authentication means; or a biometric authentication means.

In still another embodiment of the first aspect of the present invention, wherein the financial institution authentication means further comprises: end user credential authentication data storage means for storing authentication credentials of all of the end users in the banking industry; banking sector fraudulent transaction data storage means for storing information related to past fraudulent transactions that have been detected by a banking industry; financial institution past transaction data storage means for storing information related to past financial transactions of all of the end users of a financial institution; financial institution fraud record data storage means for storing information related to fraudulent transactions of all of the end users of the financial institution that are stored in the financial institution past transaction data storage means; and an authentication means for interacting with the end user credential authentication data storage means, the banking sector fraudulent transaction data storage means, the financial institution past transaction data storage means, and the financial institution fraud record data storage means to provide an electronic banking transaction authentication result to the end user.

In still yet another embodiment of the first aspect of the present invention, the risk computation means further comprises: risk computation means for interacting with the authentication means to provide an electronic banking transaction authentication result to the end user; and GPU computation means for interacting with the risk computation means for assisting the risk computation means in providing the electronic banking transaction authentication result to the end user.

In a further embodiment of the first aspect of the present invention, the risk computation means further comprises: determining an aggregated authentication assurance level when the end user is authenticated through the use of a multi-factor authentication.

In a still further embodiment of the first aspect of the present invention, the risk computation means further comprises: determining an aggregated level of assurance for multiple level of assurance values based upon a separate authentication factor; and determining a Lagrangian Copula-based Aggregated Level of Assurance in order to make a risk-linked authentication decision such that the Lagrangian Copula-based Aggregated Level of Assurance provides an estimate of a required authentication assurance level for the desired electronic banking transaction.

In a further embodiment of the first aspect of the present invention, the GPU computation means further comprises: applying a Genz non-linear integration method to the Lagrangian Copula-based Aggregated Level of Assurance through a use of parallel processing on a GPU.

In yet another embodiment of the first aspect of the present invention, the transaction session means further comprises: transaction session timing means for determining an amount of time that the desired electronic banking transaction is taking; and transaction session cessation means, wherein the transaction session timing means and the transaction session cessation means interact with the authentication means for ending the end user's desired electronic banking transaction if a predetermined period of time has elapsed.

In a still further embodiment of the first aspect of the present invention, the financial institution transaction means is further comprised of: end user financial institution transaction data storage means for storing information related to past financial transactions of the end user; log means for storing information related to a date, time, monetary amount and location of past financial transactions of the end user; and accounting and financial data storage means for storing information related to a type and amount of past financial transactions of the end user and information related to statistics about the past transactions (e.g. number of wire transfers per day etc.).

A second aspect of the present invention is a method for evaluating risk in an electronic banking transaction by estimating an aggregated risk value from a set of risk factors, the method comprising the steps of: performing an initial authentication of a user; performing an initial aggregated risk value analysis from a set of risk factors related to the user; requesting, from the user, that the user enter a secondary authentication, wherein the secondary authentication is a multi-factor authentication such that the number of factors in the multi-factor authentication is based upon the user; receiving, from the user, a query concerning an electronic banking transaction that the user desires to conduct; performing a further aggregated risk value analysis from a set of risk factors related to the electronic banking transaction that the user desires to conduct; requesting, from the user, that the user enter a tertiary authentication, wherein the tertiary authentication is another multi-factor authentication such that the number of factors in the another multi-factor authentication is based upon a type of electronic banking transaction that the user desires to conduct; and completing the desired transaction, if the user enters an acceptable tertiary authentication.

In one embodiment of the second aspect of the present invention, the performing an initial authentication step further comprises the step of requesting an initial user identification from the user.

In another embodiment of the second aspect of the present invention, the performing an initial aggregated risk value analysis from a set of risk factors related to the user step further comprises: identifying relevant risk factors from a set of possible risk factors related to the user; assigning a value to each relevant risk factor based upon the user; computing correlation matrices based upon a past transaction history of the user and based upon fraudulent transactions of all of users of a financial institution and fraudulent transactions of all of users of a banking sector, wherein the correlation matrices are computed in parallel using two separate graphical processing units to determine two aggregated risk values; and selecting the aggregated risk value that is the largest of the two aggregated risk values.

In yet another embodiment of the second aspect of the present invention, the secondary authentication step is selected from a group of secondary authentication steps comprising: using a hard token authentication means; using a face recognition authentication means; or using a biometric authentication means.

In still another embodiment of the second aspect of the present invention, the performing a further aggregated risk value analysis step further comprises: identifying relevant risk factors from the set of possible risk factors related to the desired banking transaction by the user; assigning a value to each relevant risk factor based upon the desired banking transaction by the user; computing the correlation matrices based upon the past transaction history of the user and based upon the fraudulent transactions of all of users of the financial institution and fraudulent transactions of all of users of a banking sector, wherein the correlation matrices are computed in parallel using the two separate graphical processing units to determine the two aggregated risk values; and selecting the aggregated risk value that is the largest of the two aggregated risk values.

In still yet another embodiment of the second aspect of the present invention, the requesting the tertiary authentication step further comprises the step of requesting a further user identification from the user.

A third aspect of the present invention is at least one non-transitory computer-readable medium storing computer-readable instructions that, when executed by a computing device, cause the computing device to: perform an initial authentication of a user; perform an initial aggregated risk value analysis from a set of risk factors based upon the user; request, from the user, that the user enter a secondary authentication, wherein the secondary authentication is a multi-factor authentication such that the number of factors in the multi-factor authentication is based upon the user; receive, from the user, a query concerning an electronic banking transaction that the user desires to conduct; perform a further aggregated risk value analysis from a set of risk factors based upon the electronic banking transaction that the user desires to conduct; request, from the user, that the user enter a tertiary authentication, wherein the tertiary authentication is another multi-factor authentication such that the number of factors in the another multi-factor authentication is based upon a type of electronic banking transaction that the user desires to conduct; and complete the desired transaction, if the user enters an acceptable tertiary authentication.

In one embodiment of the third aspect of the present invention, the performing an initial aggregated risk value analysis step further comprises identify relevant risk factors from a set of possible risk factors related to the user; assign a value to each relevant risk factor based upon the user; compute correlation matrices based upon a past transaction history of the user and based upon fraudulent transactions of all of users of a financial institution and fraudulent transactions of all of users of a banking sector, wherein the correlation matrices are computed in parallel using two separate graphical processing units to determine two aggregated risk values; and select the aggregated risk value that is the largest of the two aggregated risk values.

In another embodiment of the third aspect of the present invention, the performing a further aggregated risk value analysis step further comprises: identify relevant risk factors from the set of possible risk factors related to the desired banking transaction by the user; assign a value to each relevant risk factor based upon the desired transaction by the user; compute the correlation matrices based upon the past transaction history of the user and based upon the fraudulent transactions of all of users of the financial institution and fraudulent transactions of all of users of a banking sector, wherein the correlation matrices are computed in parallel using the two separate graphical processing units to determine the two aggregated risk values; and select the aggregated risk value that is the largest of the two aggregated risk values.

A fourth aspect of the present invention is a method for determining an aggregated risk value from a set of risk factors in an electronic banking transaction, the method comprising the steps of: performing an initial aggregated risk value analysis from a set of risk factors related to a user; requesting, from the user, that the user enter an authentication, wherein the authentication is a multi-factor authentication such that the number of factors in the multi-factor authentication is based upon the user and the initial aggregated risk value analysis; performing a further aggregated risk value analysis from a set of risk factors related to an electronic banking transaction that the user desires to conduct; requesting, from the user, that the user enter another authentication, wherein the another authentication is another multi-factor authentication such that the number of factors in the another multi-factor authentication is based upon the electronic banking transaction that the user desires to conduct and the further aggregated risk value analysis; and completing the desired transaction, if the user enters an acceptable another authentication.

In one embodiment of the fourth aspect of the present invention, the performing an initial aggregated risk value analysis step is further comprised of the steps of: identifying relevant risk factors from the set of risk factors related to the user; assigning a value to each relevant risk factor based upon the user; computing correlation matrices based upon a past transaction history of the user and based upon fraudulent transactions of all of users of a financial institution and fraudulent transactions of all of users of a banking sector, wherein the correlation matrices are computed in parallel using a plurality of separate graphical processing units to determine two aggregated risk values; and selecting the aggregated risk value that is the largest of the two aggregated risk values.

In another embodiment of the fourth aspect of the present invention, the computing correlation matrices step is further comprised of the steps of: preparing a plurality of parameters that are constant across and are used in a plurality of Monte Carlo sample points; generating a plurality of uniform random numbers for the plurality of Monte Carlo sample points; synchronizing the preparing step and the generating step; calculating a value at each Monte Carlo sample point; synchronizing the calculating step; and combining the values at each Monte Carlo sample point.

In yet another embodiment of the fourth aspect of the present invention, the performing a further aggregated risk value analysis step is further comprised of the steps of: identifying relevant risk factors from the set of possible risk factors related to the desired banking transaction by the user; assigning a value to each relevant risk factor based upon the desired banking transaction by the user; computing the correlation matrices based upon the past transaction history of the user and based upon the fraudulent transactions of all of users of the financial institution and fraudulent transactions of all of users of a banking sector, wherein the correlation matrices are computed in parallel using the plurality of separate graphical processing units to determine the two aggregated risk values; and selecting the aggregated risk value that is the largest of the two aggregated risk values.

In still another embodiment of the fourth aspect of the present invention, wherein the preparing step is further comprised of the step of: preparing the plurality of parameters in parallel on the plurality of separate graphical processing units, wherein the parameters include the correlation matrices, a marginal probability, a plurality of marginal quantile values, and a plurality of degrees of freedom.

In still yet another embodiment of the fourth aspect of the present invention, the step of the preparing the plurality of parameters in parallel is further comprised of the step of: generating the plurality of Monte Carlo sample points on the plurality of separate graphical processing units in parallel.

In a further embodiment of the fourth aspect of the present invention, the generating step is further comprised of the step of: applying a Genz non-linear integration method to the plurality of Monte Carlo sample points.

In a still further embodiment of the fourth aspect of the present invention, the calculating step is further comprised of the step of: obtaining a visual representation of the plurality of Monte Carlo points as the points undergo Genz non-linear transformation.

In a further embodiment of the fourth aspect of the present invention, the combining step is further comprised of the step of: calculating an average of the plurality of the Monte Carlo sample points immediately after the value of each of the points is computed using the Genz non-linear transformation.

In yet another embodiment of the fourth aspect of the present invention, the calculating an average step is further comprised of the step of: applying a vector reduction to the plurality of the Monte Carlo sample points.

A fifth aspect of the present invention is at least one non-transitory computer-readable medium storing computer-readable instructions that, when executed by a computing device, cause the computing device to: perform an initial aggregated risk value analysis from a set of risk factors related to a user; request, from the user, that the user enter an authentication, wherein the authentication is a multi-factor authentication such that the number of factors in the multi-factor authentication is based upon the user and the initial aggregated risk value analysis; perform a further aggregated risk value analysis from a set of risk factors related to an electronic banking transaction that the user desires to conduct; request, from the user, that the user enter another authentication, wherein the another authentication is another multi-factor authentication such that the number of factors in the another multi-factor authentication is based upon the electronic banking transaction that the user desires to conduct and the further aggregated risk value analysis; and complete the desired transaction, if the user enters an acceptable another authentication.

In one embodiment of the fifth aspect of the present invention, the performing an initial aggregated risk value analysis step is further comprised of the steps of: identifying relevant risk factors from the set of risk factors related to the user; assigning a value to each relevant risk factor based upon the user; computing correlation matrices based upon a past transaction history of the user and based upon fraudulent transactions of all of users of a financial institution and fraudulent transactions of all of users of a banking sector, wherein the correlation matrices are computed in parallel using a plurality of separate graphical processing units to determine two aggregated risk values; and selecting the aggregated risk value that is the largest of the two aggregated risk values.

In another embodiment of the fifth aspect of the present invention, the computing correlation matrices step is further comprised of the steps of: preparing a plurality of parameters that are constant across and are used in a plurality of Monte Carlo sample points; generating a plurality of uniform random numbers for the plurality of Monte Carlo sample points; synchronizing the preparing step and the generating step; calculating a value at each Monte Carlo sample point; synchronizing the calculating step; and combining the values at each Monte Carlo sample point.

In yet another embodiment of the fifth aspect of the present invention, the preparing step is further comprised of the step of: preparing the plurality of parameters in parallel on the plurality of separate graphical processing units, wherein the parameters include the correlation matrices, a marginal probability, a plurality of marginal quantile values, and a plurality of degrees of freedom.

In still another embodiment of the fifth aspect of the present invention, the step of the preparing the plurality of parameters in parallel is further comprised of the step of: generating the plurality of Monte Carlo sample points on the plurality of separate processing units in parallel.

In still yet another embodiment of the fifth aspect of the present invention, the generating step is further comprised of the step of: applying a Genz non-linear integration method to the plurality of Monte Carlo sample points.

In a further embodiment of the fifth aspect of the present invention, the calculating step is further comprised of the step of: obtaining a visual representation of the plurality of Monte Carlo points as the points undergo Genz non-linear transformation.

In a still further embodiment of the fifth aspect of the present invention, the combining step is further comprised of the step of: calculating an average of the plurality of the Monte Carlo sample points immediately after the value of each of the points is computed using the Genz non-linear transformation.

In a yet further embodiment of the fifth aspect of the present invention, the calculating an average step is further comprised of the step of: applying a vector reduction to the plurality of the Monte Carlo sample points.

A sixth aspect of the present invention is a computer-implemented method for authenticating a user in an electronic banking transaction, the method comprising the steps of: performing an initial aggregated risk value analysis from a set of risk factors related to a user; requesting, from the user, that the user enter an authentication, wherein the authentication is a multi-factor authentication such that the number of factors in the multi-factor authentication is based upon the user and the initial aggregated risk value analysis; performing a further aggregated risk value analysis from a set of risk factors related to an electronic banking transaction that the user desires to conduct; requesting, from the user, that the user enter another authentication, wherein the another authentication is another multi-factor authentication such that the number of factors in the another multi-factor authentication is based upon the electronic banking transaction that the user desires to conduct and the further aggregated risk value analysis; and completing the desired transaction, if the user enters an acceptable another authentication.

The preferred system and method for evaluating risk in a given context by efficiently making the best decision of proposing the set that has the aggregated level of assurance and considering the dependency relationships of the authentication assurance of the authentication methods to recommend the set of authentication methods with the exact individual level of assurance for each method which needs to be imposed on the user performing the financial transaction which has the lowest cost in real time. Specifically, the risk authentication system 10, helps to decide when to include an additional factor of authentication and at what level of assurance as their dependencies change and the current risk values of the transaction become better or worse. In fact, these advantages are optimized to an extent that is considerably higher than heretofore achieved in prior, known systems and methods for evaluating risk.

BRIEF DESCRIPTION OF THE DRAWINGS

The above mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIGS. 3A-3C are graphical illustrations that visualize exhaustive versus adaptive integration methods, according to the present invention;

FIGS. 18A and 188 are graphical illustrations that show Union Aggregated Risk with a Gaussian copula, $\rho$=−0.91 (FIG. 18A) and Union Aggregated Risk with a T copula, $\rho$=−0.91 (FIG. 18B), according to the present invention;

FIGS. 33A and 3 B are illustrations of the brute force (i.e., non-adaptive) Monte Carlo algorithms that were used for designing a Genz non-linear transformation method on GPUs, according to the present invention;

DETAILED DESCRIPTION OF THE PREFERRED EMBODIMENTS

Figure 1:
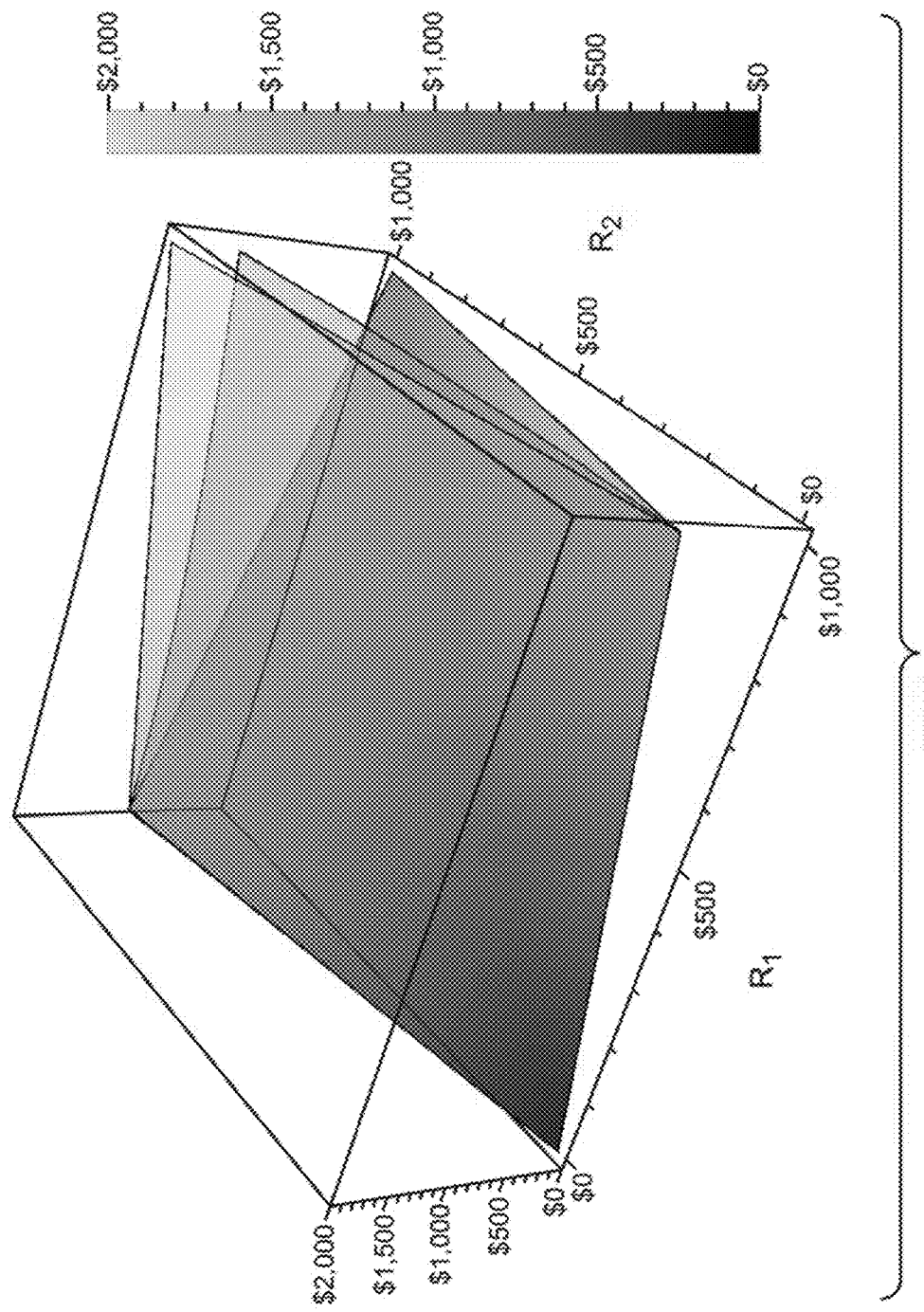
FIG. 1 is a graphical illustration that shows the effect on aggregated risk using a Square-Root Formula with different correlation scenarios.

To facilitate a complete understanding of the invention, the following terms and acronyms are used throughout the detailed description:

Client-Server. A model of interaction in a distributed system in which a program at one site sends a request to a program at another site and waits for a response. The requesting program is called the "client" and the program that responds to the request is called the "server." In the context of the World Wide Web (discussed below), the client is a "Web browser" (or simply "browser") which runs on a computer of a user; the program which responds to browser requests by serving Web pages, or other types of Web content, is commonly referred to as a "Web server."

Content. A set of executable instructions that is served by a server to a client and which is intended to be executed by the client so as to provide the client with certain functionality. Web content refers to content that is meant to be executed by operation of a Web browser. Web content, therefore, may include, but is not limited to, one or more of the following: HTML code, Java Script™, Java Program(s) and C-"Sharp" code.

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally, in specifying how the Web browser is to display the document.

HTTP (HyperText Transport Protocol). The standard World Wide Web client-server protocol used for the exchange of information (such as HTML documents and client requests for such documents) between a browser and a Web server. HTTP includes a number of different types of messages that can be sent from the client to the server to request different types of server actions. For example, a "GET" message, which has the format GET <URL>, causes the server to return the document or file located at the specified URL.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

World Wide Web ("Web"). Used herein to refer generally to both (i) a distributed collection of interlinked, user-viewable Hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP and the Web pages are encoded using HTML.

However, the terms "Web" and "World Wide Web" are intended to encompass future markup languages and transport protocols that may be used in place of (or in addition to) HTML and HTTP.

Website. A computer system that serves informational content over a network using the standard protocols of the World Wide Web. Typically, a Website corresponds to a particular Internet domain name, such as "mybusiness.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Website users. Importantly, a Website can have additional functionality. For example, a Website may have the ability to print documents, scan documents, etc.

URL (Uniform Resource Locator. A unique address which fully specifies the location of a file or other resource on the Internet or a network. The general format of a URL is protocol://machine address: port/path/filename.

Figure 40A:
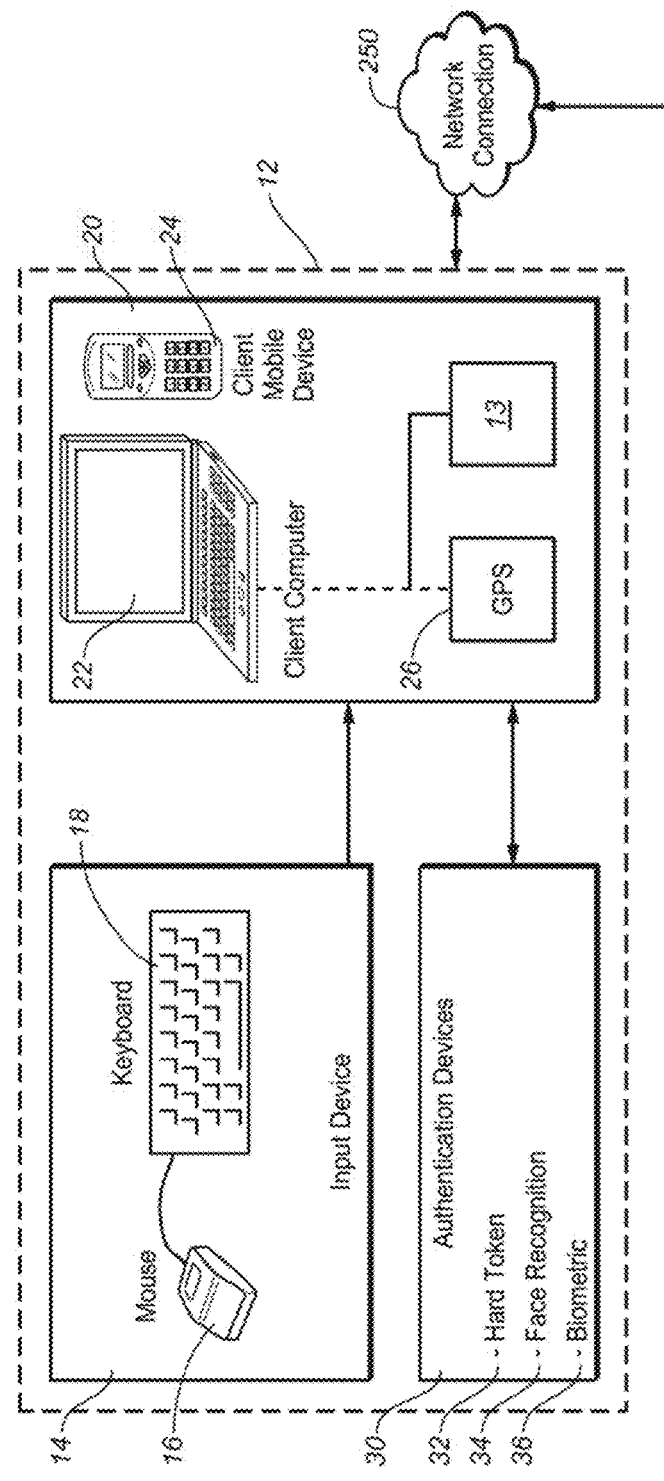
FIG. 40 is a schematic illustration of a system for evaluating risk in a given context by estimating an aggregated risk value from a set of risk factors which system is constructed according to the present invention.

Referring now to the drawings, and more particularly to FIG. 40, there is a schematic illustration of a risk authentication system 10 which is constructed in accordance with the present invention. In this regard, the risk authentication system 10 is constructed to find the most optimal set of multi-factor authentication methods and the level of each authentication method which give an aggregated authentication level of assurance that matches a current aggregated risk value with the lowest financial transaction costs. More particularly, the risk authentication system 10 makes an initial and a secondary authentication to provide the required authentication throughout a financial transaction session to adapt to the aggregated level of risk. Stated otherwise, the risk authentication system 10 of the present invention finds the optimal set of multi-factor authentication decisions (i.e., the set which has the required aggregated authentication level of assurance that incurs the lowest costs) by intelligently finding the best set of multi-factor authentication methods out of all the possible sets without having to explore all the possible sets by using a Lagrange method. Once the risk authentication system 10 efficiently estimates the risk value from a set of risk factors, the authentication methods (found during the Lagrange method), using a Copula method, takes into account the dependency relationships for the assurance of the authentication methods in the estimate of the aggregated level of assurance. In this system process, each authentication method conducts a specific individual authentication level of assurance (e.g. hard token=0.7 and soft token=0.8 and a secret phrase=0.4, etc. where 1 is the highest value and 0 is the lowest value) multiple times with a different specific individual authentication level of assurance every time (i.e., the individual authentication level of assurance for each method changes giving a set of different values than the previous set; e.g. hard token=0.2 and soft token=0.9 and a secret phrase=0.6 etc.) to estimate the aggregated authentication level of assurance for each set every time.

More particularly, the inventor found a way of using a survival function which can always reduce the number Copulas into one single Copula, no matter how many factors/attributes are being aggregated for evasive fraud detection, which is referred to as Copula-based Risk Estimation and Detection Method Version 2 (C-REDv2). The computation time of the present invention was improved drastically with the C-REDv2 using the survival function. Even though it only created only one Copula, the dimensions of this single Copula will grow within that single Copula into a Copula with n dimensions according to the n number of factors/attributes present in the m-Banking or e-Banking banking transaction.

Within the C-REDv2, a method that estimates the joint probability for a set of probabilities must be used. The Genz nonlinear transformation and computation method was chosen to calculate this joint probability value. In order to optimize the computation further, the serial computations that are performed based on Genz non-linear transformation and computation were made into a parallel design on a GPU instead of serial process on a CPU. This process is referred to as GPU-C-REDv2 as it parallelizes the C-REDv2. There may be some benefit of parallelizing the Copula-based Risk Estimation and Detection Method Version 1 (C-REDv1) on a GPU as compared with C-REDv1 on a CPU. However, since there is more than one single Copula to be parallelized and the number of Copulas grows exponentially as the number of factors/attributes increase, it makes parallelizing the C-REDv1 computationally more complex. Therefore, parallelizing the C-REDv2 on the GPU (the GPU-C-REDv2 process) was found to be desirable.

Regarding the parallelizing of the C-REDv1 on a GPU, parallelizing the C-REDv1 on a GPU (i.e. applying the parallel design of Genz non-linear transformation and computation) will provide a time-efficiency benefit as compared with the C-REDv1 when run on a CPU (using the serial Genz non-linear transformation and computation). Interestingly however, it was determined that parallelizing the C-REDv1 is slower than parallelizing the C-REDv2 (i.e. the GPU-C-REDv2) when running each on a single GPU. This determination reveals the unique and novel aspect of discovering the improved, but unexpected performance gained by parallelizing the C-REDv2 on the GPU.

The C-REDv2 needs to parallelize one single Copula because the C-REDv2 only generates one single Copula regardless of the number of risk factors/assurance attributes being aggregated for detecting an evasive fraud transaction etc. However, the C-REDv1 has to generate multiple Copulas, where the number of Copulas generated grows exponentially as the number of risk factors/assurance attributes increase.

When parallelizing the C-REDv1, each of the Copulas generated is parallelized serially (i.e. each Copula is parallelized one after the other until all of the Copulas are computed and consolidated). As the computations from the parallel C-RED-v1 and the computations from the parallel C-REDv2 are the same in terms of accuracy, it is more desirable to parallelize C-REDv2 (i.e. the GPU-C-REDv2) than parallelize the C-REDv1. This is because the GPU-C-REDv2 has to parallelize one single Copula no matter how many risk factors/assurance attributes are being aggregated so the GPU-C-REDv2 is more time-efficient and executes fewer computations than parallelizing the C-REDv1 where the set of Copulas are run serially.

To enable the parallelized C-REDv1 to become almost as fast as the GPU-C-REDv2, one needs to employ several GPUs in a cluster where each GPU runs one of the generated Copulas of the C-REDv1, thereby eliminating the serial process, which allows each GPU to run simultaneously with the other GPUs and then consolidate all of the results of all of the GPUs. In this regard, the GPUs are run simultaneously to parallelize the computation of the Copulas generated by the C-REDv1 and to benefit from the parallel non-linear transformation and computation within each Copula. Here, however, it was determined that more GPU devices would have to be employed and more computations would have to be executed due to the numerous number of Copulas generated for the C-REDv1. Therefore, it was ultimately determined that the GPU-C-REDv2 is more efficient that a GPU-C-REDv1.

In summary then, the risk authentication system 10 of the present invention, efficiently makes the best decision of proposing the set that has the aggregated level of assurance and considering the dependency relationships of the authentication assurance of the authentication methods to recommend the set of authentication methods with the exact individual level of assurance for each method which needs to be imposed on the user performing the financial transaction which has the lowest cost in real time. Specifically, the risk authentication system 10 helps to decide when to include an additional factor of authentication and at what level of assurance as their dependencies change and the current risk values of the transaction become better or worse.

Financial transactions, as above-mentioned, contemplate not only mobile banking (M-banking) transaction applications, but any financial transaction suitable for risk-linked authentication such as, for example, Apple pay, Samsung pay, Android pay, Person to Person pay, and other digital wallet type of applications.

Risk authentication system 10, also computes an overall (i.e. aggregated) authentication assurance level when a user is authenticated through the use of multi-factor authentication. In this regard, the risk authentication system 10 of the present invention, generally consists of two novel methods: (1) a Copula-based Aggregated Level of Assurance (CALoA) method that computes an aggregated level of assurance (LoA) given multiple component LoA values, each from a separate authentication factor, and (2) a Lagrangian Copula-based Aggregated Level of Assurance (LC-ALoA) method which makes a risk-linked authentication decision based on the Lagrange Multiplier theory. Finally, in risk authentication system 10 utilizing the LC-ALoA method is intended to give an estimate of a required authentication assurance level for a given level of risk (in relation to identity threats) and the usability cost.

Before considering the risk authentication system 10 in detail, it would be good to first review the algorithm technology which makes such a risk authentication system 10 possible. To begin this background study, the following list of acronyms will be utilized:

| List of Acronyms | |
|---|---|
| Acronym | Meaning |
| ALoA | Aggregated Level of Assurance |
| C-ALoA | Copula-based Aggregated Level of Assurance |
| Corp-M-Banking | Corporate Mobile Banking |
| C-REDv1. | Copula-based Risk Estimation and Detection Version 1 |
| C-REDv2. | Copula-based Risk Estimation and Detection Version 2 |
| C-REM | Copula-based Risk Estimation Method |
| C-REMv1. | Copula-based Risk Evaluation Method Version 1 |
| C-REMv2. | Copula-based Risk Evaluation Method Version2 |
| CFD Method | Copula-based Fraud Detection Method |
| CUDA | Compute Unified Device Architecture |
| e-Banking | Electronic Banking |
| EMV | Europay, MasterCard, and Visa |
| EVT | Extreme Value Theory |
| GPD | Generalized Pareto Distribution |
| GPGPU | General Purpose Graphical Processing Unit |
| GPU | Graphical Processing Unit |

-continued

List of Acronyms

| Acronym | Meaning |
| --- | --- |
| GPU-C-REDv2 | GPU-based Copula-based Risk Estimation Method Version 2 |
| LC-ALoA | Lagrange-based Copula-based Aggregated Level of Assurance |
| LoA | Level of Assurance |
| m-Banking | Mobile Banking |
| MC | Monte Carlo |
| MVN | Multivariate Normal MLS |
| MLS | Multi-Level Security |
| MVT | Multivariate |

Considering now, a motivating scenario with respect to currently known algorithms. Alice is a manager who has to access to an electronic corporate bank account of the company she works for. She regularly accesses the company's bank account using her mobile device from her home in Paris, France. Sometimes Alice travels abroad on business trips. When Alice tries to transfer a large amount of money from the company's account to an external beneficiary account while being abroad, the electronic banking system will seek additional security verifications. For example, the system could seek authentication from Alice based upon a memorable place, her date of birth or her mother's maiden name or any combination of such authentication questions. Once Alice answers all these security verification or authentication questions correctly, the transfer request will be processed successfully.

Now assume that a fraudster has managed to install a malicious file on Alice's mobile device while she is on a business trip abroad. The fraudster is now able to spy on her electronic banking transactions from anywhere. The fraudster could access her secret answers to the authentication questions as she enters them during the authentication process. Having obtained the secret answers, the fraudster is also able to log into the business account using any device and then perform illegitimate transactions such as transferring money from the business account to an account owned by the fraudster. The fraudster may perform a number of transactions, starting from small amounts to larger amounts. The electronic banking system processes the transactions without ever detecting that fraudulent transactions are occurring, except perhaps when a large amount transfer is requested.

For all these transactions, the banking system uses the same procedure to authenticate the requests. In performing these transactions, the fraudster follows an evasive fraud pattern. The evasive fraud pattern works by switching between small amount transfers to large amount transfers to show a benign intent. The fraudster continues to perform the fraud over and over again without the system being able to detect the evasive fraud pattern. In these transfers, the authentication procedure used has repeatedly failed to prevent the fraudulent transactions.

There are several consequences as a result of this undetected fraud incident. The corporate client loses faith in the electronic banking system, and other bank clients, who learn of this fraud, become reluctant to use the banking system. As a result, the bank suffers losses from not only the loss of customers, but also because of the need to compensate Alice's company for the fraud.

To prevent similar attacks or in attempt to at least reduce the risk level, the bank decides to adopt a stronger form of an authentication method, a multi-factor authentication method, for all transaction requests regardless of their risk levels. In this regard, the bank deploys this strong authentication method even for low risk transactions, such as checking the balance of an account. As a result, the server-side costs will go up and system usability may suffer, unnecessarily. To balance security, cost and usability, the security level provided, e.g. the authentication methods applied should be determined based on the risk level associated to the transaction request.

The above use-case scenario demonstrates that that an effective and efficient authentication solution is needed which is risk-aware and dynamic. Being dynamic means that the decision as to how a requester is authenticated should be adjustable based upon the requester's contextual information. A dynamic risk-aware authentication system could function as follows: the system gathers the surrounding information about the requester, e.g. the device used, the location where the request is being made, the payment amount requested, etc. Next, the risk values imposed by each of the risk factors (called component risk values) are evaluated based on the contextual information acquired. Then, an overall (or aggregated) risk value is calculated based upon the component risk values. This overall risk value is then used to govern how the requester should be authenticated before the request can be granted. Different authentication technologies have different levels of assurance, and the assurance level derived from each authenticating process must be in proportional to the risk level derived from this transaction request instance before the transaction is allowed. There are many risk factors and fraud patterns targeted at mobile financial systems. Some of the risk factors have dependency relationships among them and others do not. These relationships should be taken into account when calculating an aggregated risk value but in real time transactions, such calculations must be limited in time, otherwise such calculations could well affect clients' usability and server-side costs.

The present risk authentication system 10 solves this multi-faceted problem by developing a dynamic and risk-aware authentication solution, calculating an overall risk value given multiple risk factors and doing so by intelligently finding the best set of multi-factor authentication methods out of all possible sets which have a required aggregated authentication level of assurance incurring the lowest costs, without having to explore all possible sets by using a Lagrange method. In short, the risk authentication system 10 of the present invention, efficiently estimates the risk value from a set of risk factors to efficiently aggregate a candidate set of multi-factor authentication methods using a Copula method to take into account the dependency relationships for the assurance methods in the estimation of the aggregated level of assurance. More particularly, as will be described hereinafter in greater detail, the risk authentication system 10, finds the most optimal set of multi-function authentication methods and the level of each authentication method that give the aggregated authentication level of assurance that matches the aggregated risk value with the lowest cost with respect to the financial transaction in progress.

Present Invention Hypothesis

The hypothesis for this present invention is based upon taking into account the dependency relationships among different risk factors, where the overall risk value (i.e., the aggregated risk value) calculated may be more accurate. The risk value may be more realistic and relatively more accurate in the sense that neglecting such dependency relationships has a large impact on the calculated aggregated risk value.

To validate this hypothesis, it was necessary to derive an aggregated risk calculation method. In deriving such an aggregated risk calculation method, the inventive process first evaluated what have been considered accurate methods in the context of detecting evasive fraud patterns and then using these methods in the context of optimal real-time decisions regarding risk-linked authentication for financial systems and more particularly, mobile transactions. This evaluation also sought seeking computationally efficient implementations for suggested methods because risk computations needed to be performed in a real-time mobile financial environment.

Present Invention Aim and Objectives

To this end, the aim of the present invention was the development of a viable solution for aggregated risk value estimation for a given set of risk factors, so that the aggregated risk value estimated could be useful in implementing risk-linked security solutions, e.g., a risk-linked authentication solution. To make the present invention understandable to those skilled in the art, m-Banking has been selected as the application context for making this disclosure.

Turning now to the details of the present invention, the following objectives:

i. Identify risk-effecting factors (hereafter referred to as 'risk factors') in an m-Banking context. It should be recognized by those skilled in the art that this is a challenging task, considering the complex environment in which m-Banking services are provided.

ii. Analyze inter-relationships (i.e., any inter-dependencies or correlations) among the different risk factors in order to come to a clear understanding of the implications of the inter-dependencies on aggregated risk values.

iii. Design risk calculation method(s) so that an aggregated risk value (hereafter referred to as 'an aggregated risk value' or 'an overall risk value'), as caused by multiple risk factors in relation to a given transaction undertaken in a given environment, can be derived. The method(s) should capture not only the risk value contributions by individual risk factors but also their interrelationships.

iv. Investigate and apply optimization techniques that substantially reduce execution times of the method(s) derived in (iii). In achieving this objective, it was necessary to make the risk estimation method(s) as computationally efficient as possible, since aggregated risk values are calculated at run-time, and will be used to make risk-linked authentication decisions.

v. Investigate means of reducing run-time costs in risk-linked security method using e-authentication as the investigative context, so as to assess the applicability of the risk-linked security provisioning concept.

Present Invention Methodologies

The present invention uses probability theory, specifically the copula theory to achieve objective (iii). The present invention uses a number of optimization techniques, including the survival function and parallel programming on GPU to reduce the execution time of the designed risk evaluation method. The present invention utilizes an optimized risk-linked authentication solution demonstrating the feasibility of using risks to govern security decisions at run-time.

Achievements, Novel Contributions and Publications

The present invention includes the following achievements. The first is the literature survey of risk quantifications in a mobile financial system context. The second is the explanation of the relevant mathematical theories to the inventive context. The third is the analysis of the risk factors and evasive fraud patterns relevant in mobile financial systems. In particular, the present invention focuses on corporate mobile banking and stock market risk factors and fraud patterns. The fourth is the design of a novel system and method for risk estimation. The fifth is the optimization of the mathematics of the present invention's risk estimation system and method to make it more efficient while calculating aggregated risk values. The sixth is the explanations and visualization of Genz non-linear transformations to calculate the integration on a multi-dimensional distribution of risk. The seventh is the parallelization of Genz non-linear transformations to further reduce the execution time of the present invention's risk calculation method, which in turn, makes the method more suited to real-time risk estimations. The eighth is the design of a novel level of assurance aggregation method. The ninth is the proposal of a novel risk-lined security method to help determine a required level of security for each of the security methods to be used to secure a mobile financial transaction. The tenth is the evaluation of all these novel methods against the methods previously proposed related to risk-linked security.

Literature Review: Risk Quantification and Authentication

This section critically analyses related work in the topic area, namely the models and methods proposed for risk estimation and aggregation, and authentication technologies proposed for e-Banking and m-Banking systems.

In particular, this section surveys risk modeling and aggregation methods and identifies their respective merits and limitations. This section further investigates existing e- and m-Banking authentication models and methods. This section highlights knowledge gaps identified in this topic area, and provides high-level ideas relative to how the identified gaps may be addressed.

Risk Modeling, Estimation and Aggregation

Risk Aggregation is a broad term. In the context of the present invention, risk aggregation means reducing multiple values of risk associated with multiple kinds or sources of risk into a single number that indicates the total risk. The aggregated risk value is the single number accumulating the risk being informed from various sources. In this regard, those skilled in the art will recognize that companies need to aggregate the risks to be able to be prepared to compensate (i.e. mitigate) potential losses by providing enough capital or other resources in advance. Often mathematical models are used to define value of the aggregated risk.

Major Approaches in Modelling Risk

There are three main approaches currently utilized in modelling risk aggregation. They are the Var-Covar approach, distribution-based aggregation using copulas, and scenario-based aggregation approach.

The Var-Covar approach is most commonly used approach in risk estimation and aggregation. It uses elliptical joint distributions such as multidimensional gaussian or multivariate t-distribution. In this approach, correlations are limited to linear pairwise correlations (Pearson correlation) while marginal distributions are limited to elliptical distributions such as a normal distribution. This approach is simple to implement.

The second approach, distribution-based aggregation using copulas, is flexible in terms of accommodating different types of risk factors. It can combine any marginal distributions with desired tail properties with a correlation structure. However, most of the copula-based methods are analytically complex and they do not have closed-form formulas. As a result, the calculations sometimes are computationally intensive. Also finding the parameters of a copula can sometimes be difficult.

In the scenario-based aggregation approach, the sum of profit and loss is represented as a large array of scenarios with the entire loss or risk distribution being simulated using the Monte Carlo method. In this approach, the outcome may be very sensitive to data or parameters. Fitting the parameters and calibrating these risk models may be challenging with this approach.

The novel risk estimation methods presented are based on the second approach introduced above, i.e. distribution-based aggregation using copulas.

Note that these approaches are commonly based on the mathematical concept of correlation wherein its precise mathematical definition is presented later.

The Solvency II Square-Root Formula

One of the alternative approaches to risk aggregation is the Square-Root Formula. The Solvency II "Square-Root Formula" is a common method for aggregating risk. It is use by banks to aggregate risk values as caused by multiple risks factors as reported by the Bank of International Settlement (BIS). In Solvency II requirements, this formula is used to define SCR (solvency capital requirement) that is a minimum required capital. SCR is equivalent to the Value-at-Risk at level of 99.5%. The formula used to calculate SCR is also called the Square-Root Formula.

An important difference between the Square-Root Formula and the approach of the present invention is that the disclosed risk authentication system 10 measures the risk in terms of probability of risk, whereas the Square-Root Formula defines the value of risk based on the quantile of the risk. This is the same for risk factors and their aggregations. For example, the Square-Root Formula calculates the aggregated amount of money at risk based on each individual indication of the amount of money at risk based on the individual risk factors. However, in the present invention, the risk does not depend on the physical units (e.g. amount of money) but instead is described in terms of the probability of the event of risk (e.g. the probability of a fraud or a security attack) that is a number between 0 and 1 or a percentage. However, the Square-Root Formula is based on limiting assumptions such as Normal distributions, which makes it less accurate in real-life scenarios.

The Square-Root Formula is a value when the total loss is known to be the sum of multiple losses $S=r_1+r_2$. Here $r_1$ and $r_2$ are random variables and $R_i$ are their value-at-risk (similar to their expected values but in the worst case scenario for each factor). The losses $r_1$ and $r_2$ are random and are now known. Similarly, their sum is not known. Instead, the distribution between them is known in terms of correlation. In this case, one defines $R_1=VaR(r_1)$ and $R_2=VaR(r_2)$, and $SCR=VaR(r_1+r_2)$. Although the values of $r_1$ and $r_2$ at each instance are not known, the $R_1$ and $R_2$ are known based on the (marginal) distributions. The SCR quantity gives us a known value based on the distribution of their sum. This is in contrast with the present method.

The Square-Root Formula can be generalized into a more general context of risk, as a simple way to aggregate the risk factors that have dependency. The dependency between them is modelled by Pearson's linear correlation coefficient. In the Square-Root Formula, the correlation is used as a scaling factor of the risk factors. The dependency of the risk variables is taken into account simply by the scaling of the two risk factors ($R_i$ and $R_j$) by their pairwise correlation ($Corr_{i,j}$)

$$_iR_jCorr_{i,j}$$

where $\{R_i\}$ are individual factors and $Corr_{i,j}$ is the pairwise dependency ratio using Pearson's linear correlation coefficient.

The positive and negative correlations have opposite effects on an aggregated risk value according to the Square-Root Formula. The Square-Root Formula is not derived from the principles of stochastic distributions.

Example of Using the Square-Root Formula

Considering now a first scenario example of using the Square-Root Formula. A context that the Square-Root Formula is a valid measure of risk is the context of financial portfolio risk. Assume an investor's portfolio consists of shares from two companies, Apple Inc. and Samsung Electronics Co Ltd. The amount of losses in the worst case scenario (0.5% value-at-risk) for that person is $r_1=\$1,000$ and $r_2=\$1,000$ for the companies Apple and Samsung companies respectively. The total portfolio loss of that investor is the sum of his losses in both companies, i.e. $s=r_1+r_2$. Note that $R_1=Var(r_1)$ and $R_2=Var(r_2)$ and $SCR=Var(s)$.

Since these two are competitors in the same major market (smart-phones) and it is their biggest market, when Apple performs worse, it is likely that Samsung performs better. Hence, $r_1=\$1,000$ does not happen at the same time with $r_2=\$1,000$. Hence, a loss of values of shares of our investor indicates that it is likely that the other company does well, hence, the expected total sum of losses is not an addition of the expected individual losses (i.e. $SCR<\$2,000=\$1,000+\$1,000$). In other words, when $Corr_{1,2}<0$, the total loss $Var(r_1+r_2)$ is smaller than $Var(r_1)+Var(r_2)$, i.e. $E(r_1+r_2)<R_1+R_2$. In fact, if the negative correlation is extreme, the investor may never lose money because the loss of money in one investment implies gaining the same amount of money in his other investment. Hence, in this extreme case, the loss is compensated and the worst loss may be zero. In SCR calculations (i.e. the Square-Root Formula), when $Corr_{1,2}=-1$, then $SCR=R^2+R^2-2R_1R_2=|R_1-R_2|$, that is, the losses compensate each other. See FIG. 1.

Considering now another scenario example in which an investor is investing in two companies that are allied. For example, Samsung and Google (provider of the Android operating system) which provide the hardware and software platforms for the same smart-phone products respectively. Loss of values of shares of one company (Google Inc.) may indicate that the value of shares of the other company (Samsung) is also in risk. In the extreme case of perfect correlation, i.e. $Corr_{1,2}=+1$, the investor either loses his investment in both companies or none of them. Since risk is about the worst case scenario, the risk is losing $2,000 because both companies have lost their values. See FIG. 1. In this example, $Var(r_1+r_2)=Var(r_1)+Var(r_2)$.

Weaknesses of the Square-Root Formula

There are some clear weaknesses in using covariance. Firstly, it disregards the skew of the distribution (from a symmetric distribution) which is often present in the marginal distribution associated with the risk factors. Secondly, dependency may spread differently at different regions of the random variables. The effect of correlation may be positive or negative at different regions. Hence, the overall effect of aggregation is a mixture of these effects.

The third and historically more important weakness of the Square-Root Formula is related to the so-called heavy tails. A phenomenon observable in many bank's operational risks is the presence of heavy tails. The heavy tail information is lost using the Square-Root Formula. Therefore, with this approach, there is a risk that an extreme risk may be underestimated. Using correlation to solve this problem may overestimate the risk and inflate the level of security decision unnecessarily. See FIG. 1 for the effect on aggregated risk using this formula with three different correlation scenarios. In cases where the risk is modelled using t-copula, possibly to capture extreme risk, it was observed that the "Square-Root Formula seriously underestimated risk capital" in the interaction between credit and market risk.

The Solvency II approach is often used to calculate an approximated risk value due to the fact that the Square-Root Formula is computationally simple and it does not require heavy simulations. However, the Square-Root Formula "no longer performs well" in the existence of tail dependence and its insensitivity to tail dependence means that it "performs poorly".

Square-Root Formula Versus Methods Developed

In aggregation, using SCR the total loss is the sum of multiple losses. However, this is in contrast with the inventive approach in which the disjunction (i.e. the "or" combination) of risk events (attacks, frauds) are considered instead of the sum of losses.

Since the Square-Root Formula is not the subject of focus in the present invention, it is not explained in more detail. The reason to cover it in the literature review was that it used to be a widely used formula for aggregating risk, and it is considered as the "Standard Formula".

Multi-Level Security (MLS)

As defined in, what is called the Orange Book, Multilevel Secure is "a class of system containing information with different sensitivities that simultaneously permits access by users with different security clearances and needs-to-know, but prevents users from obtaining access to information for which they lack authorization". The initial Bell-Lapadula model was designed to estimate the combined probability P from two probabilities, $P_1$ and $P_2$. A major limitation of this model is that each of the two probabilities is binary. So any benefit of the MLS component was cancelled by the naïve binary assignment of the probability values. The Bell-Lapadula model can be described by the following:

$$P_1 = \begin{cases} 0 & \text{Human Subject Sensitivity Level} \geq \text{Object Sensitivity Level} \\ 1 & \text{Otherwise} \end{cases}$$

$$P_2 = \begin{cases} 0 & \text{Human Subject Category Set} \supseteq \text{Object Category Set} \\ 1 & \text{Otherwise} \end{cases}$$

This method neglects the different possible levels that can be determined by the MLS model. It is a binary decision. It checks whether a human sensitivity level is appropriate versus an object sensitivity level and an object category set. Different levels of security are assigned to one of these limits (i.e. either extremely high probability or extremely low probability). In real life, this way of assignment is not appropriate, especially in the corporate mobile banking context.

Fuzzy probability has also been considered since fuzzy logic and probability theory were believed to be complementary of each other. Fuzzy Bell-Lapadula Multi-level Security (MLS) was an attempt by IBM and the US Department of Defense to create an adaptive MLS model. It computes a quantified estimate of risk related to a human subject reading an object by quantifying the deviation between the subject's and the object's labels. A risk aggregation measure using a Union operator, fuzzy logic and probability theory was proposed and the method is shown below:

$$P = P_1 + P_2 - P_1 P_2$$

With fuzzy logic, these quantified estimates of risk are adaptable to more risk possibilities. The risk region is further divided into bands of risk in a way that each band is linked to a particular risk mitigation measure. In the present invention, experiments were performed to compare this model with the novel risk aggregation model of the present invention.

EVT-Based Bayesian Estimation

Another approach utilizes what is call a Generalized Pareto Distribution (GPD) to estimate operational risk. An estimate of extreme risk can be based on a combination of expert opinion and historical data. The GPD has certain parameters that define its heavy tail. These parameters are shape, location, and scale. Since data is scarce in the context of operational risk, it is advisable not to use it alone to define the GPD's parameters. Therefore, expert opinion is also necessary. A combination of expert opinion and historical data provides the estimate for these parameters.

Extreme Value Theory (EVT) is another approach which studies the behavior of the very large (i.e. extreme) values of distributions. These large values happen rarely. EVT helps to model the distribution of heavy tails. GPD is suitable for heavy tails, defined by EVT.

The parameters of the tail are defined based on the elicitation of expert opinion. This can be done using one of the two methods: a direct method and an indirect method. In the direct method, the facilitator asks experts to estimate parameter values by specifying ranges of values. The distribution of parameters is based on a direct estimate. In the indirect method, the facilitator asks the experts a set of questions. The questions may take such form as: what was the worst loss event in the period of the past 10 years and of the past 5 years? The answers to these questions are used to define distribution of the parameters of the GPD.

A multi-dimensional joint distribution of GPD parameters is made according to the expert opinions. This distribution is called the prior distribution. The available data is combined with the prior distribution to make the posterior distribution. The combination is made according to Bayesian Theorem. This method uses optimization to find the estimate of the parameters. This is called the Maximum Likelihood. The advantage of this method is that expert opinion enriches the amount of input data for risk estimation. Operational risk data is scarce and insufficient to be used alone. Since this method approaches the problem from two different angles (i.e. expert opinion and data), bias is reduced. One disadvantage is that their work is specific for GPD and cannot be used immediately for other distribution types.

Neuroscience-Inspired Detection of Lying with Mask Smile

In the context of deceptions, it has been shown that deceptions may be committed by using an evasive strategy based on negative correlations among multiple indicators of deceit. It is reasoned that the same psychological tendencies from similar brain mechanisms are used by fraudsters to produce a similar evasive behavior. It was shown that liars attempt to censor or disguise facial expressions by altering their facial expressions. The reason for using facial expressions to disguise is that observers were more accurate in detecting deceit when they viewed the liar's body without the face compared to the cases when they could see the face and body together. This was a surprising result because it was expected that by seeing the face in addition to the body, more information will be provided and liars may be detected more accurately. But, in fact, observing the face causes more inaccurate detections because of the positive correlations assumed by the observer.

This result is due to the success of liars in evading detection by making evasive facial expressions. It has also been shown that liars have implemented this strategy by using a certain kind of smile called "masking smiles". In the context of risk modelling and estimations, the observer's detection can be translated into an aggregated risk value calculated based on two risk factors about deceit. The risk factors in this aggregation process are the facial expression and bodily movements. The phenomenon can be explained by an incorrect aggregation by the observer. In terms of correlations, the observer hypothesizes that the two risk factors regarding deceit are positively correlated. The liar is aware of this hypothesis and abuses the observer's internal mechanism of aggregation of risk of deceit. This comes from the fact that the liar is aware of the aggregation mechanism used by the observer.

In terms of formalism of the present invention, observing the face is risk factor $R_1$=smile. The $R_1$ by itself provides an (inaccurate) estimate of lie detection. The likelihood of lie is estimated to be $P_1$ based on $R_1$. Observation of the body constitutes the second risk factor $R_2$=body. This risk factor helps a detection likelihood of deceit, which is $P_2$ based on $R_2$. The probability of deceit detected by observing both body and face is $P_{1,2}$ which is based on the $(R_1, R_2)$. The $P_2$ is obviously a more accurate deceit than $P_1$ because liars can pretend honesty with smiles on their faces. However, the estimation $P_{1,2}$ is less accurate than $P_2$, although it is a combination that utilizes more information from both observations. The reason is that the correlation between $\rho_{1,2}$ is supposed to be positive because smile is often observed with good intention and agreeableness during usual life experiences. But, in fact, a negative correlation ($\rho_{1,2}>0$) would create a more accurate detection of deceit.

This same strategy maybe used by fraudsters in the context of banking fraud. Since they are aware of the aggregation based on positive correlation, they use a similar evasive strategy. For example, the insider fraudsters can use less monetary amount in the fraud attempts among more frequent transactions to pretend a more benign behavior.

Existing E-Banking Authentication Solutions
Solutions Proposed for m-Banking

Authentication is a security service that is used to verify a claimed identity. It is invoked when a user (via a client run on the user's mobile device) initiates an access request to the bank's server. Normally, the communication channel connecting the client and the server also has confidentiality and integrity protections. Once the client is identified by the server, the client would usually be allowed to start viewing information and/or execute financial related transactions. For certain transactions, the client may be required to obtain additional authorization from another person with a higher authority to approve the transaction requests. It would be desirable for the authentication method(s) used for verifying clients' IDs to be able to adapt to the underlying risk level associated to a transaction, achieving the so called risk-linked security protection.

The Generic Smart Card Authentication

Microsoft has proposed a generic smart card authentication method to support a user, via the use of a smart card, to securely and mutually authenticate with a remote server and establish a secure channel between them over a non-secure network. The user's Public Key Infrastructure (PKI) credential is stored on the smart card and then a Kerberos authentication protocol is used to facilitate the authentication and secure channel establishment tasks. A smart card has an advantage over other types of portable authentication solutions because bank clients are used to smart cards. It can accommodate additional authentication factors (i.e. the cryptographic keys and the smart card PIN). Smart cards could now have Near Field Communication (NFC) technology which tends to be available for newer smart phones.

IBM and UBS AG Zurich Work

IBM and UBS AG Zurich developed a separate trusted device to confirm sensitive transaction data. The device is independent from the output display (i.e. screen) and input keyboard of the client's potentially infected PC. The devices only differ in whether they are physically connected or disconnected (i.e. isolated) from the client's computer. Typically, the transaction details to be confirmed might be sent to the device automatically (e.g. via a Universal Serial Bus (USB) connection or Bluetooth) in the case of a connected-device method. (The Bluetooth solution is named "ZTIC" and was developed by IBM and UBS AG Zurich). The disconnected-device method requires the end user to enter data manually. The confirmation process would then generate a digital signature or a Transaction-dependent Authentication Code (TAC). Similarly, generated confirmation credentials could be retrieved either automatically or manually.

Estimating Authentication Assurance Levels

A work by Li Yao and Ning Zhang from the University of Manchester has worked on deriving authentication assurance levels based on authentication methods used in real time. The work includes the identification of authentication attributes that may affect authentication assurance levels, and structure the attributes into a hierarchical structure based on their interrelationships so that a systematic method could be derived and used to calculate an aggregated assurance level given the authentication methods used. However, this work does not estimate risks in real-time. The work proposed the estimation of an Aggregated Level of Assurance (ALoA) for two inter-relationships: the weakest-linked relationship, and the additive relationship. In the weakest-link relationship, the work estimates the ALoA as the value of the assurance attribute with the lowest LoA. It is reasonable as the ALoA is as good as its lowest value. In an additive relationship, the ALoA value is estimated using a Union operator while taking the weights of the assurance attributes. The weights are derived using an Analytical Hierarchy Process (AHP).

What is Missing?

Based on a current literature research, it is clear that there are weaknesses in the current risk estimation methods. Some methods, such as the IBM/US Department of Defense method, do not consider the dependency relationships among different risk factors. Other methods, such as the Square-Root Formula, consider the dependency relationships, but do not consider extreme risks. Still other methods, such as the Pareto, assume the use of a particular distribution of risks. Finally, some methods are designed without being given due consideration of computational costs.

The Best Way Forward

The present invention develops an inventive risk estimation method that overcomes the weaknesses identified in existing solutions. This method provides the following features: (a) it can aggregate risk factors using probability distributions; (b) it can consider any forms of dependencies among multiple risk factors and extreme risks; and (c) it is efficient so that it can be applied in real-time. In short, this method provides a unique and novel approach in facilitating risk-linked security provisioning, such as risk-linked authentication in a m-banking context.

Mathematics Preliminaries in Understanding the Present Invention

Copula may be useful for modelling dependencies in risk estimation. This disclosure therefore begins by explaining copula theory based on a Sklar theorem. The copula requires an integration of a Probability Distribution Function (PDF) over a multi-dimensional space. Therefore, a discussion about two main traditional integration methods is provided. The first is an exhaustive integration method. The second is an adaptive integration method. Experiments were performed to visualize these two methods. Visualization in this instance helps in understanding how each one works internally.

The Correlation Coefficient

A correlation coefficient is the most commonly used way to quantify the interdependence relationship among various factors. When computing an overall (i.e. aggregated) risk value based on multiple risk factors, the correlation (i.e. the dependency relationship) among multiple risk factors should be considered. The most common measure of dependency among risk factors is called the Pearson's correlation coefficient. The Pearson's correlation is a pairwise correlation, that is, it is defined between two risk factors. Given two risk factors, $R_i$ and $R_j$, their pairwise correlation, is defined by the following formula:

$$\text{Corr}_{i,j} = \frac{\text{Cov}(R_i, R_j)}{\sqrt{\text{Var}(R_i) \times \text{Var}(R_j)}} \qquad (3.1)$$

Here, Cov ($R_i$, $R_j$) is the covariance between $R_i$ and $R_j$.

The covariance is the average value (expected value) of the product of deviation of individual risk factors from their respective means. The Cov($R_i$, $R_j$) is simply defined by Cov($R_i$, $R_j$)=E[($R_i$-μ$R_i$)×($R_j$-μ$R_j$)], where E[X] is the average (i.e. the expected value of) of the random variable X.

Note that any statistical quantity (such as mean, variance, covariance and correlation) has two slightly different forms of equations; an equation for defining the quantity based on the distributions that are defined in the probability theory, and an equation for calculating the statistical estimation of that quantity in case of a small number of given data points. When estimating these quantities, the average is calculated based on a limited number of historical data points. As will be seen, the difference between the definition of the expected value and calculating the average value makes a small difference in calculating Cov and Var.

To highlight expected value (or average) based on probability distributions with numerical averaging; the notation μ (an estimation from Statistics) is utilized rather than E (from Probability Theory). For example, $\mu_{R_i}$ is a statistical estimation of e[$R_i$], which is the calculation necessary for the average of the random variable $R_j$. It is calculated based on data points or historical data ($R_i$)$_k$ (the data point k of the random variable $R_i$ associated with the ith risk factor) is the case where N points are available (k=1, 2, 3 . . . , N. Note that N in this sense should not be confused with n, the number of risk factors). Although the formulas for averaging the marginal random variables are similar, calculating the correct estimation of the Cov and Var has subtle differences (e.g. one divides by N−1 rather than N). When the number of samples N is small, this subtle difference becomes important. This difference is called the bias. To calculate an unbiased estimation of these quantities, one uses the following formula for estimation of the covariance and variance of any random variables for which a set of samples if given:

$$\text{Cov}(X, Y) = \frac{1}{N-1} \sum_{k=1}^{N} (x_k - \mu_x) \times (y_k - \mu_y) \qquad (3.2)$$

$$\text{Var}(X) = \frac{1}{N-1} \sum_{k=1}^{N} (x_k - \mu_x)^2 \qquad (3.3)$$

Here, $x_k$ means the sample number k from a random variable X, and $\mu_x$ is the estimate of the average of the distribution of the random variable X. The variables X and Y can be any of the random variables associated with risk factors $R_i$, i=1, 2, 3, . . . , n. As a result, the following formula is used to estimate the correlation based on expanding the Equation 3.1. Note that the difference between Equations 3.1 and 3.4 is that the latter is used in case of limited sample size (e.g. when a limited amount of historical data in available):

$$\text{Corr}_{R_i, R_j} = \frac{\frac{1}{N-1} \sum_{k=1}^{N} \left((R_i)_k - \mu_{(R_i)}\right) \times \left((R_j)_k - \mu_{(R_j)}\right)}{\sqrt{\frac{1}{N-1} \sum_{k=1}^{N} (x_k - \mu_x)^2 \times \frac{1}{N-1} \sum_{k=1}^{N} (x_k - \mu_x)^2}} \qquad (3.4)$$

A geometric interpretation of the covariance is based on where the data points lie with respect to the mean of each variable. The covariance is positive when both variables have a tendency to lie on the same side of their means, and negative otherwise. The covariance is zero in three cases: (1) when one of the variables has a zero variance (i.e. is constant and is not random); (2) when the two variables are independent, in which case, the variations may be equally positive or equally negative regardless of the other variables; (3) in complicated cases where the variables are not independent of each other, but the Pearson correlation coefficient remains zero. It means that the Pearson correlation may not be powerful enough to capture (detect) certain cases of interdependence of variables. Copulas are powerful in capturing all types of correlations and dependencies among multiple risk factors if the correct type of copula is used.

The maximum value of a covariance is the variance of the bigger variables because the maximum dependency of a variable is with itself. For this reason, covariance is divided by the variances in above equations and the correlation coefficient bounded between [−1, 1].

The sign of the covariance (and correlation) indicates when two risk factors have the tendency to vary in the same or opposite direction. For example, when a risk factor is increased, the other one is decreased, and vice versa.

Copula Theory

Generally, the Latin term copula means to couple or join. The idea of copula is based on the Sklar Theorem, which proves the existence of a copula function C. This copula function C effectively describes the dependence structure between multiple continuous random variables. The copula function C can be combined with any given set of marginal distributions to derive the whole joint distribution between those random variables by applying the desired dependence structure between them. The function C takes the marginal cumulative distribution functions $\{F_i\}$ as arguments and yields the joint multivariate cumulative distribution function F.

The Sklar theorem states that any multidimensional distribution can be described by a copula between the marginal distributions. In other words, for any arbitrarily complex multidimensional distribution, there is a copula that describes the correlation structure. Importantly, it states that the copula function is unique for a given joint distribution. However, more than one multi-dimensional distribution may have the same copula. In this case, one considers a similar dependency structure in both multi-dimensional distributions. As a result, it can be seen that the copula of a multi-dimensional distribution as the essence of their dependency structure. Unlike a correlation coefficient which is another mathematical object which describes dependency structures, a copula can model all the skews and non-linear dependency structures of any arbitrarily dependence structure to reproduce arbitrarily complicated joint distribution from the marginal distributions. The copula function therefore is defined across the entire joint domains of the marginal distributions. Copula can be used to generate multidimensional distributions from 1-dimensional distributions. In short, copula is a function for effective description of the dependence structure between marginal variables.

Before describing the Sklar theorem and a proof, two mathematical concepts need to be considered: the Quantile Transform and the Distributional Transform defined for 1-dimensional distributions which are defined on a given random distribution.

Distributional Transform

The Distributional Transform, when applied to a random variable (that is 1-dimensional and continuous), generates a new random variable that follows a uniform distribution on [0, 1]. This transformation is then applied to a marginal quantile variable.

$$F(x):=Pr(X \leq x), \forall x \in \mathbb{R} \tag{3.5}$$

The functional $F(x)$ is basically the CDF of the given distribution. Note that this is a simple case where the distributions are continuous and smooth. If there is a discontinuity in the CDF, the function has a more complicated form $F(x, \lambda):=Pr(X<x)+\lambda Pr(X=x)$.

The Quantile Transform

The Quantile Transform is a transform that when applied to the random variable U, uniformly distributed over [0, 1], transforms the values of U into the desired distribution. It can be used to generate random numbers according to any arbitrary 1-dimensional distribution. The Quantile Transform therefore functions in the opposite direction of, and serves as the reverse of, the Distributional Transform. In the context of continuous and smooth distributions, the Quantile Transform is simply the inverse function of the CDF function F, and is shown as $F^{-1}$.

$$F^{-1}(u):=x, \text{ where } F(x)=u, X \in \mathbb{R} \tag{3.6}$$

The more general case which is used in mathematical texts, $F^{-1}(u):=\inf\{x \in R: F(x) \geq u\}$ also works for CDF with discontinuities.

The Sklar Theorem

According to the Sklar theorem, a copula function can be defined based on any multi-dimensional probability space. Let F be an n-dimensional distribution function (CDF) with marginal distributions described by CDF functions $\{F_i\}$, i=1, 2, 3, . . . , n then there exists a copula C, an n-dimensional distribution function on $[0, 1]^n$ with uniform marginals, such that $$F(x_1, \ldots, x_n) = C(F_1(x_1), \ldots, F_n(x_n)). \tag{3.7}$$

Proof: A short and intuitive proof is provided by Ruschendorf which is a proof by construction. To begin, the proof is limited to continuous and smooth distributions defined on R. Then the function C is defined (constructed) by combining the function F with the Distributional Transform of all marginal distributions. Now, suppose that the n-dimensional random vector X follows the distribution F, which is a continuous joint distribution function over $R^n$. $X=(X_1 \ldots X_n) \sim F$. Now building the distribution U by applying the Distributional Transforms $F_i$ on each $X_i$: In this case, the new random variable U is a sequence of uniform random variables $\{U_i\}$. Note that these random variables are not independent. They have the essence of the dependence structure in them. The joint CDF of these random variables is the copula.

$$C(u_1, u_2, \ldots, u_n) = Pr(U_1 \leq u_1, \ldots, U_n \leq u_n) \tag{3.8}$$

Note that $F^{-1}(U_i) = _i X_i$. Now, it can be proved that the original distribution F can be constructed from combining the copula C with the marginal distributions $F_i$:

$$\begin{aligned} F(x_1, \ldots, x_n) &= Pr(X_1 \leq x_1, \ldots, X_n \leq x_n) & (3.9) \\ &= Pr(F_1^{-1}(U_1) \leq x_1, \ldots, F_n^{-1}(U_n) \leq x_n) & (3.10) \\ &= Pr(U_1 \leq F_1(x_1), \ldots, U_n \leq F_n(x_n)) & (3.11) \\ &= C(F_1(x_1), \ldots, F_n(x_n)). & (3.12) \end{aligned}$$

Using the fact that since the function F (the CDF function) is monotonic $F_1^{-1}(U_i) \leq x_i \Leftrightarrow U_i \leq F_i(x_i)$, this proved that at any given quantile $x_1, x_2, \ldots, x_n$, one can calculate $F(x_1, \ldots, x_n)$ using C and marginals $F_i$.

According to this theorem, the overall calculations of CDF is as follows: First apply the marginal CDF on each of the quantiles $x_i$ to get the $u_i = F_i(x_i)$ for each i, and then calculate the copula function C on these $u_i$: $C(u_1, u_2, \ldots, u_n)$.

Note that the Sklar theorem describes the distributions in terms of their CDF functions. To derive the Probability Distribution Function (PDF), one needs to apply calculus and apply the first derivative of the CDFs to derive the PDF.

Figure 2A:
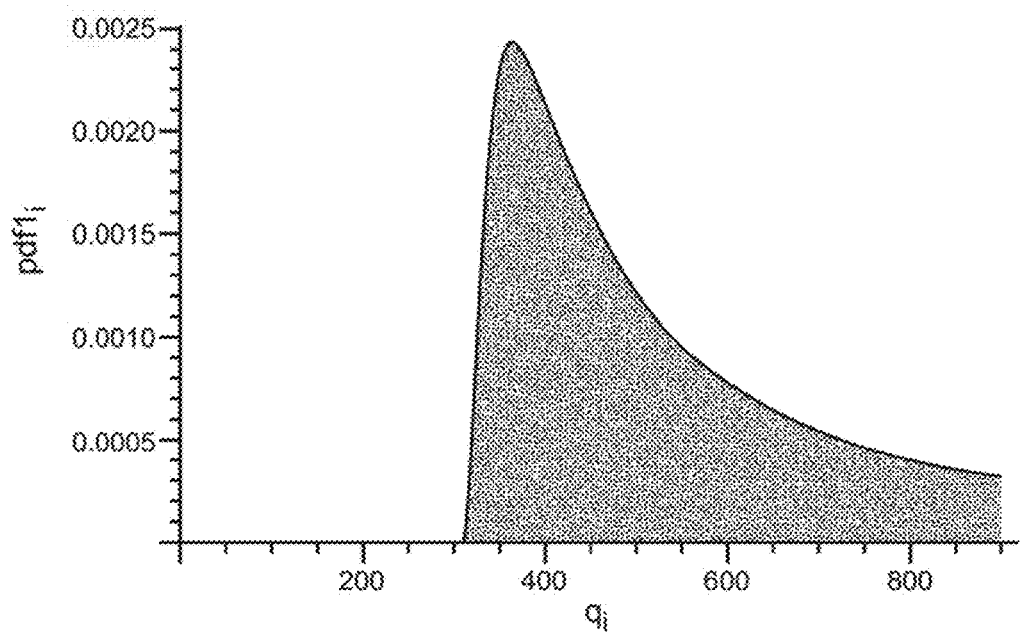
FIGS. 2A-2C are graphical illustrations of a Levy distribution with location parameter µ=300 (FIG. 2A), a Levy distribution with µ=77 (FIG. 2B), and a t-copula that joins distribution A with B (FIG. 2C), according to the present invention.
Figure 2B:
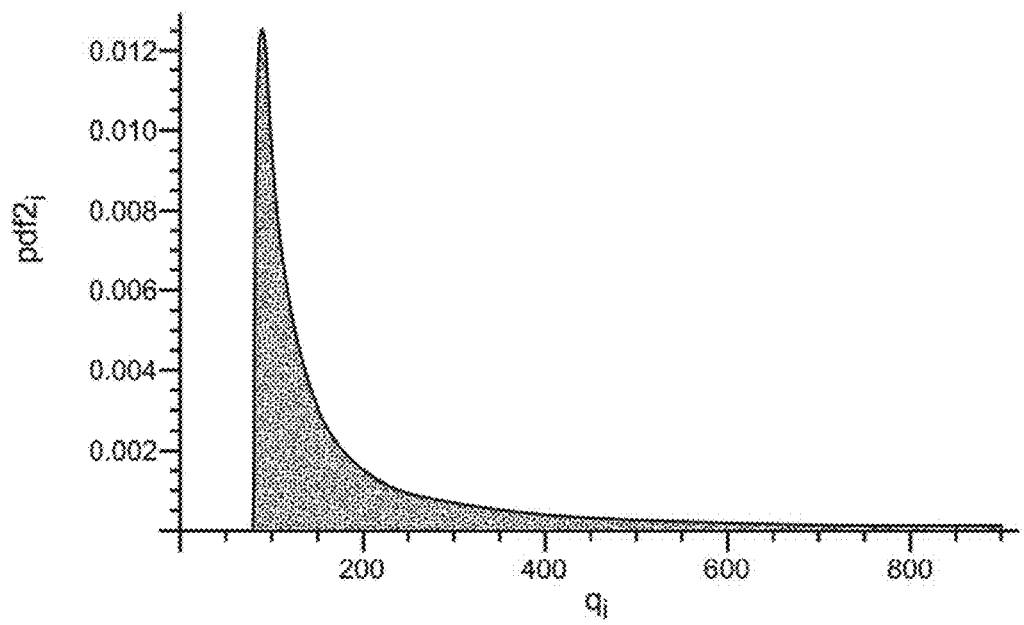
Figure 2C:
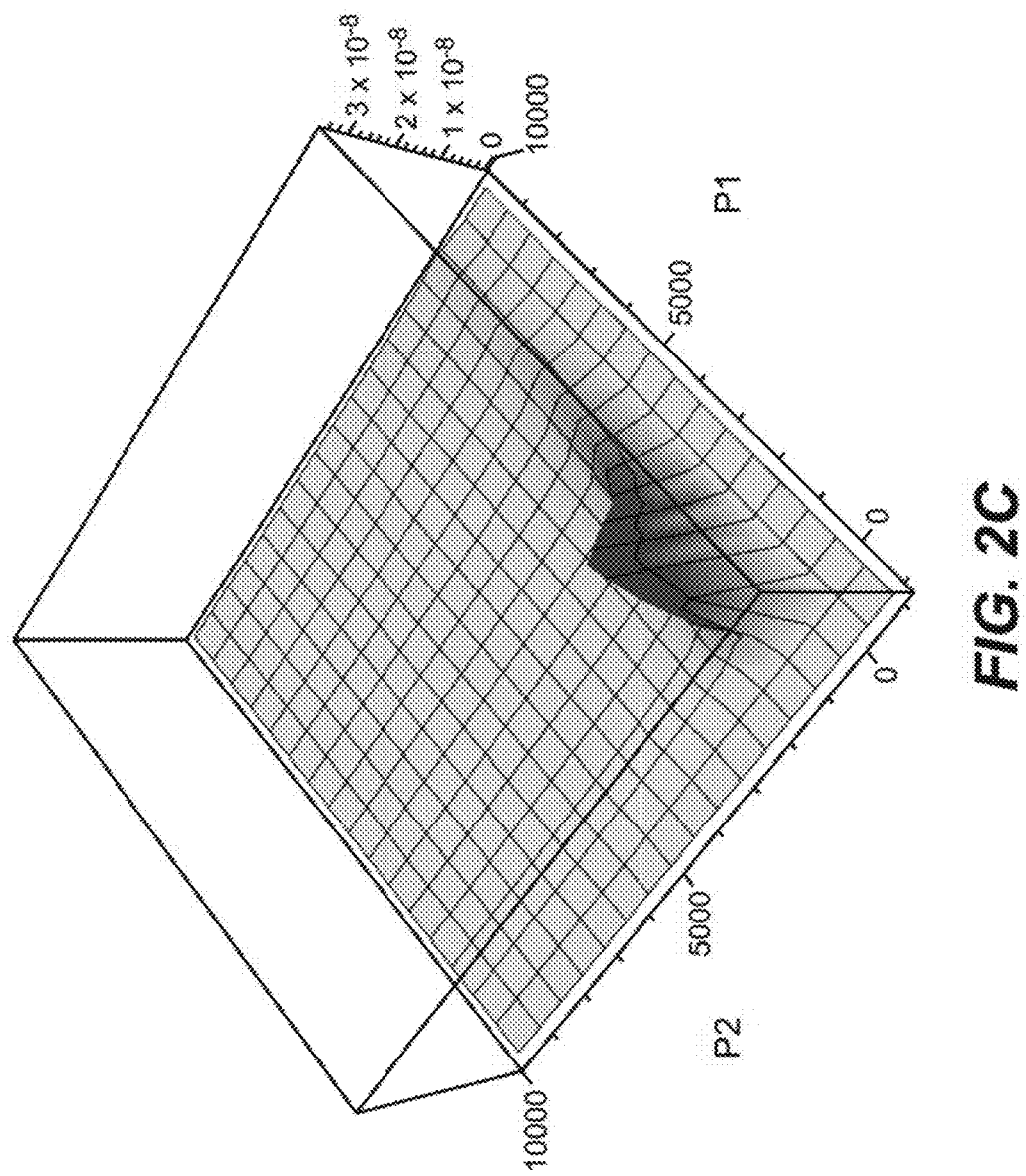

The copula can accept any set of marginal distributions to form a multidimensional distribution. FIGS. 2A-2C use two individual Levy distributions as marginal distributions. Their joint distribution is formed in a two-dimensional copula of type t-copula. The Probability Distribution Function (PDF) shows how one of the marginals has a heavier tail compared to the other marginal.

Integration on Elliptical Distributions

The elliptical copulas require the integration over a multi-dimensional density function. The CDF of copula is defined by:

$$\text{CDF}(\vec{x}) = \int_0^{q_1} \int_0^{q_2} \ldots \int_0^{q_n} \text{PDF}_x(x_1, x_2, \ldots, x_i) \, dx_1 dx_2 \ldots dx_n \tag{3.13}$$

Similarly, in case of survival of copulas, the integration is defined by:

$$\text{Survival}(\vec{x}) = \int_{q_1}^{1} \int_{q_2}^{1} \ldots \int_{q_n}^{1} \text{PDF}_x(x_1, x_2, \ldots, x_i) \, dx_1 dx_2 \ldots dx_n \tag{3.14}$$

The copula can be calculated according to Sklar theorem by:

$$\text{Copula}_p^K(p_1, p_2, \ldots, p_n) = \text{CDF}(Q_1(x_1), (Q_2(x_2), \ldots, Q_n(x_i)) \tag{3.15}$$

Here, $Q_i(x_i)$ is the quantile function which is defined as the inverse of the Cumulative Distribution Function CDF of the marginal probability distribution function ($p_i$), i.e. $Q_i(x_i)=CDF^{-1}(p_i)$. The details of how the CDF copula and the survival copula can be used for risk estimation will be explained later.

The CDF of the Gaussian copula utilizes the Multivariate Normal (MVN) distribution function which is defined by:

$$\Phi(q', q, \Sigma) = \frac{1}{\sqrt{|\Sigma|(2\pi)^m}} \int_{q'_1}^{q_1} \int_{q'_2}^{q_2} \cdots \int_{q'_m}^{q_m} e^{-\frac{1}{2}x^t \Sigma^{-1} x} dx. \quad (3.16)$$

where $a_j$ and $b_j$ are the bounds of the integration. Another common elliptical copula is the t-copula. It requires the numerical computation of the multivariate t (MVT) distribution function which is defined by:

$$T(q', q, \Sigma, v) = \frac{\Gamma\left(\frac{v+m}{2}\right)}{\Gamma\left(\frac{v}{2}\right)\sqrt{|\Sigma|(v\pi)^m}} \int_{q'_1}^{q_1} \int_{q'_2}^{q_2} \cdots \int_{q'_m}^{q_m} \quad (3.17)$$

$$\left(1 + \frac{x^t \Sigma^{-1} x}{v}\right)^{-\frac{v+m}{2}} dx$$

$$\equiv \frac{2^{1-\frac{v}{2}}}{\Gamma\left(\frac{v}{2}\right)} \int_0^\infty s^{v-1} e^{-\frac{x^2}{2}} \Phi\left(\frac{sq'}{\sqrt{v}}, \frac{sq}{\sqrt{v}}, \Sigma\right) ds. \quad (3.18)$$

In the above two definitions $x=(x_1, x_2, \ldots, x_m)^t$, the mean is assumed to be zero, $\mu=x_0$, and $x^t\Sigma^{-1}x$ is the Mahalanobis distance from $\theta$ to $\mu$. The function $\phi$ is the CDF of the MVN. The $|\Sigma|$ is the determinant of $\Sigma$ where $\Sigma$ is an m×m symmetric positive definite covariance matrix and $-\infty \leq q'_i < q_i \leq \infty$, for $i=1, \ldots, m$.

The CDF of a t distribution can be defined in terms of the MVN CDF (the function $\phi()$) based on Equation 3.18 by applying another integration to the MVN CDF. This integration is over a new variable s. The variable s changes the integrand and changes the parameters of the nested MVN integration. The parameter v, the degrees of freedom, is applied within this process. The variable s is a random variable that defines a distribution $X_y$. This distribution is explained later.

Exhaustive Integration Methods

An Overview about Exhaustive Integration Methods

Here it is explained why the integration calculation using the exhaustive integration methods is not practical for larger number of dimensions. The reason that makes the calculations difficult is that each evaluation of the copula requires calculating the multidimensional CDF. According to Equation 3.13, the calculation requires multi-dimensional nested integration over the PDF (i.e. the integrand). The exhaustive integration approach evaluates the integrand function at all the possible points within the multidimensional space bounded by the quantiles. When a fixed step size is used, the points at which the PDF is evaluated form a multidimensional grid. This is an exhaustive Monte Carlo approach. The goal of generating the Monte Carlo points is to fill up the space inside the PDF. Once the points are generated, they can be used to estimate the CDF.

The number of points is increased quickly as the number of dimensions increases. For example, an integration over a two dimensional PDF which requires 1,000 Monte Carlo points would require 10,000 Monte Carlo points over a three dimensional PDF with a step size of k=10. The exponential growth is due to the multiplication of the number of Monte Carlo points from the previous dimensions by the value of the step size of the next dimension. A new plane of points is generated in the third dimension for every set of points that form a line between the first and the second dimension. This method is time-consuming. As the number of dimensions increase slightly (e.g. from 4 to 6 dimensions), the complexity of the calculations grows exponentially and cannot be computed in real-time. Therefore, the performance of this method is impractical for real-world use (e.g. mobile financial systems).

Complexity of the Exhaustive Integration Method

To have an estimate of the computational complexity of the exhaustive integration algorithm, it is beneficial to calculate the number of Floating-point Operations per Second (FLOPS) required for the CDF calculation. One assumes the step size at each dimension is a fixed number and is given (i.e. $dx_1, dx_2, \ldots, dx_n$). The algorithmic complexity is valid as the step size is made larger or smaller. To calculate the computational complexity in terms of FLOPS, one needs to analyze the pseudo code of the exhaustive integration method. The calculation of the FLOPS requires evaluating the number of floating points at each line, and then multiplying it by the number of repeats of that line of code. At the end, these FLOPS are summed up.

In the case where the number of dimensions is m, and the number of steps at each dimensions is k, the total number of floating point operations is $m^3/3+1+k^m[m+2 \ m^2+m-1+2+1]+3+m+1+m+1$ (FLOPS), that is, $k^m \times [2m^2+2m+2]+m^3/3+2m+6$. This number is larger than $k^m \times (2m^2+2m+2)$, i.e. $>2m^2 \times k^m \in O(2m^2 k^m)$. This means that the number of operations grows exponentially in terms of m. For example, in case of m=10 dimensions and step size of k=20, then the number of operations is 2.27e+15 FLOPS, (i.e. about 2,000,000,000,000,000 FLOPS).

The calculation time of each FLOPS can be estimated. The running-time required for this number of floating point operations on a dual-core 2020M CPU (2.40 GHz), which is claimed to operate at 2.21 Giga FLOPS per core, may take approximately 1 million seconds, that is 11.9 days. It was calculated by performing the following arithmetic operations ((2.27e+15)/(2.21e+9))/(24*60*60). Even when parallel computing is used (e.g., 1,000 processors), the complexity will be evaluated to 2,000,000,000,000 FLOPS which is still computationally heavy.

Algorithm 3.1 The exhaustive integration method uses a nested approach to solve the CDF of an MVN distribution.

```
function EXHAUSTIVECDF( q, ρ )
Input: q ∈ ℝ^m, ρ ∈ ℝ^{m×m}
    C ← Cholesky(ρ)                    ▷ m^3/3
    s ← 0                              ▷ 1
    q'_i = −1000, ∀i = 1, 2, . . . , m    ▷ Lower bound of integration
```

-continued

Algorithm 3.1 The exhaustive integration method uses a nested approach to solve the CDF of an MVN distribution.

```
for x₁ ← q'₁ to q₁ step dx₁ do          ▷ from a very large negative number.
    for x₂ ← q'₂ to q₂ step dx₂ do      ▷ k steps
        ...
        for xₙ ← q'ₘ to qₘ step dxₘ do
            X ← [x₁, x₂, ···, xₙ]ᵀ;           ▷ kᵐ × m
            z ← (Xᵀ × C) × X;                 ▷ k × [(2m − 1) × m + (2m − 1)]
            PDF ← exp(−1/2z);                 ▷ kᵐ × 2
            s ← s + PDF                       ▷ kᵐ × 1
        end for
    end for
end for
z₀ ← ((2π)⁻ᵏ × det(C))^(1/2)             ▷ 3 + m
d ← 1                                     ▷ 1
for i=1:m do
    d ← d × dxᵢ                           ▷ m × 1
end for
return P ← z₀ × s × d
end function
```

Adaptive Integration Methods

An Overview about Adaptive Integration Methods

Berntsen, Espelid and Genz jointly developed an algorithm which uses a sub region adaptive multiple integration method for numerical integration. The merit of this type of algorithm is that they focus on the integrand evaluations in the sub regions and along the directions where the integrand faces the most variations. It evaluates a vector of integrand functions over a hyper-rectangular region. They developed a FORTRAN implementation of the algorithm. The double precision implementation is called DCUHRE: a double precision adaptive cubature routine for hyper-rectangular region of integration. The single precision implementation is called SCUHRE where the S replaces the D in the acronym.

This algorithm starts with using a low degree (i.e. basic) integration rule for the integration over the whole region. It frequently tests the error estimate E. If it is over a specified threshold, the initial integration region is divided in half. The slicing is made along the coordinate axis where the integrand incurs the largest change. Next, the basic rule is used to examine the two new sub regions. If the total E is still undesirable, the sub region with largest error is divided in half. The algorithm continues to subdivide the sub region with largest estimated error until one of two conditions are met. The first condition is that the total of all of the sub region errors is less than E. The second condition is that the limit (i.e., the specified total number of integrand evaluations) has finished.

Complexity of Adaptive Algorithm

Even though the numerical evaluations are fewer than the exhaustive one, it is still computationally heavy. The adaptive numerical integration algorithms use an asymptotically similar number of FLOPS as the exhaustive method. The lower complexity of the adaptive strategy is not useful enough for high dimensions (i.e. larger than 5). The fact that the running time grows exponentially with the number of dimensions m, the complexity will be the same as the exhaustive algorithm. A possible solution is to distribute the computation of the sub regions with higher difficulties among the parallel processor. This may allow one to achieve a significant speedup. However, this would require an implementation of complicated message passing protocols which may increase communication overheads.

Visualizing Exhaustive Vs. Adaptive Methods

In order to compare the exhaustive and the adaptive integration methods, two experiments were performed. The first experiment visualizes the exhaustive integration method. The second experiment visualizes the adaptive integration method. Both experiments use a copula as the type of multivariate PDF and is performed on Mathematica 8. The first experiment uses the built-in function (NIntegrate [PDF[CopulaDistribution r["Multinormal"]], Method→ "Monte Carlo"]. This integration method uses an exhaustive Monte Carlo strategy as shown in FIG. 3A. This method attempts to generate as many points as possible to find the region where the PDF is located. The location of the PDF is supposed to be inside the smaller box on the corner according to the parameters of the copula. The experiments show that the exhaustive method failed to converge with a reasonable accuracy. An insufficient number of points were generated inside the region of interest. In other words, it could not find the region of interest. The method terminated automatically without being able to find the solution.

Figure 3B:
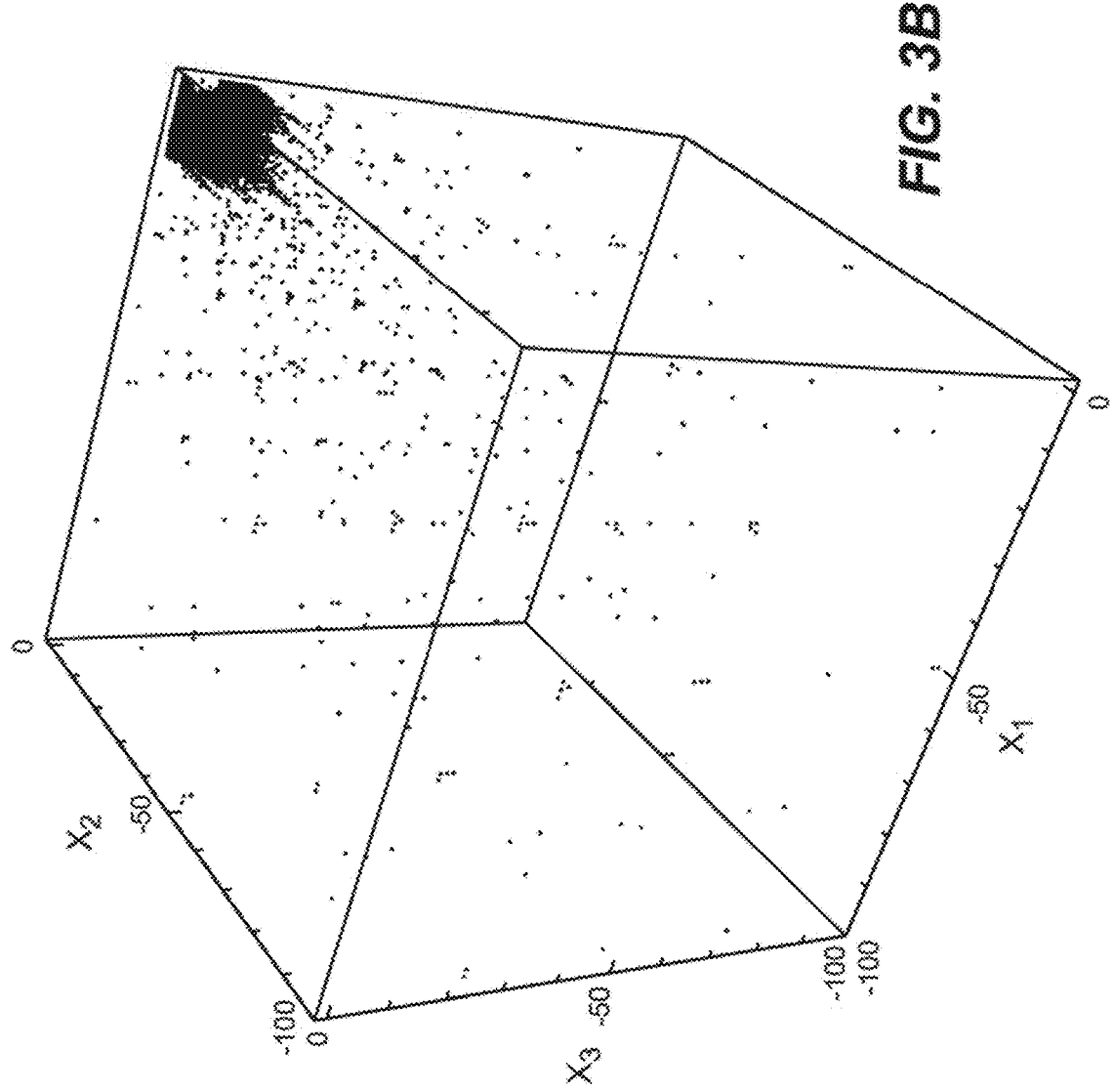
Figure 3C:
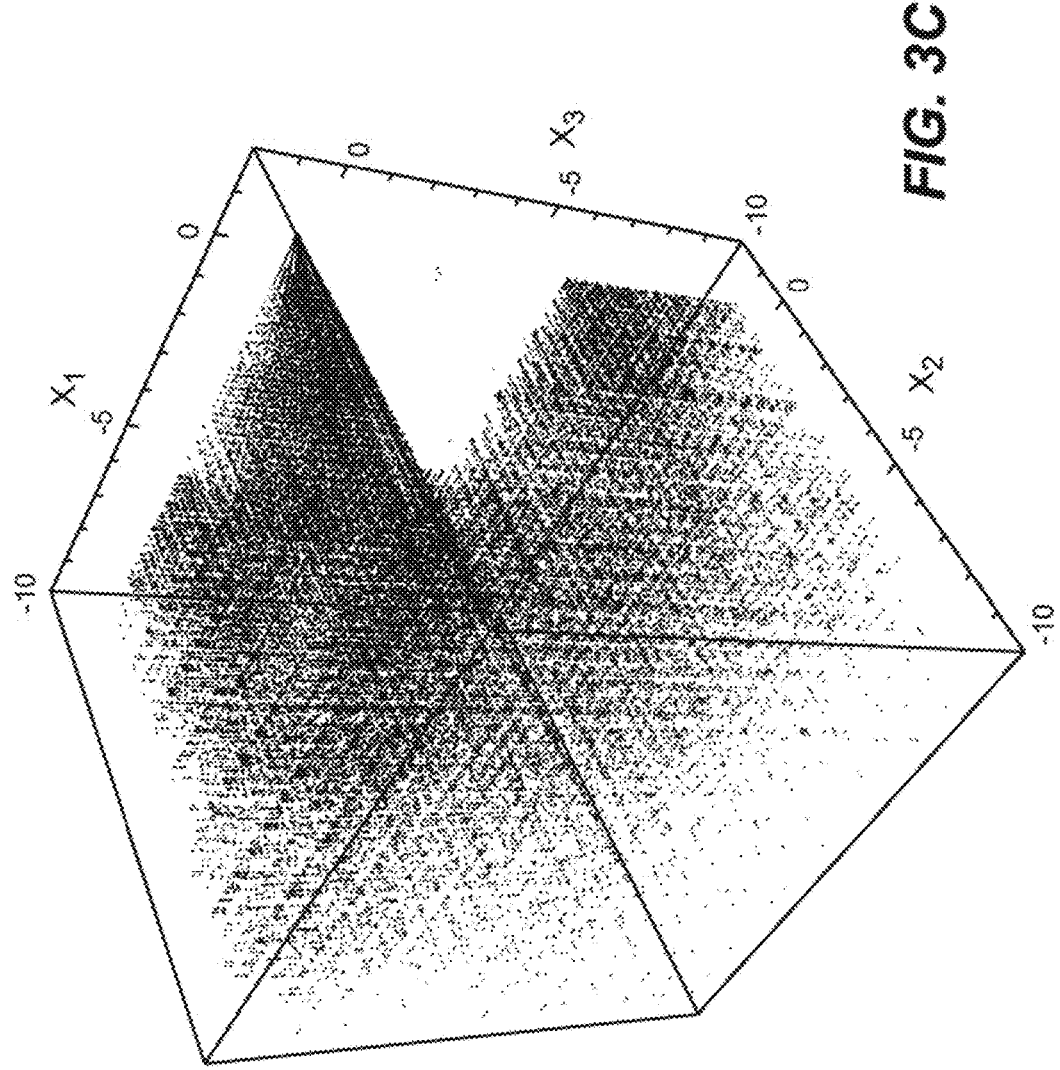

The second experiment uses (CDF[CopulaDistribution ["Multinormal"]]) which is also a built-in function. It is an implementation of the CDF of a Gaussian copula. It uses the adaptive integration method as its strategy as shown in FIG. 3B and an enlargement of the same figure in FIG. 3C. The adaptive integration method adapts the step sizes according to the density of the integrand (i.e. PDF). It is more intelligent than the exhaustive integration method as is generates a fewer number of points in total. FIG. 3C shows how the points are generated more frequently within the region of the PDF and are generated less frequently as the distance from the PDF is increased. The points generate a three-dimensional footprint of the PDF. Some points near infinity were not used in the evaluation of the integrand. However, they were useful in the adaptive strategy to direct the generation of points to finding the region of interest.

In the adaptive methods, the integrand is evaluated using a fewer number of points. When the probability value of a sampling point is below a certain low threshold (e.g. where the PDF is effectively zero), it means that is does not lie in the main part of the distribution function. The method searches for the regions where the points have more impact on the value of the integration. Once the density of the distribution is detected, the step size will be as small as possible to achieve the accuracy desired from the method.

The step size will change according to the local properties of the PDF (i.e. its density patterns). Hence, the density of the evaluation points will not be uniform across the multidimensional space within the boundaries of integration in the exhaustive integration method. However, there are still a large number of points that get wasted as the method is searching for the region of interest.

The adaptive integration method also faces a problem. Even when an adaptive strategy is used to adapt the step sizes, it still takes a long time to calculate. It does not fully base the generation of points according to a prior knowledge about the geometric structure of the PDF function across the integration space. In higher dimensions, there will be an exponential growth in the number of points that have to be generated without being used in the integration over the core cubature of the PDF. Therefore, the calculations will still take a long time. The accuracies would drop when the running time is constrained to an upper limit. The reason is that the sampling points may not be chosen effectively.

Copula-Based Risk Estimation

Risk Factors

The present invention has identified and analyzed three common risk factors in corporate m-banking transactions that are dependent of each other: geographic location risk, fraud patterns (amount and frequency), and financial statements fraud risk.

Geographic Location Risk

Differential geographic locations may experience different types of risk factors. Risky geographic locations may be identified as follows: (1) countries identified to be supporting terrorism, (2) non-cooperative countries in combating moneylaundering crimes as identified by the Financial Action Task Force (FATF), (3) countries recognized to be "of primary money laundering concern" by the Secretary of the Treasury, and have special measures imposed on them by the Secretary of the Treasury through the Financial Crimes Enforcement Network (FinCEN), (4) offshore financial centers (OFCs) as identified by the U.S. Department of State, (5) local (i.e. domestic) geographic regions that were designated as high risk according to High Intensity Drug Trafficking Areas (HIDTAs) and High Intensity Financial Crime Areas (HIFCAs) and (6) countries identified as blacklisted by each bank as high-risk due to negative prior experiences or other risk factors (e.g., legal considerations, or allegations of official corruption), etc.

The HIDTAs are regularly reported by the HIDTA Program from the Executive Office of the President and the Office of National Drug Control Policy. The HIFCAs designate certain areas as high-risk areas in terms of money laundering and related financial related crimes. Fraudsters who reside in risky locations may try to commit financial fraud to launder or gain illegal profits using two risk factors: Fraud patterns and financial statement fraud.

Fraud Patterns: Amount and Frequency

Transaction Amount Risk

Transaction amount risk evaluates the risk based upon the monetary amount of a transaction. It compares the amount with the trend of the company's historical transfer amounts and the norms of the business sector to which the company belongs. The more the transaction amount deviates from the historical trend of previous transfers, the riskier the transaction is considered. However, an increase in the transaction amount may still be legitimate as the company might be expanding its operations and making larger business deals. So the growth value predicted based upon the historical trend and performance has to be factored into the risk estimation method. This helps to determine a more appropriate risk value.

Transaction Frequency Risk

Abnormal frequency of transactions may indicate a fraud pattern. The fraudster's goal is to make as many fraudulent transfers as possible. The higher the frequency of fraudulent transfers, the more amounts can be stolen in total. More cautious fraudsters may try to adopt evasive fraud patterns to get away with the fraud undetected. Evasive fraud patterns will be discussed in more detail later.

Financial Statements Fraud Risk

Financial statements fraud risk can be influenced by four risk factors: the opportunity risk, the pressure risk, the rationalization risk (i.e. attitude risk) and company financial performance. The literature indicates the existence of correlation among these factors.

The opportunity risk factor can be magnified by weak internal control. The greater the opportunity that is available to commit a financial crime, the riskier the transaction becomes. External fraudsters can obtain information about the existing loopholes in internal controls of the targeted financial institution's corporate m-banking system through collaborations with internal fraudsters. Internal fraudsters could be bank employees who have a certain level of trust from their employer bank. They later take advantage of the opportunity to spot weaknesses in internal control to perpetrate financial fraud. For instance, the fraudulent purpose might be to launder money out of corporate banking accounts. Fraudsters try to exploit loopholes in the bank's corp-m-banking system. Similarly, an internal fraudster could be an employee of the corporate client.

The pressure risk factor arises when an employee is pressurized to commit a fraud for financial gain. For example, by fear of losing their jobs due to the expectation that the company might soon go out of business, a pressure risk may be triggered. This fear may aggravate the pressure risk which may simultaneously trigger the rationalization risk. The fraudster justifies the illegitimate behavior by rationalization. The interaction of these risk factors can encourage the employee to commit a financial crime by collaborating with a cyber attacker.

A company's financial performance helps predicting the company's future financial health. One such financial performance indicator is defined by a profitability ratio. This ratio may be classified into a risk factor tree. Some of the profitability risk factors are the return on assets (ROA), return on equity (ROE), and the profit margin ratio. These may be called sub-risk factors. These sub-risk factors tend to trigger more fraud risk as they decline because the lower profitability may trigger fear in the mind of the fraudster. The correlations between fraud risk factors and the financial risk factors exist and have been reported. Since financial statement frauds tend to occur more often within riskier geographic locations, there is a dependency relationship between these three risk factors. Certain simultaneous behaviors by a suspected insider could be mapped to an intended fraud type as will be discussed later.

The Copula-Risk Estimation Dependency v1 (C-REDv1) Method

The main purpose of the C-REDv1 is to take into account the dependency relationships among the fraud risk factors. An individual (i.e. marginal fraud risk value) is the risk associated with each individual fraud risk factor. It is quantified based on the concept of Value-at-Risk (VaR), defined by the Equation:

$$\text{VaR}_\alpha(S) = \inf\{x \in \mathbb{R} : Pr(S > x) \le 1 - \alpha\}. \tag{4.1}$$

For a given risk factor S, $\text{VaR}_\alpha(S)$ quantifies a quantile value for each individual risk factor based on the given level of risk. VaR is calculated based on a given $\alpha$, the estimate of risk. Conversely, C-REDv1 takes into account $\alpha$, the estimate of risk, based on a known VaR. In C-REDv1, the measure of quantification of risk for each individual risk factor i is the value of $\alpha_i$ associated with the details known about the individual risk factor according to a given corporate-m-banking transaction.

Since the random variables, associated with the risk factors, and their associated probability distribution functions are continuous, VaR can be expressed in a simpler form:

$$\text{VaR}_\alpha(S) = \{x \in \mathbb{R} : Pr(S \leq x) = \alpha\}. \tag{4.2}$$

where the severity is denoted by the random variable $S_i$ of the risk factor i. The measure of quantification or risk for each individual fraud risk factor is the reverse of this function, that is $P_i(x) = \text{VaR}_\alpha^{-1}(S) = Pr(S \leq x)$, where x and $P_i(x)$ are analogous to the Value-at-Risk and $\alpha$ respectively. Based on the latter quantity, one can define the individual fraud risk value associated with the fraud risk factor i as the following quantity:

$$P_i(x_i) = Pr(S_i \leq x_i | c_1, \ldots c_m). \tag{4.3}$$

Here, $x_1, x_2, \ldots x_n$ are the attributes of a corp-m-banking transaction each associated with an individual fraud risk factor i (i.e. risk factor of type i). The conditions $c_1, c_2, \ldots c_m$ can also be determined according to the details of the transaction of the corp-m-banking client (i.e. the contextual information).

The risk quantity defined in Equation 4.3 is the marginal fraud risk value for a given individual fraud risk factor. It can be expressed as a marginal cumulative probability distribution function. This quantity can be calculated by integrating the probability density function $f_i$ associated with the severity.

$$P_i(x_i) = Pr(S_i \leq x_i) = \int_0^{x_i} f_i(x)dx. \tag{4.4}$$

$$f_i(x) = \lim_{\Delta x \to 0} \frac{Pr(x \leq S_i < x + \Delta x | c_1, \ldots c_m)}{\Delta x}. \tag{4.5}$$

The marginal risk $P_i(x_i)$ represents the probability of a fraud happening within a certain range of the severity of a random variable associated with the risk factor i, for example, $[0, x_i]$.

To aggregate the risk values, the subsets of the severity of individual risk factors associated with the possibility of fraud should be combined using set union. For this purpose, the union of the n random events $S_i \leq x_i$ is taken into account.

C-REDv1 aggregates the values of the individual risk factors using the union of the risk severities:

$$P_{Aggr.}^{dep.} = Pr\left(\bigcup_{i=1}^{n} S_i \leq x_i \middle| C\right). \tag{4.6}$$

The term C is used to indicate the combination of conditions. As mentioned before, $S_i$, the values of severities of different risk types are of different physical units (e.g., monetary amount, location, distance, and time, etc.). Hence, they cannot be aggregated by simply adding the value of the severity random variables as done in other approaches.

Modelling Dependencies

In calculating the aggregated risk, the dependence between the individual fraud risk factors should to be taken into account. Each of the individual fraud risk factors being aggregated may involve in a complex dependency interaction with several other individual fraud risk factors. These interactions are characterized by a correlation structure. In the C-REDv1, the correlation structure is a matrix of the pairwise correlations of the individual risk factors (i.e. the correlation matrix $\rho$). The pairwise correlations between the risk factors can be calculated based on historical data. The C-REDv1 uses copulas originated from probability theory to take into account the correlation structure among the individual fraud risk factors. In probability theory, a copula is used to define the joint probability distribution function of several random variables based on their marginal probabilities and their copula kernel and correlation matrix. The use of parametric copulas (e.g. t-copula) in conjunction with parametric marginal distributions for each of the severities allows defining a parametric multi-dimensional joint probability distribution with a number of parameters (i.e. degrees of freedom in t-copula).

C-REDv1 employs parametric copulas because otherwise an empirical distribution would require a prohibitively large amount of historical data for the full characterization of the multi-dimensional probability distribution function between the fraud risk factors. To calculate the aggregated risk in terms of the union of individual risk factors based on marginal fraud risk values, the C-REDv1 utilizes the inclusion-exclusion principle as follows:

$$P_{Aggr.}^{dep.} = Pr\left(\bigcup_{1 \leq k \leq n} S_k \leq x_k \middle| C\right) = \tag{4.7}$$

$$\sum_{1 \leq k \leq n} \left((-1)^{k-1} \sum_{1 \leq j_1 < \ldots < j_k \leq n} Pr\left(\bigcap_{q=1}^{n} S_{j_q} \leq x_{j_q} \middle| C\right)\right).$$

Here the probability of the union is calculated based on the individual probabilities and on the intersections of subsets of the set of individual fraud risk factors$_k$. Each subset of risk factors can be specified as a k-tuple of risk indices $1 \leq j_1 < \ldots < j_k \leq n$ where each index is a number $j_q = 1, 2, \ldots, n$, and k is the number of elements in that subset. These subsets are sometimes called l, where $l = \{j_1, j_2, \ldots, j_k\}$. For a given k, there exist subsets. For a given subset of risk factors, the probabilities of the intersections can be calculated using the CDF integration of the joint probability distribution function. Each of these joint probability distributions is defined using a parametric copula:

$$P_{Aggr.}^{dep.} = \tag{4.8}$$

$$\sum_{1 \leq k \leq n} \left((-1)^{k-1} \sum_{1 \leq j_1 < \ldots < j_k \leq n} \int_0^{x_1} \int_0^{x_2} \ldots \int_0^{x_n} f^{Copula}(x_{j_1}, x_{j_2}, \right.$$

$$\left. \ldots x_{j_k}) dx_{j_1} dx_{j_2} \ldots dx_{j_k}\right).$$

The term $f_{Copula}(x_{j_1}, x_{j_2}, \ldots x_{jk})$ is a joint probability density function (PDF) for the random variables $(S_{j_1}, S_{j_2}, \ldots S_{j_k})$ that is defined using a copula function. In each term, the parameters of copula such as the correlation coefficients, etc., depend on the subset of the indices of the risk factors used in each term.

This nested integration can be calculated efficiently using the joint Cumulative Distribution Function (CDF). The joint CDF is calculated directly by evaluating the kernel function of the copula at the given marginal CDFs:

$$P_{Aggr.}^{dep.} = \sum_{1 \leq k \leq n} \left( (-1)^{k-1} \sum_{1 \leq j_1 < \ldots < j_k \leq n} Copula_{\rho^l}^{K} \right. \quad (4.9)$$
$$(Pr(S_{j_1} \leq x_{j_1} \mid C), Pr(S_{j_2} \leq x_{j_2} \mid C), \ldots,$$
$$\left. Pr(S_{j_k} \leq x_{j_k} \mid C)) \right)$$
$$= \sum_{1 \leq k \leq n} \left( (-1)^{k-1} \sum_{1 \leq j_1 < \ldots < j_k \leq n} \right.$$
$$\left. Copula_{\rho^l}^{K}(P_{j_1}, P_{j_2}, \ldots, P_{j_k}) \right)$$

The term $Copula^K(\ldots)$ is the kernel function of the copula in which K is used to specify the type of the copula kernel used (e.g. Gaussian or t-copula).

The parameters of each copula are denoted by a submatrix which its rows and columns are extracted from the main correlation matrix. Each term of the inclusion-exclusion principle (i.e., Equation 4.7) corresponds to a copula term associated to a matrix #, which in turn corresponds to a set l, a subset of the indices of the random variables associated with the risk factors $l \subset \{1, 2, \ldots, n\}$. For each subset l of the risk factors, a probability of intersection of the random variables is calculated using a copula distribution over a combination of k risk factors specified by l.

Each copula term is computed with respect to the marginal fraud risk values ($P_{j1}(x_{j1})$, $P_{j2}(x_{j2})$, ..., $P_{jk}(x_{jk})$). The quantities of these probabilities, i.e., ($x_1$, $x_2$, ... $x_n$), are assigned with severity values based on the current m-banking transaction. Each of these probabilities is calculated based on an integration from Equation 4.4. Once all the integrations are performed, they are fed into the copula evaluations in Equation 4.9.

The Choice of the Copula Kernel

In the present invention, the Gaussian copula was used with C-REDv1 because it allows the incorporation of the pairwise correlations between all the marginal fraud risk factors while allowing the types of the marginal distributions to be heavy-tailed (e.g. Levy Distributions). It allows the marginal distributions to be estimated separately before being joined on their Levy Distributions which consider extreme risk. Even though the Gaussian copula does not consider extreme risk as the t-copula, it is still a valid copula kernel to model the dependencies. The kernel of the Gaussian copula can be defined as:

$$Copula_\rho^{Gauss}(p_1, \ldots p_n) = \Phi_{\rho,n}(\Phi_1^{-1}(p_1), \Phi_1^{-1}(p_2), \ldots \Phi_1^{-1}(p_n)). \quad (4.10)$$

In this formula, $\phi_\rho$, n ($x_1$, $x_2$, ... $x_n$) is the cumulative distribution function for the multivariate Gaussian distribution with parameter ρ (the correlation matrix between the n dimensions of risk factors), and accordingly $\phi^{-1}(x)$ is the inverse of a univariate cumulative function for the Gaussian distribution.

The Independence-Based Method

The independence-based risk aggregation method is the traditional method for aggregating the fraud risk factors. It computes the aggregated risk without taking into account the dependencies between the individual fraud risk factors (for example, see the work by IBM and the US Department of Defense.

In probability theory, if there is independence between several random variables, then their joint distribution function is simply the product of their marginals. Hence, if the probabilities of the risk factors are independent of each other where ρ=zero (i.e. there are no correlations between the individual fraud risk factors), then: $P_r(S_1 \leq x_1 \cap S_2 \leq x_2) = P_r(S_1 \leq x_1) \times Pr(S_2 \leq x_2) = P_1(x_1) \times P_2(x_2)$. Consequently, with the assumption of independence, the copula terms in Equation 4.9 can be replaced by the product of the marginal probabilities to estimate the aggregated fraud risk value:

$$P_{Aggr.}^{ind.} = \sum_{1 \leq k \leq n} \left( (-1)^{k-1} \sum_{j_1, \ldots, j_k} P_{j_1}(x_{j_1}) \times P_{j_2}(x_{j_2}) \times \ldots P_{j_k}(x_{j_k}) \right) \quad (4.11)$$

The same equation could be derived if the copulas was used with the pairwise correlation coefficients set to zeros, i.e. $\rho = 0_{n \times m}$.

Modelling the Marginal Fraud Risk Factors

The C-REDv1 can be used for any type of marginal distribution. In a related work by Bocker et al., Levy distribution was previously used to model the marginal distributions in operational risk and aggregated with a Levy copula with jump diffusions. However, Levy copula is a non-distributional type of copula so their work is fundamentally different from the present invention.

In the context of cyber fraud risk estimation, Levy distribution was used in C-REDv1 to model the distribution of the severity of the fraud risk factors to account for the extreme risk values. The Levy probability density function used for modelling S, the severity random variable of an individual fraud risk factor, is defined as:

$$f(S; \mu, \sigma) = \sqrt{\sigma/2\pi} \frac{1}{(S-\mu)^{3/2}} \exp\left(-\frac{1}{2}\frac{\sigma}{S-\mu}\right). \quad (4.12)$$

The Levy distribution can represent the possibility of very large severity occurring at the heavy-tail (i.e. the risk of large losses). The Levy distribution has two parameters, namely the location μ and the scale σ to allow the modelling a heavy-tailed distribution.

Evaluations

Evaluations of the Copula-based Risk Estimation Method (C-REM) were carried out in two parts. First, the accuracy was evaluated for the Copula-based Risk Estimation Method Version 1 (C-REMv1) in the presence of dependencies (real-life corporate fraud dependency data) among a set of individual fraud risk factors. Secondly, its behavior in the presence of larger number of dependencies and stronger dependencies was evaluated using a Monte Carlo scenario simulation method.

Regarding the accuracy experiments, three tests were performed. In each test, the two aggregation methods were evaluated: the C-REDv1 and the independence-based aggregation method for estimating the aggregated fraud risk value. The difference between these quantities was considered as a measure for the evaluation of the accuracy of the C-REDv1 method. The difference between the C-REDv1 and the independence-based method was defined as the error reduction of risk aggregation. Greater error values indicate the increased accuracy of the C-REDv1 compared to the traditional independence-based aggregation method.

Role of Copula in Real-Life Risk Estimation

The goal of this evaluation is to make an assessment of accuracy of C-REDv1. An examination on a real-life situation was conducted to assess the strength of copula. The data are taken from a published experiment. The details of the experiment and how the data was collected are explained later, where the same data was utilized for the purpose of detecting evasive fraud patterns. What is sought here is to reveal the impact of correlations in the evaluation of aggregated risk.

Figure 4:
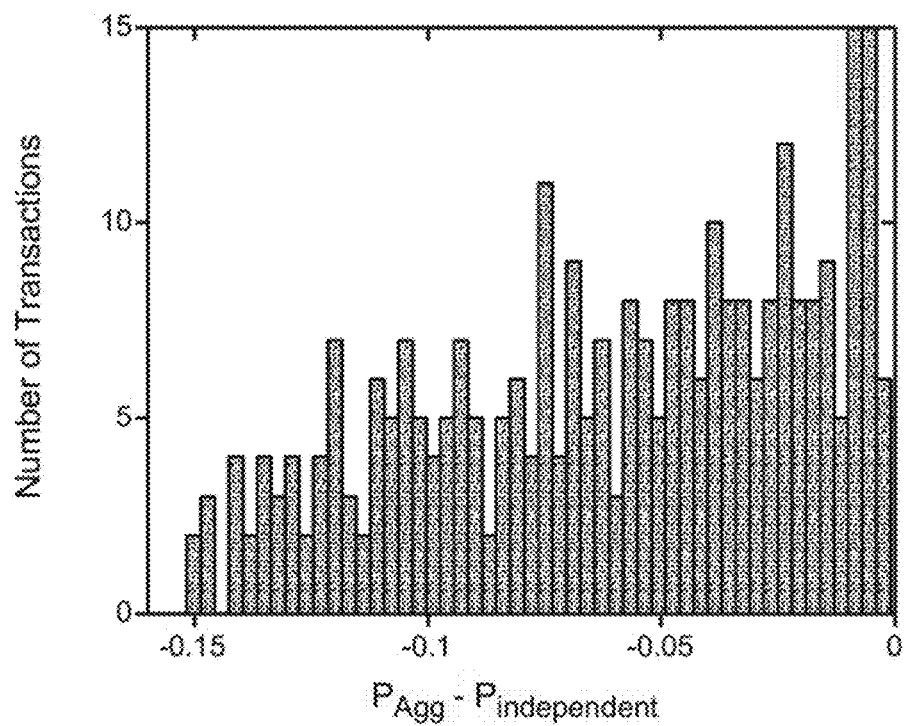
FIG. 4 is a graphical illustration of errors in the risk aggregation using the independence-based risk model versus C-REDv1 on realistic corporate fraud data, according to the present invention.

As shown in FIG. 4, the evaluation was conducted using a Monte Carlo simulation. The fraud transactions were simulated using Monte Carlo to quantify the distribution of the error reductions. The risk was aggregated among six positively correlated individual fraud risk factors. These factors were: (1) fraud risk assessment (FR), (2) altering of the staffing of the engagement (STAFFING), (3) time pressure (TIMING), (4) the extent of the auditors' responses to fraud incidents (EXTENT), (5) the extent of discussion about the auditors' responses to fraud risk (RD), and (6) the level of manager contribution to the session (MC). Some of these fraud risk factors have sub-risk factors. For instance, the risk factor EXTENT was measured by evaluating three sub-risk factors about the auditors' responses: the extent of increase of budgeted audit hours, sample sizes, and the audit documentation review. These individual risk factors were included in the Statement on Auditing Standards No. 99 (SAS99) published by the American Institute of Certified Public Accountants (AICPA).

The parameters for the marginal distributions of the fraud risk factors and their correlation matrix (i.e. dependency structure) were taken from previously published expert statements of audit firms.

The results showed how the independence-based risk aggregation method was significantly more unreliable than the C-REDv1 (FIG. 4). In the case of aggregating the six aforementioned SAS 99 fraud risk factors, the error reduction of the aggregated risk reached up to 15%. The pairwise correlations between these risk factors are represented in the following matrix. (Equation 4.13).

$$\rho = \begin{matrix} & FR & STA. & TIM. & EXT. & RD & MC \\ FR & 1. & 0.36 & 0.31 & 0.46 & 0.13 & 0.17 \\ STAFFING & 0.36 & 1. & 0.43 & 0.64 & 0.26 & 0.24 \\ TIMING & 0.31 & 0.43 & 1. & 0.5 & 0.17 & 0.15 \\ EXTENT & 0.46 & 0.64 & 0.50 & 1. & 0.28 & 0.24 \\ RD & 0.13 & 0.26 & 0.17 & 0.28 & 1. & 0.43 \\ MC & 0.17 & 0.24 & 0.15 & 0.24 & 0.43 & 1. \end{matrix} \quad (4.13)$$

Figure 5:
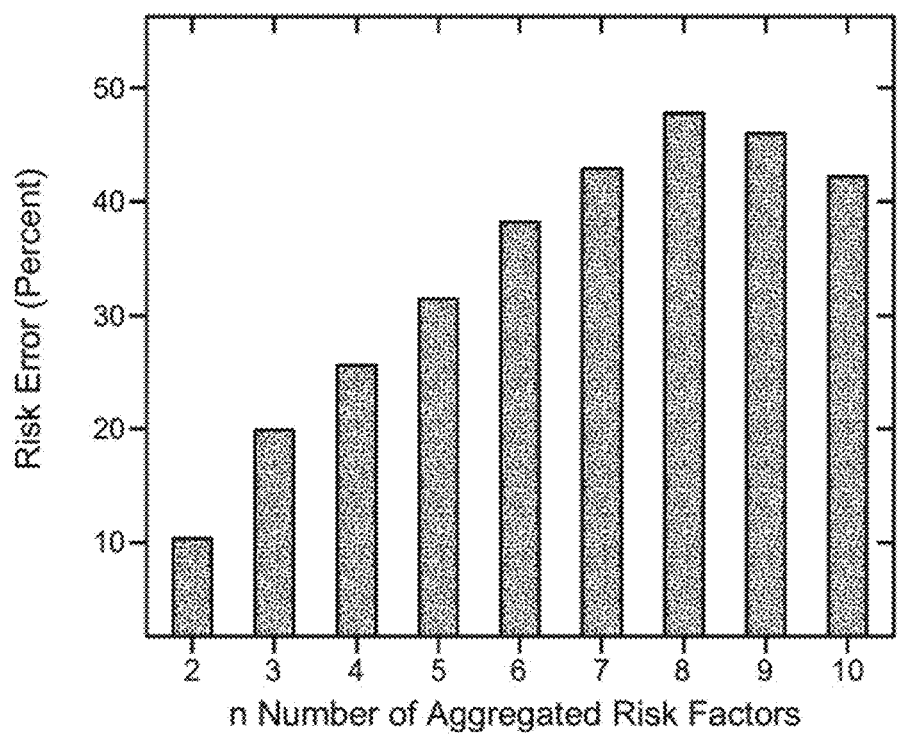
FIG. 5 is a graphical illustration of the error generated by the independence-based risk aggregation method by assuming independence when an inter-dependency relationship exists, according to the present invention.

As shown in FIG. 5, a number of 300 Monte Carlo trials were conducted. At each of these trials, a set of fraud transactions were simulated, and each was fed into the C-REDv1 to assess the aggregated risk. This amount of error can cause an inaccuracy of the independence-based risk aggregation method in the form of an over-estimation of the actual risk value. The security decision will erroneously become stronger. As a result, this erroneous authentication decision for corp-m-banking transactions may lead to extra costs for the bank and reduced usability to the corp-m-banking client.

Effect of the Number of Dependencies

It can be argued that the effect of correlations may be even stronger when there are a large number of risk factors. The next question was to investigate whether the risk aggregation is important at very large number of risk factors. It was important to explore how the risk aggregation behaves at large number of risk factors. In this regard, a second evaluation experiment was performed to assess the influence of correlations across the risk factors in aggregating a higher number of risk factors.

In this experiment, artificial values were utilized for marginal risks to investigate the behavior of copula-based aggregation. The reason for using such test values was that real values for such quantities were not available for a large number of risk factors. It can be argued that in realistic scenarios, qualitatively similar behaviors may be observed. Here, the experiment concentrated on the possible behaviors of the aggregation without emphasizing on the exact values from a real scenario.

Figure 6A:
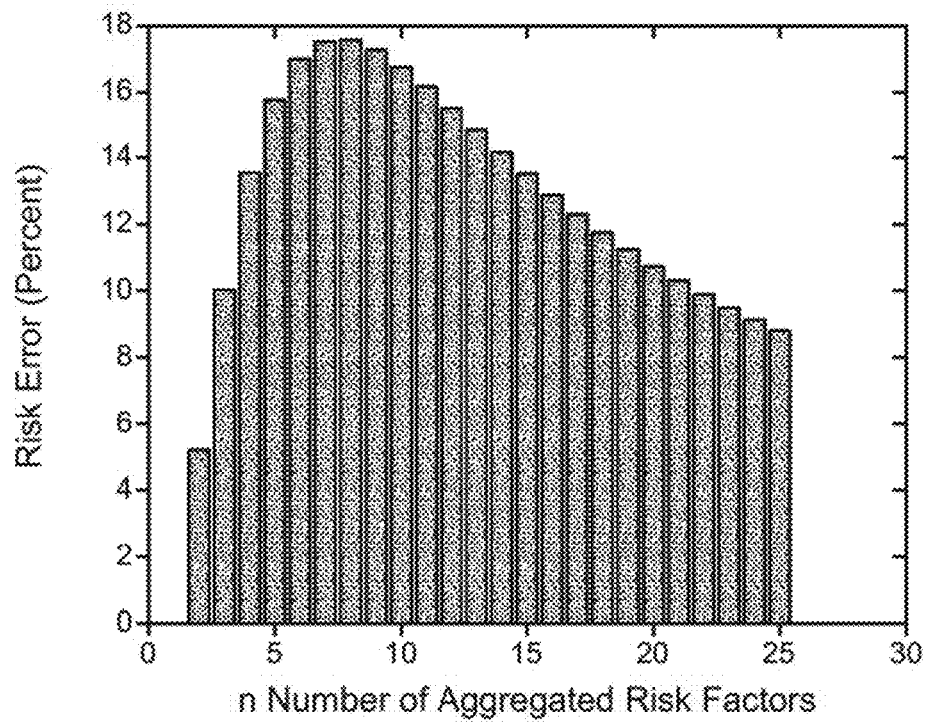
FIGS. 6A and 6B are more graphical illustrations of the error generated by the independence-based risk aggregation method by assuming independence when an inter-dependency relationship exists, according to the present invention.

In this case, a correlation matrix corresponding to high correlations across n risk factors was used ($\rho_{ij}$=0.93). The quantity of the aggregated risk was evaluated for different numbers of risk factors (n=2, 3, . . . 10). In the first evaluation, a few example values were utilized based on the assumption that many of the marginal risk factors are small in value: $p_1$=0.16, $p_2$=0.16, $p_3$=0.16, $p_4$=0.19, $p_5$=0.16, $p_6$=0.06, $p_7$=0.13, $p_8$=0.13, $p_9$=0.39, and $p_{10}$=0.47. The surprising finding from the first investigation was that at very high number of risk factors, the difference between the risk aggregations was actually declining, as shown in FIG. 6A. However, the difference was most prominent at about 8 risk factors.

The results showed that the inaccuracy of the independence-based risk method, indicated by the risk aggregation error reduction, increased when larger numbers of risk factors were used. FIG. 5 shows a rise in the influence of correlations in aggregated risk when more risk factors are taken into account. The trend was almost linear and up to 45% error in risk quantity. The increasing trend with respect to n, the number of risk factors, should be taken to be the result of more dependencies (i.e. dependency relationships) and not the increase in the number of risk factors. Next, this phenomenon was examined more thoroughly. Each time a new risk factor is taken into account (when the number of risk factors increases), the independence-based aggregated risk increases. But the copula aggregation of risk increases more slowly, which results in an error in the aggregated risk. When the marginal risk is large (here, at risk factors $p_9$ and $p_{10}$), the aggregated risk also increases quickly. As a result, the difference between the copula-based aggregation and independence-based aggregation is smaller when the marginal risks are larger. The reason is there are larger marginal probabilities at risk factors 9 and 10. However, based on these experimental results, it is believed that saturation of the independence-based aggregated risk is important.

Note that although a peak is seen in the FIG. 5, the aggregated risk monotonically increases as more risk factors are taken into account. The reason is that the risk aggregation in C-REDv1 (and other models in the present invention), the aggregation of risks is based on the union of risks. Hence, adding another risk factor always adds to the union and never decreases the aggregated risk. The peak of the risk error caused by neglecting correlations that appears in FIG. 5 occurs at about 8 risk factors. However, this peak is about the error from neglecting correlations and not a peak in aggregated risk.

To go beyond the potential bias from the first experiment, more scenarios were explored using different parameters.

Another experiment was initiated for four reasons: First, to check if this effect can be seen for other model parameters (e.g. lower correlation) and is not a by-product of a very special case of artificially chosen model parameters (in which some marginal risks are larger). The second goal was to visualize and show that this peak in the trend is only about the error (from neglecting correlations) and the aggregated risk was not peaked. The third reason was to investigate whether this trend continues as one increases the number of risks to even larger numbers of risk factors. The fourth reason is to investigate that if the peak is a product of saturation of the independence-based aggregated risk.

To systematically investigate this in the second experiment, a constant correlation was utilized between all risk factors $\rho ij=\alpha$, $\forall i \, l=j$, $\rho ii=1$ and a constant marginal probability for all risk factors $pi=\beta$.

Figure 6B:
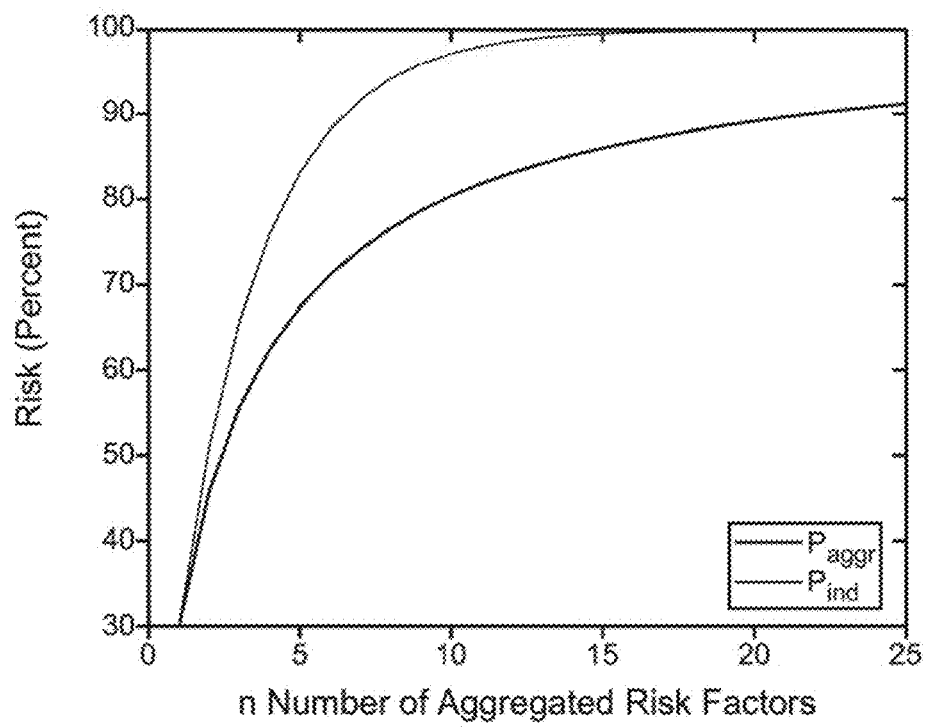

When one used $\rho ij=0.57$, $pi=0.30$, the peak occurred again at n=8 risk factors. This means considering the correlations between as high as 8 factors is important. Beyond 8 risk factors, the risk starts to saturate and the difference in risk because of correlations becomes gradually less prominent. Another implication is that this trend is not special for extremely high correlations or unusual situations. Visualizing the aggregated risk (and not the error), confirms that the aggregated risk is monotonically increasing (FIG. 6B). This is the case also for independence assumption. FIG. 6A shows that the peak is a consequence of a normal increasing trend because at low number of risk factors (n=1 one risk factor, i.e., no aggregation) the risks are equal. At a very high number of risk factors, the difference between the independence-based and correlated risk factors is zero because they both converge to 100% at very large number of risk factors (under the conditions that all marginal risks are non-zero and equal). So the difference or error from neglecting correlations is zero at n=1 and n=∞. As a result, if there is any risk error, this error will be peaked at some point between n=1 and n=∞. However, note that the peak of risk error may happen at the earliest at n=2 and will be monotonically decreasing. This was the case in some evaluations for example when the marginal probabilities (pi) were large. Using more realistic assumptions and a moderate correlations $\rho ij=0.57$ and $pi=0.57$, the peak was at n=4. At a very high correlation, the marginal risk $pi=0.4$ caused a peak at n=9 risk factors. The peak phenomenon was not specific to high and moderate correlations only. At low correlations such as $\rho ij=0.57$, the peak occurred at n=5 when moderate-high marginal values of risk (pi=0.4) were examined.

It was determined that using certain parameters, the peak can occur at very high number of risk factors. At very high correlations ($\rho ij=0.93$), when pi=0.30, the peak occurred at very high number of risk factors, one could calculate up to 25 factors until there no peak was observed. However, this increase will stop at some point because the risk values saturate at %100 using enough number of risk factors. So the peak occurred at some n>25). The latter case was because the marginal probability was small and adding more risk factors increased the aggregated risk very weakly (because of the high correlation, another risk factor should not increase the aggregated risk strongly). This means that evaluating the aggregated risk using the correct method such as copulas is important for large number of risk factors. This justifies finding efficient methods to aggregate large number of risk factors. However, this phenomenon was not specific to very high correlations. One typical case in which aggregation of very large number of risks matter was when the marginal risks were small.

The peak n depends on both $p_i$ and the correlation values. It was expected that larger correlations shift the peak n to larger numbers of factors. It was also expected that the smaller values of marginal probabilities $p_i$ also cause the peak n at higher number of factors. The reason is that both higher correlations and lower marginal probability values cause a slower build-up of the accumulated aggregated risk, hence a larger n. This trend was in agreement with all of the tests (about 6 cases).

A short explanation of this peak is that the independence-based aggregated risk saturates near %100. As a result, the overestimation of this false measure of risk will appear smaller. As a result, it seems that the correlations are less important in higher dimensions. However, this saturation is another source of error in the independence-based aggregation and not a reason against the relevance of copulas in aggregating higher dimensions. In fact, the copula-based aggregation continues to be relevant at higher dimensions. This saturation effects the second type of shortcoming of the independence-based aggregation and should not be misleading us.

Effect of the Strength of Dependencies

Figure 7:
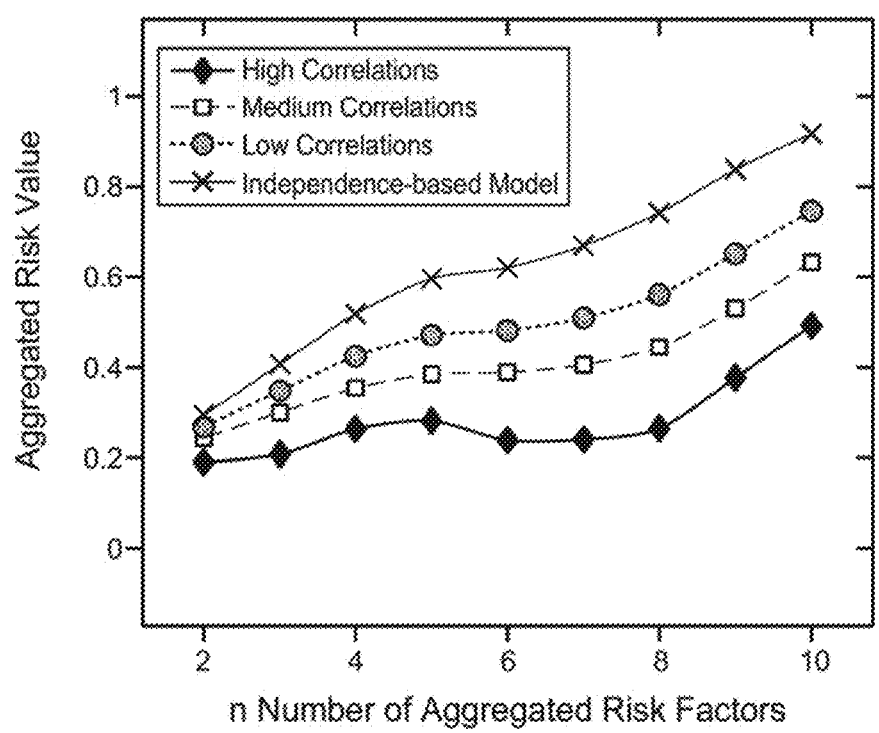
FIG. 7 is a graphical illustration of a comparison of the aggregated risk value between the C-RED v1 method with various levels of dependence scenarios against the independence-based method, according to the present invention.
Figure 8A:
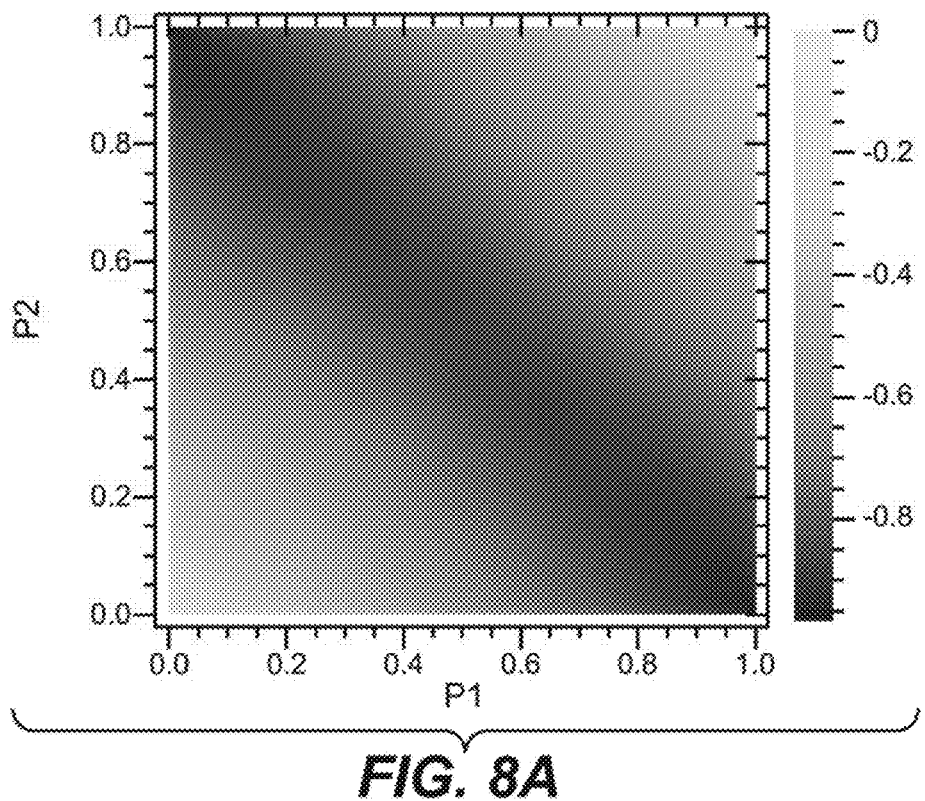
FIGS. 8A and 8B are graphical illustrations of aggregated risk with CDF where $\rho$=0-93 (FIG. 8A) and $\rho$=0-31 (FIG. 88B)
Figure 8B:
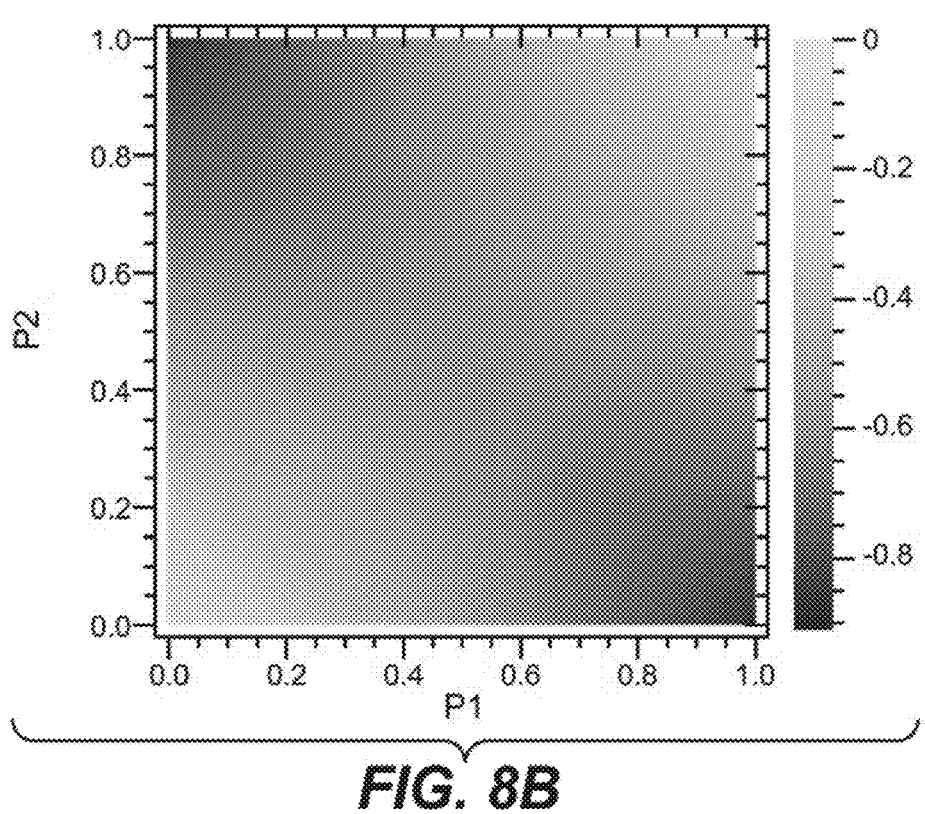
Figure 9A:
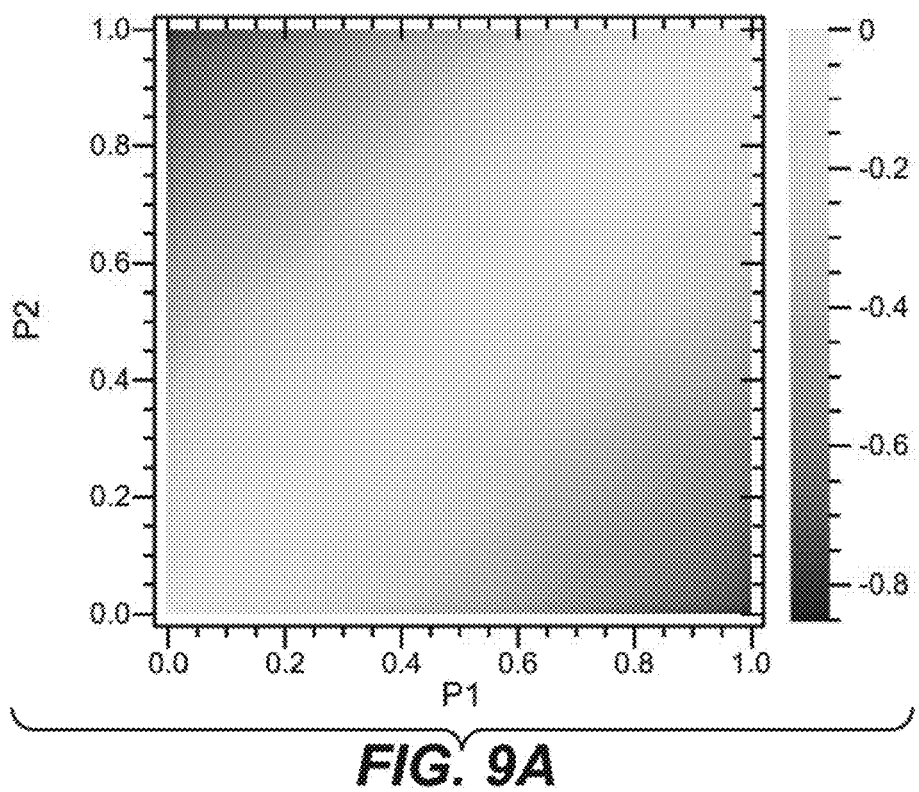
FIGS. 9A and 9B are graphical illustrations of aggregated risk with intersection T Copula less the aggregated risk with C-REDv1, where $\rho$=0.93 (FIG. 9A) and $\rho$=0.31 (FIG. 9B)
Figure 9B:
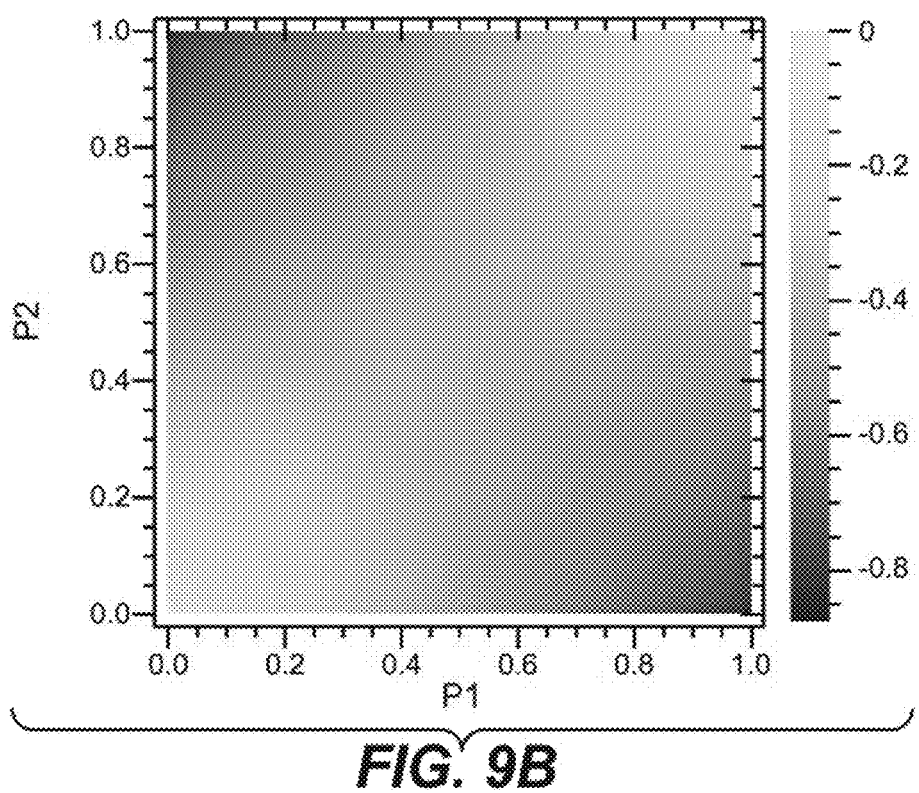

The third evaluation experiment was carried out using different fraud scenarios. To characterize the qualitative behavior of the aggregation with respect to the amount of correlations, the fraud correlation matrices were set to four levels of dependency strengths: (1) the high correlations case, (2) the medium correlations case, (3) the low correlations case, and (4) the independence case. The corresponding correlation values were 0.93, 0.61, 0.36, and zero, respectively. The correlation matrix was tested as a symmetrical positive definite matrix. As shown in FIG. 7, the results showed that in the case of the strongest dependence, the independence-based risk aggregation method suffered very large risk errors.

The improvement of accuracy using the C-REDv1 method over the independence-based risk method monotonically increased with respect to the strength of correlations. Interestingly, FIG. 7 shows that in the strong dependence case (high correlations), the aggregated risk did increase slowly. Since the risk factors are highly correlated, adding marginal risk factors with the same value will only indicate the same risk.

C-REDv1 Versus Diversification Risk Approach

The risk estimation in the cyber insurance world is performed differently from the network security world. The aim of risk estimation in the cyber insurance world is to make profits on the insurance premium to hedge for the diversified risk. Diversified risk is not appropriate for network security as it under-estimates risk. This section shows a comparison between the C-RED-v1 which estimates the worst-case risk versus the diversified risk approach. The former estimates the C-REDv1 (i.e., the union quadrature of a copula) and the latter calculates the intersection quadrature of copula.

The intersection copula was proposed in the literature for evaluating cyber insurance risk. It is a diversified copula which only considers the intersection quadrature of the joint risk. Risk diversification can lead to a joint risk that is lower than the value of the lowest risk factor. The C-REDv1 uses a Union copula which accounts for the union quadrature (i.e. an aggregation of the intersection on the joint risk, as well as the marginal risk factors). In addition, the Union copula accounts for the dependence at the extremes. It forecasts the occurrence of extreme risk scenarios even when the current risk factors indicate low risk values.

Both FIGS. 8A and 8B and FIGS. 9A and 9B reveal that using the intersection copula without forecasting the extremes may cause an underestimation of risk. The value of underestimation may exceed 80 percent as measured in the density plots. In largely negative dependence modelled using a T copula, the risk of severe underestimation is more likely to occur than in low negative dependence or positive dependence scenarios. The underestimation of risk in the intersection copula may lead to exposing a vulnerability in the system.

Figure 10A:
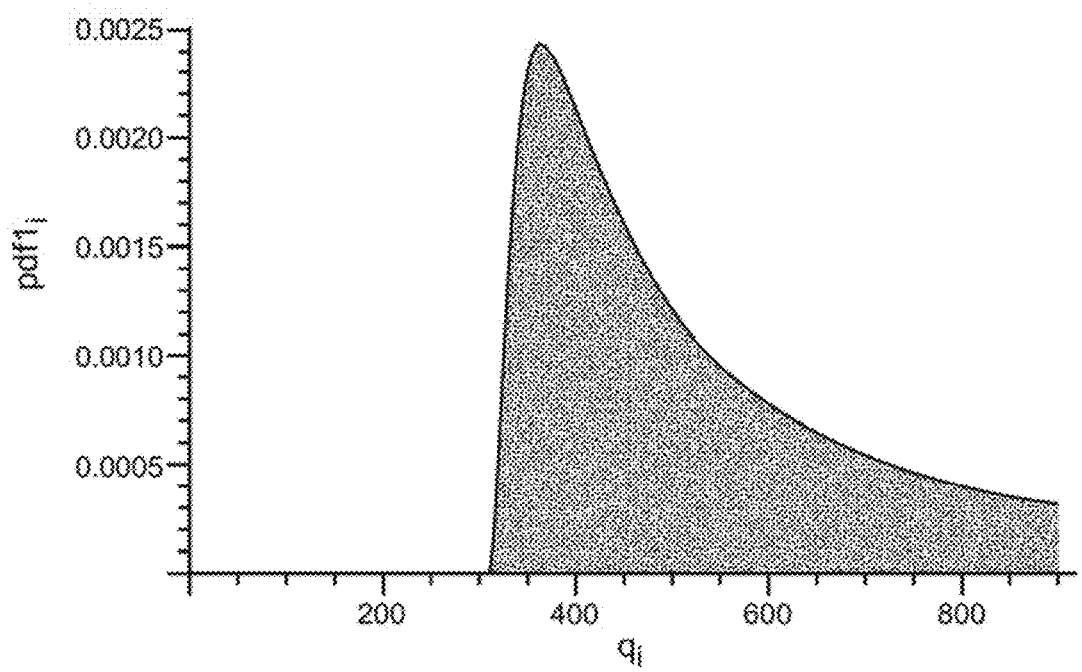
FIGS. 10A and 10B are graphical illustrations of two different Levy Distributions, according to the present invention.
Figure 10B:
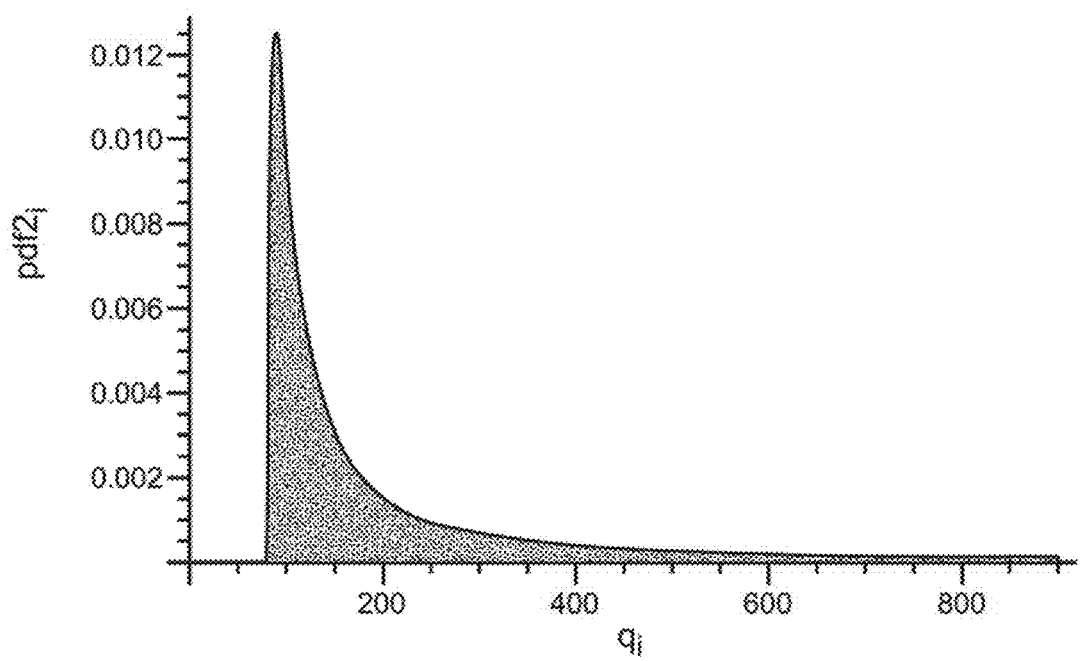
Figure 11A:
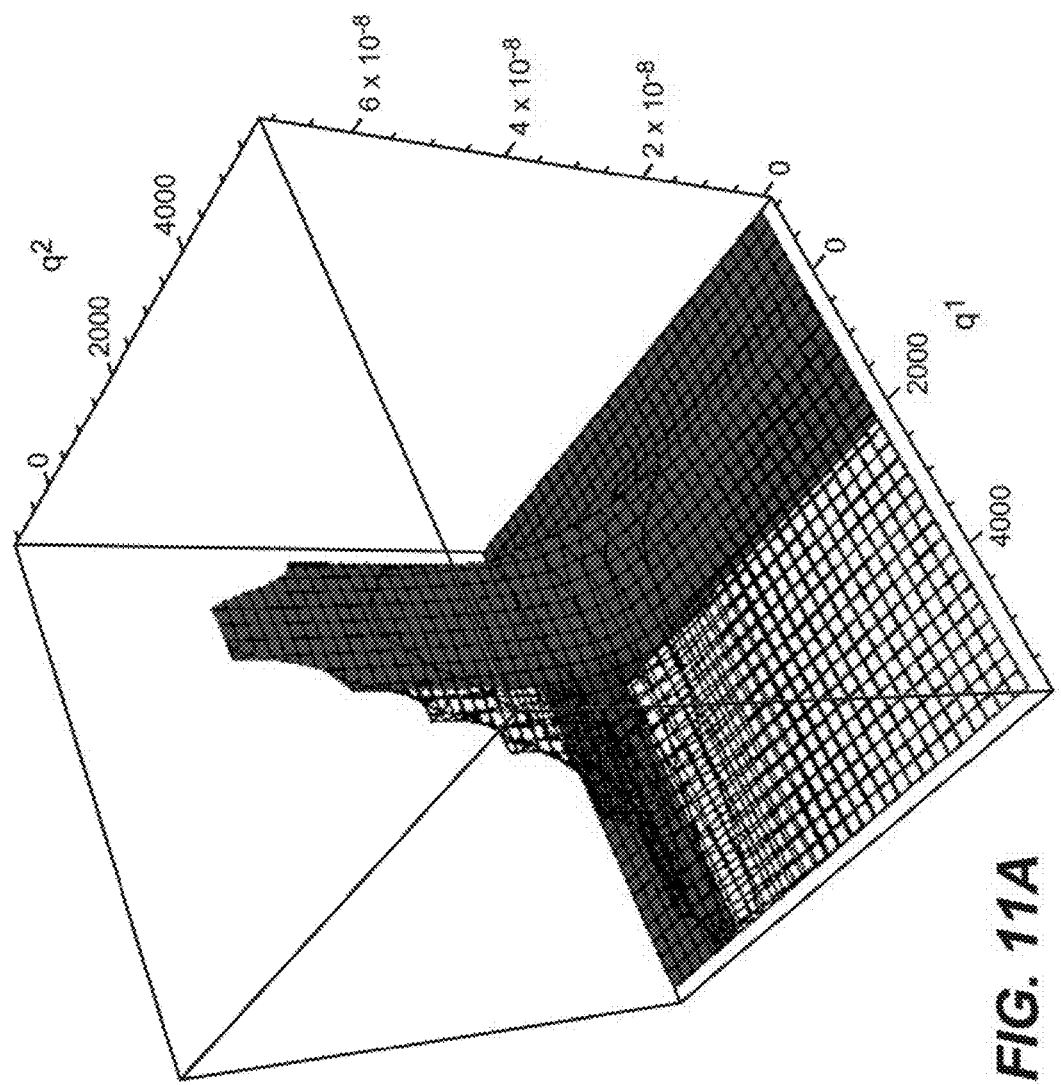
FIGS. 11A and 11B are graphical illustrations of unions on a t-copula, according to the present invention.
Figure 11B:
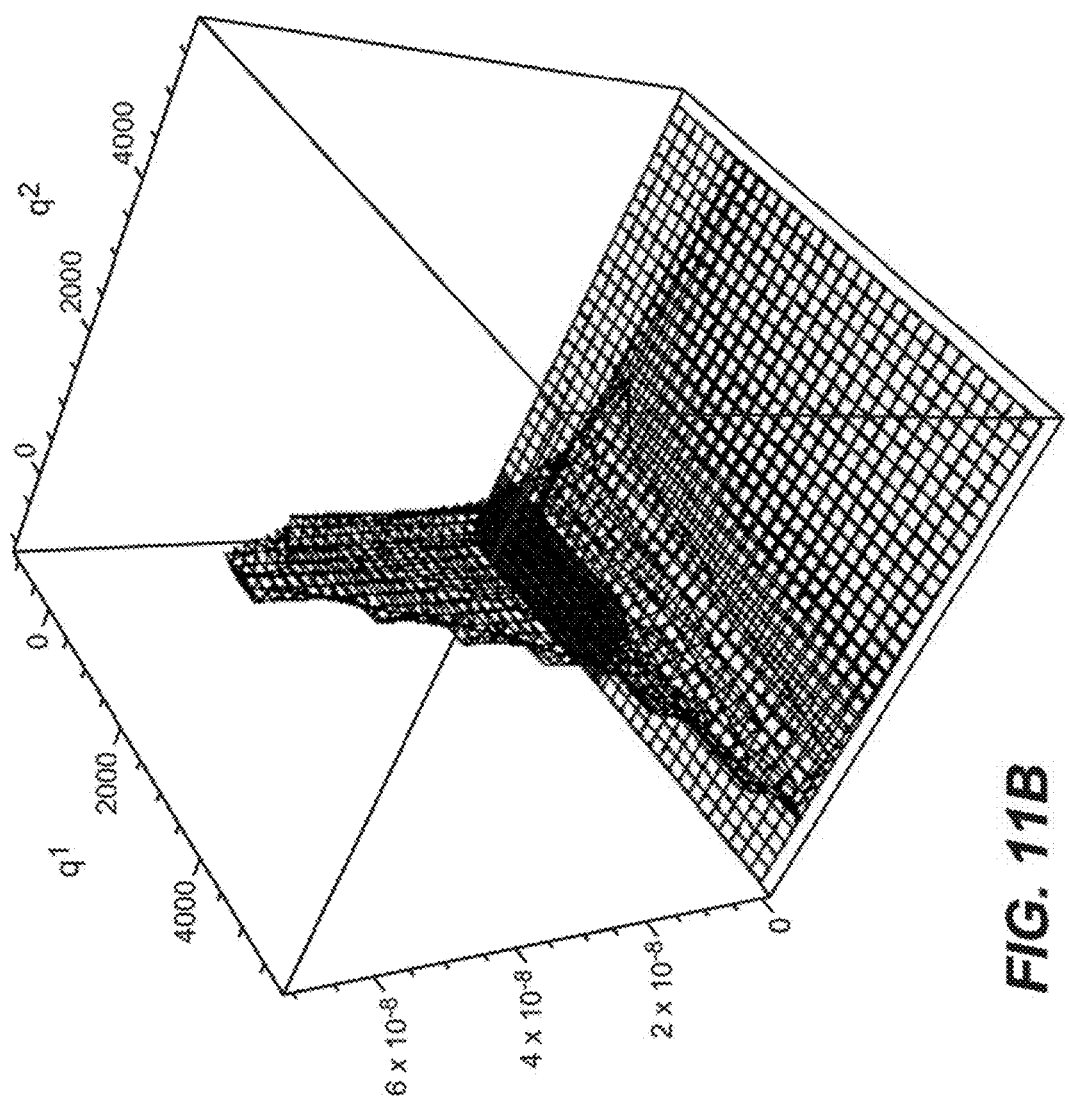
Figure 12A:
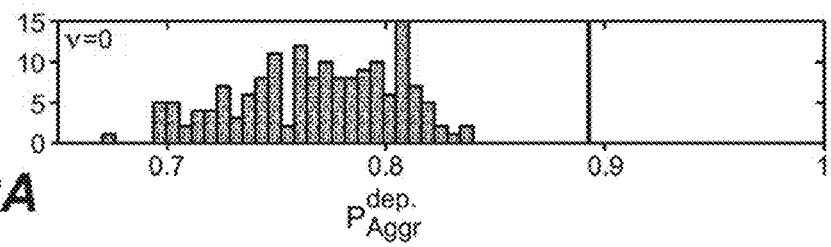
FIGS. 12A-12F are graphical illustrations of how the CFD method can detect evasive fraud risk patterns as the fraudster uses more negative correlations, according to the present invention.
Figure 12B:
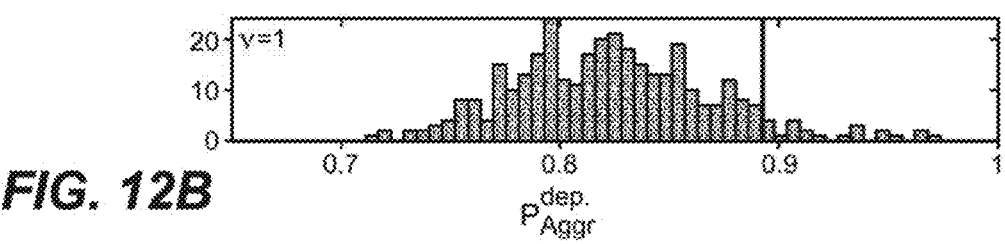
Figure 12C:
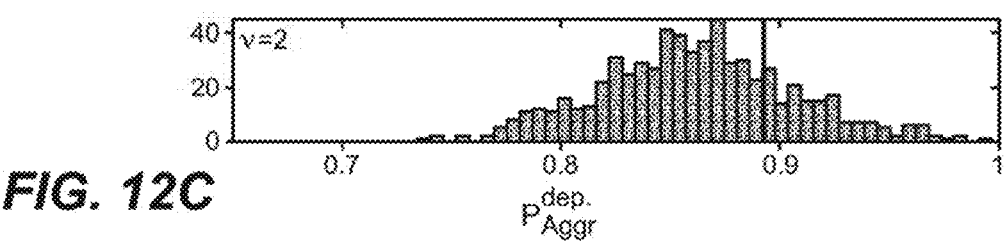
Figure 12D:
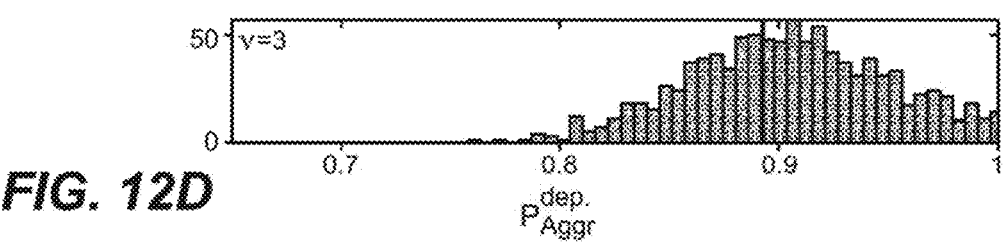
Figure 12E:
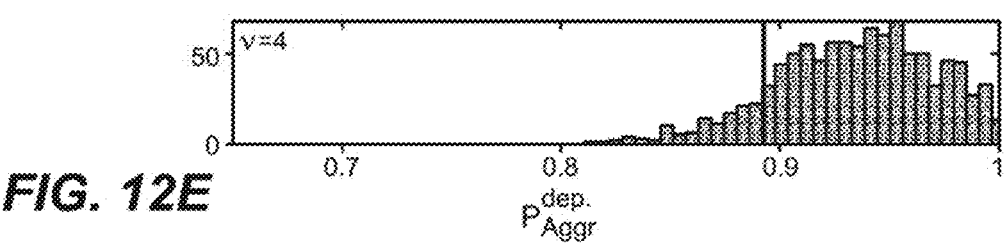
Figure 12F:
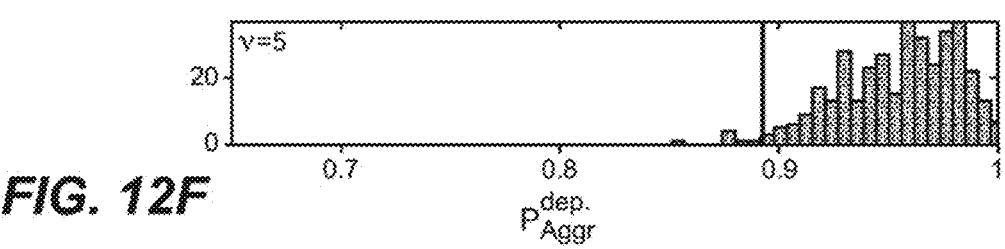

An evaluation was performed to represent the cubature of the aggregated risk using the C-REDv1. Assume there are two different individual risk factors modelled as Levy distributions as specified in FIGS. 10A and 10B. The first experiment in FIG. 10A evaluated the Union in FIGS. 11A and 11B. The second experiment in FIG. 10B evaluated the diversified-risk approach (i.e., the intersection cubature) on the same copula distribution as the one used in FIG. 10A. The cubature region is shaded a three-dimensional visualization of risk. The estimation of aggregated risk is severely under-estimated in FIG. 10B. Therefore, C-REDv1 is more suitable for cyber fraud risk estimation than the diversifies-risk approach.

Real insurance companies have suffered large losses due to neglecting the extreme risks. An Australian insurance company, National Mutual which was partly owned by AXA, has incurred large monetary losses. The losses were due to the failure of estimating extremely risky operational incidents. Arbitrage driven client's behaviors and financial systems failures were the main risk factors that were neglected. It accounted for the historical rather than the forward looking monetary risk. It lost $6 million for unexpected transaction costs and was exposed to a potential liability of $2.8 billion.

Related Work

Earlier works on fraud estimation in the network security context have aggregated marginal fraud risk values by assuming that marginal fraud risk factors are independent of each other. Relevant to the issue is a collaborative work by IBM and the US Department of Defense, which recognizes the existence of an intersection between the probabilities of the marginal fraud risk factors in an access control context. In that work, they proposed an aggregation method using the union, but the correlations among the fraud risk factors were simply assumed to be zero as in Equation 4.11. Their model is equivalent to simply multiplying the probabilities when the probability of each intersection is calculated. In another earlier work by Josang, aggregated risk was also computed using a union operator, but assumed independence among the risk factors. Indeed, results of the present invention showed that neglecting the dependence relations among the individual fraud risk factors can cause a large error in the aggregated fraud risk value. The error was more sever when a larger number of dependency relationships and stronger dependencies (i.e. higher correlations) were taken into account.

In yet another related work, the Bocker's Operational Risk method also uses copulas. However, the measure of quantification of the aggregate fraud risk values used in the C-REDv1 method is fundamentally different from Bocker's method. The aggregation of fraud risk factors in the C-REDv1 method is achieved by using the union of marginal fraud risk values rather than the addition of severity random variables of risk factors, as in Bocker's approach (i.e. $S_1+S_2$). The distinction of the C-REDv1 method is that, in an m-banking context, the severities associated with different marginal fraud risk factors are of different types with different physical units (e.g., the unit of money, the unit of time, and the measurement of location, etc.). Therefore, in the C-REDv1 approach, the severities of different units cannot be added. Instead, the C-REDv1 quantifies the union of the marginal fraud risk factors as $P_{Aggr} := P_r(S_1 \leq x_1 \cup S_2 \leq x_2)$. In contrast, Bocker's Operational Risk method is quantified based on a single dimension defined as the addition of the severity random variables of the risk factors as $P_{Aggr} := P_r(S_1+S_2 \leq x_1)$, which is a fundamentally different risk aggregation measure. The Bocker method uses Levy Copula (i.e. a type of non-distributional copulas) to link two different jump processes $S_1$ and $S_2$. Basically, such copulas parameterize how often losses of two different risk classes occur together. One cannot do this with standard distributional copulas. However, the Gaussian copula can perfectly be used to link different kind of distributions and that is what is needed for evaluating the joint probability distributions in the C-REDv1.

A previous work by Yao and Zhang used a similar union approach for aggregating levels of assurance attributes (analogue to marginal fraud risk factors). However, it was based on the assumption that the underlying assurance attributes are independent of each other.

Another approach which took dependencies into account for aggregation of risks was using Dempster-Shafer Theory of Belief Functions. They took correlations into account using logical operators from the logic of belief and incorporated three parameters for the "strength" of the dependencies. In contrast, the C-REDv1 uses probability theory and a correlation matrix to structure the dependency relationships.

Evasive Cyber Frauds in Corporate Banking

According to the National Fraud Authority (NFA) of the UK, during the period of 2011-2012, twenty-seven percent (27%) of the businesses surveyed were victims of fraud and more than 33% of these had suffered from cyber-fraud. The introduction of corporate e-banking services and use of mobile devices for corporate m-banking transactions have made fraud activities by means of unauthorized transactions easier to perform. Owing to the potential monetary gains, m-banking services are particularly attractive to cyber attackers. According to the head of the US National Security Agency and U.S. Cyber-Command, the number of cyber-attacks shot up 44% in 2011. These figures indicate that existing security measures have much room to improve. For example, in a corporate m-banking context, fraudulent transactions or other illegitimate collaborative malicious activities may be undertaken by using Zeus Trojan, a type of malware that has been targeting banks.

One of the open issues in securing corporate m-banking transactions is how to evaluate an aggregated fraud risk value so as to detect fraud risk patterns and, in particular, how to detect an evasive fraud risk pattern. The present invention addresses this issue by proposing a novel Copula-based Fraud Detection (CFD) method. It uses corporate m-banking services as an application context to demonstrate how evasive fraud risk patterns may be detected. It investigates and identifies different types of evasive fraud patterns in this context based on the different dependency relationships among them. The CFD method uses the dependency structure among the marginal risk factors to estimate an aggregated fraud risk value given a set of marginal fraud risk values associated with a set of marginal fraud risk factors. This method can help to detect fraud risk patterns in the presence of intentional evasive manipulations of a fraud risk pattern with an intention of bypassing the bank's risk authentication system.

Escalating Cover-Up and Flying Below the Radar are two common strategies in manager fraud cases: "The victim organization may observe the insider's fraud activities if it looks in the right places. An insider's unexplained financial gain is a red flag. But insiders' online or social attempts to conceal their actions can provide the victim organization with further observables of an escalating cover-up. There is evidence in manager fraud cases that insiders were able to reduce the observables of their crime, and thus conceal their activities, by keeping the victim organization's per month fraud losses low. While "flying below the radar" resulted in slower losses, the longer duration of these crimes led to greater losses by the victim organization.

Their study indicated that as the fraudster increases the duration of the fraudulent activities against their organization, the more limited the exposure to fraud will become (i.e. due to the positive correlation between the two). This itself will influence the observables due to fraud to decrease due to the negative relationship between the limiting exposure to fraud risk factor and the observables due to fraud risk factor. The less the observables due to fraud, the insider's fraud concealment is achieved due to the positive relationship. Therefore, negative correlations between the fraud risk factors help the fraudsters to achieve their evasive fraudulent behavior (i.e. to fly-below-the-radar).

Fraud Patterns in Mobile Financial Systems
Evasive Fraud Patterns in Wire Transfers With evasive fraud patterns, fraudsters may try to manipulate certain fraudulent acts in order to make the fraud more difficult to detect. They may try to conceal some fraudulent acts by modifying the way the fraud is usually committed. The attacker may incorporate negative relationships among the fraud patterns: a tactic to evade the detection by pretending a trust-worthy behavior.

Take an electronic fund transfer into an account owned by a fraudster as an example. Instead of performing, a single large outward transaction into the account, the fraudster may execute multiple small-valued transactions. Small valued transactions usually have a declining fraud risk pattern in a risk authentication system. This evasive fraud pattern may impose a negative influence on the alert level (i.e. it may impose a positive influence towards the trust level) that the banking systems may have towards the transactions. The results are that: (a) these transactions may escape from fraud detections: and (b) during a certain period the risk authentication system may assign a lower alert level (or a higher trust value) to the corporate account from which the money is taken out. Once the alert level is lowered, the fraudster could perform a monetary transfer with an amount larger than the previous transaction from the same compromised corporate bank account. At the same time, the transfer amount is intentionally maintained below the ceiling amount imposed by the bank on the corporate bank account. This way, the fraudster may go undetected should the banking risk authentication system not be able to capture such evasive patterns or behaviors.

Another example of an evasive fraud pattern is when a fraudster performs a series of monetary transactions, but with decreasing monetary amounts and frequencies. If the risk authentication system disregards the fact that these series of transactions are inter-related (i.e., they are actually part of a single fraudulent event) and if the detection system solely assigns higher risk levels to transactions with larger (or increasing) transactional amounts and/or frequencies, then these "non-typical" fraudulent transactions may not catch the "eye" of the risk authentication system and may go undetected.

Treasury-Related Fraud Pattern

This fraud pattern is related to suspicious behaviors in products sold via bank treasuries. One example is the insurance products. Some banks' treasuries have special licenses from insurance companies to sell insurance products directly. Similarly, the banks' treasuries normally design complex structured products for their sophisticated corporate clients. For instance, insurance products can be attached with an investment component to meet the clients' investment appetites.

The treasury-related fraud pattern may be processed as the following four sequential steps: (1) a fraudster, who might be an authentic corporate banking client with a fraudulent intent, first subscribes to an investment-attached insurance product, e.g., an annuity product, (2) the fraudster cancels the annuity product within the grace period, (3) the fraudster then deposits the insurance annuity check from the cancelled policy into the corporate banking account, (4) finally, the fraudster immediately requests a withdrawal or an outward transfer of the funds. In this case, the fraudster might subscribe to these investment products to all the employees in the company. In this case, the amount may become substantial which can help the fraudster to launder large sums of money.

Combining Treasury with a Loan Fraud Pattern

Banks normally offer some complex financial products such as derivatives and custom-designed structured products. Fraudsters may use a layered approach to disguise the true nature of a transaction making it hard to detect. The client may cause confusion by commingling several transactions requested from different bank departments to conceive the m-banking risk authentication system. For example, the client may first request a corporate loan from the corporate banking department, and then, the client immediately makes a financing request to back up the loan (i.e. to secure the loan) with the company's issued treasury or insurance products offered by the bank's treasury department. Finally, the client repays the loan with cash or various monetary instruments to money launder the cash-based illegal funds gained from previous crimes. These different steps may confuse the risk authentication system due to its complexity and may eventually allow the fraudulent attempt to get through successfully. It conceals the fraud intent as it involves different bank department which may elude trustworthiness in the corporate client. It is one fraud scheme to avoid getting caught. Simply depositing that large sum of cash directly into the account without a proper reason can be detected more easily by the fraud system.

Trade-Based Terrorist Financing Patterns

Trade financing transactions can be used to finance terrorism and to launder illegal money gained from illegitimate sources. There are four main trade-based fraud patterns identified by FATF: (1) Over-Invoicing and Under-Invoicing of Goods and Services; (2) Multiple Invoicing of Goods and Services; (3) Over-Shipments and Under-Shipments of Goods and Services; and (4) Falsely Described Goods and Services. In these type of fraud patterns, the monetary amount severities and the frequencies of the trade-financing request would support matching a fraudulent transaction to these fraud patterns. The attacker might manipulate the level of the monetary amounts and frequencies of the transactions to evade the detection system as described in the previous fraud pattern. The first four trade-finance fraud patterns involve falsifying trade documents and accounting records to launder money. Trade financing fraud patterns can become more complex such as the Black Market Peso Exchange Arrangements (BMPEAs), which are a more complex trade-based money laundering technique/pattern and involve illegal funding of foreign currencies. In particular, BMPEA is a practical fraud pattern which combines different money laundering techniques into one criminal action.

Evasive Fraud Patterns in the Stock Exchange Market

Manipulating stock markets by means of creating a fake image of an active market. A portfolio manager or a broker may engage in stock manipulation activities to manipulate the price of a traded stock. Using the mobile device may be a way to get away from future forensics investigations as mobile devices are easily discarded. Manipulating stock markets is known. The risk factors of stock market manipulations are mentioned in the document by Financial Action Task Force (FTATF) and Groupe d'action Financiere (GAFI).

According to the analysis, an evasive fraud pattern may also occur by the formation of distributed market manipulators. They may or may not belong to the same group. They execute an evasive fraud pattern to manipulate the price of a traded financial instrument according to the following sequence of events. The manipulation starts with high frequency trading among the group. They continue this activity until the price of the stock increases to the higher limit. Once the stock is attractive, then a subset of the group starts to sell their stocks to the public to liquidate the stocks and gain abnormal profits. They perform the liquidation in a less frequent manner than their fake activity to maintain the evasive manipulation act. They reduce the frequency gradually to make the price go higher. They continue by increasing the fake activity within their group and reducing the sale to external buyer. This way, they increase the price without raising a suspicion to the regulators. This is a type of injecting a negative dependency (i.e. influence) between the two risk factors (i.e. the fake activity within the group and the sale to the investor from the public).

To evaluate the performance of the method using simulations, it was necessary to randomly generate correlation matrices. Also needed was n-dimensional random matrices that have a mixture of negative and positive correlations. A Wishart distribution was employed. The Wishart matrices were generated as follows: A matrix of n×n randomly generated elements was generated in which the elements were drawn from a (one dimensional) normal distribution. This normal distribution has a zero mean and a fixed standard deviation V. This is identified as random matrix X. Then another matrix $S:=X^T X$ (scatter matrix or a covariance matrix) was calculated from the matrix X. This scatter matrix behaves like a covariance matrix, that is, it is positive semi-definite (according to linear algebra). The resulting matrix is a covariance matrix (because it is built using this formula: $X^T X$). The covariance matrix can have negative elements. The reason is, each element of the original random matrix X can be either positive or negative. Then a correlation matrix is created from this covariance matrix. The element $\rho_{i,j}$ of correlation matrix is calculated by dividing the elements by the square root of the variances. The variances are the diagonal elements of S. The resulting matrix will have both positive and negative elements. It is positive definite and symmetrical. The diagonal elements will be equal to 1. The matrix S will have a Wishart distribution with parameter V and n. Using the Wishart distribution approach is more efficient than randomly generating numbers in a matrix and then testing whether it is a symmetrical semi-positive definite one or not.

A program was implemented to test and filter and group the matrices one-by-one. The program counts the number of negative correlations in each matrix. The matrices that contain negative correlations are kept. The ones that are free of negative correlations are deleted. The matrices that contain negative correlations are grouped according to the number of negative correlations.

Evaluation of Randomly Generated Evasive Fraud Patterns

Monte Carlo simulation experiments were used to generate random evasive fraud patterns to simulate all the different combinations of fraud patterns that a fraudster might design to evade the detection system of a bank. To explore as many possible negative correlations as possible, randomly generated correlation matrices were utilized. Another reason for using randomly generated correlation was that it was not possible to have correlation matrices with negative correlations between all risk factors. This is because, mathematically, a matrix with all the correlations being negative will not be a valid correlation matrix, as it will not be a positive-definite matrix. An all-negative correlation matrix cannot be used to define rational relationships among the elements. For example, in terms of interactions between risk factors, if risk factors A and B are negatively correlated, and the risk factors B and C are also negatively correlated, then the risk factors A and C must be positively correlated and the correlation between them cannot be negative. For this reason, a procedure was needed to automatically generate matrices with different number of negative correlations. These correlations are not based on real data but they permit exploring different possibilities of negative correlations. Samples were taken randomly from all possible matrices with different signs of correlations. In each case, the number of negative correlations was different. The number of negative correlations were counted, followed by sorting the results based on the number of negative correlations. Random correlation matrices used in the Monte Carlo simulation were generated from randomly generated covariance matrices, which were generated using a Wishart distribution with variance equal to five.

To systematically quantify how strongly evasive behavior was incorporated across different scenarios by the fraudster, the measure v was defined as the number of negative pairwise correlations in each correlation matrix. The generated random matrices were categorized and pooled based on the number of negative correlations, i.e., the number of negative elements in the resulting correlation matrix in each iteration. The measure v was used because the fraudster can employ a more strongly evasive behavior by imposing a larger number of negative correlations among the risk factors. For evaluation, a fixed set of marginal probabilities was used with 4000 generated correlation matrices: e.g., $(P_1; P_2; P_3; P_4)=(0:23; 0:67; 0:43; 0:26)$. The simulations showed that in case of larger numbers of negative correlations, i.e., larger v, the estimations based on the independence-based method systematically shifts towards under-estimation of fraud values (FIGS. 12A-12F). The amount of error generated using the independence-based method in this test was 10%. This can be larger depending on the threshold value used for detection of the fraud transactions. This shows that if the fraudster manipulates the fraud patterns to incorporate negative relationships among the fraud patterns, the independence-based method is very insensitive to such behavior. In contrast, the CFD method is able to detect this type of behavior and reflect it in an evaluated outcome of the aggregated fraud risk value. This suggests ignoring inter-dependency relationships among marginal risk factors may put banks and the corporate at significant risk, which otherwise could be detected effectively using the CFD method.

Evaluation of Real Fraud Data

The second evaluation was the evaluation of real corporate fraud data, based on real fraud attacks with evasive fraud patterns. The type of fraud was the financial statement audits. It is argued that an insider's fraudulent behavior affects the financial statement audits. The fraudulent insiders might collaborate with an outsider to perform illegal activities on their corporate mobile bank account. In a study, the risk factors on financial statements were reviewed and reported negative correlations among some of the risk factors. Negative correlations were considered as evasive behavior.

The evasive behaviors include the fraudster's choice of the transaction attributes to be executed on the online corporate account being hacked. Also the malicious collaboration of the fraudster with an insider from the corporation can influence the fraudster's attempted transactions.

In this evaluation, real data collected in audit sessions from a previous study by Joseph F. Brazel from North Carolina State University, Tina D. Carpenter from the University of Georgia and J. Gregory Jenkins from Virginia Polytechnic Institute and State University was utilized. Established model parameters (marginal distributions and correlations) were employed based on the statistics they extracted from their data. Also utilized were the marginal distributions based on the mean and variances reported in their report and the correlations based on Pearson correlations the reported. In that study, the data was collected using "field survey data of auditors' actual brainstorming sessions for 179 audit engagements". The SAS 99 standards require brainstorming sessions to be conducted to improve the fraud judgements by the auditors. They studied the relations between the fraud risk factors and related risk assessments to see how brainstorming can improve the quality of assessments. In this case, the data they acquired was utilized for the purpose of the present invention of studying the role of correlations in predicting the aggregated risk.

The authors approached large international firms and sent Internet surveys to various roles in the firms. A total of 179 auditors completed the survey from the Deloitte & Touche, Ernst & Young, Grant Thornton, KPMG, and PricewaterhouseCoopers. Each of the participants selected a recently completed audit. Each of the risk factors elicited from participants were measured according to SAS 99 and were reported on a scale from 1 to 10. The mean and standard deviation for each of these factors and the correlation between each pair of these risk factors were calculated based on the data collected using questionnaire. A mean and standard deviation was utilized to define the parameters of the marginal distributions. Also utilized was the pairwise correlations calculated in their study (using Pearson correlation statistic) to define the correlation matrix in the present invention.

Among the risk factors they reported, a selection of their risk factors were adopted in the evaluation of the present invention, namely OPP, EXP, ITC, and PC. The risk factor OPP is a measure of the fraud opportunity risk, which measures the ability to commit fraud. The distribution parameters of the marginal OPP distribution were: mean=0: 317 and standard deviation=3:13. The factor EXP is the level of expertise of external auditors from the risk audit engagements, that is, the engagement team expertise. This factor was measured on a scale from 1 (extremely low) to 10 (extremely high), with a mean of 7.50 and standard deviation of 1.81. The factor ITC is the level of contribution of the IT auditor when attended the brainstorming session. It was measured as the percentage of attendance, with a mean of 69:27 and a standard deviation of 46:34. The risk factor PC is the level of partner contribution to the audit brainstorming sessions. PC was measured on a scale from 1 (extremely low) and 10 (extremely high), with a mean of 8:41 and a standard deviation of 1:48.

In this evaluation, these factors were employed because of the negative correlations between this selection of risk factors. The less the contribution (ITC, PC and EXP risk factors), the higher opportunity (OPP risk factor), which in turn causes higher rationalization and leads more overall fraud. The study showed that the IT manager contribution risk (risk factor ITC) was negatively correlated with the fraud opportunity risk (OPP risk factor). This negative dependence between the two helps the fraudsters to evade the detection of fraud and become more successful in committing the fraud.

Avoiding the contribution can be interpreted as evasive behavior. It is negatively correlated with IT manager contribution (ITC factor). When the IT manager contribution is smaller, the fraud opportunity risk will increase. The less contribution weakens the control and, as a result more vulnerabilities are created in the system. Thus, the fraudsters may rationalize their fraudulent intentions, and a fraud incident will more likely take place. The correlation matrix (Equation 5.1) among these risk factors was according to the real fraud data:

$$\rho = \begin{array}{c} \\ OPP \\ EXP \\ ITC \\ PC \end{array} \begin{pmatrix} OPP & EXP & ITC & PC \\ 1 & -0.29 & -0.29 & -0.16 \\ -0.29 & 1 & 0.19 & 0.16 \\ -0.29 & 0.19 & 1 & -0.04 \\ -0.16 & 0.16 & -0.04 & 1 \end{pmatrix} \quad (5.1)$$

The real fraud pattern data exhibited negative relationships among some of the fraud patterns. The probability values used in simulations were randomly generated based on a Monte-Carlo simulation of different combination of quantiles on the marginal Levy distributions that correspond to each fraud pattern in order to test all the different severities that might occur in a real-life fraud pattern transaction.

Figure 13:
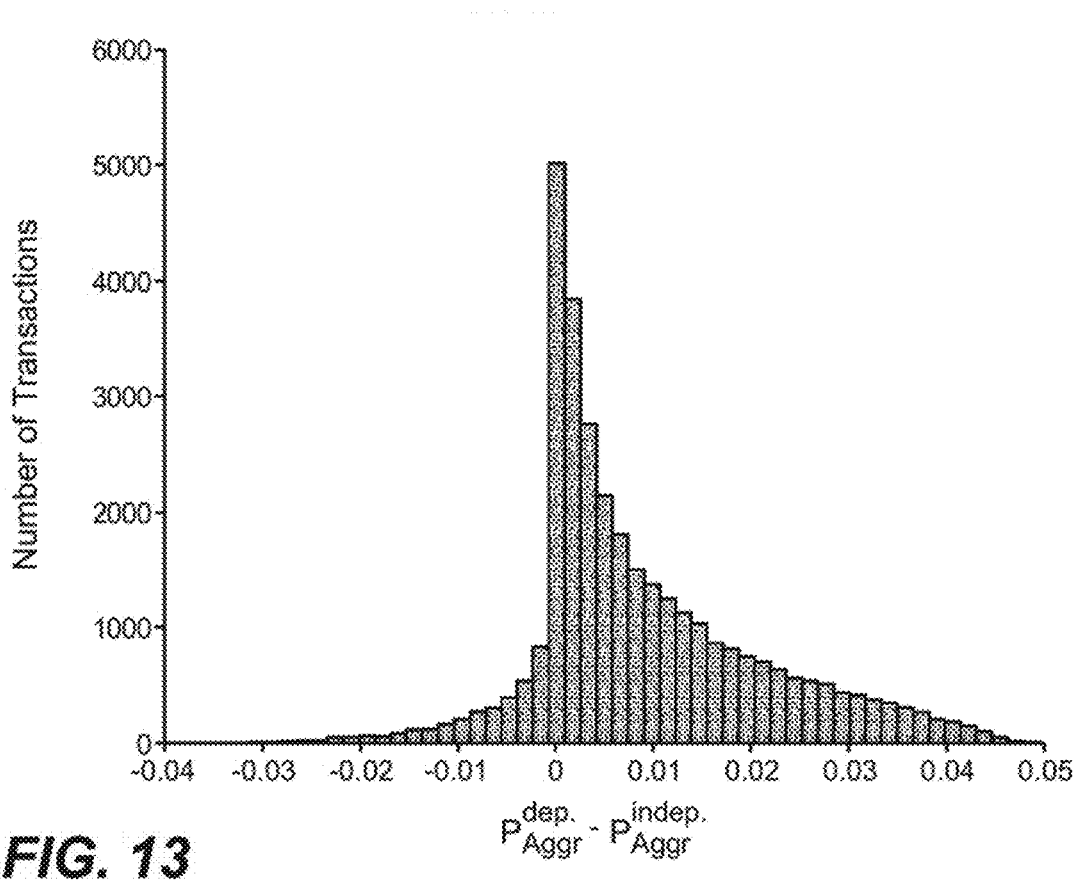
FIG. 13 is a graphical illustration of the under-estimation error in aggregation of various risk factors, according to the present invention.

Unlike the first evaluation, the correlation matrix for each trial was fixed. Results of the simulation showed that ignoring the negative correlations by the independence-based aggregation method (Equation 4.11) leads to an under-estimation of the aggregated fraud value. C-FDM proved its ability to detect evasive fraud patterns which outperformed the independence-based method by over 4.0% (using risk factors OPP, EXP, ITC). When aggregation of four factors (OPP, EXP, ITC, and PC) was used, the under-estimation of fraud risk was as high as 4.4% as shown in FIG. 13.

The difference in risk can be larger if it is calculated among the fraudsters that use the evasive fraud patterns showing negative correlations in their behavior. This is significant in fraud detection as C-FDM can better capture the fraudsters aiming to evade the next level of assurance (i.e. authentication or other security controls). The independence-based method under-estimated fraud values which may open loopholes for fraudsters to exhibit lower fraud values and evade detection.

Finally, the type II errors of the evaluations were quantified. The false negative detections were the number of fraudulent transactions that went undetected compared with the independence-based aggregation method. For this evaluation, a risk threshold was used, that is, the point where the bank enforces additional authentication and fraud investigation procedures.

Results showed that C-FDM has 13.10% less undetected fraudulent transactions. The evaluations were based on 33,333 real fraud scenarios at risk probability threshold of 0.6. Indeed, 492 fraudulent transactions were undetected by the independence-based aggregation methods compared with only 435 by C-FDM. When the threshold was increased to 0.700, 0.750, 0.800, 0.850, 0.900, 0.950, 0.970, 0.990, 0.997 and 0.999, C-FDM resulted in 12.530%, 15.470%, 15.280%, 18.740%, 19.530%, 19.490%, 17.920% 15.040% 11.630% and 7.870% less false negative errors than the other methods, respectively.

In simulations of the present invention, as shown in FIG. 13, C-FDM consistently led to less false negative results compared to the independence-based risk aggregation method. Detecting 13% more frauds prevents large monetary losses in the long run, because each of such detected frauds could lead to large losses. This strongly suggests the incorporation of evasive fraud patterns in the bank's risk engine can be of huge benefit for the bank and its corporate clients. This can be achieved by employing methods such as C-FDM that take into account negative correlations among risk factors.

Optimizing the Survival Copula

For the sake of m-banking usability, copula risk calculations should take as short time as possible. In a bank's daily activities, thousands or even millions of m-banking transactions may be executed. In each m-banking transaction, the C-REDv1 method needs to be evaluated at least once (e.g. in the simplest aggregation exercise of two risk factors). When more risk factors are aggregated, the number of copula calculations that need to be performed grows exponentially. A client has to wait for a long time (e.g. many minutes) to complete a transaction, while all the copula computations are made. The usability of the m-banking facility thus diminishes.

One solution to reduce the computation time of the C-REDv1 method is to employ more servers on the bank's server-side, with each server performing a portion of the computation. But this incurs high cost, which in turn reduces net profits. Therefore, a better solution to the problem has to be found.

A similar method to the C-REDv1 method is the novel Copula-based Risk Estimation and Detection Method Version 2 (C-REDv2). It is an optimization of the C-REDv1 with an applied survival function to improve efficiency. The C-REDv2 method evaluates the total cyber fraud risk of a financial transaction. This method can be applied as an equivalent measure to the C-REDv1 method. Both methods use the theory of copula.

There is one main difference between the two methods. The C-REDv2 method is based on a survival copula concept. The purpose now is to show how the survival function used in the survival copula can be successfully incorporated to estimate the survival risk region (i.e. the upper tail). This region will be calculated once. It will be necessary to derive how the survival copula can be used to reduce the steps required in the calculations of aggregated risk to only one copula calculation.

It will also be necessary to numerically calculate the survival risk region to show how the survival copula reduces complexity and the computation time of the C-REDv1 method. In addition, a comparison of the C-REDv2 method to the C-REDv1 method using the Mathematica built-in parallel function in terms of computation time will be provided.

The C-REDv2 method makes it simpler to visualize the aggregated risk region. When one of the risk factors is less than the maximum, three out of four quadrants estimate the risk value. The selection decision of the type of copula is enhanced as the aggregated risk region is visualized. The C-REDv2 method is estimated based on the calculation of the upper tail of the copula distribution. The value of the upper tail of the copula is critical in the estimation of the aggregated risk value in extreme risk scenarios. Some types of copulas, such as the T copula, consider the extreme tails more importantly than other elliptical copula types.

Even though the C-REDv2 requires one copula calculation, the calculation still takes a considerable amount of time when the number of dimensions n is large. The current evaluations were conducted on Mathematica 8 that uses an exhaustive numerical integration. The following will show how this type of integration method wastes time by evaluating unnecessary regions in the copula distributions. Even though these methods were slightly optimized in Mathematica 8 to make their algorithms less exhaustive, they still take a long time to calculate. When a fraud pattern is composed of many risk factors, it is not wise to eliminate some risk factors for the sake of performing faster calculations. This provided the motivation to find more efficient integration methods in the literature.

The Genz Integration method was found to be more efficient than exhaustive integration methods relative to computing the CDF of elliptical probability distribution functions. The mathematics of the Genz non-linear transformation algorithm will now be explained, and a novel contribution will geometrically explain the Genz Integration method and its pseudo code. Calculation time is reduced significantly using the Genz method Matlab compared with the exhaustive methods that were presented earlier. To the best of the inventor's knowledge, unlike previous work which focused on visualizing non-copula functions, this novel contribution is the first to visualize the Genz algorithm as the copula function is being computed and visualizing the transformed cubature to reveal the non-linear boundaries in high dimensions (i.e. in two and three dimensions).

The C-REDv2 Method

Estimating risk using copula may be time-consuming. When there are many individual risk factors, the equations used in the C-REDv1 may require many copula calculations. Therefore, a large amount of computation time will be taken to calculate the aggregated risk value. The running time of calculating high dimensional copulas can be so long that aggregation of fraud risk factors may become impractical for m-banking systems.

The C-REDv2 method is a novel optimized version proposed to simplify the C-REDv1 method. This optimized method can calculate the aggregated risk more efficiently using a survival function. In the C-REDv1 method, for each subset generated by the inclusion-exclusion principle (as shown in Equation 4.9), the calculation of different copula terms was required. The number of copulas grows exponentially with respect to n; in case of n marginal, the C-REDv1 has to calculate $2_n-1-n$ copulas, many of which are high dimensional. However, if the equations are derived in terms of the survival function, the copula calculations will be significantly reduced, and only require an evaluation of one copula term. The mathematical derivation of C-REDv2 is as follows:

$$Pr\left(\bigcup_{i=1}^{n} S_i \leq x_i \middle| C\right) == 1 - Pr\left(\left(\bigcup_{i=1}^{n} S_i \leq x_i\right)^c \middle| C\right) \quad \text{(using complement)}$$

$$= 1 - Pr\left(\bigcap_{i=1}^{n} (S_i \leq x_i)^c \middle| C\right) \quad \text{(using De Morgan's law)}$$

$$= 1 - Pr\left(\bigcap_{i=1}^{n} (S_i > x_i) \middle| C\right) \quad \text{(removing complements)}$$

$$= 1 - \widehat{Copula}_\rho^K(Pr(S_1 > x_1), \quad (6.1)$$
$$Pr(S_2 > x_2), \ldots, Pr(S_n > x_n))$$

$$= 1 - \widehat{Copula}_\rho^K(1 - Pr(S_1 \leq x_1),$$
$$1 - Pr(S_2 \leq x_2), \ldots,$$
$$1 - Pr(S_n \leq x_n))$$

$$= 1 - \widehat{Copula}_\rho^K(1 - P_1(x_1), \quad (6.2)$$
$$1 - P_2(x_2), \ldots, 1 - P_n(x_n)).$$

The Copula is the kernel of the "survival copula". The copula kernel function of this term is fed with the survivals of the marginal distributions associated with the individual fraud risk factors. According to the above mathematical derivation, the survival copula region may be simply complemented to derive the aggregated risk quantity. The C-REDv2 method prevents the computation of the inclusion-exclusion copula subsets. The C-REDv2 requires calculating only one n dimensional survival copula. Calculating the aggregated risk value in the C-REDv2 is mathematically equivalent to calculating the complement of the n-dimensional survival integration.

$$P_{Aggr.}^{dep.} = 1 - \int_{x_1}^{+\infty} \int_{x_2}^{+\infty} \ldots \int_{x_n}^{+\infty} f^{Copula}(x_1, x_2, \ldots x_n) dx_1 dx_2 \ldots dx_n. \quad (6.3)$$

Here, $f^{Copula}(x_1; x_2; \ldots x_k)$ is the copula PDF (defined on the quantile space) that is the same as the one used in the C-REMv1 method. The copula quantiles are equal to the corresponding marginal probabilities. This is due to the special property of having uniform marginals along the copula dimensions. However, the ranges of the integration in C-REDv2 are solving the quadrature value of the survival copula. They are different from the ones performed in the copula terms of the C-REDv1 method that solve the CDF copulas. This optimization leads to a more efficient calculation in terms of computation time. The improvement in the running time as a result of this optimization method is evaluated and discussed later.

The survival method can also be implemented in the independence-based method:

$$P_{Aggr.}^{ind.} = 1 - [1 - P_1(x_1)] \times [1 - P_2(x_2)] \times \ldots \times [1 - P_n(x_n)]. \quad (6.4)$$

Cubature Estimation of Survival Copulas

Calculating the aggregated risk requires survival copula but often the distribution is given in terms of a copula. Although this makes it easy to calculate CDF (based on Sklar theorem), the optimization of the present invention requires calculating the survival as opposed to CDF. (The boundaries of integration for CDF and Survival are $(-\infty; p_i]$ and $[p_i; +\infty)$, of respectively). In certain cases, where there is symmetry, the two integrations are equal and the survival is identical to the CDF. In such cases, the value survival copula is equal to the value of the copula. An important class of copulas with this type of symmetry is elliptical copulas. A copula is elliptical when it is based on a PDF that is in form of $PDF(x) = f(|x-\mu|)$ for some function f. Examples of elliptical copulas include Gaussian and t-copulas.

The estimation of the integral of survival copulas depends on the type of copula kernel. There are elliptical and non-elliptical copula kernels. The former is symmetrical and the latter is asymmetrical. The Gaussian copula and t-Copula are examples of elliptical copulas. In the case of symmetry, the C-REDv2 method can be simplified by quantifying the CDF directly using the Sklar theorem instead of the integration over the physical region of the survival copula. The Gaussian Copula CDF and the t-Copula CDF can be used respectively to compute the numerical integration of the survivals of these copulas. Numerical integration of multiple variables is sometimes called the cubature (computing the volume of a solid) or quadrature (computing the surface area). If the copula is symmetric when the marginals are Uniform [0; 1]), the survival copula is computed based on Sklar theorem as follows:

$$P_{Aggr.}^{dep.} = \widehat{Copula}_\rho^K(p_1, p_2, \ldots, p_n) = 1 - \quad (6.5)$$
$$\int_0^{1-p_1} \int_0^{1-p_2} \ldots \int_0^{1-p_n} f^{Copula}(x_1, x_2, \ldots x_n) dx_1 dx_2 \ldots dx_n.$$

Here $p_i = P_i(x_i)$. The region of integration was changed from the upper tail to the lower tail. This allows the computation to be performed using the CDF. The simplification in the above equation is due to the reversal symmetry between the right and left tails in the Probability Distribution Function (PDF) of the copula.

However, if the copula kernel is asymmetrical (e.g. a Clayton copula), the numerical integration algorithm that needs to be used to estimate the survival copula for the C-REDv2 method cannot be simplified by substituting the survival with the CDF. The Sklar theorem used in the C-REDv1 method will no longer be appropriate. In order to account for the asymmetry, there is need for an integration implementation specifically designed for determining the quadrature of the survival copula. It may be performed by using a modified version of Sklar theorem.

The C-REDv2 Algorithm

The calculations of the C-REDv2 can be summarized as the following pseudo code algorithm.

```
function C-REDv2( ρ, x⃗ )
Input: x⃗ = (x₁, x₂, ... xₙ)ᵀ ∈ ℝⁿ
    for i=1:n do
        sᵢ := 1 − CDFᵢ(qᵢ)            ▷ sᵢ is survival
    end for
    return 1 − COPULAρ(s₁, s₂, ..., sₙ)
end function
```

Due to the tail symmetry of elliptical copulas, $s_i$ is equivalent to the marginal survival of risk factor i at $x_i$ (i.e. $s_i=1-p_i=1-CDF_i(x_i)$). The implementations of the CDF functions are used for evaluating the marginal survival. The functions $CDF_i(x)$ are numerical integration implementations of the CDF of the marginal distribution of the risk factor Si. The CDF was calculated to find the Survival Copula because it is valid in the case of symmetry which is a merit of elliptical copulas.

Evaluations of the Running-Time Performance

The running time of the C-REDv1 and C-REDv2 and the multi-core parallel implementation of the C-REDv1 were measured. The aim was to evaluate their applicability for m-banking systems. The experiment measured the computation time for aggregating up to ten risk factors. The running-time performance tests were implemented using Mathematica 8 (Wolfram Research, Inc.) on a Toshiba Dual-Core machine (2.40 GHz, 4 GB RAM, and 32-bit).

Figure 14:
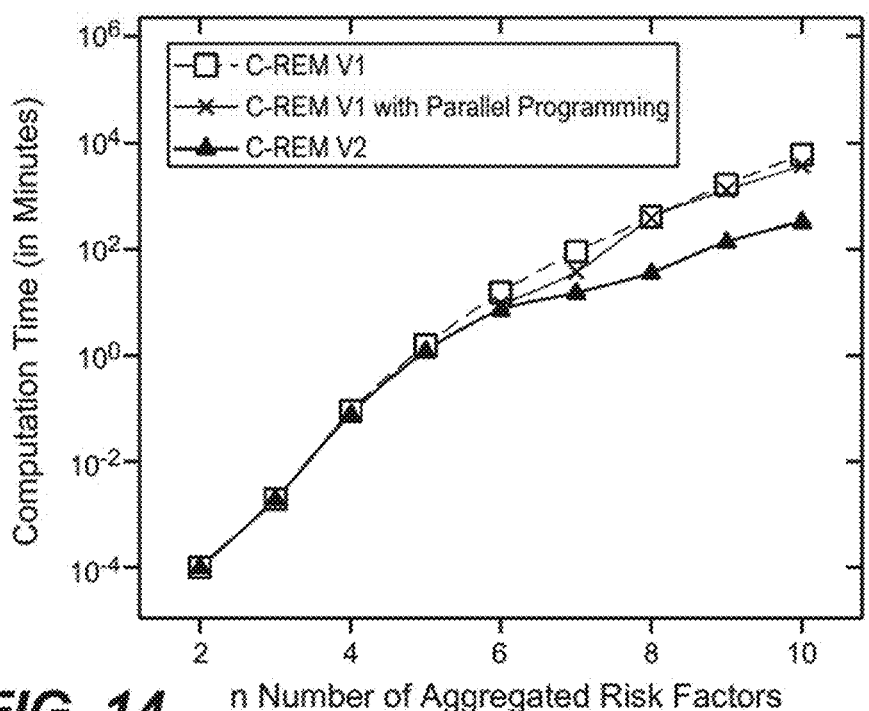
FIG. 14 is a graphical illustration of performance comparisons between the C-REDv1, C-REDv2 and the parallel programming implementations of C-REDv1, according to the present invention.

The results showed that the evaluations of the C-REDv1 take up to hundreds of hours if a large number of risk factors is used (>101 hours for n=10 risk factors; FIG. 14), revealing that the running-time of the computations is a serious limiting factor in aggregating larger numbers of risk factors. The performance results of the three implementations of the C-REM method are shown in FIG. 14. The computational cost of the C-REM method grew exponentially.

The C-REDv2 helped to cut down the computation time significantly. In the case of 10 risk factors, the computation time was 101 hours and 5.5 hours for the C-REDv1 and the C-REDv2 method, respectively, leading to a saving of 95.5 hours waiting time for each corporate m-banking client during the bank's fraud checks process. Indeed, the C-REDv2 further optimized the running time by more than one order of magnitude. To improve the running time performance, the C-REDv1 model was also implemented using the parallel processing feature in Mathematica (a built-in function Parallelize). The parallel implementation of the C-REDv1 improved the running time performance. The C-REDv2 performed faster than both of the CREDv1 and the parallel implementation of the C-REDv1. The simplicity of the C-REDv2 algorithm had led to significant savings in terms of time.

Visualizing the Risk on Elliptical Copulas

Since "Gaussian has no tail dependence", the Gaussian copula may not be suitable for a risk scenario where tail dependence is present. Therefore, the T copula is more suitable for modelling extremely risky events because "it gives asymptotic dependence in the tail".

The visualization of the survival copulas can help to make a better decision about the choice of the copula kernel. As shown in FIG. 14, the Gaussian copula is ineffective in capturing the risk data at the tail of the copula while the T copula is more effective.

Figure 15A:
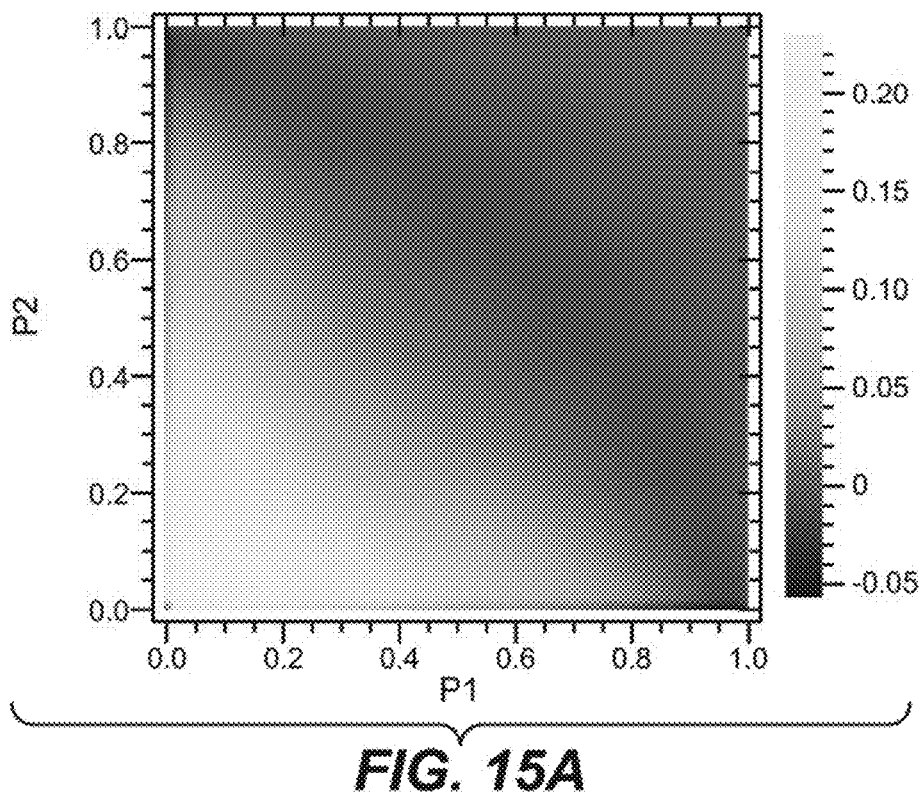
FIGS. 15A and 15 B are graphical illustrations of the difference between various copulas in case of negative correlation, according to the present invention.
Figure 15B:
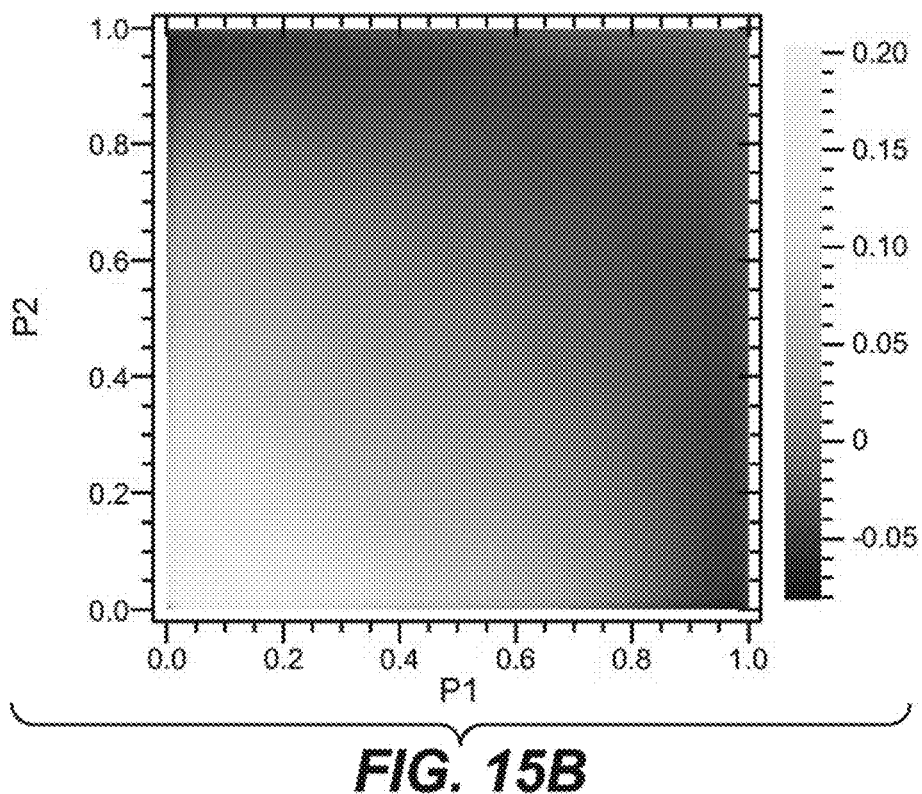
Figure 16A:
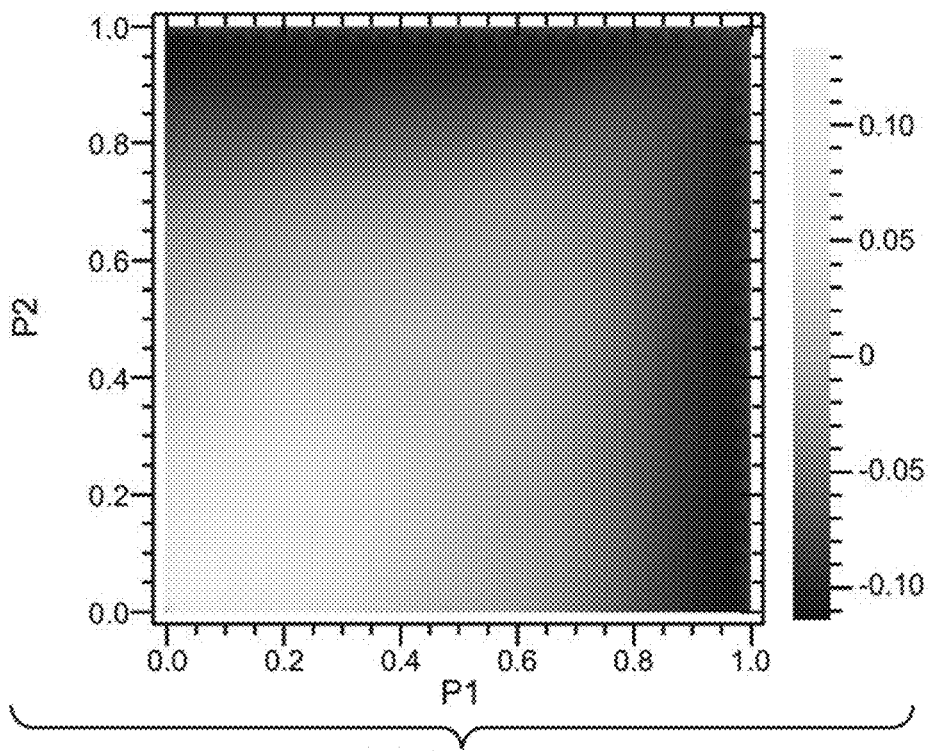
FIGS. 16A and 16B are graphical illustrations of the difference between various copulas in case of positive correlation, according to the present invention.
Figure 16B:
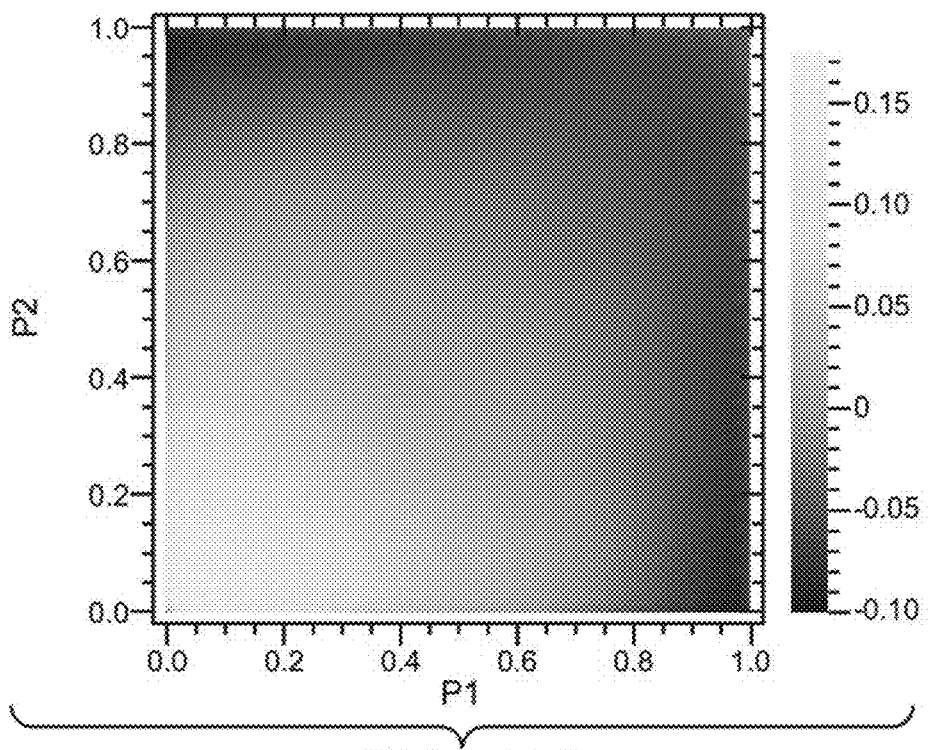

With respect to FIGS. 15A and 15B, the lower risk in T Copula along the negative dependence indicates the ability of this copula to model the risk at the extremes and not only in the main part of the distribution as with the Gaussian Copula. The impact starts to become more significant as the correlation becomes lower and especially when it becomes more negative until being extremely negative. The darker shade illustrated in FIGS. 15A-B, near the extreme regions increases in the extremely negative correlation which indicates a high detectably of risk and the ability to model risk in extremely negative correlation using T Copula. Thus, T Copula would be suitable for risk estimation at the extremes along and near the diagonal line where both risk values P1 and P2 are moving towards the extreme risk, as shown in FIG. 15A as the correlation goes lower and moves to negativity from FIG. 16A to FIG. 16B to FIG. 15B and, finally, to FIG. 15A.

Figure 20:
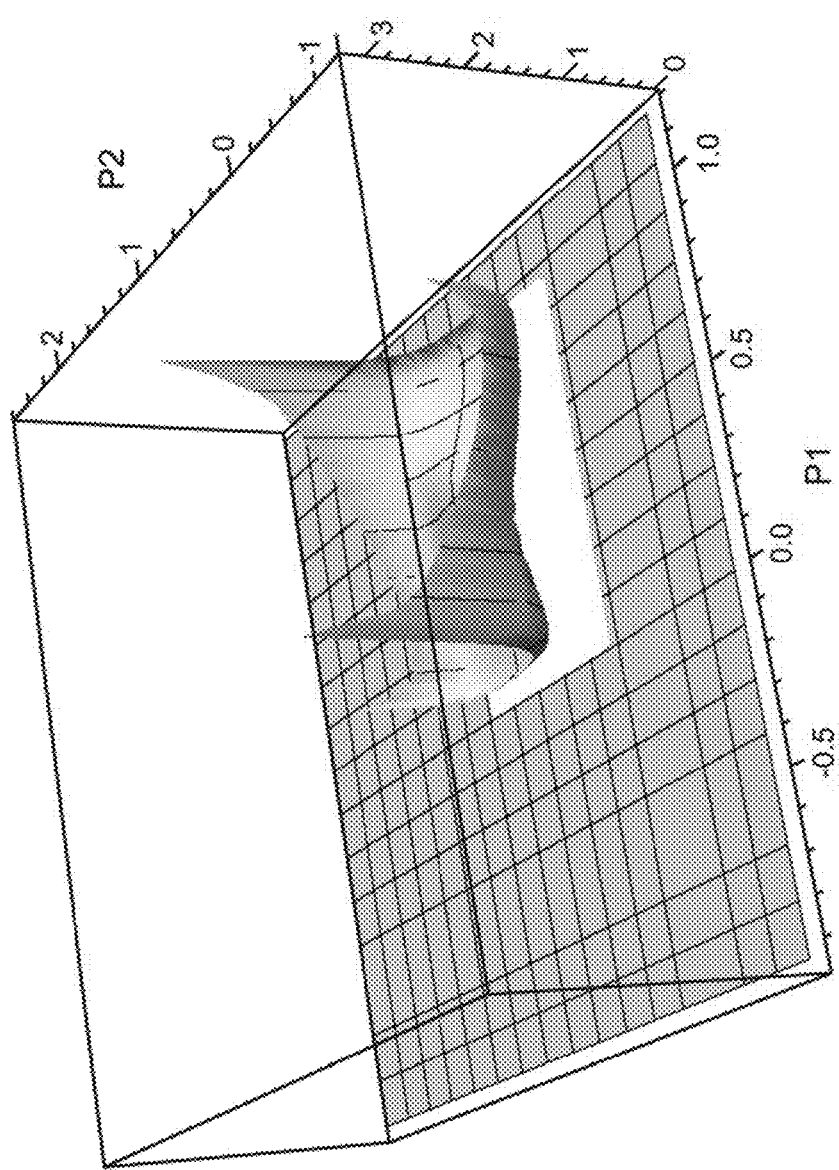
FIG. 20 is a graphical illustration that shows the symmetry of the T copula with uniform marginal and positive correlation, according to the present invention.
Figure 21A:
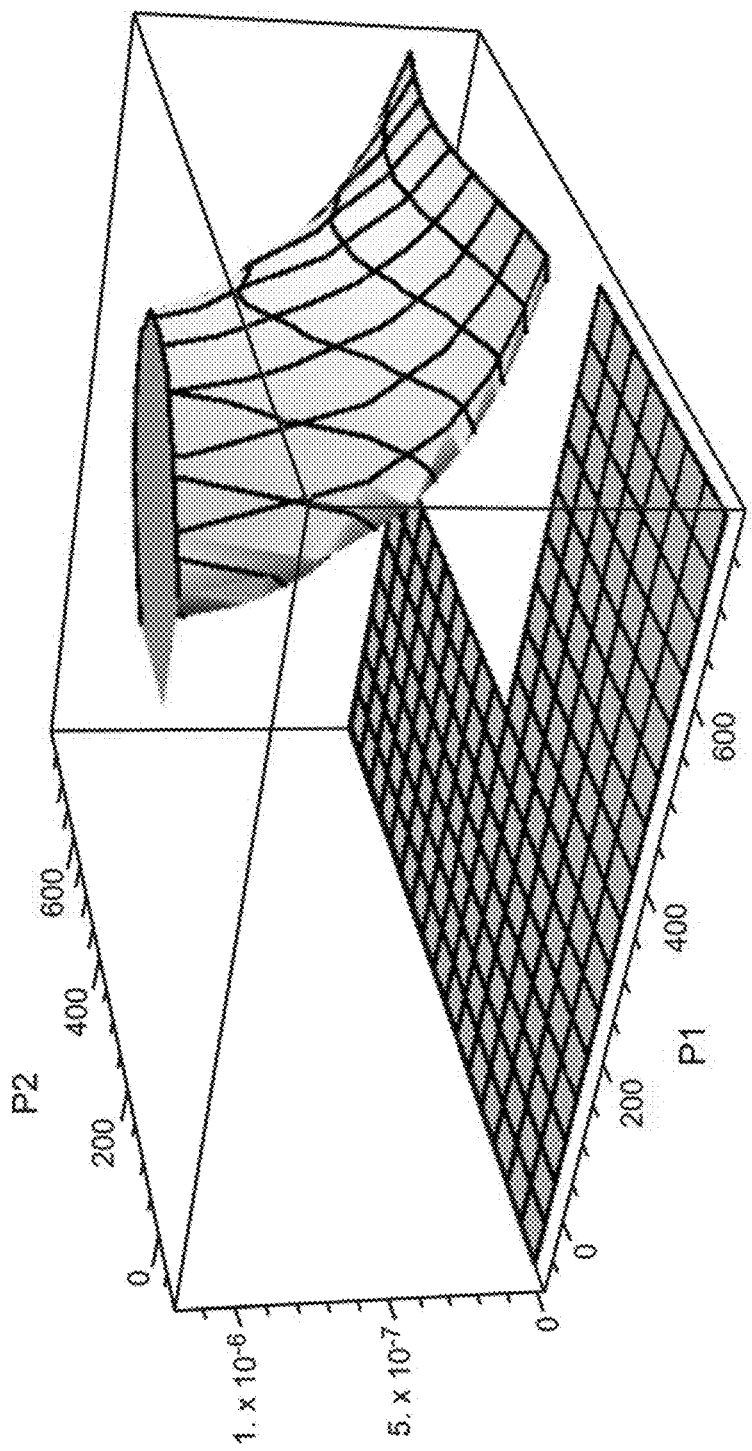
FIGS. 21A and 21B are graphical illustrations that show the T copula with Levy marginals with positive correlation (FIG. 21A) and its List Plot (FIG. 21B), according to the present invention.
Figure 21B:
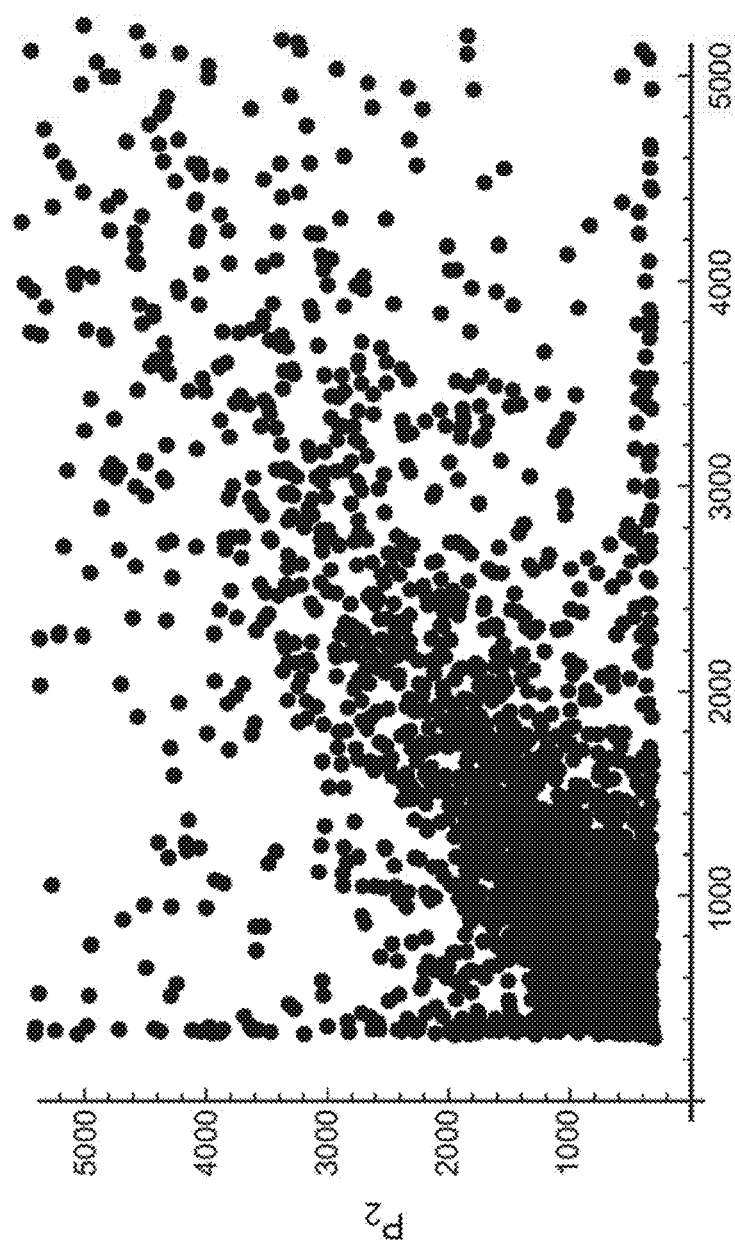
Figure 22:
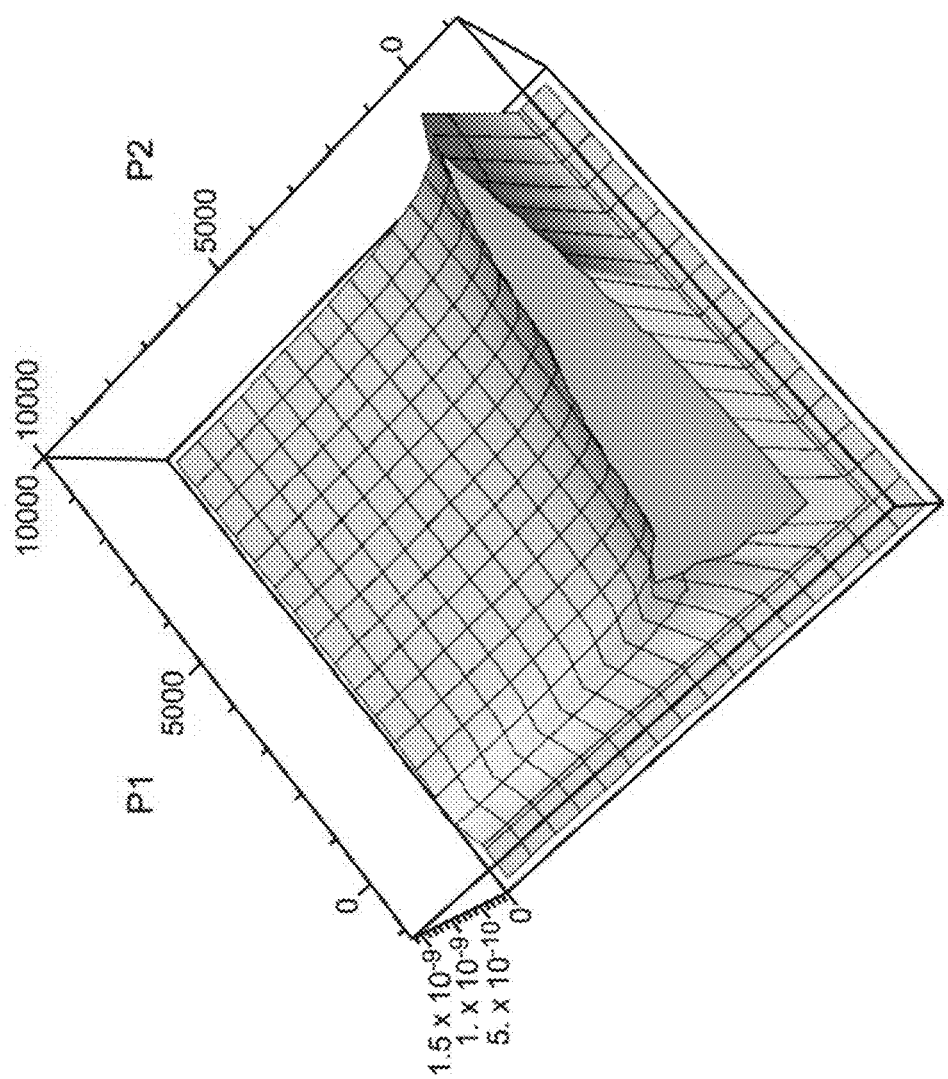
FIG. 22 is a graphical illustration that shows the T copula with two different Levy marginals joined by a positive correlation, $\rho$=0.9, according to the present invention.

With respect to FIGS. 21A, 21B and 22, they illustrate the ability of Elliptical Copula to model any set of marginal (i.e. individual) risk distributions even when the individual risk distributions are non-elliptical and have different properties. In particular, FIGS. 21A and 21B graphically model the joining of two Levy Risk Distributions. When the marginal distributions being joined are similar, the joint becomes symmetrical at least along one of the diagonals. When the two marginal risk distributions are different, the joint distribution becomes non-symmetrical as in FIG. 22. It is a distinguishing property of elliptical Copula which allows it to convert the joint distributions that have non-symmetrical shapes, as shown in FIGS. 21 A and 21B and FIG. 22, to one that has a symmetrical shape, such as shown in FIG. 20. This property has been utilized in the formation of the Survival Copula C-REDv2 method.

The Gaussian assumption should be avoided in the modelling and estimation of extreme risk transactions. The T copula helps to predict risk at the tail of the copula distribution. T copulas indicate that there is a probability of risk at the tail as the risky behavior moves towards the extremes. When the marginal risk factors experience fraudulent behaviors near the extremes, T copulas account for the aggregated risk better than the Gaussian copulas.

Figure 17A:
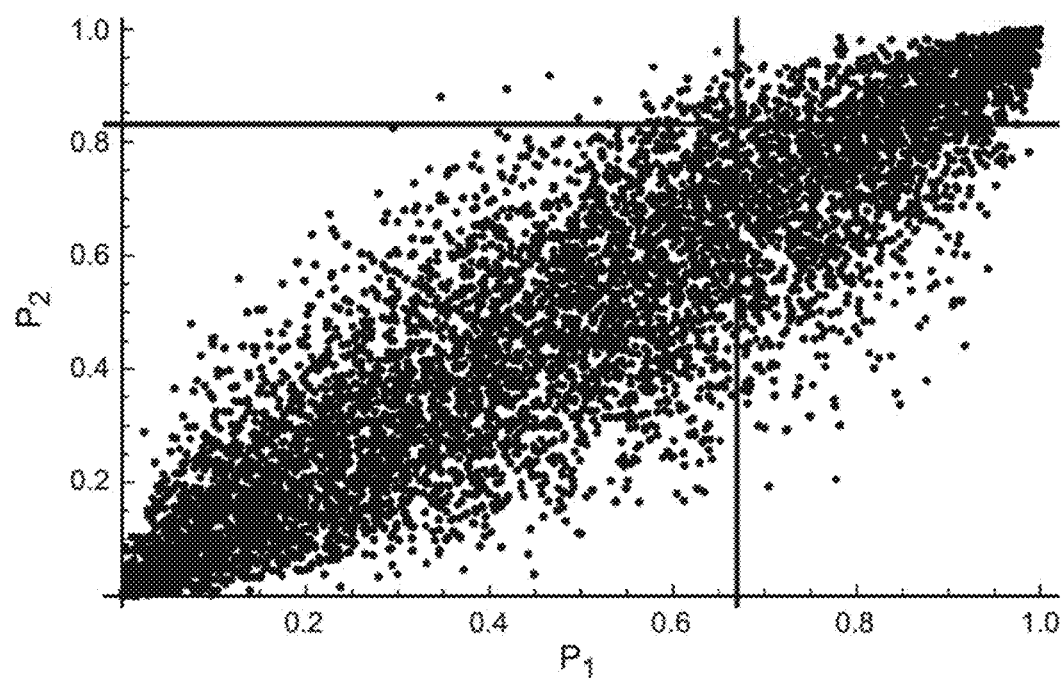
FIGS. 17A and 17B are graphical illustrations that show Union Aggregated Risk with a Gaussian copula, $\rho$=0.91 (FIG. 17A) and union aggregated risk with a T copula, $\rho$=0.91 (FIG. 17B), according to the present invention.
Figure 17B:
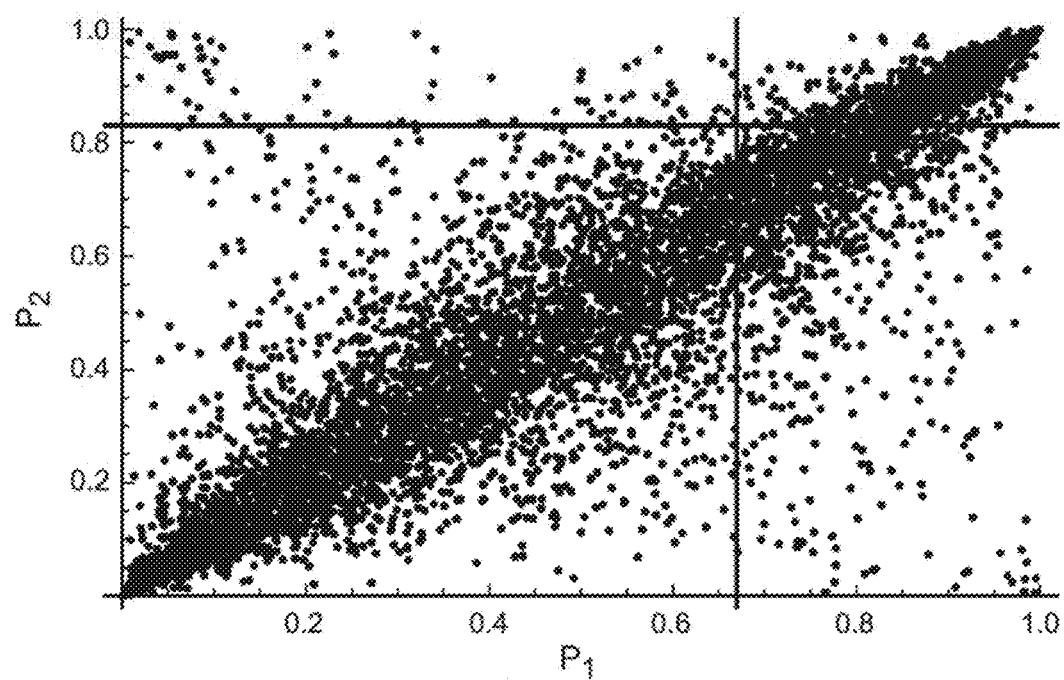
Figure 18A:
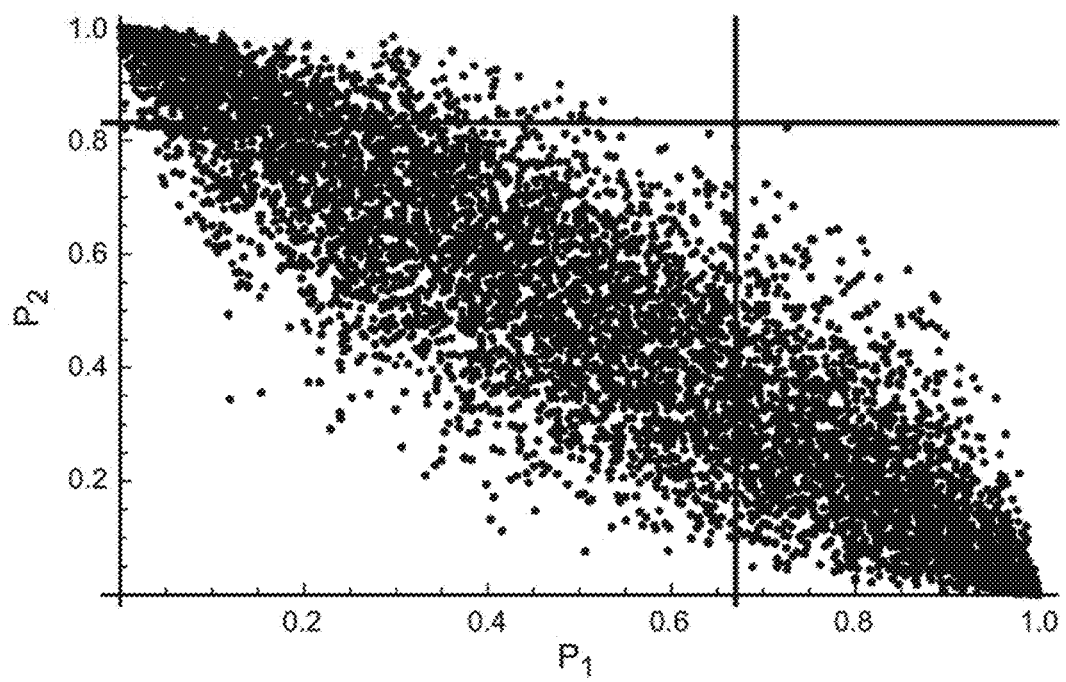
Figure 18B:
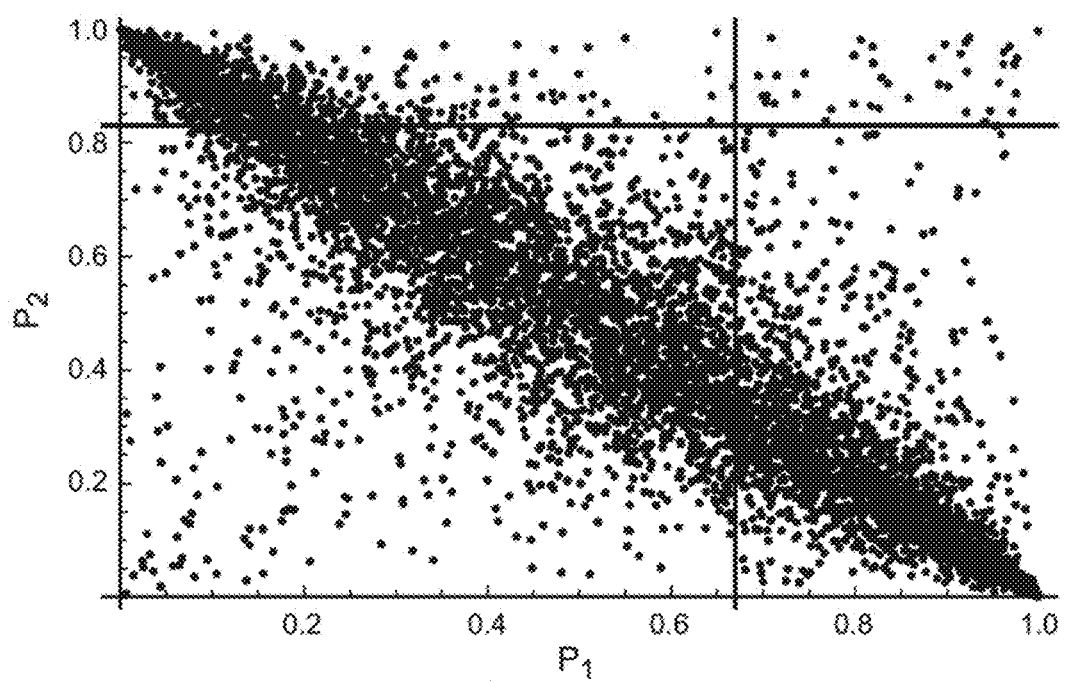
Figure 19A:
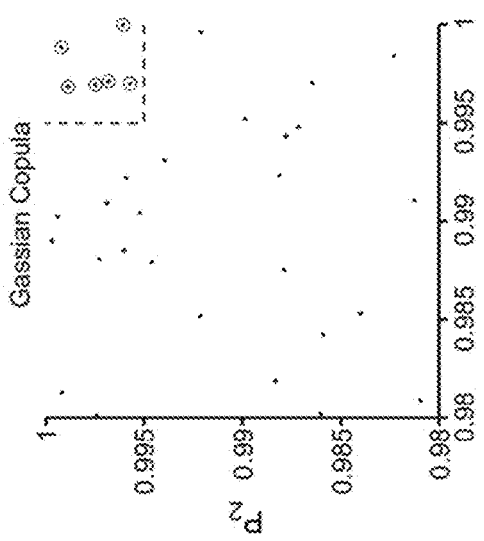
FIGS. 19A-19D are graphical illustrations of the Gaussian copula over estimate of the aggregated assurance value in the case of positive correlation between two marginal distributions, according to the present invention.
Figure 19B:
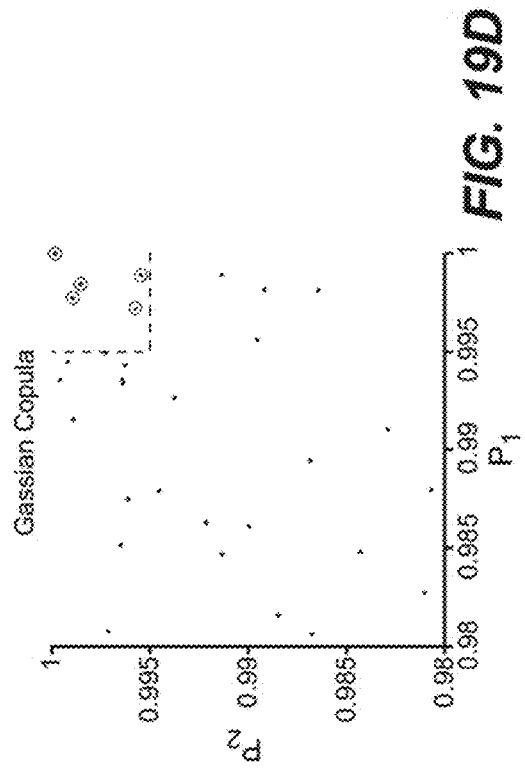
Figure 19C:
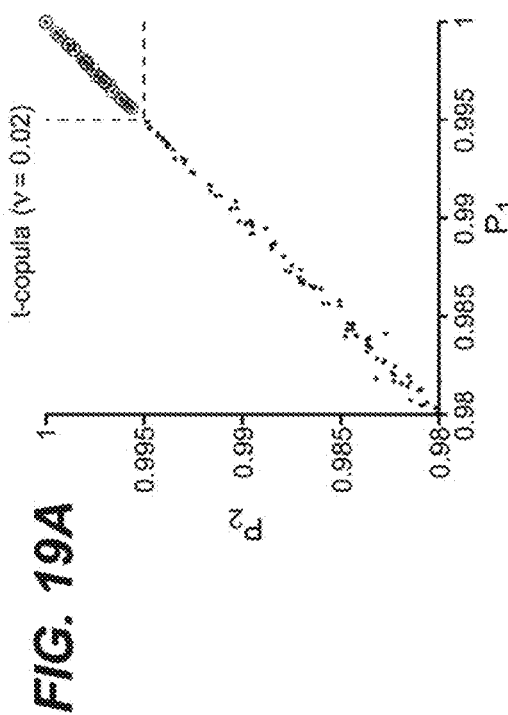
Figure 19D:
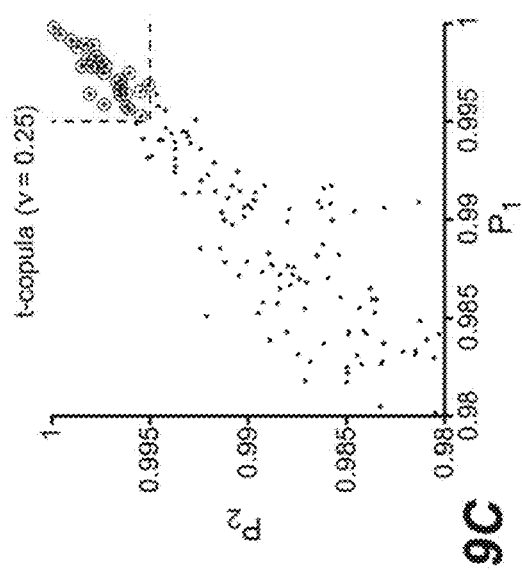

A Monte Carlo data points were generated to follow a T copula for the two distributions on the left panels and a Gaussian copula for the two distributions on the right panels as shown in FIGS. 19A-19D. The data points for the T copula are highly dense on the upper left and lower right quadrants near the tails in case of negatively correlated T copula. By the same token, the upper right and lower left quadrants are highly dense in case of positively correlated T copula. This indicates that C-REDv2, using a T copula kernel, can capture correlations at the extremes, making it suitable for cyber risk aggregation. Therefore, T copula is more suitable than the Gaussian copula for modelling extreme risk events at the tails. The data plots in FIGS. 17A-17B compared the union region of the two copulas using positive correlation while FIGS. 18A-18B use negative correlation.

What is Still Needed for Real-Time Risk Estimation?

Although a reduction in the calculation time was achieved, the evaluation showed that implementation using this method was still not suitable for real-time risk estimation and authentication decision-making. The integration over the marginal risk distributions is instantaneous. However, the calculation of the survival copula of high dimensions (e.g. more than 3 dimensions) becomes more time-consuming. Therefore, the survival copula computation needs to be performed using more efficient integration methods. The computation time for this integration (using the C-REDv2) could be further optimized. The mathematical formula which evaluates the Cumulative Density Function (CDF) for a Gaussian Copula distribution needs to evaluate the CDF of the multivariate normal distribution (MVN). This is the computational-heavy component of the CREM V1. Similarly, the survival of the MVN for the CREM V2 is the computationally heavy component. Both the CDF and the survival function suffer because of the time taken for the integration computation in Equations 3.13 and 3.14.

Next, the focus of this disclosure will be on how the CDF and Survival function are computed to evaluate the integration over elliptical copulas. Both the Gaussian and the t-copula are discussed. The CDF function of Mathematica is not recommended for m-banking systems. By a thorough study of the literature of numerical integration, the existence of other highly efficient methods was determined.

Genz Non-Linear Integration for Elliptical Copulas

As was explained earlier, the adaptive integration method is more efficient than the exhaustive method. However, the adaptive integration method generates many points that are not eventually used in the core part of an integration calculation. Genz introduces a more efficient integration method that uses non-linear transformations to calculate the integration of an elliptical distribution. In particular, it was created to solve integration over a MVN and an MVT distribution function.

Figure 23A:
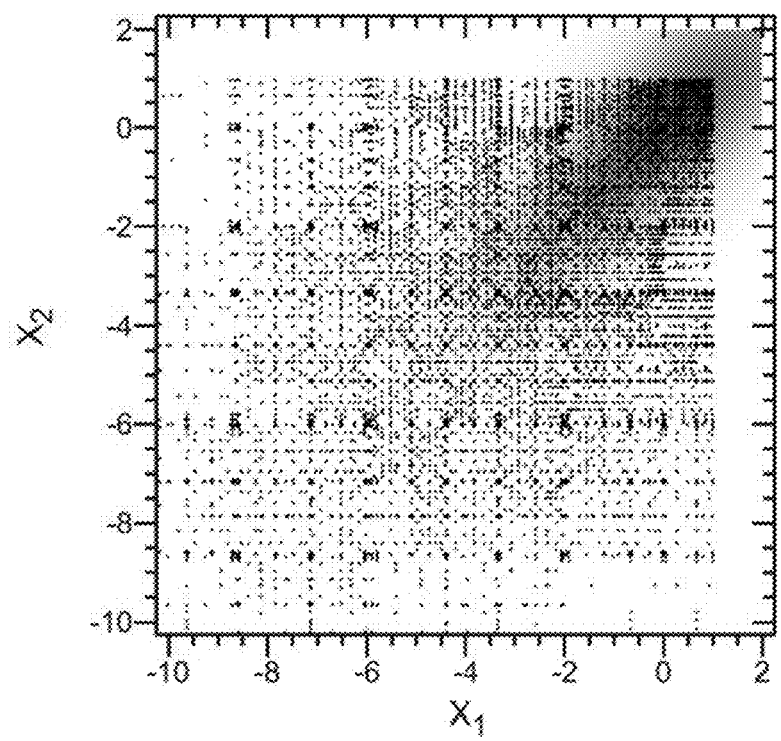
FIGS. 23A and 23B are two-dimensional representations of an adaptive numerical integration method using a "Global Adaptive" integration strategy, according to the present invention.
Figure 23B:
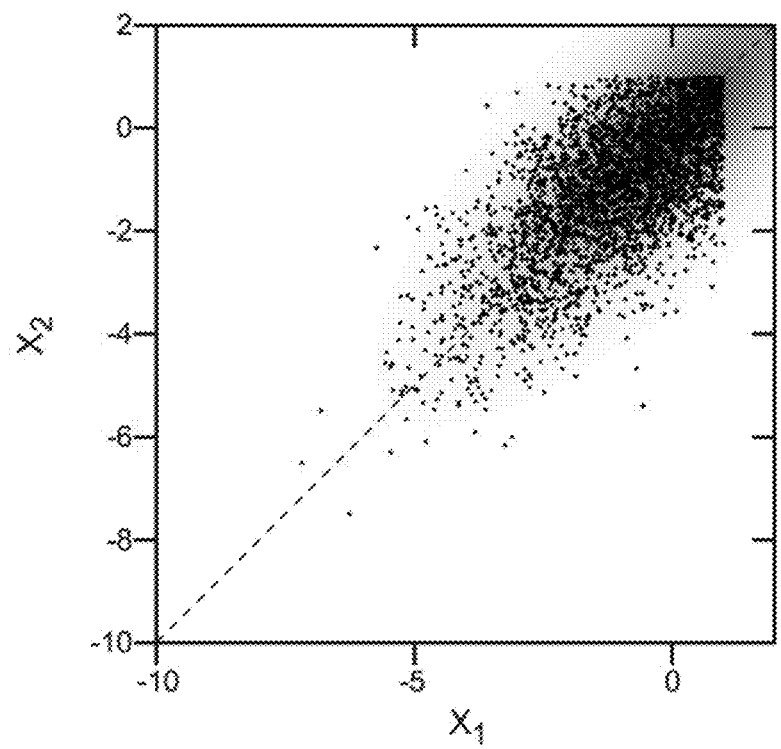

The experiment results, as illustrated in FIGS. 23A-23B, show how the Genz non-linear transformation method is more intelligent than the adaptive integration method (Equation 3.2). The experiment was performed using a Gaussian copula with positive correlation matrix. The random points that have to be generated to solve the integration lie exactly on the density of the distribution. All points are used to calculate the CDF. There are no wasted points as in the adaptive or the exhaustive methods. The exhaustive numerical integrations using the Mathematica Software was not time-efficient. A detailed research into the literature on integration methods helped to find an effective method by Genz, where the Genz integration method is based on geometrical non-linear transformations. An initial experiment of the copula CDF computation time showed a tremendous time reduction. The CDF computations that take days to be computed in Mathematica can take only a few minutes using the Genz integration method in Matlab.

The C-REDv2 method presented here is based on analytical simplification using the survival function. The C-REDv2 method was then explored using the Genz non-linear transformation method. The purpose of using both methods was to achieve a more efficient numerical integration computation. Attempts were made to simplify the formula analytically as much as possible so that the resulting calculation time of the numerical evaluations would be minimal. Another approach is parallelization, which will be discussed in greater detail later. But when m, the number of copula dimensions, is large (e.g. m≥10), parallelization is not enough without simplification. It was also necessary to use some analytical simplification as well as parallelization. The previous method presented was used to simplify the calculations. It was also noticed the method resulting from the simplification by Genz et al. could be further improved by parallelization, which will be discussed in greater detail later. Each of the two methods helps to reduce part of the complexity of the computation, and therefore lessens the running time, which in turn, helps in reaching a practical real time risk estimation.

Calculating the elliptical copulas is far too time-consuming. In the case of elliptical copulas, the most time-consuming part of the calculations is attributable to the CDF of multivariate elliptical distribution. So it was necessary to calculate the CDF according to the Sklar theorem. But calculating the CDF requires numerical integration and the current numerical integration methods take hours to calculate which would not be acceptable in mobile banking, since it is absolutely essential to calculate the elliptical copula in real-time.

The C-REDv2 achieves a better performance by using Genz method in Matlab's built-in function CDF than the exhaustive numerical integration method in Mathematica. Next, the disclosure focuses on optimization of the CREDv1. After that, Genz non-linear integration is used to achieve a more efficient time performance than the exhaustive integration method.

Genz Non-Linear Transformations Method

Starting with an original space, X, where the Monte Carlo points will pass through during the transformation, as each point passes through this space, it captures the density of the kernel of the elliptical distribution. The integration boundaries are defined in the X space. Many points are generated. Each point contributes in the calculation of the quadrature of the probability distribution. The Monte Carlo points are inside the boundaries of this space, and need to fill the space to give an accurate value.

The integration of probability in the transformed space must be equivalent to the volume of the original space. Since the Monte Carlo points are generated in a uniform fashion, applying them directly on the original space will not enable them to capture the density patterns. The Monte Carlo points are randomly generated points inside a W space. These points are then transformed into a sequence of transformed spaces. For this disclosure this will be called the $T_{W \to Z}$ transformation. However, a full description of this transformation will require defining a series of transformations from the Z to Y, Y to X, X to Y and Y to Z spaces. The $T_{W \to Z}$ transformation cannot be described separately in a simple and intuitive way. Accordingly, it will be defined in terms of equations hereinafter in greater detail. It is noted now however, that it is not a one-directional transformation. The direction of transformation varies upon the particular stage of the transformation process. The first space is the Monte Carlo space. The random point goes through space X, Y, and Z. The final numerical integration is based on the boundaries of Z. The goal of the transformation is to flatten the density of the PDF by means of non-linear transformations from the W space to the Z space and removes the effect of correlation. The volume under the surface of the distribution remains the same. The only change is the shift in points to different locations to flatten the transformed distribution to allocate them in the space in a more uniform fashion than the original distribution space. The Monte Carlo points capture the points in the transformed space perfectly. There will be no waste in the generation of Monte Carlo points. This is the benefit of the flattening of the distribution.

Where there is density, the exhaustive Monte Carlo is not efficient. Because it ignores the areas with high density, it should not be applied on the original raw distributional data. It should be applied on the transformed space after the transformation. Every point from the Monte Carlo sample is flattened using geometrical methods to transform the original density. What is desired is for the Monte Carlo algorithm to pick the points concentrated on high density regions. The transformation will help eliminate the density patterns. By getting rid of the density, the points will be spread evenly around the transformed space.

The purpose of flattening the distribution in the transformation is to capture the density patter of the X space into the Z space. All the points generated by the Monte Carlo method in the W space will be utilized efficiently in the integration on the Z space. To be able to capture the patterns, one needs to generate a tremendous amount of points.

After the transformation, the Monte Carlo algorithm will generate points that will fall evenly in every point of the region, capturing the density patterns. Since the region is stretched, resulting in non-linear boundaries, the Monte Carlo algorithm will capture the original density pattern perfectly without the need to know the patterns. The Monte Carlo algorithm does not need to know the density pattern in the original space; it only needs the transformed boundaries. Each evaluation of a single Monte Carlo point will capture the density patterns of the distribution which will be influenced by the distances to the non-linear boundaries of all the dimensions n≥1, where the only linear boundary is in the first dimension. A minimum number of samples is achieved by using the non-linear transformations method. Through the non-linear transformations, the following intermediate goals were achieved. The PDF is flattened. Efficient sampling is achieved by choosing more samples where the PDF is larger and has less number of points where the probability density is smaller. There is no wasted calculation when the transformed non-linear boundaries are used. Accordingly, the integration based on non-linear transformation becomes more efficient than the exhaustive one.

In Gaussian and t-distribution, this transformation method is particularly useful for the reason that there are large areas of integration with extremely low probability density. Taking them into consideration by choosing Monte Carlo sample points located in these regions will have no significant effect on the outcome of the Cumulative Distribution Function (CDF) value. As a result, the non-linear transformation maneuvers the numerical integration more intelligently by focusing only on subsets of the whole area. Therefore, it will be more efficient than the exhaustive method.

The CDF is calculated based on the samples taken from the transformed space. The PDF of transformed space is flattened. Each calculation will have some influence on the outcome value. All calculations contribute equally and efficiency is maximal with respect to the number of Monte Carlo (MC) samples.

The randomly generated points should not be rejected and all the points should fall within the non-linear region (manifold) in the Z space. There will be no randomly generated points that fall outside the non-linear boundaries of the manifold. These points should cover all the volume inside the non-linear region.

Every random generated point is generated according to the following procedure, starting with a random point generated in the W space. Firstly, it is necessary to find the boundaries by using the non-linear transformation described in the previous section. Then the coordinates of the point in the manifold volume are determined. Each point has n number of axes that pass through it in a multi-dimensional space. The lengths of these axes are governed by the non-linear boundaries. Once the lengths are measured, their multiplication is performed. Finally, the weighted sum is calculated to compute the volume.

Genz Integration Method with Non-Linear Transformation
Transformation of the Monte Carlo Points The geometrical descriptions in this section are described in terms of four spaces namely X, Y, Z and W. Each of them is a subset of the m-dimensional Euclidian space ($R^m = R \times R \times \ldots R$), where m the number of dimensions in the copula. Although some of them are defined as same sets (mathematically X=Y, Z=W) but each set is used for different representations of the points used to describe the Alan Genz' Integration algorithm. FIGS. 15A and 15B give a visualization of these spaces.

$$\mathbb{X} = \mathbb{R}^m \quad (6.6)$$

$$\mathbb{Y} = \mathbb{R}^m \quad (6.7)$$

$$\mathbb{Z} = (0,1)^m \quad (6.8)$$

$$\mathbb{W} = (0,1)^m \quad (0.9)$$

$$x \in \mathbb{X} \leftrightarrow \mathbb{X}, y \in \mathbb{Y} \leftrightarrow z \in \mathbb{Z} \leftrightarrow w \in \mathbb{W} \quad (6.10)$$

The X space is the original space in which the multivariate Normal distribution (or the multivariate t distribution) is defined. Each dimension of the space X is one of the quantiles of this distribution. The Y space is where the distribution of the Monte Carlo points, when mapped from X to Y, is a spherical distribution. A Spherical distribution is a distribution that is symmetrical among all dimensions (e.g., a normal distribution with independent variables). The marginal distribution at each dimension will be a standard Normal distribution $y_i \sim$ Normal (0, 1). The Z space is one in which the PDF of the transformed distribution is at. The mapped distribution from the original distribution into Z is a uniform cube (hypercube). The random variables z are independent and $x_i \sim$ Uniform (0; 1). The W space is one in which all the points within the boundaries of integration are mapped onto the intervals [0; 1] at each dimension. If the Monte Carlo points in the X space follow a Normal distribution, the points in W will not be uniformly distributed. But in the Monte Carlo algorithm used by the Genz algorithm, a different distribution (different to what described above) is used. In the algorithm, the points are generated so that they are uniformly distributed in the W space (instead of uniformly distributed in the Z space). After transformation, these points will not exactly follow a Normal distribution in the X space, and neither a uniform distribution in the Z space. But a correction factor, the density T(z), will compensate the non-uniformity in the Z space. As a result of this compensation, the outcome of integration will be corrected, i.e. equivalent to a Monte Carlo without the density T(z), i.e. T(z)=1 in which the Monte Carlo points are uniformly spread in the Z space. A summary of transformations between the points in these sets is listed in the following equations. They are explained in greater detail later.

$$\mathbb{X} \ni x = Ly, y \in \mathbb{Y} \quad (6.11)$$

$$\mathbb{Z} \ni z = \Phi(y), y \in \mathbb{Y} \quad (6.12)$$

$$z \in \mathbb{Z} : z_i = w_i \times (e_i - d_i) + d_i, w \in \mathbb{W} \quad (6.13)$$

The Genz integration algorithm uses non-linear transformation that require the generation of random points. In this section, the method of transforming the randomly generated Monte Carlo points is explained in more details. First, the transformation from W to Z ($T_{W \to Z}$) will be explained. The aim is to fill up the random points so that the values do not exceed the integration boundaries in the X space. From the perspective in the Z space, this means avoiding exceeding the boundaries of the manifold in Z. In the Z space, the sides of the boundaries of the manifold tend to be non-linear curves except for one side, associated with the first dimension.

The algorithm starts with a randomly generated point w in the W space. The algorithm needs to find the corresponding point in the Z space. It aims to find the point z in the Z space which corresponds to the point w in the W space. The coordinates of w are defined by $w=(w_1, w_2, \ldots w_m)$. The Genz method finds the coordinates of point z one dimension at a time.

In the first dimension, the method begins by finding $z_1$. The transformation from the W to Z is defined as the proportion of maximum value of z (i.e. a weigh of the limit where the quantiles lie). The weight of the limit in the W space will be transformed to find the corresponding coordinates in each dimension. The maximum value along this dimension is $e_1$. The value of $e_1$ is defined based on the shape of the boundaries in the Z space.

The method finds $e_1$ by transforming the largest $w_1$ into the Z space to find the maximum $z_1$. The quantile $q_1$ is the value of the upper limit of the integration in the X space. Since $q_1$ is a known input, the randomly generated points will never exceed it. The farthest randomly generated point will fall somewhere on or very near $q_1$ in X space. Since the exact coordinates of $z_1$ are unknown, it is necessary to find the maximum in the Z space first. Next, the scaling of the uniform randomly generated number ($w_1$) is calculated. The value computed is proportional to that of where the $w_1$ is located. Since $w_1$ is generated in a uniform space, the weight is computed proportion from 1 (i.e. the maximum of the two-dimensional square). This weight allows for the computation of the first coordinate which will lie within the range (0; e1). The method calculates $z_1$ by multiplying $w_1$ and $e_1$ together. In this way, the point w is transformed into the Z space. In the case of the Genz algorithm, the Quasi-random generation of random numbers will not be correct. Therefore, Genz suggests using a randomized version of the Quasi-random generators. The present invention uses a pseudo-random number generator to achieve the full benefit of the Monte Carlo generator on massively parallel processing units. The exact details of how the pseudo random algorithm allocates the Monte Carlo points in the W space is explained in detail later.

Transformations Between the Y and Z Spaces

The transformations from Y to Z and Z to Y spaces are using the functions $\phi(x)$ (NormP) and $\phi(x)^{-1}$ (NormQ). These functions are implemented using on the Error Function and its inverse function. The $\phi(x)$ transformation is defined based on the error function:

$$NormP(x) = \Phi(x) := \frac{1}{2}\left[1 + erf\left(\frac{x}{\sqrt{2}}\right)\right], x \in \mathbb{R}. \quad (6.14)$$

The inverse function $\phi(x)^{-1}$ is defined based on inverse erf function.

$$NormQ(x) = \Phi^{-1}(x) := \sqrt{2}\,erf^{-1}(2x-1), x \in (0,1). \quad (6.15)$$

The Error Function and the Inverse Error Function are used many times in the Genz algorithm. Both functions are called about N×m times. For example, in a typical evaluation in 10 dimensions, they are both called 5,000,000×10, i.e., 50 million times. Calculating these functions is implemented using Matlab's functions erf and erfinv. The error function is calculated using fast and approximate formulas based on equations such as the following Equation:

$$erf(x) = \frac{2}{\sqrt{\pi}}\left(z - \frac{x^3}{3} + \frac{x^5}{10} - \frac{x^7}{42} + \frac{x^9}{216} - \cdots\right) \quad (6.16)$$

A similar series is used to evaluate the erfinv function ($erf^{-1}(x)$ or erfinv(x)). A practical approximation is using the following formula: $erf(x)=(1-\tau)\times(Sign(x)+(x=0))$ where $T=t\times exp(-x2-1.26551223+1.00002368t+0.37409196t^2+0.09678418t^3+0.18628806t^4+0.27886807t^5-1.13520398t^6+1.48851587t^7-0.82215223t^8+0.17087277t^9)$ and $t=1/1+0: 5|x|$. In this implementation, the number of floating-point operations (FLOPS) for each calculation of the error function is E=26(flops) and the FLOPS for the erfinv function is $E^0$=26(flops).

Geometrical Description of the Algorithm

Here the algorithm is described in terms of a series of geometrical operations. One starts with the randomly generated coordinates of a three dimensional point W in the W space. The coordinates of the point are $W_{MonteCarlo}=(w_1, w_2, w_3)^T \in W$. The boundaries of integration in the W space are the whole two-dimensional square [0; 1]×[0; 1]. One now needs to find the proportion from the upper bound of integration in the W space. This step is done by using a number of intermediate points such as $A_W$, $A_Z$, $A_X$. The coordinates of upper bound point in the W space are $A_W=(1; 0; 0)^T \in W$. Next, the upper bound point in the X is determined. It is known that this point corresponds to a point $A_X=(q_1, -\infty, -\infty)^T \in X$ space in the X space. The second and third coordinates of $A_X \in X$ are kept, $-\infty$ because at this step one only needs to know the upper bound of the first coordinate. $A_X$ is the upper bound of the CDF integration on the first axis. Now the transformation of $A_X$ in the Z space needs to be determined. This has to go first through the transformation into the Y space. The coordinates $A_Y \in Y$ in the Y space are calculated by: $L^{-1}\times(q_1, -\infty, -\infty)^T$. L is a square matrix from the Cholesky decomposition of $\rho$, the correlation matrix. The coordinates in the Z space are $A_Z=\phi L^{-1}\times(q_1, -\infty, -\infty)^T$. The calculated coordinates are shown in the Z space by $A_Z=(e_1; 0; 0)^T \in Z$. In transformations from X to Y, the function $\phi(.)$ is applied to each coordinate of the vector separately. This function is the $Norm_p$ of the point in the Y space. This is valid because the coordinate of the point in the Y space was originated from a Monte Carlo point in the Uniform [0, 1] distribution in the W space. The Monte Carlo point in the W space could be thought of as the probability value which was transformed by $\phi^{-1}: Z \to Y$ into the X space to determine the corresponding quantile value using the $Norm_q$ function which is the inverse of the NormP function. The $\phi(\ )$ function ($\phi: Y \to Z$) generates the multi-normal distribution using standard normal distributions as the marginal distribution functions. The reason is that the correlation matrix can be considered as the covariance matrix of the standardized random variables (i.e. with standard deviation 1 and mean zero) $X_i/\delta(X_i)$ for $i=1, \ldots, n$. Therefore, the conversion between the correlation matrix and the covariance matrix is computed directly in the X space. The second and third coordinates are 0 because $(-\infty)=0$. Now one has $e_1$, the maximum of $z_1$. One can find the $z_1$ by scaling the $w_1$ from [0; 1] in the W space to lie within the range [0; $e_1$] on the Z space. One does this by simply multiplying $w_1$ by $e_1$, that is, $z_1=w_1\times e_1$. By so doing, one can get a new $B_Z \in Z$ point for which the first coordinate is $z_1$: $B_Z=(z_1, 0, 0)^T \in \times Z$.

Now that the first coordinate of the random point in the Z space has been determined, one can proceed with the next coordinate ($z_2$). To do so, one needs to find the point $B_Z \in Z$ at the upper bound, and then divide the distance between the lower and upper bound of the manifold, proportional to $w_2$, in the Z space. This will find a new point $D_Z \in Z$ which has the correct $z_2$, but with the same $z_1$ coordinate.

To find the point $C_Z$, the following steps are necessary. One first finds the transformation of $B_Z$ into the Y space. The coordinates are $B_Y=\phi^{-1}((z_1, 0, 0)^T)$. Then, it is necessary to transform the point $B_Y$ into the X space, i.e., $B_X=L\times\phi^{-1}((z_1, 0, 0)^T)$. The coordinates in the X space will be $B_X=(x_1, -\infty, -\infty)^T \in X$. The coordinates of the new point $C_X$ are $(x_1, q_2, -\infty)^T$, where $q_2$ is the upper bound of the CDF integration on the second dimension. The third coordinate does not need to be computed. The value of that coordinate remains $-\infty$. But it is not needed at this stage. Since the point CX was found in the X space, one can now find the corresponding point on the Y space by using the following formula: $C_Y=L^{-1}\times(x_1, q_2, -\infty)^T$. Similarly the point $C_Z$ can be calculated using the following formula: $C_Z=L^{-1}\times(x_1, q_2, -\infty)^T$. The resulting coordinates will be $C_Z=(z_1, e_2, 0)^T$. Here $e_2$ is the maximum of the second dimension in the Z space. Note that during the calculation one only needs to calculate $e_2$. Next, one needs to find the proportion of the second coordinate of the randomly generated point $W_{MonteCarlo}$ within the range from the lower to the upper bound in the W space. Now apply the same proportion to the corresponding range in the Z space to find the point $D_Z \in Z$. The coordinates are $D_Z=(z_1, w_2 \times e_2, 0)^T \in Z$. The first two coordinates of the transformed $W_{MonteCarlo} \in W$ have been calculated.

Now it is necessary to find the third coordinate of the transformation of $W_{MonteCarlo}$ into the Z space. The third coordinates are not shown. A similar procedure is repeated to find the third coordinate. The third coordinate is computed by the following steps. First, one calculates the coordinates of the transformation of $D_Z \in Z$ into the Y space. The coordinates are $\phi^{-1}((z_1, w_2 \times e_2, 0)^T$ Y. Then, this point is transformed into the X space by multiplying by the Cholesky matrix: $L\phi^{-1}((z_1, w_2 \times e_2, 0)^T)$. These coordinates now are in the X space, allowing replacement of the upper bound of the third integration into the third coordinates. The coordinates of new point will be $(x_1, x_2, q_3)^T$. This point is transformed into the Y space: $L^{-1}\times(x_1, x_2, q_3)^T$. It is then transformed into the Z space: $\phi(L^{-1}\times(x_1, x_2, q_3)^T) \in Z$. This point has a new third coordinate which is now called $e_3$. The value $e_3$ shows the upper bound of the third dimension in the Z space. The coordinates are $(z_1, z_2, e_3)^T \in Z$. Similar to previous dimensions, one now multiplies the third coordinate of the resulting point ($e_3$) by the third coordinate of the point $W_{MonteCarlo}$. The coordinates are $(z_1, z_2, w_3 \times e_3)^T \in Z$.

In cases where the dimensions are more than 3, the next coordinates can be calculated using similar geometrical operations.

Geometrical Requirements

The reason this procedure was chosen for finding $C_X \in X$ is as follows. One wants a point in the X space that lies on the upper boundary of second integration that has the same first coordinate as $B_X \in X$. The line that connects $B_X \in X$ to $C_X \in X$ must be parallel to the vertical axis. The second coordinate of $C_Z \in Z$ in the Z space is not known. For each generated random point, the upper boundary is different in the Z space. In the Z space, one looks for the intersection of the boundary of the manifold with the vertical line that crosses $B_Z$. One must go to X and see where they intersect, so it is necessary to find the point in the X space that corresponds to the intersection point in the Z space. The corresponding point in the X space is the intersection between the vertical line and the boundary of the integration manifold in the X space. Although the transformation from Z to X in non-linear, some lines still remain linear. The transformation of the vertical lines in the Z space remains lines in the X space. The intersection point between the curved line and the straight line in the Z space will remain an intersection in the transformed space. Using this idea, one can find the intersection between the upper side of the boundary in Z and the vertical line from $B_Z \in Z$. The transformation of the curve that is the upper side of the boundary of the integration manifold in the Z space is a straight horizontal line in the X space. However, in the X space, one can easily find the intersection of this straight line with the vertical line. This is the point $C_X=(x_1, q_2, -\infty)^T \in X$. Here, $q_2$ is the upper bound of the integration in the second dimension which is already known.

Derivation of Algebraic Calculations from the Geometric Description

The algebraic equations corresponding to the geometric operations described in the above procedure are now derived. Then one solves the equations to derive explicit algebraic formulas that are used in the algorithm's pseudo code.

The coordinates of the points are as follows:

$$A_X = (q_1, -\infty, -\infty)^T \in X \tag{6.17}$$

$$A_Y = L^{-1} \times (q_1, -\infty, -\infty)^T = (q_1/l_{11}, -\infty, -\infty)^T \in Y \tag{6.18}$$

$$A_Z = \phi((q_1/l_{11}, -\infty, -\infty)^T) = \tag{6.19}$$
$$(\phi(q_1/l_{11}), \phi(-\infty), \phi(-\infty))^T (e_1, 0, 0)^T \in Z, e_1 \stackrel{def}{=} \phi(q_1/l_{11})$$

$$B_Z = (z_1, 0, 0)^T \in Z, z_1 \stackrel{def}{=} w_1 \times e_1 \tag{6.20}$$

Calculations for the second dimension are as follows.

$$B_Y = \phi^{-1}((z_1, 0, 0)^T) \tag{6.21}$$
$$= (y_1, -\infty, -\infty)^T \in Y, y_1 \stackrel{def}{=} \phi^{-1}(z_1)$$

$$B_X = L \times B_Y = L \times (y_1, -\infty, -\infty)^T \in X \tag{6.22}$$

$$C_X = (x_1, q_2, -\infty)^T \in X \tag{6.23}$$

$$C_Y = L^{-1} \times (x_1, q_2, -\infty)^T = (y_1, y_2, -\infty)^T \in Y \tag{6.24}$$

The point $C_Y$ can be directly calculated from $B_Y$ by solving the following linear equation set. If one does not calculate $B_X$ and $C_X$, there will be fewer calculations. The sequence of points $B_Y \to B_X \to C_X \to C_Y$ is based on linear transformations. Hence, one can solve it analytically in a closed form. In terms of coordinates, this means one does not want to calculate $x_1$. Instead, one needs to calculate $y_2$ in terms of $y_1$ and $q_2$, regardless of $x_1$. This will prevent unnecessary calculation of $x_1$, which is itself calculated from yr. The Equation $(x_1, q_2, -\infty)^T=L\times(y_1, y_2, -\infty)^T \in X$ can be rewritten as the following Equation set:

$$x_1 = l_{11} \times y_1 \tag{6.25}$$

$$q_2 = l_{21} \times y_1 + l_{22} \times y_2 \tag{6.26}$$

The Equation 6.25 can now be solved set using Gaussian elimination:

$$y_1 = (x_1)/l_{11} \tag{6.27}$$

$$y_2 = (q_2 - l_{21} \times y_1)/l_{22} \tag{6.28}$$

Since $y_1$ was calculated in previous steps, here one only performs the calculations of the second step, i.e. Equation 6.28, which leads to the coordinates of the point $C_Y=(y_1, y_2, -\infty)^T \in Y$.

$$C_Z = \phi((y_1, y_2, -\infty)^T) = (z_1, e_2, 0)^T \in \mathbb{Z}. \quad (6.29)$$

$$e_2 \stackrel{def}{=} \phi(y_2) \quad (6.30)$$

$$D_Z = (z_1, w_2 \times e_2, 0)^T \in \mathbb{Z} \quad (6.31)$$

Now the calculation of the first two coordinates of the transformed Monte Carlo point in Z space is complete.

The procedure for calculating the coordinates at higher dimensions is similar to calculations at the second dimension. The sequence of the calculations for the third dimension is similar to the sequence from $B_Z$ to $D_Z$. The sequence was $B_Z \to B_Y \to B_X \to C_X \to C_Y \to C_Z \to D_Z$. In this $i^{th}$ dimension, the calculations are as follows. Similarly, to Equation 6.21, the coordinates up to dimension i, $z_1, z_2, \ldots z_i$ are known.

$$B'_Z = (z_1, z_2, \ldots z_i, 0, \ldots, 0) \quad (6.32)$$

$$B'_Y = \phi^{-1}(B'_Z) = (y_1, y_2, \ldots, y_i, -\infty, \ldots, -\infty), \quad (6.33)$$

$$y_j \stackrel{def}{=} \phi^{-1}(z_j), j = 1, \ldots, i \quad (6.34)$$

$$B'_X = L \times B'_Y = (x_1, x_2, \ldots, x_i, -\infty, \ldots, -\infty) \quad (6.35)$$

$$C'_X = (x_1, x_2, \ldots x_i, q_{i+1}, -\infty, \ldots, -\infty) \quad (6.36)$$

$$C''_Y = L^{-1} \times C'_X \quad (6.37)$$

Calculating $C'_Y$ from $B'_Z$ can be simplified analytically in the same manner as dimension 2. The following Equation set has to be solved:

$$\begin{cases} x_1 := l_{1,1} \times y_1 \\ x_2 := l_{2,1} y_1 + l_{2,2} y_2 \\ \ldots \\ x_i := l_{i,1} y_1 + l_{i,2} y_2 \ldots l_{i,i} y_i \\ x_{i+1} := l_{i+1,1} y_1 + l_{i+1,2} y_2 \ldots l_{i+1,i+1} y_{i+1} \end{cases} \quad (6.38)$$

Using Gaussian elimination, the inverse transformation will be $$\begin{cases} y_1 = x_1 / c_{1,1} \\ y_2 = (x_2 - c_{2,1} y_1)/c_{2,2} \\ \ldots \\ y_i = \dfrac{(x_i - l_{i,1} y_1 - l_{i,2} y_2 \ldots l_{i,i-1} y_{i-1})}{/l_{i,i}} \\ y_{i+1} = \dfrac{(q_{i+1} - l_{i+1,1} y_1 - l_{i+1,2} y_2 \ldots l_{i+1,i} y_i)}{/l_{i+1,i+1}} \end{cases} \quad (6.39)$$

Only the calculation of $y_{i+1}$ is needed. The coordinate $y_{i+1}$ can be calculated from previous y. coordinates using Equation 6.39.

$$C'_Z = \phi((y_1, y_2, \ldots, y_i, y_{i+1}, -\infty, \ldots, -\infty)) \quad (6.40)$$

$$= (z_1, z_2, \ldots, z_i, e_{i+1}, -\infty, \ldots, -\infty) \quad (6.41)$$

$$e_{i+1} \stackrel{def}{=} \phi(y_{i+1}) \quad (6.42)$$

$$D'_Z = (z_1, z_2, \ldots, z_i, (w_{i+1} \times e_{i+1}), -\infty, \ldots, -\infty) \quad (6.43)$$

The $y'_1$ are the coordinates the points on the boundaries ($A_Y$, $C_Y$, $C'_Y$, etc.). The $y_i$ are the coordinates of the points between the two boundaries. But $y_i$ is only needed for calculation of the $z_i+1$ of the next dimension. Note that only the calculations of coordinates at dimension i+1 are needed at each step. The summary of the calculations at each Monte Carlo point $w = \{w_i\} \in W$ is as follows:

```
function GENZPARTIAL( q, l, w⃗ )
Input: q, w ∈ ℝ^m, l ∈ ℝ^{m×m}
    e_1 ← φ(l_n × q_1)
    z_1 ← w_1 × e_1
    for i ← 1, 2 ... m do
        y_i ← φ^{-1}(z_i)
        y'_{i+1} ← (q_{i+1} - Σ_{j=1}^{i} l_{i+1,j} y_j)/l_{i+1,i+1}
        e_{i+1} ← φ(y_{i+1})
        z_{i+1} ← w_{i+1} × e_{i+1}
    end for
end function
```

In the geometric operations for higher dimensions, it is required that certain lines in the Z space, remain straight lines in the X space. The linearity of these transformed lines is valid regardless of the fact that the transformation is nonlinear. The lines for which the above property should hold are the line segment $B_Z C_Z$ and the $B'_Z C'_Z$. The former is used for the calculation of the coordinate, where the parallel line to the first dimension intersects with the curved quantile line of the second dimension. The latter is used for a similar calculation on the higher dimensions.

In the first derivation, the equation for being a straight line $B_Z C_Z$ in the Z space is proven. The coordinates of the end points are $B_Z = (z_1, 0)$ and $C_Z = (z_1; z_2) \in Z$. Hence, the coordinates of the points on the line $B_Z C_Z$ that connect $B_Z$ to $C_Z$ are: $(z_1, \alpha_2, 0, 0, \ldots, 0) \in Z$ for any $z \in [0, 1]$.

The transformation of this line on the Y space is comprised of the transformation of all the points. The coordinates of each point are fixed except for the second coordinate between the line $B_Y C_Y$. When one transforms each point from Z to Y, the $\phi^{-1}$ is applied on each coordinate separately. The coordinates in the Y space will be $\phi^{-1}(z_1, \alpha_2, 0, 0, \ldots, 0) = (\phi^{-1}(z_1), \phi^{-1}(\alpha_2), \phi^{-1}(0), \phi^{-1}(0) \ldots)$. This means that all the coordinates except for the second coordinate will remain fixed in the transformation process. The transformation is applied on each Monte Carlo point separately. In other words, the transformation does not require dependency in the transformation of point $z_1 \in Z$ and point $z_2 \in Z$. Hence, all the points on the transformed line on the Y space will have the same fixed first coordinate $y_1$. Hence, the set of points transformed on the Y space remain on the same line. Note that the transformation on the second coordinate is not linear. $\beta_2 = \phi^{-1}(\alpha_2)$ is a non-linear function of $\alpha_2$. But since the coordinates are transformed separately, the set of points remain a line in the Y space.

Not only does the transformation of this line from Z to Y remain linear, but the whole transformation from Z to X will be linear. This is because the transformation between Y and X is linear. It has now been established that a line parallel to the vertical axis in the Z space will remain a straight line in the X space.

One also needs to prove that the lines that are vertical in the Z space will remain vertical in the X space. The proof is based on the lower-triangular property of matrix L. It was noticed that the line remains vertical in the Y space. Only the second coordinate varies in the Y space. The other coordinates are fixed. What is needed now is to show that similarly in the X space only the second coordinate varies.

$$L \times (y_1, \beta_2, -\infty)^T = (x_1, y_2, -\infty)^T \in X \quad (6.44)$$

Because of the lower-triangular property of L, each coordinate in the X space depends on the previous coordinates in the Y space. The $y_1$ will not depend on $\beta_2$. The other coordinates in dimensions higher than the second dimension will also not depend on $\beta_2$. The reason is that they are $-\infty$. This property comes from the fact that in the Z space, all coordinates in dimensions higher than the second dimension are zero: $z_i=0$, i=3, 4, ..., m. Hence, of the coordinates in the Y space, only coordinate, $y_2$, will depend on $\alpha_2$ in the X space. Since all other coordinates are fixed, the set of transformed points will remain a vertical line in the X space.

The same properties hold for all dimensions. The generalized property can be as follows. First, any line in the Z space that is parallel to one of the axes will remain a line when it is transformed in the X and Y spaces. Second, if all the higher coordinates in the Z space are zero, then the transformed line will remain parallel to the same axis in the X space (e.g. remain vertical). The coordinates of the points on the lines are $(z_1, z_2, \ldots z_{i-1}, z_i, z_{i+1}, \ldots, z_m) = (z_1, z_2 \ldots, z_{i-1}, \alpha_i, 0, 0, \ldots, 0) \in Z$. The coordinates at the dimensions lower than i are fixed. The higher coordinates greater than the dimensions i are zero and the coordinate i varies. Therefore, it remains a line and remains parallel to axis i in all spaces X, Y, Z, W. The proof is similar to the case of vertical lines explained above.

As a result, one can use the geometric procedures described above. This property is used in the step in which the point $C_X$ from $B_X$ based on $q_2$ was located, the upper bound of the integration. In higher dimensions, this property used for locating $C'_X$ from $B'_X$ based on the $q_1$.

The main reason for this property of linearity is due to the proportional transformation between the W and Z spaces using a fixed weighted distance. Therefore, along each dimension, the lines parallel to the axes in Z will remain parallel to those axes in both Z and W spaces.

Integrating the Transformed Monte Carlo Points

The Cumulative Distribution Function (CDF) value will be the volume of the integration manifold in the Z space. The goal of transformation of the points was to find the volume of integration manifold in the Z space. The original volume in W space is already known and is 1.0. The reason is that the space W is a hypercube $(0, 1) \times (0, 1) \times \ldots \times (0, 1) = W$. To find out what the volume is in the Z space, one just needs to know how much each local region around each random point is compressed during the transformation from the W to Z space. One needs to know how much the space about each point is compressed. For each point, W is will be $e_1 \times e_2 \times \ldots e_m$. The outcome of the integration will be the average of this multiplication over all Monte Carlo points. The value of CDF will be:

$$CDF = \frac{1}{N}\sum_{j=1}^{N} \prod_{i=1}^{m} t_i^j \qquad (6.45)$$

Here N is the number of Monte Carlo (MC) samples. The $T^j = (t^j_1, t^j_2, \ldots, t^j_m)$ are calculated in the previous procedure. For each j a MC random sample point, $W^j$, is generated in the W space. The multiplication of the edges that pass through the point in each dimension are multiplied to calculate the volume $T^j$. This volume gives an estimation about the transformed volume from the X space.

Validity of Integration Using Multiplication

The isosurface contours are shown in different shades (see FIGS. 24A-I), with different shades representing different densities. After the nonlinear transformations in z coordinates (FIGS. 24J-L), the density is now uniform. When the density is uniform, the method of multiplication of boundaries lengths of edges (i.e. multiplication of $e_i-d_i$, in which density is equal to $T = \Pi_i(e_i-d_i)$ is valid. The lengths of the boundaries are measured before escalating to the next dimension. Therefore, the lengths are not the real lengths of edges in the manifold. This works according to the pattern of the Genz algorithm where each dimension is calculated based on the prior one.

The Boundaries from Prior Dimensions

At each Monte Carlo sample $z \in Z$ in the Z space, n lengths are multiplied and then averaged. Examples of these lengths are visualized in FIGS. 24J-L. As can be seen in FIG. 24K, the lengths $e_i-d_i$ are not exactly the boundaries of the irregular shape. The boundaries ($d_i$, $e_i$) allow us to measure the range of the choice of the $z_i$ dimension. But the real boundaries of the crumbled shape at the final z point may be smaller or equal to the boundaries before choosing the values of future dimensions i, i+1, ..., n. In each iteration of the loop in the algorithm, the current dimension is i-1, the next dimension is i, etc.). During the process of determining different dimensions of z in the algorithm (the loop i=1 ... n) the boundaries will change as one moves to the next dimension. But one is not concerned about the exact distance from the wall (boundaries) at that point. Distance along dimension l means the distance between the two points that a line passing through the point z and parallel to axis a intersects with the boundary of the volume. That is, the thickness of the volume along the axis when it passes through the point z (the z is the random point that is randomly picked by the Monte Carlo algorithm).

The Mathematical Equation to be Calculated

The evaluation of the copula required evaluation of CDF.

$$C_R^{Gauss}(u) = \Phi_R(\Phi^{-1}(u_1), \ldots, \Phi^{-1}(u_d)) \qquad (6.46)$$

Evaluation of copula requires plugging the bounds of the CDF. The a and q vectors are the lower and upper bounds of the multivariate CDF integration. In copula evaluation, $a_i = -\infty$ for i=1, 2, ..., m and $q_i$ are the upper bounds for the integrations in CDF. For copula evaluations, $q_i = \phi^{-1}(P_i)$ where the $P_i$ are the copula marginals.

The final formula of the CDF is shown below. The term $T(a, q, \Sigma, v)$ is the cumulative MVT, which is also used in MVN calculations. The a, q, $\Sigma$, v are determined based on the parameters of the copula.

$$T\left(q', q, \sum, v\right) \approx \frac{1}{N}\sum_{k=1}^{N}\prod_{i=1}^{m}\left(\hat{e}_i(s_k, w) - \hat{d}_i(s_k, w)\right) \qquad (6.47)$$

where $e_i(s_k, w)$ and $d_i(s_k, w)$ are defined based on the error function:

$$\hat{a}_i(s, y_1, y_2, \ldots, y_{i-1}) = \frac{s}{\sqrt{v}}\left(a_i - \sum_{j=1}^{i-1} c_{i,j} y_j\right)\bigg/ c_{i,i} \qquad (6.48)$$

$$\hat{b}_i(s, y_1, y_2, \ldots, y_{i-1}) = \frac{s}{\sqrt{v}}\left(q_i - \sum_{j=1}^{i-1} c_{i,j} y_j\right)\bigg/ c_{i,i} \qquad (6.49)$$

$$\hat{d}_i(s, w) = \phi(\hat{a}_i(s, y_1, y_2, \ldots, y_{i-1})) = 0 \qquad (6.50)$$

$$\hat{e}_i(s, w) = \phi(\hat{b}_i(s, y_1, y_2, \ldots, y_{i-1})) \qquad (6.51)$$

$$\hat{z}_j(w_i) = \hat{d}_i + (\hat{e}_i - \hat{d}_i) w_i \qquad (6.52)$$

-continued $$y_i = \phi^{-1}(\hat{z}_i(w_i)), i = 1, 2, \ldots, m \quad (6.53)$$

$$s_k = \chi_v^{-1}(w_{m,k}) \quad (6.54)$$

$$w_{m,k} \sim \text{Uniform}(0, 1) \quad (6.55)$$

Note that each round of applying these equations calculates a $y_i$ at a new dimension. The $y_i$ in Equation 6.53 eventually depends on previous $y_j$ for $j<i$ in Equation 6.48. This means that $y_i$ needs $y_{i-1}$, $y_{i-2}$, etc., but there is no circular dependency and a new coordinate of y is generated each time one applies the y above equations. Also, note that a is used as the lower bound of integration, while in previous equations, q' was the lower bound.

Here $X_v(u)$ is the CDF function of the Chi Distribution. The $C_{i,j}$ are taken from the matrix C that is the Cholesky decomposition of the matrix $\Sigma$, i.e. $\Sigma = CC^T$. The matrix C is a lower triangular m×m matrix, i.e. if $j>1$ then $c_{i,j}=0$. The copula can be specified either using the covariance matrix $\Sigma$, or the correlation matrix p. In the latter case, a Cholesky decomposition of the matrix p is used as matrix C. In this case, the elements of a and q need to be divided (element-wise) by the diagonal elements of the matrix C, i.e. $p=C'C'^T$, $d_i:=C_{i,j}$ are the diagonal elements, and the new a and q vectors are defined as $a''=a_i/d_i$, and $q''=q_i/d_i$. The columns of C are scaled accordingly $C_{i,j}=C_{i,j}/d_i$. The parameter v which is used in multivariate t distributions, is set to $v=+\infty$ in normal distribution. If a copula type based on t distribution is desired, the appropriate v parameter should be chosen.

Boundaries of Integration

In the Genz algorithm a and q are the lower and upper bounds of the integration. The upper and lower bounds of integration in this algorithm (for T), i.e. a and q, are specified based on a multivariate normal with unit variances at marginals. Scaling a and q to a normal distribution with unit variances (standard normal): When $\rho$ is specified, the quantiles are already scaled. When a C matrix is created, the covariance $CC^T$ is reproduced from the $\rho$. The resulting marginal variances are no longer 1, and hence the quantiles a and q need to be scaled accordingly. Mapping a point from the space W to the space Z requires calculating $e_i$, the boundary of integration mapped to the space Z, which depends on the $z_i$ at previous dimensions 1, 2, ..., i−2, i−1.

Generation of Random Points

Each of the variables $w_{i,k}$ is taken from a uniform random $w_{i,k} \sim \text{Uniform}(0, 1)$, that is calculated using function rand in Matlab, which is evaluated N×m times. The rand function (generation of random numbers) is one of the slowest parts of the computation. Consequently, each vector wk is taken from the unit hypercube $[0, 1]^m$.

Computational Complexity of Genz Algorithm

Suppose N is the number of Monte Carlo samples, m is the number of the copula dimensions, and E and E' are the number of FLOPS for each evaluation of the error function and the inverse error function respectively. One can now assume E=26(flops) and E'=26(flops), which are taken from the standard implementations of the error function. The number of floating point operations according to the pseudo-code described above is 7+2E+mN+N+(m−1)*[NE'+2EN+13N+2mN+2] (flops). This formula is simplified into 90mN+2Nm²+2m−90N+57 (flops). For example, for m=10 and N=10,000, then the number of operations will be 10,100,077 floating point operations (about 10 mega flops).

However, a full analysis will require a trade-off between accuracy and speed. The parameter N also appears in the time complexity formula. For this reason, the largest degree of m is also the term m² in this equation, it cannot be concluded that the number of operations is proportional to m². The reason is, in larger number of dimensions, the calculation of many more points is needed to attain a given accuracy. When m increases, accordingly N, the number of the Monte Carlo samples also needs to be increased. This is done automatically by the adaptive algorithm to compensate for the lower accuracy (larger variance) in a higher number of dimensions. In other words, to identify the amount of calculation time, one needs to know how the number of samples N increases when the number of dimensions m is increased. However, in the literature, an analytical estimate of the complexity for a given accuracy was not found. The evaluations of running time are reported using simulations.

Calculating t-Copula Using Genz Method

The t-copula is similar to the Gaussian copula except that it has an additional parameter v, the Degrees of Freedom (see Equation 3.18). The algorithm and implementation details of the copula evaluation for t-copulas are very similar to the Gaussian copulas except for one difference. This difference was one new line of code that calculates $s_v$ and a slight change in a few lines of code in the do Transform ( ) kernel that generates the value of T based on $w_i$. The t-copula calculation has an additional component that does not exist in the computation of the Gaussian copula. This component is a new random variable s (on top of m other random variables, one for each dimension; see Equation 3.18) which in turn depends on the new parameter v that is unique to t-copulas. The CDF is calculated by integrating a similar function over an extra dimension s (see Equation 3.18). This is done by adding a new dimension to the random numbers generated in the Monte Carlo integration. The Alan Genz algorithm for multidimensional t distributions uses v only to produce $s_v$, which is generated once at each Monte Carlo point. This randomly generated number remains fixed during the loop that calculated various dimensions of the same Monte Carlo sample. The variable $s \sim X_v$ is a random number drawn from a $X_v$ distribution, where $X_v$ is a Chi distribution with parameter v. Note that the Chi distribution (X) should not to be confused with the more popular Chi-square distribution $X^2$. The Chi distribution is defined by the following CDF function:

$$CHICDF(s) = \int_0^s \frac{2^{1-\frac{v}{2}}}{\Gamma(\frac{v}{2})} s^{v-1} \exp\left(-\frac{s^2}{2}\right) ds \quad (6.56)$$

However, to apply the Quantile Transformation, what one needs to calculate is the inverse of $C_{HI}CDF$ function, by using the following formula:

$$s = CHIQUANTILE(u) \quad (6.57)$$

$$CHIQUANTILE(u) = \sqrt{2 \times GAMMAINCOMPLETEINVERSE(v/2, 1-u)} \quad (6.58)$$

$$s_v = s/\sqrt{v} \quad (6.59)$$

The random variable u is drawn from uniform random distribution $u \sim \text{Uniform}(0, 1)$. The Quantile Transform is applied to the random variable u to generate $s \sim X_v$. Then s is used in the algorithm via $s_v = s/\sqrt{v}$. At each sample, one needs to generate a uniform random number u. Since in the original algorithm $w_i$ up to (m−1) are used, and the last element of w, i.e. $w_m$ is not actually used in calculations, this random number (which is already uniform $w_m$~Uniform (0; 1)), is used as u. In the implementation code the calculation of $s_v$, is based on s, which in turn, is based on $w_m$. In the pseudo code this is done by calling the function ChiQuantile in Algorithm 6.1.

Implementation of the Chi Quantile Function

Generating the value s=ChiQuantile (u)=ChiCDF$^{-1}$(u) is computationally expensive. The Chi-Quantile function is calculated based on the GammaIncompleteInverse( ) function. The function GammaIncompleteInverse( ) does not have an analytical or closed-form formula and one needs to calculate it numerically. It is calculated using Newton's iterative method of function inversion. The Newton's iterative method is a general method of calculating the inverse function of another function (the forward function; the GammaIncomplete function) that its implementation is known. Multiple iterations of the forward evaluations are required for the Newton's function inversion method. Since one has the implementation for calculating the GammaIncomplete function distribution, the inverse transformation on the given u=$w_m$ is calculated. Other details of the algorithm are shown in Algorithm 6.1.

the PDF (using iso-surfaces; see FIGS. 24A-L) of three multivariate Normal distributions was used.

In FIGS. 24A-24L, three types of correlations in three dimensions were used. Each correlation condition was presented in a separate column. In each case, the top row (FIGS. 24A-24C) is the original multi-variate normal (Gaussian; top row in FIGS. 24A-24C). The second (FIGS. 24D-24F) row shows the PDF iso-surfaces after cutting away the quantiles (using places). It should be noted that the different densities are shown using different shades. Each result is represented as a piece of iso-surface. The trimmed iso-surfaces show the iso-probability points at each point of the space (i.e. points that have the same PDF value). At each distinct shade, the set of points have a similar probability density (according to the PDF function in that space). The third row (FIGS. 24G-24I) is the result of the PDF after applying the rotation transformation to map it on the Y space. Note that the PDF looks spherical. The shape of the quantiles (i.e. the planes that are used to cut part of the surfaces away) are no longer orthogonal, but they are planar (flat). The fourth row (FIGS. 24J-24L) shows the shape of the distribution in the Z space, but this time the densities of the PDF are not visualized. The reason was that the density is equal in all points. Instead, the boundaries of the volume of the transformed PDF are

---

Algorithm 6.1 Genz Non-Linear Integration method introduces higher complexity when solving the CDF of an MVT distribution than an MVN Distribution. This complexity is mainly due to the evaluation of Gamma Incomplete Inverse Function. The MVN does not have to evaluate the Gamma Incomplete Inverse Function.

Input: The parameters of an MVT distribution (q, q', Σ, $s_v$).
Output: The CDF of an MVT distribution.
1. function $\overline{T}$ = GENZTCDF(q, C, w)
2. Input: w ∈ $\mathbb{R}^{N \times m}$, q ∈ $\mathbb{R}^m$, C ∈ $\mathbb{R}^{m \times m}$
3.      N ← SIZE(w,1); ▷ The number of random points
4.      m ← LENGTH(a); ▷ The number of dimensions
5.      $q'_i$ ← $q_i/C_{ii}$ for all i = 1, 2, ..., m
6.      $s_v$ ← CHIQUANTILE($w_{m+1}$;v)
7.      emd{1} ← NORMP( $s_v$ * $q_1$) ;
8.      T ← emd{1}; ▷ emd is e − d
9.      y ← ZEROS(N, m);
10.      for i ← 2 to m do
11.          $z_{\{i-1\}}$ ← MIN(MAX(emd$_{\{i-1\}}$.*w(:,i−1), ε/2), 1 −ε/2);
12.          y(:,i−1) ← NORMQ(z{i−1});
13.          ysum ← y × C(:,i); ▷ Inner product
14.          emd{i} ← NORMP( $s_v q_i$ − ysum) ;
15.          T ← T× emd{i};
16.      end
17.      $\overline{T}$ ← SUM(T)/size(T);
1. function s = CHIQUANTILE(u;v)
2. Input: u ∈ $\mathbb{R}$ , v ∈ $\mathbb{R}$
3.      Return $\sqrt{2}$ ×GAMMAINCOMPLETEUNIVERSE(u, v/2)/v

---

In summary, the algorithm for the t-copula was similar to the Gaussian copula. The only differences were the following. Firstly, one more random number was generated in the array of random numbers w. Second, a different kernel (i.e. the MVT kernel) was used for evaluating each Monte Carlo sample points. The MVT kernel is slightly more computationally expensive than the kernel for MVN copula. There are extra calculations for each Monte Carlo sample point, but no extra calculations when the number of dimensions is increased. Since the extra calculations are executed for all samples in parallel, the increase in the total time of calculation is very small and does not scale with increasing m. Hence, the MVT algorithm is almost as efficient as the MVN implementation.

Visualization of Genz Integration

One can visualize the Genz algorithm in several ways in two and three dimensions. Firstly, volume visualization of visualized. The reason is the PDF is uniform and the densities will be the same everywhere within the boundaries of the region of interest. The shape of the boundaries (i.e. walls) of the non-linear region is curved and is not flat.

Correlation matrices used were for the first column and the third column in the identity matrix $I_3$, which is the correlation matrix of zero correlations between three factors. To generate the figures, the Matlab's volume visualization capabilities were utilized and, most importantly the iso-surface function. In FIGS. 24J-L, a continuous density was applied to provide normal vectors of the surfaces. The normal vectors were necessary for the iso-surfaces to have a correct and smooth shadow and lighting on the surfaces.

In each FIGS. 24A-I, the PDF was evaluated at every single point within a three dimensional cube of voxels (using a small step size about 0.1; See Algorithm 6.3 below for details regarding FIGS. 24A-I). Then, the points that were outside the region of interest were removed (i.e. the surfaces were cut). After that, the iso-surface function was applied at different values of probability. A curved surface was created at each probability value, with the shade chosen according to the probability value. The curved surfaces were integrated in one picture using partial transparency to improve the visualization. In FIGS. 24J-L, the PDF value was not used. The shape of the region of interest was generated using the iso-surface function to generate surfaces that show the boundaries of the region of interest (See Algorithm 6.4 for details regarding FIGS. 24J-L). In FIGS. 24J-L, an example visualization of the values $e_i$ and $w_i$ was calculated for a Monte Carlo sample.

The visualization using scatter plots was relatively easier. First, a random point was generated in the W space using Uniform distribution in interval [0; 1]. Then, the transformed points at each of the spaces Z, Y and X were generated (See Algorithm 6.2). Then, the generated points at each space in its respective panel was plotted. This was repeated N times (typically thousands).

The procedure is similar to the Monte Carlo calculations, except that the intermediate points in all spaces are stored in arrays. However, the outcome of the density of the resulting point was not calculated, nor was it necessary to combine the results by averaging since the purpose was just visualizing the Monte Carlo points but in all spaces. For efficiency, the points were generated and stored in an array and were plotted together using Matlab's plot and plot3 functions. The procedure of scatter plots was similar in both two and three dimensions.

Note that in all visualizations, the most complicated part was mapping from the space W to the space Z. This was done by one round of the Genz' algorithm which involves calculating the $e_i$ at all dimensions (see definition of the function $T_{Z \leftarrow W}(w; q)$ in Algorithm 6.2). The calculation of $e_i$ at each dimension requires applying transformations from W to Z to Y, X, and back to Y, Z. That is one round of transformation back and forth to all spaces for calculating $e_i$ at each dimension.

The Pseudo-Code for Visualization

Two types of visualizations will now be explored, namely: scatter plot visualization (either in 2D or 3D) and contours. The former (scatter plots) are shown either in two dimensions (as in FIG. 25) or three dimensions (as in FIGS. 26A-26H). The pseudo-code for both of these two figures is described in Algorithm 6.2. The contour visualizations are in three dimensions only (FIGS. 24A-L). The pseudocode for FIGS. 24 A-I is described in Algorithm 6.3 and in Algorithm 6.4 for FIGS. 24J-L.

---

Algorithm 6.2 The visualisation pseudo-code for FIG. 25 and FIG. 26A-H. Note that this works for m = 2 (2D scatter plots) and m = 3 (3D scatter plots) only. Note: $\hat{e}''_i = \{(j = i)\}_{j=1,2,\ldots,n}$ is a vector with all elements zero except for element i that contains 1. For example $\hat{e}''_3 = (0, 0, 1, 0, 0, \ldots, 0)^T$. Note that transformation from $\vec{w}$ to $\vec{z}$ requires a transformation to all spaces because it needs calculating $e_i$, the boundary of integration mapped to the space $\vec{z}$.

---

Figure 26C:
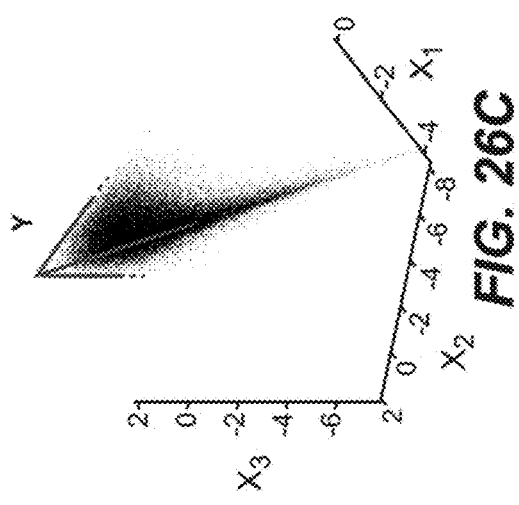
FIGS. 26A-26H are graphical illustrations that show the visualization on a three-dimensional space for the integration of three risk factors, according to the present invention.
Figure 26F:
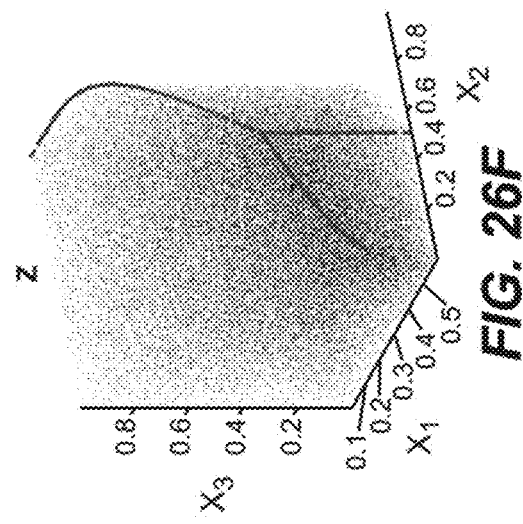
Figure 26B:
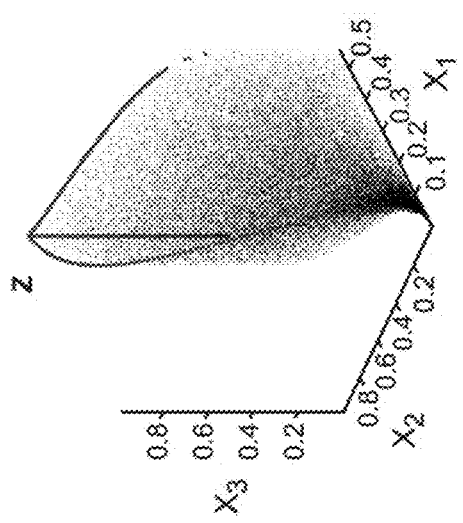
Figure 26E:
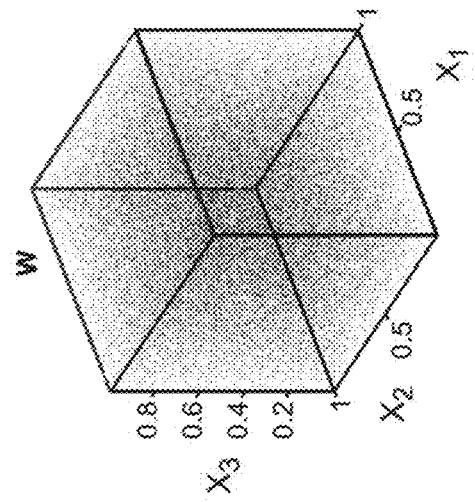
Figure 26A:
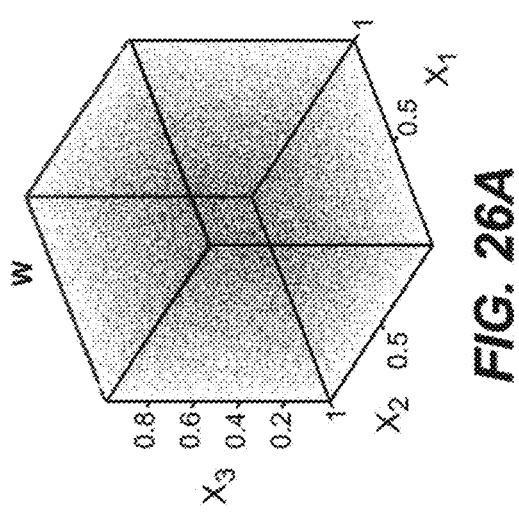
Figure 26D:
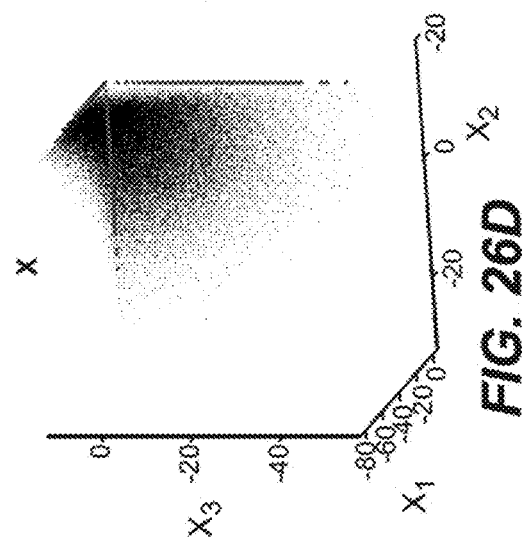
Figure 26H:
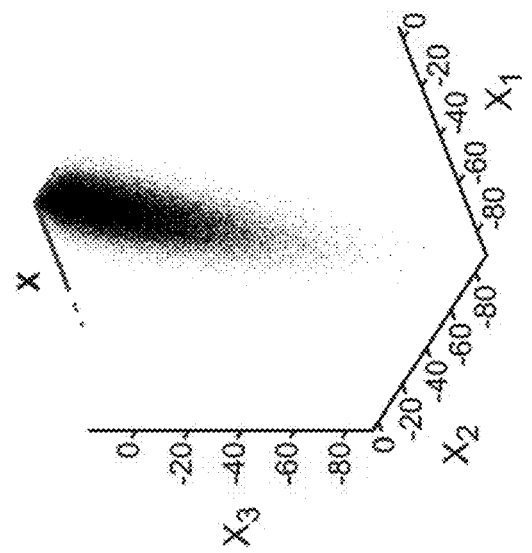
Figure 26G:
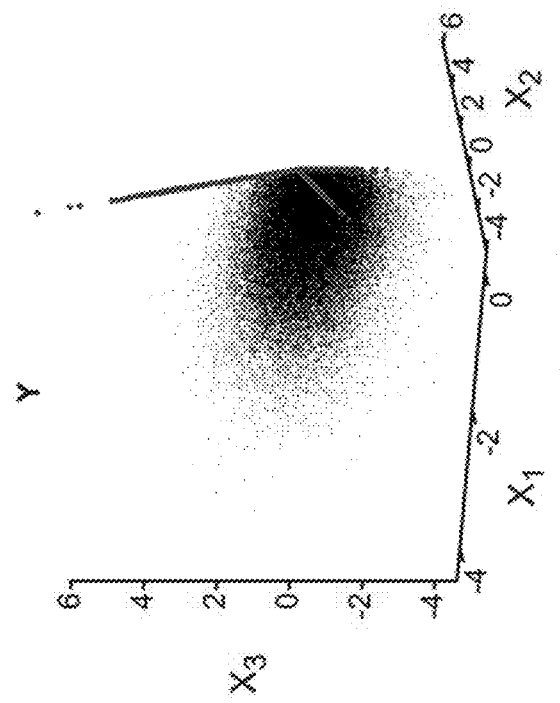

```
function VISUALISESCATTER( q⃗, ρ, N )
Input: q⃗ ∈ ℝ^m, ρ ∈ ℝ^{m×m} and N ∈ ℕ.                    ▷ Either m = 2 or m = 3.
        ▷ Generate random numbers w_i^j ∈ Uniform([0, 1]) for i ≤ N and j ≤ m.
    for i ← 1 to N do
        for j ← 1 to m do
            w_i^j ← RANDOMGENERATE               ▷ w_i^j ~ Uniform([0, 1])
        end for                                  ▷ w⃗_i = {w_i^j}_j ∈ ℝ^m
    end for
    for i ← 1 to N do                            ▷ For each MC point.
        z⃗_i ← T_{[Z←W]} (w⃗_i, q⃗)              ▷ Transform the point w⃗_i from W to Z.
        y⃗_i ← T_{[Y←Z]} (z⃗_i)                  ▷ Transform the point z⃗_i from Z to Y.
        x⃗_i ← T_{[X←Y]} (y⃗_i, L)               ▷ Transform the point y⃗_i from Y to X.
    end for
    FIG. 26A, E, TITLE("w"), SCATTER3D(w)        ▷ Plot all w points on panel A.
    FIG. 26B, F, TITLE("z"), SCATTER3D(z)        ▷ Plot all z points on panel B.
    FIG. 26C, G, TITLE("y"), SCATTER3D(y)        ▷ Plot all y points on panel C.
    FIG. 26D, H, TITLE("z"), SCATTER3D(z)        ▷ Plot all z points on panel D.
end function
function T_{[X←Y]} ( y⃗, L )
    x⃗ ← L × y⃗
    return x⃗
end function
function T_{[Y←Z]}( z⃗ )
    y⃗ ← Φ^{-1}(z⃗)
    return y⃗
end function
function T_{[Z←W]} ( w⃗, q⃗ )
    e_1 ← NORMP(q_1)
    y_i ← 0 for 1 ≤ i ≤ m
    for i ← 2 to m do
        z ← w⃗_{i-1} × e_{i-1}
        y_{i-1} ← NORMQ(z)
        y_sum ← y⃗ × C × ê''_i
        e_i = NORMP(q_i - y_sum)
    end for
    return z⃗
end function
```

Algorithm 6.3 The pseudo-code for visualisation in FIGS. 24A-C, 24D-F, 24G-I. Unlike the scatter plot, the points are not random points but form a 200 × 200 × 200 grid on a three-dimensional cube. The PDF at each voxel is calculated and the isosurface values show the surfaces with the same PDF probability. For better visualisation, the isosurface levels $s_j$ are chosen using exponential series so that the isosurfaces have almost equal space between them.

Figure 24C:
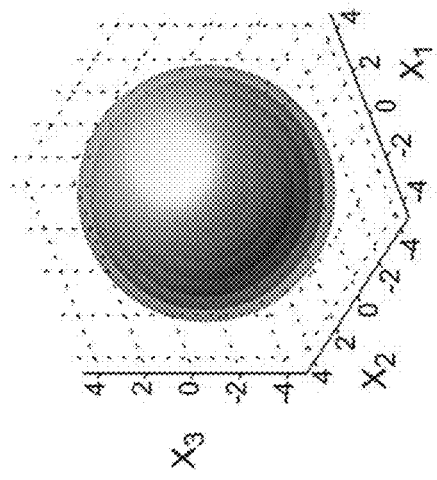
FIGS. 24A-24L are graphical illustrations that show the visualization of the transformed regions of integration of a CDF calculation, according to the present invention.
Figure 24F:
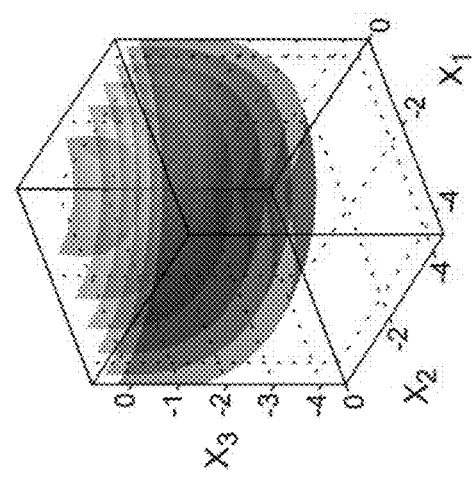
Figure 24B:
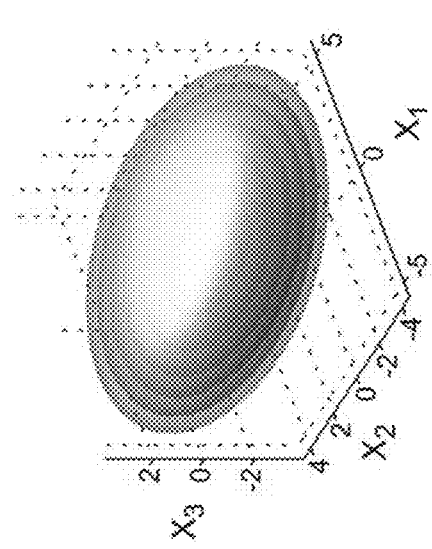
Figure 24E:
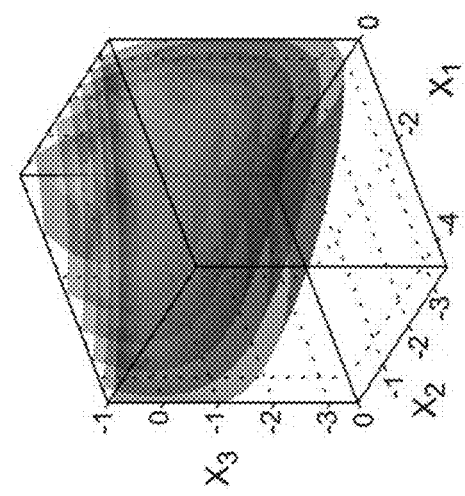
Figure 24A:
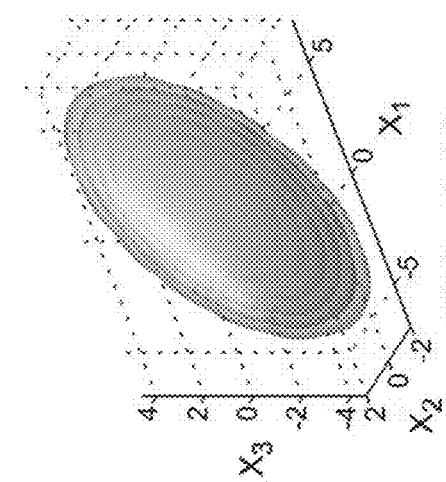
Figure 24D:
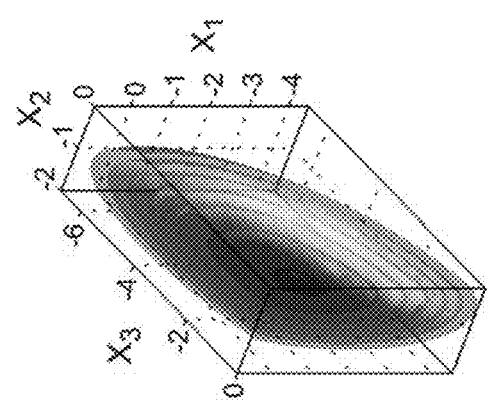
Figure 24I:
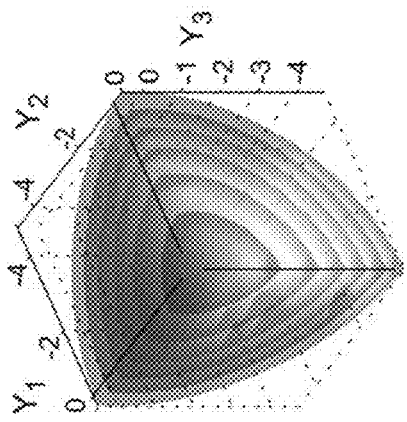
Figure 24H:
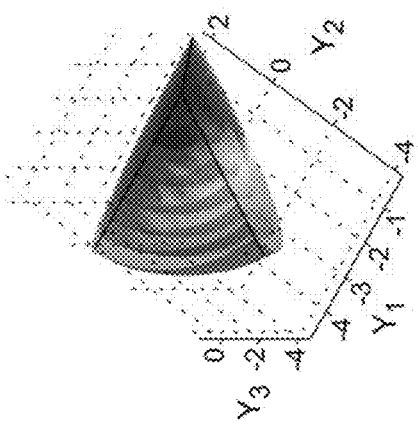
Figure 24G:
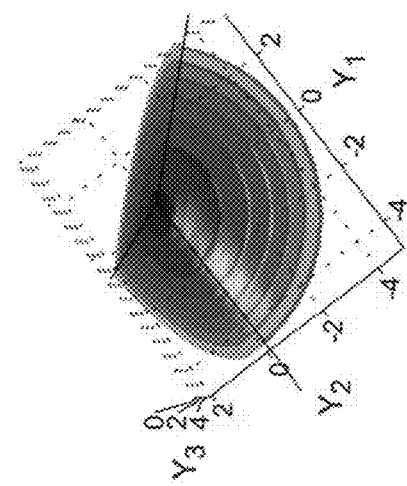
Figure 24L:
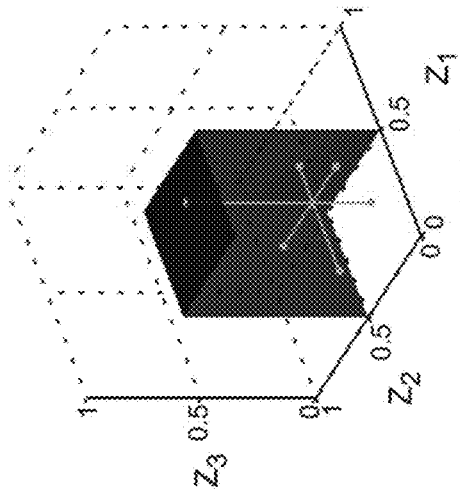
Figure 24K:
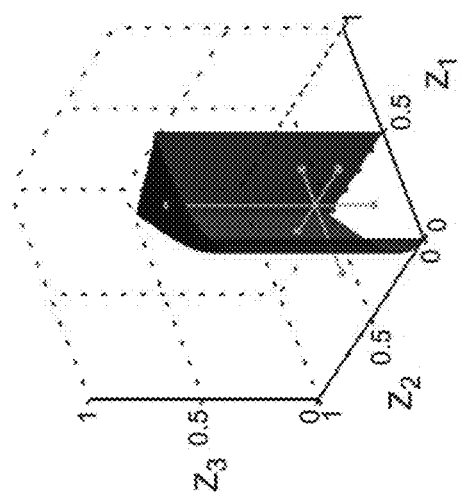
Figure 24J:
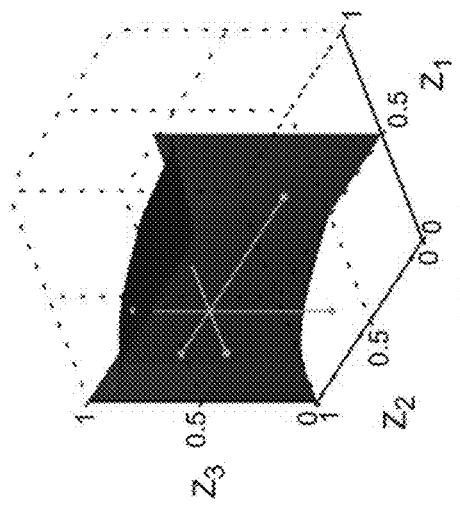
Figure 25:
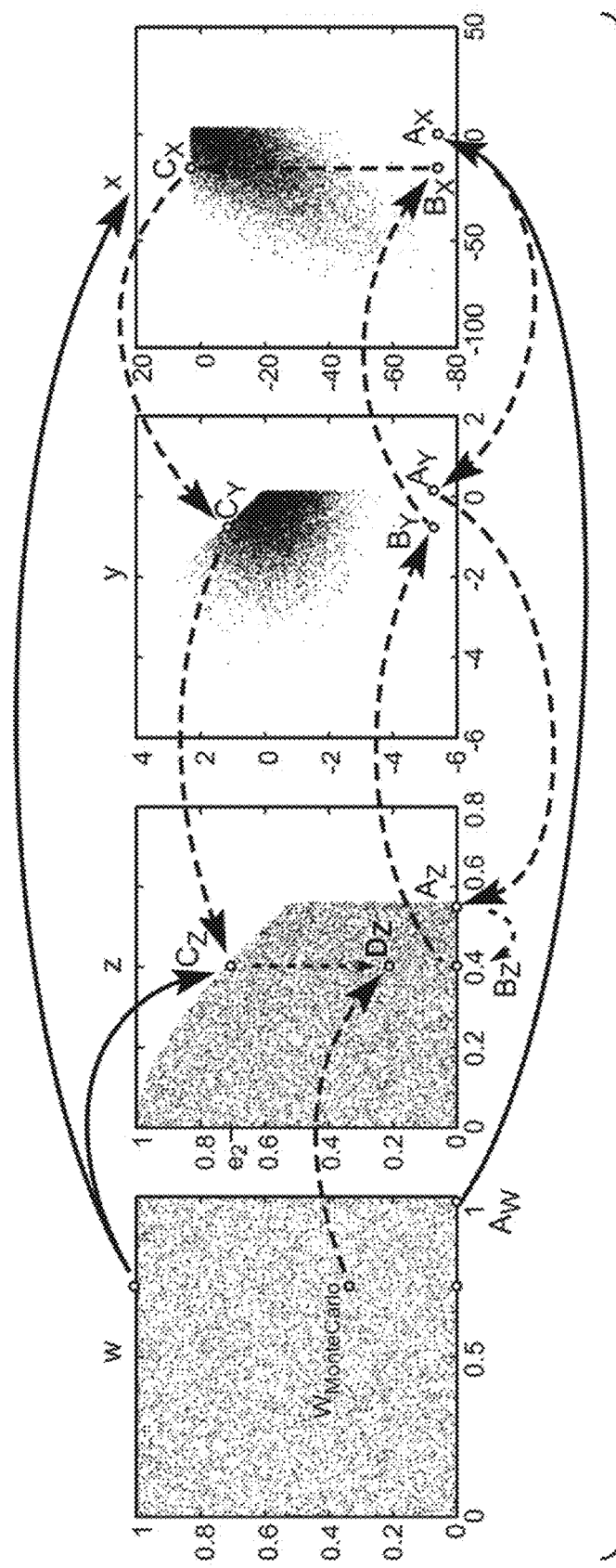
FIG. 25 is a graphical illustration that show the visualization of the transformation process using two-dimensional scatter plots for two risk factors, according to the present invention.

```
function VISUALISEISOSURFACE3D-BC( q, Σ )
Input: q ∈ ℝ^m, ρ ∈ ℝ^{m×m} and m = 3.
    for j ← 1 to N_s = 7 do
        s_j ← exp(-2j)                              ▷ Set contour density levels
    end for
    {a_i} ← -7.5, -7.0, -6.5, ... , +7.0, +7.5      ▷ Step size is 0.5
    for i ← 1 to K do
        for j ← 1 to K do
            for k ← 1 to K do
                x⃗_{ijk} ← (a_i, a_j, a_k)^T         ▷ Form the Mesh-grid X
                I ← (a_i < q_1 ∧ a_j < q_2 ∧ a_k < q_3)   ▷ Cut away boundaries
                v_{ijk} ← I × NORMPDF(x⃗_{ijk})      ▷ Assign voxels v_{ijk}
            end for
        end for
    end for
    V = {v_{ijk}}_{ijk}, where 1 ≤ i, j, k ≤ K      ▷ Voxels
    S = {s_i}_i, where 1 ≤ i ≤ N_s                  ▷ Isosurface Contour levels
    X = {x⃗_{ijk}}_{ijk}, where 1 ≤ i, j, k ≤ K     ▷ Voxel coordinates in the 𝒳 space
    Y = {L × x⃗_{ijk}}_{ijk}, where 1 ≤ i, j, k ≤ K ▷ Voxel coordinates in the 𝒴 space
    FIG. 24A-C, TITLE(X space)
    ISOSURFACE(X,V,S)                               ▷ Plot the iso-surface of voxel coordinates X
    FIG. 24D-F, TITLE(Y space)
    ISOSURFACE(Y,V,S)                               ▷ Plot the iso-surface voxel coordinates Y
    FIG. 24G-I, TITLE(Y space)
    ISOSURFACE(Z,V,S)                               ▷ Plot the iso-surface voxel coordinates Y
end function
```

Algorithm 6.4 The pseudo-code for the visualisation in FIGS. 24J-L is provided. At each point of the grid, based on the coordinates $\vec{u}_{ijk}$ which are defined in the 𝒳 space, the $d^i$ and $e_i$ at each dimension are calculated. At each point of the grid, the $w^i$ at each dimension are calculated based on $d^i$ and $e^i$. If the point is outside the integration boundaries, its w will be larger than 1. This creates a continuous value for the voxels which make it suitable for the Isosurface algorithm. Also see the caption for algorithm 6.3 for more details. Note: $\hat{e}''_i = \{(j = i)\}_{j=1,2,...,n}$ is a vector with all elements zero except for element i that contains 1.

```
function VISUALISEISOSURFACE3D-D( q, Σ )
Input: q ∈ ℝ^m, ρ ∈ ℝ^{m×m} and m = 3.
    K ← 209
    {a_i} ← 0, .001, .002, ... , .009, .01, .015, .020, ... , .995, 1, for 1 ≤ i ≤ K
    s_v ← 1
    q'_i ← -∞                                       ▷ q'_i is the lower bound of integration
    for k_1 ← 1 to K do
        for k_2 ← 1 to K do
            for k_3 ← 1 to K do
                u_{k_1,k_2,k_3}^1 ← a_{k_1}, u_{k_1,k_2,k_3}^2 ← a_{k_2}, u_{k_1,k_2,k_3}^3 ← a_{k_3}
                b_{k_1,k_2,k_3} ← (a_i < q_1 ∧ a_j < q_2 ∧ a_k < q_3)   ▷ Boundaries
                l ← k_1 - 1 + (k_2 - 1)K + (k_3 - 1)K^2
                d_l^1 ← NORMP(s_v × q'_1)
                e_l^1 ← NORMP(s_v × q_1)
                y_i ← 0 for 1 ≤ i ≤ m
                for i ← 2 to m do
                    z ← u_{k_1,k_2,k_3}^{i-1} × (e_l^{i-1} - d_l^{i-1}) + d_l^{i-1}
                    y_{i-1} ← NORMQ(z)
                    y_{sum} ← y⃗ × C × ê''_i
                    d_l^i = NORMP(s_v × q'_i - y_{sum})
                    e_l^i = NORMP(s_v × q_i - y_{sum})
                end for
                isInside ← True
                for i ← 1 to m do
                    isInside ← isInside ∧ (d_l^i ≤ u_{k_1,k_2,k_3}^i ≤ e_l^j)
                    w_{k_1,k_2,k_3}^i ← (u_{k_1,k_2,k_3}^i - d_l^i)/(e_l^i - d_l^i)
                end for
                v_{k_1,k_2,k_3} ← isInside
            end for
        end for
    end for
    D = {d⃗_{(i-1)+(j-i)K+(k-1)K^2}}_{ijk}, where 1 ≤ i, j, k ≤ K
    E = {e⃗_{(i-1)+(j-1)K+(k-1)K^2}}_{ijk}, where 1 ≤ i, j, k ≤ K
    W = {max(w_{ijk}^1, w_{ijk}^2, w_{ijk}^3)}_{ijk}, where 1 ≤ i, j, k ≤ K   ▷ Voxels
    Z = {u⃗_{ijk}}_{ijk}, where 1 ≤ i, j, k ≤ K    ▷ Voxel coordinates in the 𝒳 space
    S = {0. 1}                                     ▷ Isosurface Contour levels for boundaries
```

-continued

Algorithm 6.4 The pseudo-code for the visualisation in FIGS. 24J-L is provided. At each point of the grid, based on the coordinates $\vec{u}_{ijk}$ which are defined in the $\mathscr{Z}$ space, the $d^i$ and $e_i$ at each dimension are calculated. At each point of the grid, the $w^i$ at each dimension are calculated based on $d^i$ and $e^i$. If the point is outside the integration boundaries, its w will be larger than 1. This creates a continuous value for the voxels which make it suitable for the Isosurface algorithm. Also see the caption for algorithm 6.3 for more details. Note: $\hat{e}''_i = \{(j = i)\}_{j=1,2,\ldots,m}$ is a vector with all elements zero except for element i that contains 1.

FIGS. 24J-L,TITLE(Z space)
ISOSURFACE(Z,W,S)   ▷ Plot the iso-surface voxel coordinates
end function

Risk Aggregation on GPUs
Section Introduction

From the investigation carried out earlier, it was clear that, although the C-REDv2 method, which was optimized using the survival function, significantly reduced its execution time, the method still takes a considerable amount of time (6 seconds for 15 risk factors) to execute and this is not practical for mobile financial transactions with clients that are hard-pressed for time.

To further reduce the execution time of the REDv2 method, the following disclosure describes how to apply the Genz non-linear integration method to the C-REDv2 method and transform the latter into a novel and massively parallel processing design on a GPU. This GPU based C-REDv2 method is called the GPU-C-REDv2 method. Experimental results show that by using this parallel approach, the execution times of the risk aggregation method have been significantly reduced.

The work of Genz tested the computation times for two non-linear transformation integration algorithms. The two algorithms were the brute force (i.e. Monte Carlo) integration and the sub-region adaptive algorithm. Genz found that the brute force algorithm performed faster than the sub-region adaptive one for larger dimensions (e.g., 6 and 7 dimensions). The accuracy was comparable. Both algorithms increased slowly as the number of dimensions was increased, which is one reason why the present invention focusses on parallelizing the brute force algorithm and not the sub-region adaptive algorithm. Another reason is that this method is simpler in that it does not require message passing or shared memory which is necessary for parallelizing the sub-region adaptive algorithms. Communication latencies may result in programs that use message passing protocols.

A more recent work by Genz tested two sub-region Adaptive algorithms for two types of MVT distributions. These two algorithms were an SV-Chi-Normal (i.e. SASVN) and an SV-t formulation (i.e. SASVT) of the MVT problem. They were compared with a Quasi-Monte Carlo SVN (i.e. QRSVN) and a Quasi-Monte Carlo SVT (i.e. QRSVT). The tests were performed on 100 samples for dimensions m=2, . . . , 11. The times for the SASVN and SASVT were significantly lower than the QRSVN and QRSVT for dimensions m≤8. However, the SASVN and the SASVT computation times started to increase more quickly. They frequently took more time than the QRSVN and the QRSVT computation times for m>10, respectively. These experiments focused on the Monte Carlo (i.e. brute force) algorithm and to avoid the adaptive one. However, the present invention utilizes the Pseudo-Random Monte Carlo number generator not the Quasi Monte Carlo one. This was possible due to the massively parallel design of Graphical Processing Units (GPUs).

The computation processes of certain arithmetic operations can form a hierarchical structure and smaller components are calculated in parallel. For example, the sum operation of the elements of a large array benefits from this parallel architecture. The use of General Purpose Graphical Processing Unit (GPGPU) programming to speed up the computation of massively parallel problems is a growing field in computer science. A GPU is becoming useful for High Performance Computing (HPC) of complex problems in science and engineering in addition to computer graphics. The K40 NVIDIA GPU is an example of one of the most recent GPU devices in the market. This section proposes an implementation of a novel massively parallel processing design of the GPU-C-REDv2 on a GPU. It is designed using Genz non-linear integration method.

GPU Architecture

In massively parallel computation, there is a large number of processes that are performed simultaneously. There is a specific parallel architectural design at the hardware-level of a GPU. A GPU has a number of blocks. Each block consists of a number of GPU cores. A kernel is the program that needs to be parallelized. Each GPU core runs a separate thread, where each thread is a particular instance of the kernel.

The threads execute operations in parallel and may communicate with each other for a collaborative computation. The threads within a block have several mechanisms to communicate. A synchronization process and memory-sharing mechanisms could be designed among the GPU cores.

Each computational process requires memory to operate. There are various types of memory available for massively parallel computation processes on a GPU. There are registers, local memory, shared memory, and global memory. Each register and local memory is privately available for only one thread. A shared memory is available to multiple threads within a single block. However, memory-sharing is not readily available between the threads in any two different blocks. The global memory is available to all threads within a GPU. The CPU is able to access the global memory of the GPU.

Writing over the GPU's global memory is slower than registers, local, and shared-memory. Also, the writing process over global memory may face a bottleneck because the blocks may try to access it simultaneously. Shared memory is faster mainly because only a limited number of threads can access it. The kernel can be programmed in different programming languages such as CUDA. Matlab allows writing CUDA kernel while benefiting from Matlab's built-in functions.

The data transfer speed between GPU and CPU is slow. The reason of being slow is that the transfer between the two is sequential. Furthermore, the channel of the data transfer has a limited bandwidth. This bandwidth is slower than the and width of data transfer within the GPU itself. The following paragraphs are a glossary of the terms that are related to GPU architecture.

General-Purpose Computing on Graphics Processing Units (GPGPU)—GPGPU programming is the use of a Graphics Processing Unit (GPU) to execute computations that are normally handled by the Central Processing Unit (CPU).

GPU Core—A GPU core is an independent physical processing unit.

Kernel—A kernel is a program that is executed by each GPU core. In parallel programming, often the same kernel is being executed by multiple GPU cores at the same time. The relation between a GPU core and a kernel is a hardware and software relationship. A kernel has multiple instances that are executed in parallel called threads.

Thread—A thread is each instance of the kernel executed on GPU cores. Each thread has a unique global index. This index allows it to be distinguished from other threads. In dynamic parallelization, multiple threads of a kernel perform parallel tasks. These tasks are placed in a queue to be scheduled for execution. The only difference between these tasks is that they have different global index numbers.

Global GPU Memory—GPU global memory is the memory of the GPU board which is shared among all GPU cores. It is located on the GPU device. All GPU cores already have access to all cells of the GPU global memory. However, there is al limiting factor. When multiple GPU cores attempt to access the same cell in the GPU global memory, there will be a bottleneck. Some GPU cores will have to queue for access.

Local Memory—The rate of data transfer between the GPU cores and the local memory is faster than the data transfer between the GPU cores and GPU global memory. The main reason is there are fewer GPU cores that can access the local memory than the GPU global memory.

Shared Memory—Shared memory exchanges data between threads in a block. The rate of data transfer is better than GPU global memory but slower than the local memory. Other GPUs from other blocks cannot access it. But all GPU cores within the same block can access it.

GPU Core Registers—GPU registers are the fastest data stores within a GPU. Arithmetic operations can be performed on them directly.

CUDA—CUDA is the acronym for Compute Unified Device Architecture. It is a programming language developed by NVIDIA. Matlab is integrated with CUDA to allow programmers to build parallel software on a GPU. Block Threads are grouped into blocks. It has its own shared memory for the threads within its boundaries.

Grid—A grid is an array of blocks.

Warp—A warp normally consists of 32 threads. A warp execution is an execution among multiple threads.

Use of shared memory and CPU-GPU message passing are the 2 bottlenecks in GPU programming. The data transfer speed between GPU and CPU is slow. The reason of being slow is that the transfer between the two is sequential. Furthermore, the channel of the data transfer has a limited bandwidth. This bandwidth is slower than the bandwidth of data transfer within the GPU itself.

GPU-C-REDv2 Architectural Design

The program aims to solve the integration on elliptical copulas. The design of the GPU-C-REDv2 is a massive parallelization for the C-REDv2 algorithm. Since the calculations of Monte Carlo are not sequentially dependent on each other, it is possible to distribute the calculations into different GPU cores. Then, one can allocate each part of the C-REDv2 method on a single GPU core. However, the major components are sequentially dependent of each other (See FIG. 27). For example, random numbers should be generated before they are processed as Monte Carlo points.

Five design strategies were tried to benefit from the parallel architecture of a GPU until the final design, as presented here, was achieved. The components of the GPU program and how the components interact will now be described. The high-level description of the main steps of the GPU-C-REDv2 program is as follows:

1. Preprocess: The Preprocess step prepares the parameters that are constant across and are used in all points,
2. RandomGenerate: Generates uniform random numbers for Monte Carlo sample points,
3. ProcessMCPoint: Runs the Genz transformation kernel, which calculates the value at each sample point on each GPU core,
4. Combine: The Combining Kernel combines the outcome of the Monte Carlo samples to get the final result.
5. Synchronize: Synchronization is an intermediate process between the RandomGenerate kernel and the ProcessMCPoint kernel as well as between the ProcesMCPoint kernel and the Combine kernel. Synchronize will be described hereinafter in greater detail. For now, it will suffice to state that it is provided between the above-mentioned kernels to avoid racing condition problems between parallel kernel executions.

Figure 27:
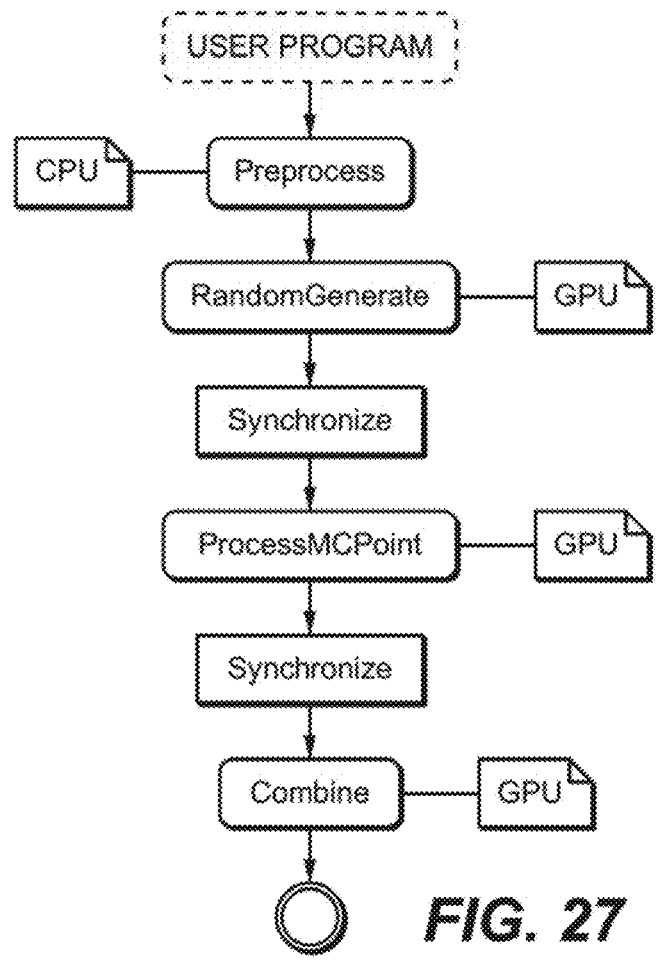
FIG. 27 is a high level flow chart of the GPU-REDv2 process or procedure, according to the present invention.
Figure 28:
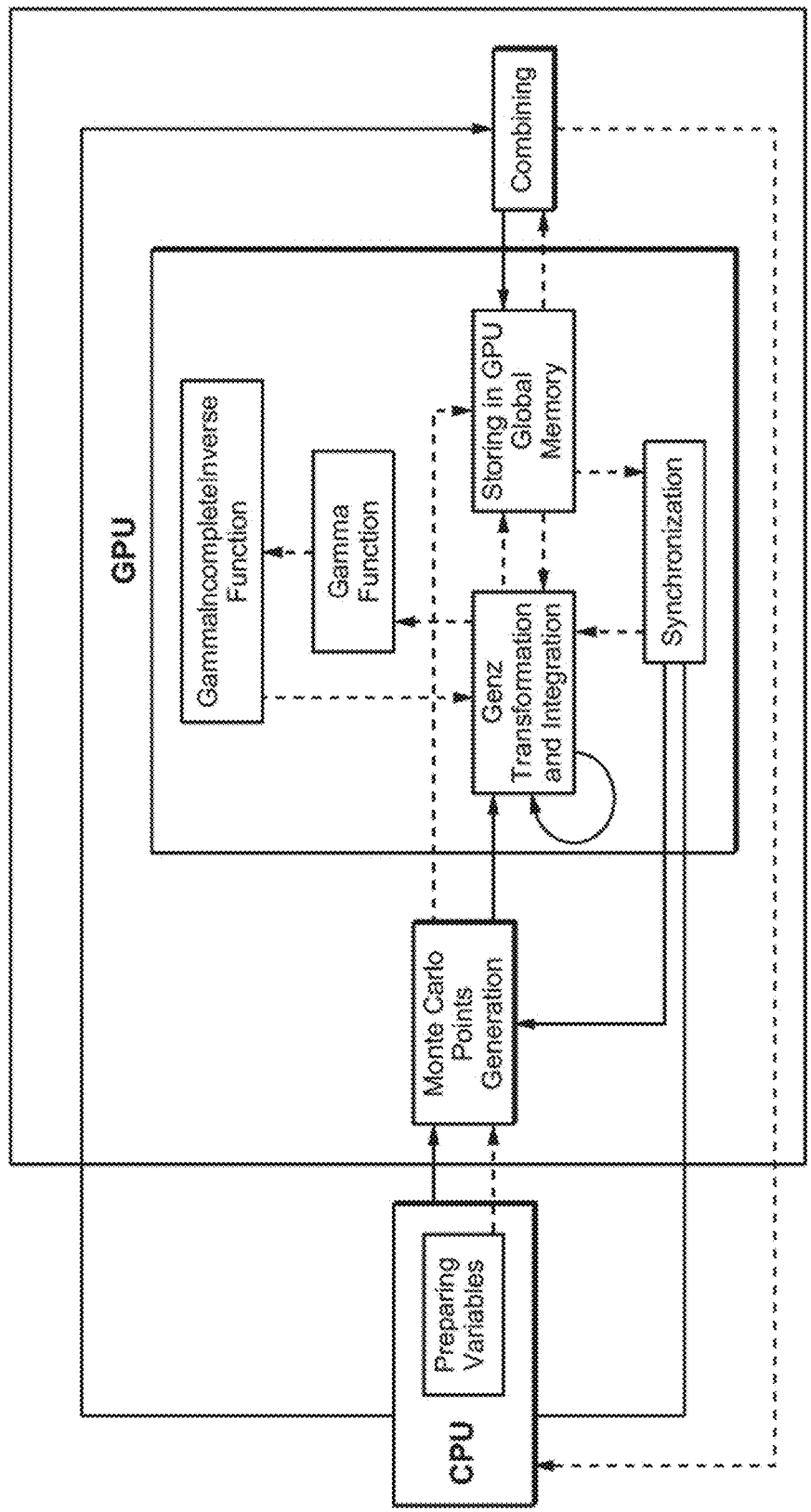
FIG. 28 is a graphical illustration that shows the interaction of different modules in a high level architectural design of the GPU-REDv2, according to the present invention.
Figure 29:
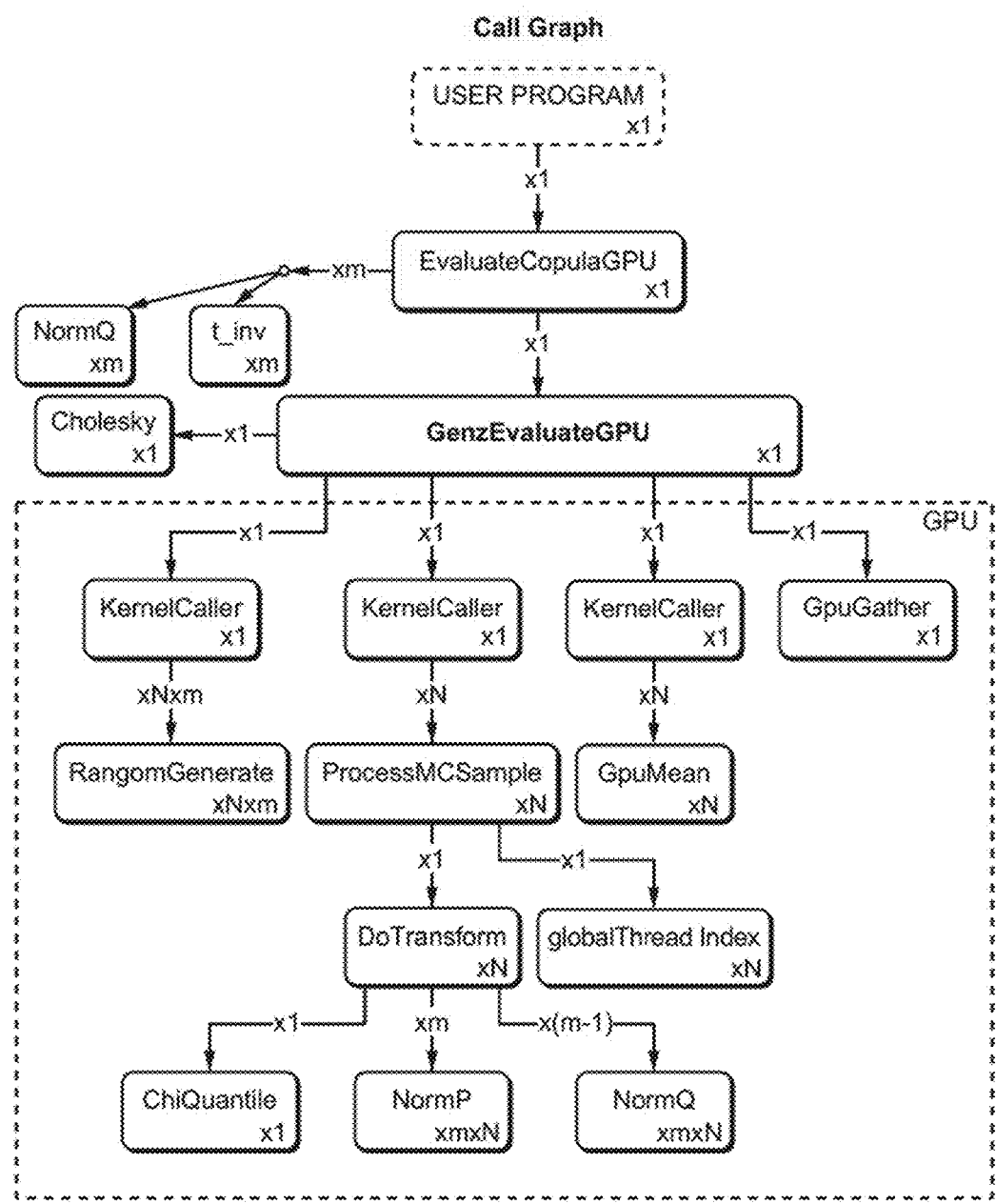
FIG. 29 is a call graph of the GPU-REDv2, according to the present invention.

FIG. 27 shows above steps as a high level flow chart. More detailed interactions among the components of GPU-C-REDv2 are illustrated in FIG. 29 as a Call Graph, while FIG. 28 illustrates the interaction of different components.

The preprocessing step (Preprocess in FIG. 27) prepares the variables on the CPU. The variables are the correlation matrix, the marginal probability and marginal quantile values, and the degrees of freedom in the case of t-copula. It sends these variables to the GPU.

In the RandomGenerate step, the Monte Carlo points generation kernel (the Random-Generate box in FIG. 27) generates the Monte Carlo points on the GPU in parallel. More particularly, these Monte Carlo points are non-linearly transformed using the Genz kernel. Each point performs part of the numerical integration (i.e. the volume determination at each point).

At the processing step (the ProcessMCPoint box in FIG. 27), each Monte Carlo point is processed in parallel. This step was the most important and most time consuming part of the process and a good parallel design was important to achieve a good performance. This step uses a series of mathematical transformations to get a representation of the MC points in a certain representation space. This transformation step is implemented as a CUDA kernel. The threads are executed with no explicit implementation for interactions via a shared memory. The reason is that the GPU-C-REDv2 adopts a brute force strategy to solve the survival value of the copula. There was no need for the GPU cores to communicate explicitly except when they need to synchronize. A good design strategy is the one that avoids communication between the GPU codes as much as possible. The reason is, the synchronization step is a bottleneck in parallel computation (See Amdahl law for interaction between the serial/sequential and parallel parts of an algorithm). In particular, Amdahl's law relates to the theoretical speedup in latency of the execution of a task at fixed workload that can be expected of a system whose resources are improved.

The generation process and the ProcessMCSample process go through a synchronization kernel (the Synchronize box in FIG. 27) before proceeding to the next process. In particular, the synchronization step is not executed independently from the first step; it is a continuation of the first step. Therefore, one could consider it as a sub-step of the first step. After the synchronization, the result is used in initializing the second step. Once the executions of calculations of the points were synchronized, the combining kernel starts the averaging process. Part of the averaging operation is the mean operation, which is performed in parallel. The summations go through a synchronization process.

Figure 30B:
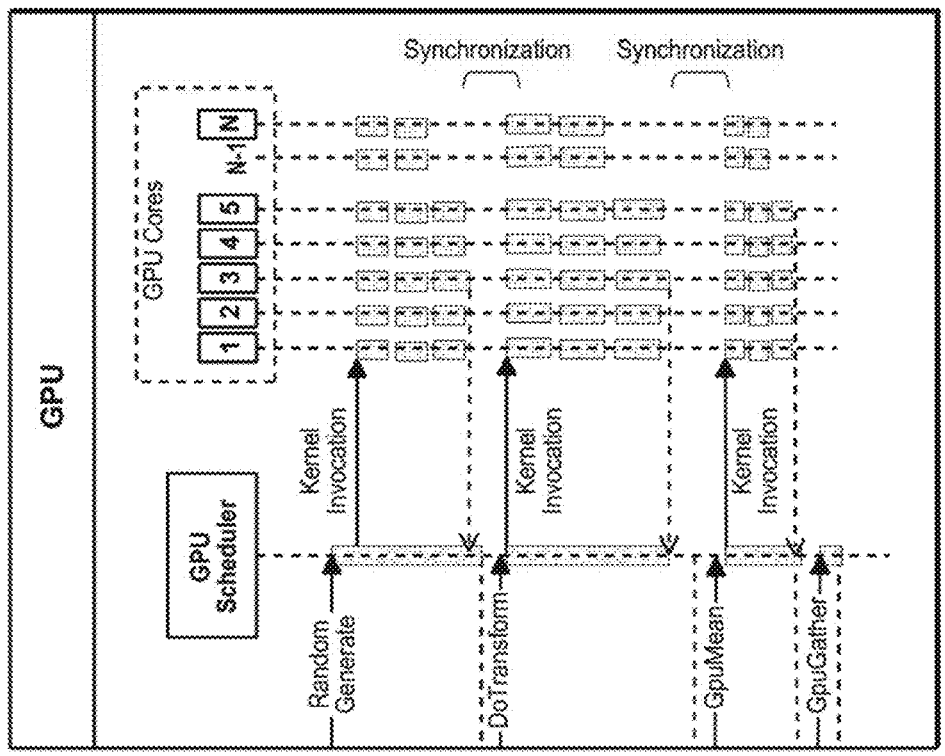
FIGS. 30A and 30 B are sequence diagrams of the GPU-REDv2, which shows timing and synchronization actions between different components and processes of the system, according to the present invention.
Figure 30A:
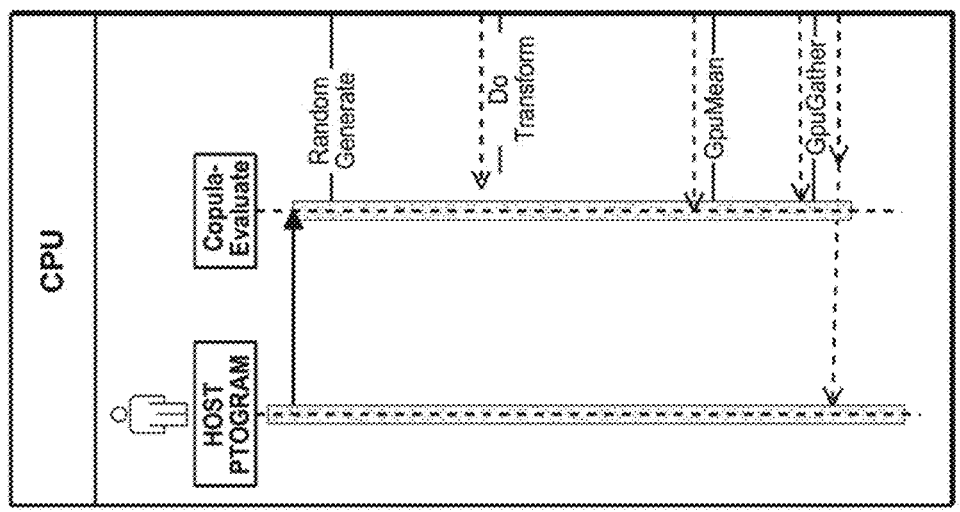

An overview of the synchronization and the timing of the processes is shown as a Sequence Diagram in FIGS. 30A and 30B.

GPU-C-REDv2 Design Details Using Genz Integration Method

The main steps of the implementation that were explained briefly previously and as shown in FIG. 27 are now explained in greater detail. More particularly, this involves three rounds of parallel processes which are executed sequentially relative to each other and are separated by synchronization. In this part of the disclosure the major steps will be described in more detail.

Note that the first step is not parallelized and is performed on CPU, but other steps are performed in the GPU. The synchronization steps are explained as a separate step.

First Step: Preprocess

The calculations of the preprocess step are performed on the CPU for real-time risk-linked security. For real-life cyber fraud risk estimation, the number of risk factors is small so it is unnecessary to parallelize them. This preprocess step extracts the risk parameters from the copula and converts them into integration related values, and calculates the values that will be used in the Genz kernel. In particular, it computes the quantiles ($q_i$) and the Cholesky matrix L. These quantities are computed based on the input parameters of the copula (i.e. $p_i$ of the marginal distributions and the correlation matrix ρ). These quantities need to be calculated only once at the beginning. Similarly, the Cholesky decomposition of the correlation matrix needs to be calculated in the beginning at the preprocessing step which is defined by L:=Cholesky(ρ). The resulting matrix L is used in the calculations that transform the Monte Carlo points. The parameters $p_i$ and L will be used multiple times in the third or the ProcessMCPoint step to transform the Monte Carlo points geometrically, as explained earlier.

The boundaries of the integration are the values of the quantiles of the marginal distributions. They are calculated based on the copula parameters $\{pi\}_i$. As the marginal distributions are one-dimensional each, they can be calculated sequentially on the CPU. This step does not have to be parallelized on the GPU.

Second Step: GPU Generation of Monte Carlo Points (RandomGenerate)

The Recursive Formula with Step Size 1

In the RandomGenerate step, random numbers are generated to produce uniform random numbers used in Monte Carlo samples. The random numbers can be either generated on the CPU or GPU. The random sample points are generated on the GPU. They are stored in the GPU's global memory. The advantages of performing this step on GPU are twofold. Firstly, it will eliminate the time of transfer of random numbers from the CPU to GPU. Secondly, the random number generation utilizes the benefit of parallel processing on the GPU. In parallel implementation of random generation, like most other parallel calculations in GPU, it is important that the calculations of sequences that are generated across GPU cores are independent between the GPU cores. The goal is to eliminate the interactions and dependencies between the GPU cores. In general, one wants to have no interaction between the GPU cores except for via synchronization. The synchronization implicitly affects the timing of the execution of the steps and provides a guarantee that the values that are taken from memory are ready before they are used. There needs to be a guarantee that the calculations of the pre-synchronization calculations are completed. This completion of data before executing a new process is a type of dependency and implicit interaction between the threads. However, the desire to have less synchronization steps to minimize the waiting time, leads to periods of idle time for GPU cores. The present strategy is to have calculations that are independent and there is no interaction between the GPU cores. In parallel generation of number sequences, each GPU core kernel generates a random stream. Different random streams are generated in parallel. Since the step size of the recursive equation is one, the random seeds used at different GPU cores must be different to prevent the GPU cores from generating the same sequences. Each GPU core may be required to generate more than one Monte Carlo point. Each GPU core can generate its random stream sequentially. The usual recursive algorithms used on CPUs for generating pseudo-random numbers are not readily suitable for parallel implementation. The reason is they have recursion with step size 1, which means, calculating the random number $Z_n$ needs the $Z_{n-k}$ and earlier elements, where k=1. The value $Z_{n-k}$ and the earlier numbers in the sequence need to be calculated before proceeding with calculating $Z_n$. A skip ahead formula is one in which k>1, that is, the immediate previous number in the sequence does not need to be known. Instead, the skip-ahead formula will be introduced in the next section. But one first starts with a recursive equation with step size 1, because the skip-ahead formula is based on the algorithm with the recursion step size 1.

The L'Ecuyer Multiple Recursive Generator MRG32K3a method was employed which is a widely used random number generation method. It is suitable for massively parallel computation. The CUDA code that was utilized takes advantage of the MRG32k3a. It is the main random number generator by NVIDIA. It is suitable for use with NVIDIA GPUs. Starting with a description about how L'Ecuyer's generator works, one needs to calculate a full sequence of numbers for X and another sequence for Y. The calculations are based on number theory and are done on integer numbers. Most of the operations are multiplication or additions in modulo m, where m is an integer number. This means that after each calculation, the remainder of the dividing the result by m is calculated and is stored in variables. The following recursive formula (on integer numbers, based on number theory) is on integer state numbers that have 32 bits. It defines two sequence of numbers $X_n$ and $Y_n$. These two sequences are first defined which leads to defining a third sequence $Z_n$ based on them, which is the actual sequence of the pseudo-random numbers used in the next stages as the outcome of this stage.

$$X_n = A*X_{n-2} + B*X_{n-3} \bmod m \qquad (7.1)$$

$$Y_n = C*Y_{n-1} + D*Y_{n-3} \bmod m' \qquad (7.2)$$

This is value for all n≥3 where A=1403580, B=−810728, m=$2^{32}$−209, C=527612, D=−1370589, and m'=$2^{32}$−22853.

Note that this recursive formula not only depends on immediate previous states n−1, but is also based on the elements 2 and 3 steps earlier. For this reason, the method needs to provide three initial values in the sequence of the states for X and Y. That's why the above values are defined only for n≤3.

The sequence $\{Z_n\}$ (i.e. the actual pseudo-random numbers) is the one which will be used in the transformation. No recursion is used in calculating Z. The values of Z at each step are based on both X and Y in the same step:

$$Z_n = \frac{(X_n + Y_n) \bmod m}{m} \tag{7.3}$$

The calculations of the sequence X are independent of the calculations of the Y sequence. They are only linked through their contribution in the Z sequence. The resulting value will be a uniform distribution on [0, 1). The purpose of division is to make the range to become between 0 and 1. The calculated X and Y are kept in memory for the next step to generate the next X and Y. The sequence of state X and Y is stored on the shared memory. At each iteration, a uniform pseudo random number is generated based on the current X and Y. Each thread has an address of the location of these two variables in the shared memory. The shared memory contains all the previous states.

The Skip-Ahead Strategy

For the parallel implementation, a skip-ahead strategy is applied. Each GPU core skips ahead a number of steps (i.e. k steps). Skipping ahead allows k GPU cores to be active simultaneously. Each calculation at each GPU core does not depend on the outcome of other threads. As a result, the process of generation of the random numbers does not need to be sequential as in CPU implementations.

The generator functions need to be suitable for a skip-ahead strategy. This means that one needs to have an efficient formula for calculating k steps ahead in parallel for each round of the calculation. If one has a skip-ahead formula, one does not need to sequentially calculate all the k−1 steps before the kth step.

Each thread receives a unique number. It is an index of the thread in the block. Therefore, the k'th step for each GPU core is different. In the parallel implementation, one only needs to calculate the k'th step at each calculation executed by the GPU core. That GPU core leaves the k−1 points in-between without calculating them. Those points will be generated by other GPU cores working simultaneously. This allows the GPU to parallelize the generation of the sequence by simultaneously generating the elements n+1, n+2, . . . , n+k. This requires that first n elements of the sequence are already calculated.

Using this strategy, one is parallelizing at the thread level. The ith thread (on the i'th GPU core) generates the Monte Carlo points i+k, i+2k, i+3k, . . . , in parallel. Like any recursive calculation, one also needs to calculate the initial values. In this case, one needs K points. The parallel sequence starts from i+k instead of i, because it requires first k elements to be generated using a sequential (i.e. non-parallel) method. Before the parallel part of this algorithm begins, one needs to provide the first k elements of the state array. The reason is that when the first round of parallel generations are performed, the first GPU core (i=1) uses the recursive generator to generate the state at location i+k in the sequence. Since it uses k-skip ahead calculations, the skip ahead recursive formula needs the past state at location (i+k)−k−1. One needs k+3 elements to have been already calculated.

For example, consider the case of k=2000. In the skip-ahead formula, the next 2000 X numbers and the next 2000 Y numbers are generated all simultaneously. In the end, one multiplies the corresponding numbers of the X and Y sequences to get the Z sequence, which is the next generated random number.

Derivation of the Skip-Ahead Formula

Now, another recursive formula needs to be derived, one that skips a certain number of elements at each step, based on the original recursive formula. The skip-ahead formula calculates the elements $X_n$ based on elements $X_{n-(k+1)}$, $X_{n-(k+2)}$, and $X_{n-(k+3)}$ that remain in memory from the last few rounds of calculations. The same is true for the Y sequence.

For each of the X and Y sequences, one can describe the recursive formula using a matrix multiplication by a vector of three recent states. For example, for X:

$$\begin{pmatrix} X_n \\ X_{n-1} \\ X_{n-2} \end{pmatrix} = \begin{pmatrix} AX_{n-2} + BX_{n-3} \\ X_{n-1} \\ X_{n-2} \end{pmatrix} \bmod m \tag{7.4}$$

The main idea is to rewrite it in form of matrix multiplication. Then one uses matrix multiplication to analytically derive the combination of k steps as one matrix. First, rewriting the above formula in matrix form:

$$\begin{pmatrix} X_n \\ X_{n-1} \\ X_{n-2} \end{pmatrix} = R \times \begin{pmatrix} X_{n-1} \\ X_{n-2} \\ X_{n-3} \end{pmatrix} \bmod m \tag{7.5}$$

$$R = \begin{pmatrix} 0 & A & B \\ 1 & 0 & 0 \\ 0 & 1 & 0 \end{pmatrix} \tag{7.6}$$

The matrix R describes one step of the calculation. One can easily calculate the k-skip ahead element by multiplying the matrix R, k times. According to linear algebra, this is equivalent to multiplying by a new matrix $R^k = R \times R \times \ldots R$.

$$\begin{pmatrix} X_n \\ X_{n-1} \\ X_{n-2} \end{pmatrix} = R^k \times \begin{pmatrix} X_{n-k} \\ X_{n-k-1} \\ X_{n-k-2} \end{pmatrix} \bmod m \tag{7.7}$$

In above skip-ahead formula, the element n is calculated based on three elements n−(k), n−(k+1), n−(k+2). For example, for k=2000 the new matrix is $R^{2000}$:

$$R^{2000} = \begin{pmatrix} 55157437 & 1800574612 & 860818611 \\ 1831407767 & 55157437 & 3698604078 \\ 617078302 & 1831407767 & 59833610 \end{pmatrix} \tag{7.8}$$

This new matrix is also 3×3 but is a powerful matrix in the sense that it performs the k multiplications at once by a single matrix calculation. However, it does not generate 2000 elements by each round of calculation. It just calculates one element in future, i.e. skips the intermediate points. But if the elements in between are needed, they still need to be calculated.

Similar to Equation 7.1, the new coefficients can be determined from the matrix $R^k$. Since the new matrix has only 3×3 elements, the skip-ahead calculations can be done in one evaluation of matrix calculations which requires 9 multiplications. However, since many elements in the original $R^1$ matrix were zero, relatively larger numbers of multiplications are necessary in the skip-ahead formula. But the calculations of each matrix multiplication are not much slower and one can get a benefit of k times speed-up when utilizing k GPU cores. Since the multiplications are done in modulus m, the skip-ahead formula will have the same form but with different coefficients. A similar method may be used to generate the Y sequence, which can be performed in parallel with X. After that, the Z calculation is performed.

A description of an example of the calculation is as follows. Suppose one has k=2000 GPU cores, and one wants to generate a sequence of one million random numbers. This is done in two parts: a slow sequential step and a fast parallel step. In the sequential step, the first 2002 elements of X and Y should be generated sequentially where the calculation are executed on one GPU core. Then, in the second part of the algorithm, all the GPU cores are recruited to operate in parallel and generate the next k=2000 elements in the sequence. In each step of this part, the generation of by each GPU core calculates only one element in the sequence.

The first GPU core, calculates the state element at position 2003 based on the previous states at elements 1, 2 and 3 using the skip-ahead formula. At the same time, the second GPU core calculates the state element at position 2004 based on elements 2, 3 and 4. Suppose i is the index of the GPU core: i=1, 2, . . . , k. The GPU core i will calculate the state element at position 2002+i based on elements i, i+1, i+2. Since the state elements up to position 2002 are ready in GPU memory, this can be done by utilizing 2000 GPU cores in parallel (i=1, 2, . . . , 2000).

After the first simultaneous step is done, the next round of parallel calculations is initiated for all k=2000 cores. In this step, the GPU core i generates the state element at position 2003+i. This GPU core, at its jth step of the skip-ahead formula (j=1, 2, . . . ), generates the element 2000×(j)+3+i, each calculated based on three elements (2000(j−1)+i, 2000(j−1)+i+1, 2000(j−1)+i+2). If one needs N=1,000,000 samples, the parallel execution of the GPU cores is repeated 499 times until the full sequence is generated. Hence, the generation of the second part is performed 2000 times faster than generation of the first 2002 numbers. The first part of preparing 2002 numbers in memory took as much as 1999 sequential calculations (i.e., 2002 minus 3), but the second part took only 499 sequential steps, each of them utilizing 2000 cores in parallel. The total time will be much faster than the running time of generating 1 million elements sequentially. The Monte Carlo points array w is stored in the GPU's global memory. It will be utilized for Genz non-linear transformation integration method.

A general estimation of the complexity of this algorithm in FLOPS is as follows. To calculate N Monte Carlo points, the first part takes k+3 steps. The second part, takes N−k−3/k taken by each GPU core. Each calculation of the skip ahead is 9/2=4.5 times slower than the one step calculation, because there are 9 versus 2 multiplications in calculation of the one step and skip-ahead formula, respectively. The total calculation times are equivalent to k+3+4.5×N−k−3/k of the sequential calculations. The speed-up ratio will be (k+3+4.5×N−k−3/k)/N. In case of this example (N=106, k=2000), the calculations are about 235 times faster. This improvement in efficiency is attributed to the design decision that the generation of the random Monte Carlo points is done directly on the GPU global memory.

The Matlab's parallel.gpuarray.rand( ) function for generation of random numbers was employed. This function implements an efficient parallel method of generating large blocks of pseudo-random numbers based on the vector reduction method described above.

Third Step: Transform and Process Monte Carlo Points (ProcessMCPoint)

This step aims to parallelize Genz non-linear transformation integration method. The volume associated with each Monte Carlo sample point is calculated after the non-linear transformations of these points. These parts of the method (i.e., the transformations and volume calculations) are executed simultaneously for almost all Monte Carlo points. Only a small set of points have to be generated sequentially in the beginning of the method. The remaining large set of points will be generated in parallel. In the present invention, each instance of the CUDA kernel does the calculation for one Monte Carlo point. They utilize the parallel resources maximally on the GPU board.

One of the kernel's main tasks is the allocation of each Monte Carlo sample point to an available GPU core. This task is performed asynchronously. Once the tasks are allocated to the GPU cores, the parallel execution is initiated and asynchronous allocation is performed throughout this step.

A thread level parallelization was used, where each execution utilized a thread. Each GPU core starts a sequential process which is one part of the calculation. This is executed in parallel to other GPU cores. The execution of this process is performed independently of the other parallel processes; there is not communication between the GPU cores while they are executing the kernels.

In the present invention, the execution process of kernels is initiated by Matlab. This process is initiated by a main process that is initiated by the CPU. The reason for choosing Matlab is to provide the present implementation as a Matlab library that can be used by the community of Matlab programmers.

It is necessary to allocate a certain Monte Carlo point. Each GPU core should perform the transformation and integration calculation independently. The allocation of the tasks needs to be done using on a unique index number. This number is given to each GPU core.

In the present implementation, the variable GlobalIndex for allocating the indices was used. The GPU decides what exact memory location on the GPU global memory should be read by a GPU core based on these indices. Also, the indices help to fetch the calculation from each GPU core. Furthermore, the indices help to assign a location on the global memory to store the calculations.

The following operations are executed within a kernel execution. First, each Global Index is calculated using the function calculateGlobalIndex. Second, the parameters (i.e. the variables of each Monte Carlo point) are fetched from GPU global memory (i.e., inside the function processMCSample). Third, the main operation of the Genz algorithm is performed. The transformations are applied on each Monte Carlo point in parallel (i.e. using the function doTransforamtion). The Genz kernel is defined using the following CUDA functions:

| __device__ | size_t | calculateGlobalIndex( ); |
| __device__ | double | doTransformation(...); |
| __global__ | void | processMCSample(...); |

The kernel function is instantiated. The memory locations of the variables in the local memory and the global parameters are allocated. The function parameters are the same for all kernel instances. The parameters are passed on memory locations (i.e., pointers). As explained in the preprocessing step, one of the parameters that is sent to the kernel is the memory location of the matrix L. The matrix L is passed on to each instance as a pointer (i.e. the location of L on the GPU global memory). This means that each kernel instance does not have a local copy of L. It is read directly from the global memory in each access. The same procedure is applied on the parameter qi, the quantiles of the copula.

The Monte Carlo points array w is allocated on the GPU memory automatically by Matlab. Each kernel instance asynchronously receives the address of this array. However, each GPU takes a unique starting location on the w array. There is one number that is unique for each CUDA kernel specified by its global index. In case of a 10-dimensional copula, every vector will take 10 locations. Each set of 10 locations represent a Monte Carlo point. The loop will go through all 10 dimensions.

Now that the parameters q, L and w are located in the GPU global memory, the kernel will proceed with the integration calculations. Then, Genz algorithm for each sample point is executed using the given parameters. The output of each instance of the kernel is one real number T. An instance of this number is synchronously written on the GPU global memory by each kernel. There is no racing condition to be explicitly handled. After the parallel calculations of all the Monte Carlo sample points are accomplished, an array of T values (i.e., the individual volumes) will be kept in the GPU global memory. Now, this array is ready for the next stage of calculations (i.e., the combining step).

Calculating the t copula requires a different kernel for the transformation compared to the Gaussian copula. Calculating t-copula using Genz Method on a GPU was according to the method described earlier.

Now, v is a t-copula input parameter and it affects the randomly generated value $s_v$ that is generated based on the randomly generated numbers.

An implementation of the Gamma Incomplete Inverse function is utilized based on the Cephes Mathematical Library (version 2.7) written in C language. Implementation of some functions needed to be adapted for the GPU implementation. For example, the implementation using recursive programming is not possible on CUDA. It was necessary here to convert the recursive implementations used in the Cephes Mathematical Library to a non-recursive implementation. The reason is the recursive programming requires stacks for function calls. The GPU cores are simplified and the stack feature is removed from them for efficiency of their parallel architecture. This makes their hardware structure simplified and enables the possibility of integrating a large number of GPU cores on a chip.

Fourth Step: Synchronization

This step is not a separate kernel and is not implemented as a separate function. It is an intermediate step between steps 2, 3 and between 3, 4 (See the boxes with label "Synchronize" in FIG. 27). Synchronization involves waiting for a previous parallel process to finish. Here, one needed to execute a synchronization step before starting the averaging process (between step 3 and 4). The execution of the next step (averaging operation) is started immediately after the parallel execution of the GPU kernels is finished.

Implementation the synchronization may be not a straightforward task. There are various solutions for synchronization. The synchronization may be done on the GPU side or the CPU side. Also, the synchronization may be between the processes within a block, within a warp (see below) or between all the parallel kernels.

Each method may have shortcomings. One shortcoming is the time lost to perform the synchronization. There are several concerns about synchronization. It is sometimes difficult to balance the workload between the CPU cores. When synchronizing is used for massively parallel computation such as GPU, the overall speed is equal to the one of the slowest process. To achieve a good balance, one needs to be aware how much the running time of the slowest process differs from the mean speed. Another important factor is the idle time, that is, how much time the other processes spent to wait for the slowest one during synchronization. The synchronization should allow the next process to start and continue processing immediately after all the results of the previous parallel execution of kernels are ready.

There are several mechanisms for synchronization in GPU in CUDA:

Barrier Synchronization—A barrier synchronization is a mechanism that a second kernel is loaded (GPU-offloaded) into a GPU after the first kernel. The process is launched by CPU to be initiated on the GPU. This forces the GPU to wait for the previous kernel to finish before starting the next kernel. This is an implicit synchronization because no separate function is called only for sake of synchronization. This implicit barrier synchronization mechanism in the program of the present invention was used. In this mechanism the CPU is notified by the barrier mechanism immediately after the last parallel kernel instance (i.e., the last thread) has finished its task (i.e. Genz calculations). It triggers the next step which does the averaging process. This method is currently the best method for synchronizing. The reason is that there is no mechanism in CUDA to synchronize the kernels inside the GPU which can be launched by GPU kernels.

Synchronization Using the 'cudaMemcpy' Function—Another mechanism is the use of the cudaMemcpy function in the CUDA. This is an implicit synchronization because it does not use a CUDA function that is specifically designed for synchronization. Instead, it uses the cudaMemcpy function which transfers data from the GPU to the CPU (i.e., where the host memory is located). When a cudaMemcpy command is used, a barrier mechanism is automatically triggered. A cudaMemcopy function waits until the kernel is completed before it begins its copy operation on memory.

Warp synchronization—Another method of synchronization is warp execution. In this type of synchronization, the instructions are synchronized. That is, the first instruction is done by all GPU cores participating in a warp, and then the second instruction is executed by all of them in parallel, etc., until the end. In warp synchronization, the waiting time is not obvious as it is divided between individual instructions. If the implementation is well designed, the waiting time for this synchronization can be near zero.

The main synchronization mechanism utilized was barrier synchronization. The barrier synchronization was used between launch of any two consecutive kernels (see FIG. 27). In the present invention, warp synchronization was not used, but the warp execution is internally used in the kernel that generated the random numbers.

Fifth Step: Combining the Individual Monte Carlo Points

The Combine step is the final step. It calculates the average of the outcomes of the DoTransform kernel executed in parallel on all Monte Carlo points.

This Combine step also requires transferring data from the GPU to the CPU. The data transferred should be as small as possible. It was important that the amount of data transfer is minimized in the design of the present invention. Because of this, it was decided to do averaging inside the GPU before passing it to the CPU side. After the transformation step is complete, the program continues to performing the average operation on the GPU. Only the outcome of the average is transferred to CPU. This reduces the data traffic between the GPU and the CPU than if the program was to send all the Monte Carlo points to the CPU to perform the averaging operation on CPU. This would be true even in cases where the averaging does not take a long time on CPU. The more important reason is that the bandwidth of transferring data back to CPU is limited. Hence, transferring the data back to CPU takes a long time even compared to the time is takes to execute the averaging on the CPU. The decision to execute the averaging computations on the GPU side improved the speed in both ways: First, the averaging was performed faster because it utilized the parallel processing, and second, transferring a large volume of data between the GPU and the CPU is avoided.

A synchronization step is required before the Combine step begins. The reason is that in the averaging process, one needs to take the results stored in a cell into account only when the calculations of that cell are finished. The synchronization is the only solution to guarantee this because in CUDA there is no communication mechanism between GPU cores in different blocks.

After the synchronization step, one can initiate a summation operation followed by a single division to calculate the average. The summation can be optimized utilizing the parallel processing. The average is calculated on the GPU using the Array Reduction algorithm. It benefits from the parallel design of the GPU. The summation operation is calculated using a hierarchical control structure. The algorithm computes each set of numbers at each level of the hierarchical structure in a parallel. At each step of this hierarchy, before moving to the next level in the hierarchical control structure, a synchronization mechanism is necessary to guarantee the completion of the calculations of the previous level. The summation at the next level continues to perform in parallel. The numbers that need to be summed reduces exponentially at each step. In the end, one value remains that is the total outcome of the sum. Then a simple division is performed to calculate the average from the sum. The final outcome is a single value representing the mean of the volumes array T. This value is the now the value of the CDF integration of the copula. Finally, the average value, a single number is transferred to the CPU.

The Vector Reduction Algorithm

The benefit of parallel processing can be employed by using a mechanism called vector reduction. It enables to speed up the process of summation of a large number of elements. The vector reduction algorithm is executed in four main processes:
1. Data is copied from the GPU global memory into the shared memory of different blocks;
2. The array reduction is performed within each block's shared memory;
3. The result of summation in each block is written back to the global memory; and
4. A summation operation of the resulting few numbers of the final level in the hierarchical structure is calculated on the GPU global memory.

In Matlab, "gpuArray" is the data structure of the arrays that are located on GPU global memory. The Matlab's function mean that is defined for gpuArrays was used. The computation processes of certain arithmetic operations can form a hierarchical structure; thereby smaller components can be calculated in parallel. The sum operation of the elements of a large array benefits from this parallel architecture. To compute the mean, one needs an efficient way to add all the numbers in an array. Then, the calculations proceed to execute a division by the total number of elements in the array. The resulting value is the mean value.

The parallels algorithm for summation of values on GPU memory is performed by a vector reduction mechanism based on a hierarchical-structure. At each vector reduction step, pairs of elements within a vector are combined to generate a smaller (i.e., reduced) array. The reduced array will have a smaller size which is calculated sequentially. As the algorithm moves from one level to the next, the length of the elements to be added is halved. The algorithm reduces the number of steps exponentially compared with the sequential algorithm. By repeating this process, one will have the summation of the numbers using a smaller number of repeats. Each reduction step is performed using a large number of GPU cores that operate in parallel.

The threads are almost synchronized because they finish each step almost at the same time. However, the next step needs to be executed only after the parallel reduction of the previous step is complete. It has to utilize an explicit synchronization step. This synchronization is utilized only for the GPU cores within a block. This guarantees that the calculated values in the next step are valid, and it avoids the racing condition problems.

When multiple GPU cores execute the same sequence of operations, divergence of their running steps may occur for different reasons such as the latency of memory accesses. In CUDA, it is implemented using the instruction ___syncthreads( ); after the execution of each level within the loop that performs the vector reduction.

Figure 31:
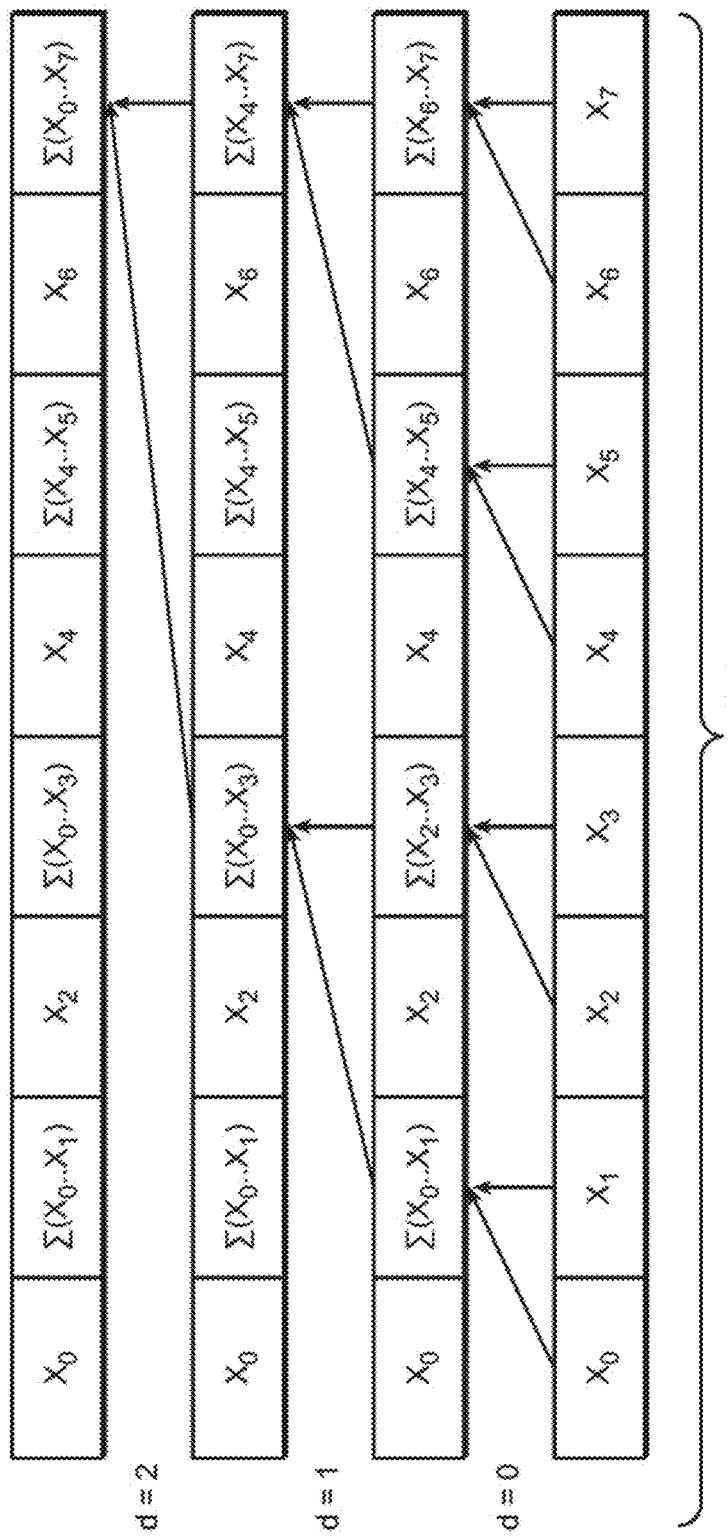
FIG. 31 is an illustration of a four step vector reduction procedure, according to the present invention.

The number of levels is equal to $\log_2(n)$ where n is of the number of elements in the array. According to Brent's theorem, each GPU core should execute the addition operation $O(\log n)$ times). See, R. P. Brent, "The parallel evaluation of general arithmetic expressions," Journal of the ACM, vol. 21, pp. 201-206, 1974. FIG. 31 shows three initial steps of this well-known procedure for 8 elements.

Different Combining Attempts

Attempts were made using three different combining methods until the one that effectively reduces the running times was determined. Here the reports of those attempts, before reaching the final parallel design, are summarized.

Attempt 1: Combining on CPU. In this first attempt, the T results were transferred to the CPU to do the averaging on the CPU. The solution was attempted because the averaging operation is relatively much simpler than the calculations of Genz kernel component. In this regard, it was thought that the CPU would be good enough to calculate the average of the volume values of all the Monte Carlo points with a reasonable speed. However, it was realized that transferring the array of T values involved the transferring of large amount of data from the GPU to the CPU. Since the GPU to CPU bandwidth is narrow, the transfer rate was a limiting factor in the calculations. Therefore, it was concluded that the transfer rate was the limiting factor.

Attempt 2: Combining on GPU using single core. After detecting the reason for low performance, the method of "combining on GPU" was attempted. Here, one GPU core was employed to combine the transferring between the CPU and the GPU mainly due to the data transfer. One GPU core was assigned to do the averaging. However, the downside of this method is that the operations are done sequentially. Since each the GPU core may not be as fast as the CPU, and only one GPU was used for the combining process, the averaging process slows down the total process. Also, synchronization function was necessary to avoid the racing problem among threads.

Attempt 3: Combining on GPU using Vector Reduction. The next strategy was to use the benefit of massive results (T array) while the results were still on the GPU global memory. The performance was greatly improved. This proved that the deterioration of speed when using parallel computation. The first attempt was combining on the GPU side in parallel. In this first attempt, each GPU core did the combining immediately after calculating its own individual final T value. The combining process needs to be stored on a shared location. First, a memory location on the GPU global memory was utilized. In this implementation, combining without a synchronization step was attempted. In this way, combining on a single memory location on GPU global memory did not give correct results. The resulting value was near zero. Therefore, it was concluded that using a synchronization step was essential if one wants to use the benefit of parallel processing on GPU.

After it was realized that synchronization is essential, this led to the simple idea that the execution of a kernel on many GPU cores is automatically synchronized by Matlab. This means that the synchronization is done on the CPU side. From this, it was decided to use a separate GPU kernel for combining the array of T results while they are still on the GPU global memory. However, such kernel that does the parallel combining was already implemented in Matlab. So, it was decided to use the Matlab's built-in kernel for this purpose. In this regard, the Matlab's mean function from Matlab's GPU Parallel library was employed. Note that the method mean is an overloaded method of the usual mean function in Matlab. This means that it is a function that has a similar name, but executes different operations. This function uses a parallel implementation of the averaging based on a tree-like (i.e., hierarchical) process of calculating the mean on the GPU memory. It calculates the mean value of a vector using multiple GPU cores partially in parallel. The algorithm used for parallelizing the mean function is called the vector-reduction algorithm and is discussed earlier.

Using this solution, the following results were achieved: (1) it avoided the overhead of the transferring of the data to the CPU; (2) averaging calculations using parallel processing were able to be performed; and (3) a global synchronization mechanism was made possible without overhead. In summary, synchronization overhead, which is purely a sequential process, was avoided.

Evaluations

The benchmark results for the CPU implementation were measured on an Intel® Core™ i7-3930K CPU @ 3.20 GHz with 12 "processors", 6 CPU cores, 12 siblings, 12288 KB of cache size, and 8130700 kB of total memory made by Intel Corporation, Santa Clara, Calif., USA. The source codes for the Matlab and CUDA program were prepared by the inventor for the experiments in this section. The Matlab functions can be used to evaluate copula in any program.

Figure 32:
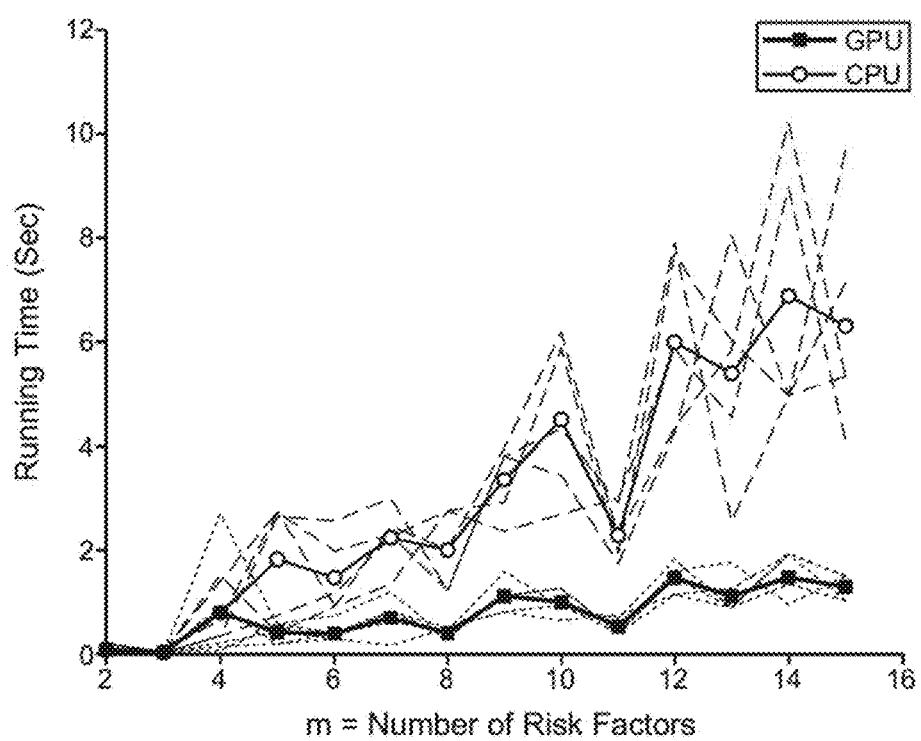
FIG. 32 is an illustration of the calculation time of GPU-C-REDv2 in a Gaussian copula using an NVIDIA K40c GPU card, according to the present invention.
Figure 33A:
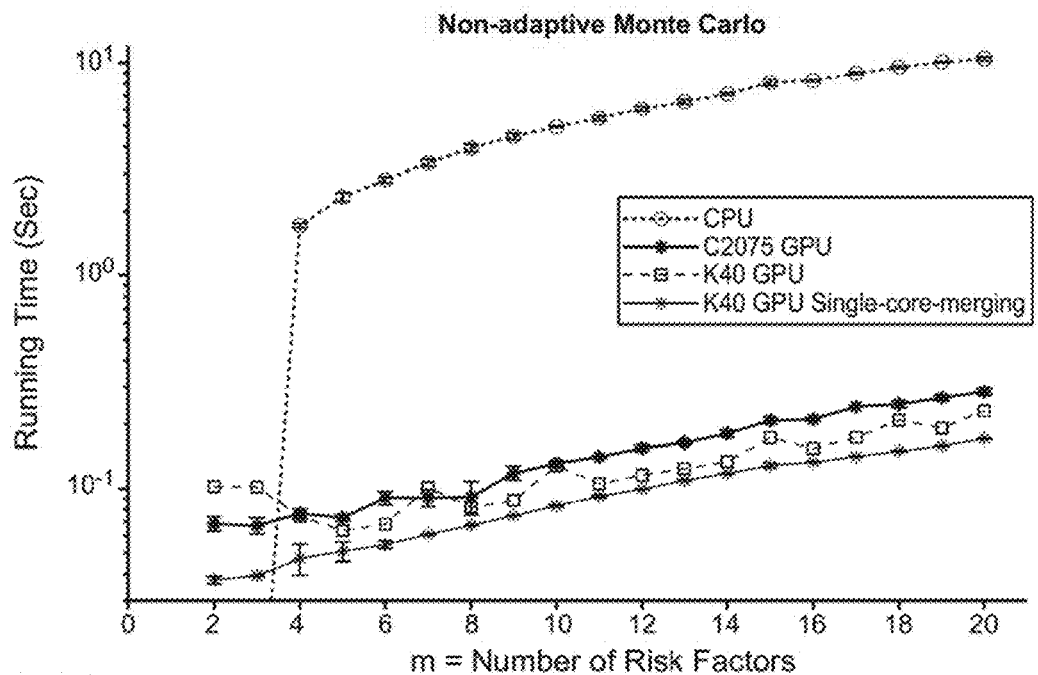
Figure 33B:
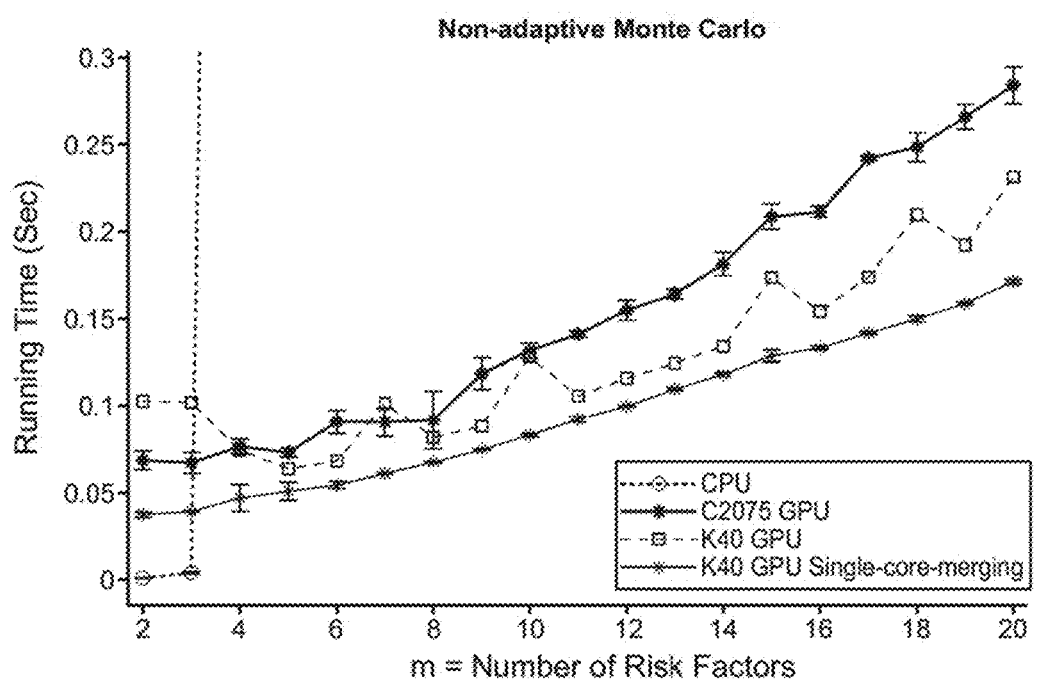
Figure 34A:
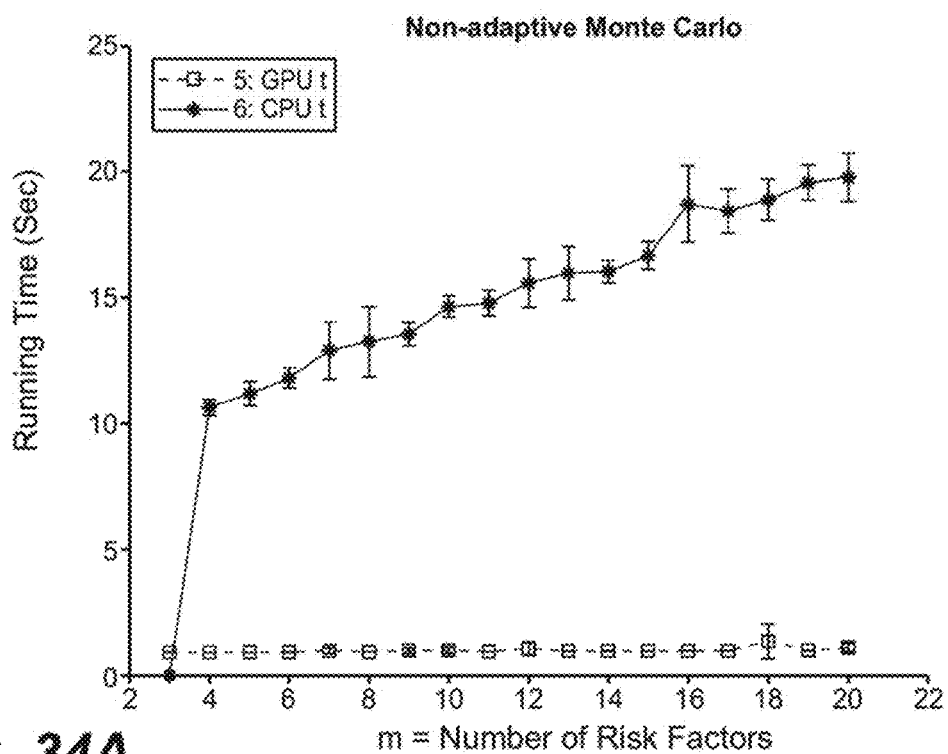
FIGS. 34A and 34B are illustrations of the performance of the parallel GPU implementations, according to the present invention.
Figure 34B:
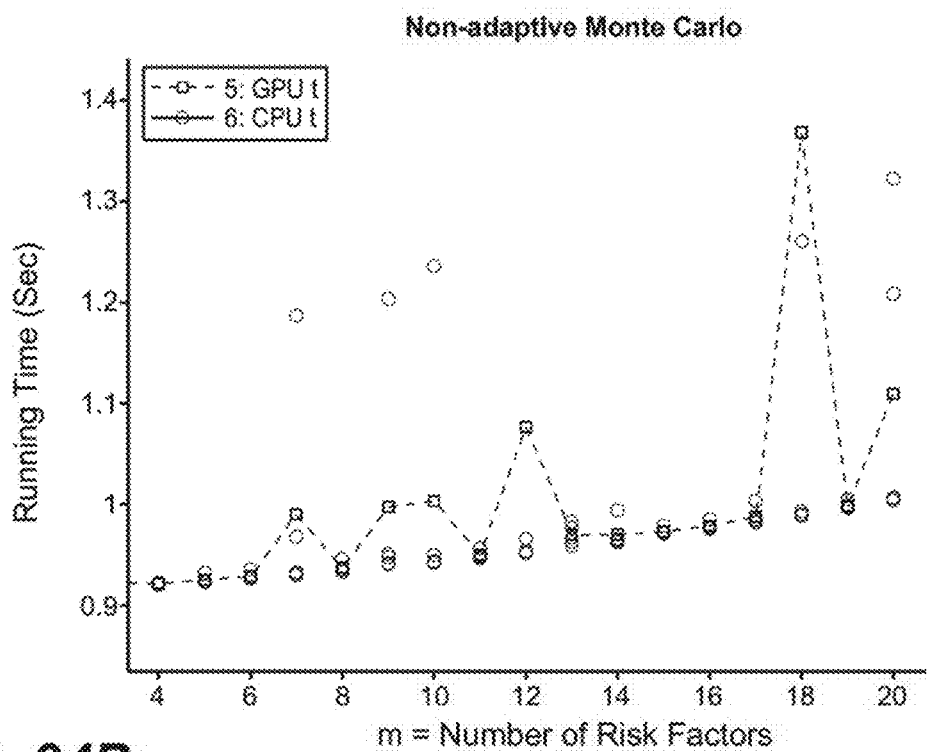

The benchmark results for the GPU implementation were measured on an NVIDIA K40c with NVRM version (UNIX x86 64 Kernel Module 319.60), on Linux sbe02 2.6.32-358.el6.x86 64. It has 2880 GPU CUDA cores, which operate at 875.5 MHz clock frequency (i.e., base clock) and 3.004 GHz memory clock. A GPU computing capabilities in Matlab's parallel computing toolbox provided in Matlab version 8.1.0.604 (R2013a) was used. The baseline GPU implementation first generates an array of w for the Monte Carlo sample points using Matlab's function "gpuArray.rand( )". The first valuation performed is shown in FIG. 32. The second evaluation is shown in FIGS. 33A and 33B. The Final evaluation was performed as shown in FIGS. 34A and 34B. The t-copula performed efficiently on the GPU as well. Even though it was more complex than the Gaussian copula, the efficiency was almost as high.

To achieve these good results, there were different possibilities that were studies carefully. The following section will describe these possibilities in detail.

The calculation times of the parallel and non-parallel implementations in an experiment. The difference in the speed between the calculation of the survival of a t-copula in the GPU and the CPU is shown in FIGS. 34A and 34B. The present implementation was able to significantly speed up the calculations compared to running it in the CPU. The CPU calculations took about 20 seconds for 20 dimensions. The GPU implementations were less than a second. The speed up achieved a 20× improvement using a K40 GPU at higher number of dimensions.

The Possible Implementation Sequences on GPU with CUDA

In this section, three different possible implementation styles are described. To describe them, some basic operations are first defined. Then, the design based on the sequences of these operations is described. Operations are labeled as R, M, C, T, where: (1) the R operation (the RandomGenerate kernel) involves the generation of a random value of each $w_i$ where $w_i$ is a random point then, the operation stores each point in the corresponding memory location; (2) the M operation (ProcessMCSample) kernel is the part of the algorithm that performs the transformations to calculate the $e_i$ and $d_i$ and ultimately to calculate the $z_i$ based on the given $w_i$; (3) the C operation (the Combine kernel) computes the combination (i.e. Average) of the outcomes of the area/volume of all the Monte Carlo points and this operation maybe executed in different sequences; and (4) the T operation transfers the results from the GPU back to the CPU.

If the calculations are performed on a single processor (i.e. serial processing unit), one can do the calculations in any of the following three sequences.

The First Possible Sequence

The random number $w_1$ is generated, then the R operation is performed, and then the M operation ($z_1$ and $e_1$, etc.) is calculated. These calculations have to be computed before proceeding with the next dimension ($z_2$, $e_2$, etc.). The next dimension will follow the same sequence R and M operations. As a result, the sequence of operations will be (RM, RM, RM) for calculating the sample in three dimensions. For the next MC sample, the same operations are performed. The total sequence would be (RM, RM, RM), (RM, RM, RM), . . . , (RM, RM, RM). They are repeated N times.

Note that the operation C needs to be done at the end to combine the outcome of the calculations (i.e. an area in the case of two risk factors) or volume (i.e., in the case of three or more risk factors). The general form of the sequence is $s_1 = ((RM)^m)^N C^N$.

The Second Possible Sequence

The same results can be calculated using the following sequence. First, all the random numbers for each sample point are generated. Then, the transformation operations for all dimensions are performed. The outcomes are stored in an array. Then, the operation C combines the products. The sequence will be as follows: (RRRMMM), (RRRMMM), (RRRMMM), . . . , (RRRMMM), then, (C). The general form of the sequence is $s_2 = (R^m M^m)^N C^N$.

The Third Possible Sequence

First, all the random numbers for all Monte Carlo samples are created. Each sample requires multiple random numbers. In total, the result will be N×m random numbers generated, where N is the number of MC samples and m is the number of dimensions. The general form of this sequence is $s_3 = R^{m \times N} M^{m \times N} C^N$.

In each possible sequence case, the C operation can be done in iterative sequences. The first method described above required storing all the results of the Monte Carlo at each point in an array and then averaging the values of that array. A number of C operations follow a sequence of R and M operations.

The Fourth and Fifth Possible Sequences

In the alternative method, one can combine the result of each Monte Carlo sample into a single global variable that contains the total summation of the Monte Carlo outcomes. This can be done by adding a step after each calculation: S←S+T. Also after finishing with the samples, the resulting total summation needs to be divided by N the number of MC samples to get the average of the MC samples. In this case, each RM pair follows a C operation. The C operation is performed immediately after the M operations for each sample are complete. Combining each of these alternatives with above implementation designs, one will get new implementation designs, which make five possible sequencing patterns. The general forms of the possible patterns of the sequences are as follows: $s_4 = (RMC)^{m \times N}$, $s_5 = (R^m M^m C)^N$.

The calculation times (i.e. running time performance) will be virtually similar if these styles were run on one CPU (i.e. serial processing). However, in parallel processing using GPUs, these styles will perform differently in terms of running time performance.

Here a comparison is made of the pros and cons of these different designs in the case of parallel implementation on GPUs. Since N is larger than m, one wants to parallelize over N. In each pattern, the process is divided into N tasks, and N GPU cores are allocated to do each task. One kernel is defined for each task.

The design chosen was based on the pattern $s_3$. This decision was based on the following reasons. The existing parallel algorithms for generating random numbers are more efficient for generating blocks of random numbers. If methods $s_1$ and $s_2$ are used in a naive way, each GPU core generates a random number simultaneously with other GPU cores. But the pseudo-random number generation algorithms are sequential. The calculations of random number generators are serial, that is, the next value is determined based on the outcome of the previous random number. If one runs the random number generators in parallel without the skip-ahead design, each core would start from the same state. This will cause the random generators to produce similar values. The distribution of the w points will generate repeated points. This will lead to error in calculations because the same random numbers may be generated at multiple GPU cores and the randomness or the sample points are not guaranteed. Therefore, independence of the random numbers in parallel random number generators is required.

Pseudo-random generators were utilized. Genz suggested a randomized Quasi-Monte Carlo method that used a Quasi-Random number generator. Genz did a further step to make the Quasi-Monte Carlo method more random. The benefit of the presently disclosed implementation is that it is more random and can potentially lead to more accurate estimations if computing resources were limited.

Related Work

Parallelization on Local Area Network

Two efforts were made by deDoncker to parallelize Genz non-linear transformation of elliptical distributions. The first work was by deDoncker, Genz and Ciobanu which parallelized the Multivariate Normal Distribution (MVN) function. See E. de Doncker, A. Genz, and M. Ciobanu, "Parallel computation of multivariate normal probabilities," Computing Science and Statistics, vol. 30, p. 89-93, 1999. The second work was by deDoncker, Zanny and Genz. See, E. de Doncker, L. Cucos, R. Zanny, and A. Genz, "Parallel computation of the multivariate t-distribution," in Proceedings of the High Performance Computing Symposium 2001 (HPC 2001), 2001. The former was the first attempt to parallelize Genz method on an MVN. It was run on a set of 12 computers connected by a Local Area Network (LAN) on Ultra-10 Sun Spare workstations. The latter aimed to parallelize Genz method of a Multivariate t Distribution (MVT) function which is a more complex distribution than the MVN as was described earlier. It was run on 32 parallel computers. They were run on their Beowulf cluster of 32 (800 MHz) Athlon processors connected by an Ethernet switch. Both efforts used a similar approach. Both of the papers used the same approach to parallelize Genz integration. Both efforts were using a Quasi Monte Carlo random generator with Korobov and Richtmyer's sequences.

There are similarities and differences between the inventive GPU design and their LAN design. The transformation component is similar between the two. The GPU-CREDv2 and deDoncker's method make each processing unit perform a complete transformation of a Monte Carlo point. There is no further parallelization of a single Monte Carlo point.

The main differences are the following. They designed their parallel processing on a local area network (LAN) using several computers. Each computer is a parallel node. LAN has slower communication than the one on a GPU. Indeed, GPU cores have access to GPU global memory, which enables interaction and communication much faster than a LAN. Also, GPU cores may have faster access to shared memory than nodes on a LAN.

The second difference is about the way the random numbers were generated. They used a Quasi Monte Carlo generator, which is different than the pseudo random number generation that was employed. It relies on a different parallel design. They used Korobov and Richtmyer sequences while the present GPU design was based on the skip-ahead method. The skip-ahead method is explained earlier.

At a high-level description of the LAN parallel design, each processing unit is either the controller or a worker. There is one controller and the rest of the processing units are workers. They applied an asynchronization strategy using message passing communications between the processing units through the controller. The message passing mechanism is used to coordinate the behavior of the workers using the controller. The workers have to wait for a message from the controller before they start.

If one increases the LAN network, the overhead of the message passing communication will be considerable. The number of messages will grow as the number of nodes increase. The limited data transmission rate of LAN is a limiting factor of message passing protocols.

The parallelization of the MVT on 21 parallel processing units took more than 33 seconds to calculate 21 dimensions. This is more than 33 times slower than the present GPU-C-RECv2 performance, which took only about 1 second.

Their MVN experiment on 8 parallel processors took more than 5 seconds to calculate the integral value on only 5 dimensions.

Adaptive Parallel Integration

Bulls and Freeman parallelized an adaptive integration method but not the sub-region adaptive method. See, T. L. Freeman and J. M. Bull, "Shared memory and message passing implementations of parallel algorithms for numerical integration," in Parallel Scientific Computing, First International Workshop, PARA '94, Lyngby, Denmark, Jun. 20-23, 1994, Proceedings, 1994, pp. 219-228. So, it was not focused for elliptical multi-variate distributions. Bull and Freeman provide a general purpose method for more effective parallel calculation of multi-dimensional integrations using sub-regions. But their method is not useful for the present purposes. The reason is that the brute force Monte Carlo samples are independent so the GPUs do not need to communicate in the present case. Also, having sub-regions is not beneficial for the present design. The merit of the present design is that it executes a very large number of calculations in parallel to fully utilize the GPU's processing power. Hence, the present algorithm is not slowed down as there are no complex synchronizations needed. Hence, using a method such as Bull and Freeman's will not speed up the computation of the present invention.

Similar to Bulls and Freeman, the work by Arumugam et al. was not focused for elliptical multi-variate distributions. See, K. Arumugam, A. Godunov, D. Ranjan, B. Terzic, and M. Zubair, "An efficient deterministic parallel algorithm for adaptive multidimensional numerical integration on GPUs," in 42nd International Conference on Parallel Processing, ICPP 2013, Lyon, France, Oct. 1-4, 2013, 2013, pp. 486-491. It parallelized the Adaptive Sub-region method on a GPU, and will not be compared to the disclosed novel method because it is fundamentally different.

Section Summary

The Genz non-linear integration method is comprised of performing many small operations. Some of the operations can be done in different sequences (i.e., styles). On the CPU, the computed results from the different styles will render the same value. However, only certain sequences are suitable to be parallelized. The present novel GPU-C-REDv2 method Is designed to run the C-REDv2 method in parallel on a GPU. It was necessary to avoid certain sequences that may incur high communication overhead among the GPU cores. The non-linear transformation used in the Genz method makes it efficient to compute the integral on multi-dimensional elliptical distribution in minutes compared with weeks as in the exhaustive numerical integration methods. The experiments showed that the efficiency of our GPU-C-REDv2 is higher than when run on a CPU. The time reduction of computing the risk of up to 25 risk factors was one third of a second for a Gaussian copula and about a second for a t-copula. This achievement is much less than the computation on the CPU as was illustrated in the evaluations. It was concluded that a massively parallel architecture on a GPU helps financial institutions to compute risk on real-time. It helps to achieve client's satisfaction by reducing the waiting time even when many risk factors have to be estimated simultaneously.

Risk-Linked Authentication

Risk-linked authentication is conceived as a way of enhancing the strength and agility of vulnerable corporate m-banking systems. It imposes authentication requirements in adaptation to the risk value of a transaction. This risk-linked authentication approach can balance the conflict between increasing security protection levels and reducing costs (in terms of performance and usability) by achieving a high level of security protection. One way to increase the level of protection is to increase authentication assurance level (i.e. level of assurance or LoA). A stronger LoA can be achieved by using a stronger form of authentication method or using a higher authentication parameter. The use of multi-factor authentication solutions may lead to higher aggregated LoA when applied appropriately.

This section proposes a novel solution to compute an overall (i.e. aggregated) authentication assurance level when a user is authenticated through the use of a multi-factor authentication method. The solution consists of two novel methods: (1) a Copula-based Aggregated Level of Assurance (C-ALoA) method that computes an aggregated LoA given multiple component LoA values each from a separate authentication factor; and (2) the Lagrangian Copula-based Aggregated Level of Assurance (LC-ALoA) method to make a risk-linked authentication decision based on the Lagrange Multiplier theory. The LC-ALoA method is intended to give an estimate of a required authentication assurance level for a given level of risk (in relation to identity threats) and the usability cost. Risk-linked authentication decision-making is a current real-world problem. The preset invention demonstrates that the problem is not a trivial one. It argues the effectiveness of the C-ALoA and LC-ALoA methods by evaluating several use-case scenarios.

This section will address three issues in risk linked e-authentication. Firstly, presented is a novel method that estimates the marginal LoA value of a single authentication factor (i.e. an authentication method) and derives an ALoA value when multiple authentication factors are used in an authentication instance. Secondly, presented is how to determine a critical point at which an additional authentication factor should be invoked given a risk level estimated at run-time. Thirdly, presented is that the optimization method should intelligently judge the marginal authentication method type needed for the risk-linked authentication approach. The marginal LoA value should be enforced on the client during the transaction for each authentication method. The optimization should minimize client's usability costs given the targeted ALoA as a constraint.

Importance of Risk-Linked Authentication

The wide range of hidden vulnerabilities in mobile financial systems make attacks more likely to occur and difficult to investigate. These vulnerabilities are exposed when a criminal attempts the imposture of the authentic client, a commonplace fraud known as an identity attack. Corporate mobile banking (Corp-M-Banking) services are particularly vulnerable to cyber-attack due to the lucrative sums involved.

A risk-linked authentication approach may be regarded as a way of increasing the effectiveness of security protection with reduced costs on performance and usability. This approach can be implemented by evaluating risk levels associated to a financial transaction and requesting the transaction requester to authenticate him/herself using one or more authentication methods (i.e., one or more factors of authentication) before the transaction can be granted. In the risk-linked authentication approach, the assurance strength of the authentication method adapts to the current risk value. Despite the difficulties of such adaptive authentication approaches, especially when dealing with complex corporate mobile banking systems, the risk-linked authentication approach has to be feasible in real-world scenarios. Furthermore, there is a trade-off between security and client usability. If checks are not kept to a minimum, corporate clients would be deterred from using Corp-M-Banking applications. Adaptive risk-linked authentication systems are also needed to help network security professionals determine the optimal constituents of the multi-factor authentication and select and apply their assurance strength.

The National Institute of Standards and Technology (NIST) has reported a number of threats associated to authentication technologies and processes. Some of the vulnerabilities mentioned are cryptanalysis, session hijack and eavesdropping. Another work by Cambridge Computer Laboratory described and demonstrated the flaw of the Chip and Pin (i.e. EMV) protocol. It allows criminals to use a genuine card to make a payment without knowing the card's PIN, and to remain undetected even when the merchant has an online connection to the banking network. The fraudster performs a man-in-the-middle attack to cheat the terminal into believing that the PIN was verified correctly. In parallel, the protocol sends corrupted messages to the card mentioning that the PIN was never entered.

A more recent work explained the existence of "preplay" attacks on Chip and Pin. An attacker can predict the Unpredictable Number of the Chip and Pin and compute an authorization code. At a future time, the attacker can produce a fake card to withdraw money from an Automated Teller Machine (ATM).

The banks may use a combination of multi-factor authentication methods to meet the needs of the moment. They can adopt either a proactive defense strategy—to combat malicious behaviors such as evasive fraudulent patterns launched by external or internal cyber fraudsters—or a reactive defense strategy: to reduce the risk inherent within the authentication methods (i.e. technologies) once vulnerabilities have been discovered. In order to counter the risk of corporate m-banking transactions and enforce an effective combination of authentication methods, it is necessary to estimate the strength of the different sets of available authentication methods and their attributes.

The Copula-Based Aggregated Level of Assurance (C-ALoA) Method

Dependencies in Electronic Authentication

There are two types of relationships (or co-relations) among different authentication factors, a positive dependence and a negative dependence. A positive dependence refers to having positive correlations between the factors, where as a negative dependence means having negative correlations between them. Positive dependence occurs when the level of exploitative attacks on the vulnerability of one authentication method leads to an increase in the level of exploitative attacks on other authentication method.

A Corp-m-banking system usually asks for multiple types of secret phrases aiming to strengthen the assurance level in an authentication process. For instance, let us say the Corp-m-banking authentication system enforces two secret memorable phrases as the type of authentication methods. The system asks about the client's mother's maiden name first. If the client answers it correctly, the system will proceed to the second question, e.g., asking about a secret phrase about a favorite place or city of birth. These two authentication methods are positively correlated. An attacker with access to private information may know or be able to guess the answers easily. For example, an attacker who has illegal access to the social network account of the Corp-m-banking account owner can predict these answers based on available clues. An attacker who can find a person's mother's maiden name can also find the person's place of birth, too. Therefore, the frequency of attacks on first method increases the frequency of attacks on the second method increases. Therefore, a positive correlation exists between the two.

Negative dependence occurs when the level of exploitative attacks on the vulnerability of one authentication method decreases as the level of attacks on a different type of authentication method increases. A real life example of negatively dependent authentication methods is as follows. Assume that two authentication methods are enforced by a Corp-m-banking system—one is a secret password and the other is a hard token device. If a technological advancement would make the hard token method more difficult to exploit, fewer attacks could be successful using this method. As a result, attackers might attempt to exploit the password methods more often than hard tokens. In this case, the dependency between the password and the hard token method are negatively dependent.

C-ALoA Method

The C-ALoA method aims to aggregate a set of LoAs (i.e. marginal LoAs). The C-ALoA method is well known. The C-ALoA method is mathematically similar to these two works. Since the Aggregated Level of Assurance ALoA of the multiple authentication methods is associated with jointly (or collectively) exhaustive events, it was decided to use the Union operator as the combining operator. This operator was also recommended in a prior work. The C-ALoA method is different from Yao and Zhang's independence-based ALoA method in that the C-ALoA method uses Copula to model dependencies between the authentication methods.

Proceeding, one defines the following variables: $q_i$, where $i=1, 2, \ldots, N$ are parameter values of the assurance attributes. Each authentication method may have a set of assurance attributes. Each assurance attribute (i.e., marginal assurance attribute) is a random variable A, with a specific probability distribution function.

According to the C-ALoA method, the LoA for each assurance attribute is defined by $P_i(q_i)$ which is determined based on some probability distribution function associated to assurance attribute i.

Each LoA is influenced by its assurance attribute and is quantified by $P_i(x):=P_r(A_i \leq x)$, i.e., the CDF of the marginal assurance attribute $A_i$ at quantile $x=q_i$. The functions $P_i(x)$ are defined based on the known marginal probability distribution functions of each assurance attribute. These marginal distributions are often defined as parametric distributions. They may be modelled based on empirical data and/or expert opinions as explained by the Bayesian Operational Risk method discussed earlier. The C-ALoA is defined as follows:

$$C\text{-}ALoA = P_{Aggr.}^{dep.} \qquad (8.1)$$

$$= Pr\left(\bigcup_{i=1}^{N} A_i \leq q_i\right)$$

$$= \sum_{1 \leq k \leq N} \left( (-1)^{k-1} \sum_{1 \leq j_1 < \ldots < j_k \leq N} Copula_\rho(P_{j_1}(q_{j_1}), P_{j_2}(q_{j_2}), \ldots, P_{j_k}(q_{j_k})) \right)$$

The parameter p is the correlation matrix, in which each element is the pairwise correlation between the assurance attributes. The term $Copula_\rho$ is the copula kernel. It can be an elliptical one such as Gaussian or a multivariate t-copula or a non-elliptical one such as Clayton copula.

Based on the Sklar theorem, these terms yield the joint CDF for each combination of a set of LoAs. The above calculation can be optimized based on survivals, which leads to the following formula, in which Copula$_\rho$ is the "survival copula" and is identical to the Copula$_\rho$:

$$C\text{-ALoA}(p_1,p_2,\ldots,p_N)=P_{Aggr.}^{dep.}((p_1,p_2,\ldots,p_N))$$
$$=1-\widetilde{\text{Copula}}_\rho(1-P_1(q_1),1-P_2(q_2),\ldots,1-P_N(q_N)) \quad (8.2)$$

This is equivalent to the following integration:

$$C\text{-ALoA}=P_{Aggr.}^{dep.}=1-\int_{q_1}^{+\infty}\int_{q_2}^{+\infty}\ldots\int_{q_N}^{+\infty}f^{Copula}(q_1,q_2,\ldots,q_N)dq_1dq_2\ldots dq_N \quad (8.3)$$

Risk-Linked Authentication

Non-Optimized Risk-Linked Authentication

The C-ALoA value needs to cover the risk of the current Corp-m-banking transaction. The required C-ALoA value should be equivalent to the C-REDv2 value. The C-ALoA value can be achieved by different combinations of the C-ALoA parameters values (i.e., the parameters values of marginal LoAs). This vector of possible combinations can be found by trying all the possible combinations (i.e. an exhaustive approach) of the marginal LoAs. Then, the filtering step is required to select a combination with the required C-ALoA. Different combinations of C-ALoA parameters values may render the same C-ALoA value. Only one combination is selected randomly or based on the lowest deviation from the required C-ALoA.

There are several major problems with this type of exhaustive search of the required LoAs. It is inefficient because many combinations may be discarded. It can take a long time to compute especially if a smaller step size if chosen. Furthermore, this approach may not be able to find the required LoAs with reasonable accuracy. Since different combinations of C-ALoA parameters values may render the same C-ALoA value, it is possible that they lead to different costs. Therefore, there is a need for an optimized risk-linked authentication.

Optimized Risk-Linked Authentication

An optimized risk-linked authentication should reduce the inefficiency of the non-optimized approach. There are two requirements: Firstly, it has to be efficient in finding the set of possible combinations with the required C-ALoA. Secondly, it has to select the combination that incurs the lowest cost.

A novel optimization method, the Copula-based Aggregated Level of Assurance (LC-ALoA) method is defined. It calculates the optimum parameters of the required C-ALoA. An optimum LC-ALoA is one with a combination of assurance parameters $q_i$ that minimize the transaction cost while balancing the risk value and the assurance value. As an optimization problem, the constraint is defined as the excess assurance value, that is, the difference between the aggregated LoA value and the aggregated risk value. It is undesirable for risk to exceed assurance, but also for assurance to exceed risk, because of unnecessary usability and monetary costs. Here, the usability cost is borne by the client. The monetary costs are borne by the bank. The next section gives the proposal of the LC-ALoA method.

LC-ALoA Method

The optimal assurance parameters are found using Lagrange multipliers. The LC-ALoA method has two inputs, the cost/objective function and the constraint function. The objective function is the cost function $f$. The constraint function is the required aggregated assurance A. The Lagrange multiplier method needs to determine the best choice of A out of a set of possible choices. The cost function is the transaction cost and is dependent on the types of authentication methods requested from the clients. The cost function is dependent on the parameters of the authentication methods. For simplicity, the cost functions may be summed up. This allows to the LC-ALoA method to deal with one aggregated cost function.

The LC-ALoA method is integrated with the C-ALoA method and the cost function. It is designed to consider dependencies to find the optimum assurance attributes parameters values for a risk-linked authentication decision. It is a nonlinear constrained optimization problem which can be defined and solved using Lagrange multipliers by the following Equation.

$$q^{-optimal} = \underset{\vec{q}}{\arg\min} f(\vec{q}) \quad (8.4)$$

$$\text{s.t. } 1-\text{Copula}\,(1-P_1(q_1), 1-P_2(q_2), \ldots, 1-P_N(q_N)) = R$$

where $f(\ )$ is the cost function and $q_i$ (the coordinates of q) denotes the quantiles of assurance attributes $(q_1, q_2, \ldots, q_N)$.

Next, the objective function and the cost function and their parameters are described in detail.

Modelling the Attacks Using Poisson Processes

The transaction session is modelled using two point processes for each authentication type i. In the first process, the events are authentications asked by the bank. This process is modelled by a single parameter, expiration times $T_i$, the time between the required authentications methods in one user's session. In other words, this parameter is the duration that each authentication instance lasts.

The second point process is the sequence of attack events that is modelled as a Poisson process. Here, one only models the successful attacks. For simplicity, a constant rate of attacks is assumed. For the point process, the attack events times are irregular. This is as a consequence of being a Poisson process. The attack events process is initiated by the fraudsters. The authentication request events are initiated by the bank. The parameters of the attack events process is described by a rate parameter $\alpha_i$ (i.e., the failure rate of authentication). It is the rate parameter of the Poisson process. In the present case, this rate corresponds to the rate of fraudulent attacks associated with the longer $T_i$.

Each authentication event resets the Poisson process of the attacks. This means that if the authentication events are more frequent, the attacks are less likely to be successful. In other words, the more frequent the authentication requests from the banking system, the better the assurance. The probability of a successful attack can be described as the CDF of an exponential distribution.

$$Pr(\text{At least one attack during } T)=1-\exp(-\alpha_i \times T) \quad (8.5)$$

T is the length of the interval between the previous authentications until the authentication expires. The quantile of this exponential distribution is the duration of each authentication. The probability at a certain quantile, as discussed earlier describes the probability of an attack happening before the next authentication. If the authentication occurs before the expected attack, the Poisson process of attacks is reset. This way it prevents the attacker from proceeding with the attack. The attacker has to start the fraudulent attempt all over again.

Using more frequent authentications, the likelihood of successful attacks would decrease. According to the Equation 8.5, a smaller T will result in a lower probability of a successful attack. However, decreasing T lowers the usability of the banking system for the client. To find an optimum trade-off between assurance and usability, the cost function needs to be considered. The optimal point is where the probability of attacks is just small enough, and the cost is minimum. One mathematically defines this point by optimizing a cost function under the constraint to achieve risk-linked authentication.

Assurance Distributions and their Quantiles

The assurance quantile $q_i$, the frequency of authentication requested by the bank for authentication type i, is defined as $q_i=1/T_i$. This relationship is based on the inverse relationship between risk and trust as defined by Griffths and Luck. See, N. Griffths and M. Luck, "Cooperative plan selection through trust," in Multi-Agent System Engineering, ser. Lecture Notes in Computer Science, F. J. Garijo and M. Boman, Eds. Springer Berlin Heidelberg, 1999, vol. 1647, pp. 162-174. The second version of the Common Vulnerability Scoring System (CVSS) calculator recognizes that the values of the unexploited vulnerabilities of security services are the complements of their impacts when exploited. According to this definition, the Level of Assurance LoA is defined as the probability of an authentication preventing an attack from occurring. $LoA(q)=1-Risk(T)$. Here, T is the risk factor and q is the authentication attribute (factor). Based on Equation 8.5, the probability of authentication requested before the attack event is:

$$LoA_i(q) = Pr \text{ (Preventing the attack)} \quad (8.6)$$
$$= Pr \text{ (Authenticated before attack)}$$
$$= 1 - Pr \text{ (At least one attack during } T\text{)}$$
$$= 1 - (1 - \exp(-\alpha_i \times T))$$
$$= \exp(-\alpha_i \times 1/q) \quad \text{for } q \geq 0$$

The random variable T is an expiration duration, a vulnerability factor of the authentication method. The random variable Q is an assurance attribute. Note that Equation 8.6 describes an exponential distribution with respect to an expiration durations parameter T. The probability distribution function based on the quantile q is not an exponential distribution. Although the function is different from the standard form of the exponential distribution, the CDF is the same. The reason is the CDF of the exponential distribution is inverted and written in terms of q. The change the variables is applied using Genz non-linear transformation method on the quantile of a probability distribution. For this reason, the PDF changes, but the CDF remains the same. The assurance quantile q was chosen instead of T because T is not a suitable choice for an assurance parameter. The reason is that as T increases, the LoA decreases. In reality, when the parameter value of an assurance attribute increases, the LoA should increase. So one makes the transformation to invert the variable T to its inverse, q.

The optimum decision about authentication is defined in terms of the required rate of authentication requests asked by the mobile financial system. This means the decision can be defined in terms of assurance quantiles $q=(q_1, q_2, \ldots, q_N)$. Alternatively, the decision space can be defined in terms of the expiration durations $T=(T_1, T_2, \ldots, T_N)=(1/q_1, 1/q_2, \ldots, 1/q_N)$. The optimal decision is according to the following:

$$\vec{q} = \arg\min f(\vec{q})$$
$$\text{s.t. } LoA(\vec{q}) = R_0 \quad (8.7)$$

The LoA(Q) is the aggregated assurance, and R is the given level of risk. The aggregated assurance can be defined using a copula similar to a C-REDv2 method that combines marginal risk factors $P_i=LoA_i(T)$.

The Optimization Constraint Function

The constraint was defined based on the C-ALoA method and its required value:

$$\text{AssuranceConstraint}(\vec{q}) = A(\vec{q}) = \log(C - ALoA(\vec{q})) - \log(R) \quad (8.8)$$

where $C\text{-}ALoA(q)=1-\text{Copula }(1-P_1(q_1), 1-P_2(q_2), \ldots, 1-P_N(q_N))$, and $q=(q_1, q_2, \ldots, q_N)$. The log function was used to improve the convergence of the optimization algorithm.

The Cost Function

Assume it effectively takes w seconds for the user to perform an authentication. For example, consider authentication using password on a banking system. Assume it takes $w_1=20$ seconds to enter a password, on average. For various reasons, the average time it takes to enter a password on a banking system is longer than the time it takes to simply enter a password on keyboard. A password may be forgotten, there may be failed attempts for various reasons, password resets, etc. Also there is a mental effort for remembering passwords. One can add a penalty value for this mental effort to discourage the system from selecting the authentication methods that require more mental effort but take less actual time. An authentication that takes longer or takes more mental effort is considered to have a higher usability cost for the user. One models the overall effort as one number for an effective cost. The higher $w_i$ is, the more difficult to authenticate, i.e., a higher usability cost for that authentication type. One does not want the user to be forced to use too many types of authentication because it takes a long time and effort to do so. Also, one does not want to ask the user too often to enter their password.

One defines the usability cost for each authentication type i as $w_i/T_i$. The reason $w_i$ is divided by $T_i$ is explained here. The total usability cost equals the number of authentications multiplied by the cost of each authentication. The number of authentications equals the length of a mobile-banking session (a session of length l seconds) divided by the length of expiration of that authentication ($T_i$), that is, $l/T_i$. Hence, the cost of authentication of length l is $l \times w_i/T_i$. Hence, the usability cost per unit of time during users banking sessions is $l \times w_i/T_i/l = w_i/T_i$. The total usability cost for multiple transaction types is the sum of times the user spends on various authentication types. Hence, the cost function of the present invention is defined according to the following Equation.

$$\text{AuthenticationCost}(\vec{q}) = f(\vec{T}) \quad (8.9)$$
$$= \sum_{i=1}^{N} w_i/T_i$$

Lagrange Multipliers

The Lagrange multipliers provide a way to solve two problems simultaneously using one single optimality criterion. They provide a single combined criterion that combines both the criteria of minimizing a cost function as well are satisfying a constraint function simultaneously.

The Lagrange multipliers method defines the optimum point in the space of possible parameters of the LoAs, according to the following formula:

$$A(\vec{q}) = 0 \quad (8.10)$$

$$\frac{\partial f(\vec{q})}{\partial q_1} - \lambda \frac{\partial A(\vec{q})}{\partial q_1} = 0$$

$$\frac{\partial f(\vec{q})}{\partial q_2} - \lambda \frac{\partial A(\vec{q})}{\partial q_2} = 0$$

$$\vdots$$

$$\frac{\partial f(\vec{q})}{\partial q_N} - \lambda \frac{\partial A(\vec{q})}{\partial q_N} = 0.$$

Where $f(\ )$ is the cost function, $A(\ )$ is the constraint function, $q=(q_1, q_2, \ldots, q_N)$ is all of the coordinates at N dimensions, and $\partial g/\partial_{xi}$ is the partial derivative of function g with respect to variable x.

In the LC-ALoA method, the above equations are solved and the optimum values for $\lambda$ and $q_1, q_2, \ldots, q_N$ are calculated. These calculations are performed using the Interior-Point Algorithm. The built-in implementation of the Interior Point algorithm in Matlab's Optimization toolbox was employed. The next section describes the Interior Point algorithm in more detail.

The Lagrange Multipliers can be used within various optimization methods. Some of the optimization methods utilize and benefit from gradients for faster conversion, but it is not a necessary condition. For example, Genetic Algorithms have been successfully used with Lagrange Multipliers although they do not use, model or build gradients during the search for the minimum point. In such cases, the combined cost function is defined as:

$$\operatorname*{argmin}_{\vec{q}, \lambda} f(\vec{q}) + \lambda A(\vec{q}) + p(A(\vec{q})) \quad (8.11)$$

where $p(\ )$ is called the penalty function (for example, see Equation 8.18). The penalty function may or may not be used (p(a)=0). Here, one Lagrange Multiplier $\lambda \in R$ is used, but in case of more than one constraint functions, multiple Lagrange Multipliers may be used in the equation. The gradient-based form of the Lagrange multipliers (Equation 8.10) can be derived from this generalized form.

Using gradient (i.e., first derivative of the objective function) makes the convergence of the optimization algorithms faster, because an estimate of the gradient helps to find the best direction to search for the optimal point. Note that gradients are defined for both the cost and constraint. These algorithms are often called non-linear [constrained] optimization algorithms. Some algorithms also use the second derivative of the objective function, that is, the Hessian matrix. These algorithms are often more efficient than the ones that only use the gradient. The Interior Point Algorithm is one of the methods that use both gradient and Hessian. It can use the evaluations at the previous iterations to estimate the gradient and Hessian matrix at the next step, and uses this to find a shortcut to the optimal point. The algorithms based on the gradient are often only able to search for local minimum points. However, the position of the global minimum may be located at another local minimum (a global minimum is also a local minimum). Finding the global minimum often requires another step which often requires some form of stochasticity, as will be discussed later in greater detail.

The Interior Point Algorithm

The "interior point" algorithm was used, which is a type of quadratic programming method. It helps solving an optimization problem defined in terms of Lagrange multipliers. The method is designed to find the best estimation of the optimum point based on the distribution of data and the required constraint C-ALoA value.

At first, it makes the estimation on the multi-dimensional space of the copula (i.e., the copula that joins the marginal LoAs) given a constraint function. It does this step before any evaluation of the cost function. After finding an estimated optimal point, the algorithm evaluates the cost at that point. This point may not be the optimum point, but one can add it to the existing data so that next time when more data is acquired, a better estimation of the optimum point will be possible. It is an iterative method that generates a sequence of approximated solutions to a problem. In each iteration, the approximation is improved. The iterative method updates the parameters at each step.

In the case of quadratic programming, the data about the previous points is summarized into a matrix called Hessian matrix. Also, at each point, the gradient of the point is stored in a vector using the iterative formula. The gradient and the Hessian matrix describe the local properties of the surface at each point. The gradient describes the slope and the Hessian describes the curvature of the cost function. The Hessian and the gradient at a given point describe the predicted surface of the landscape using a Taylor expansion. This prediction is used to predict the approximated position of the optimum point in a region known as the basin of attraction. The position of the optimum point is where the Lagrange multipliers condition holds. Each time the Hessian and the gradient vectors are updated based on the last approximation. In each iteration, at the new point, the cost is evaluated. In this class of methods, two equations are needed in each iteration: firstly, how the Hessian matrix and the gradient vector are updated using the information about the new point is needed. Secondly, a formula for updating the next best approximation of the optimum point is also needed.

In the second step of the LC-ALoA, Lagrange multipliers are required to combine the cost and constraint functions. The cost function has a Hessian Matrix and the multi-dimensional constraint also has a Hessian matrix. The overall Hessian is a combination of these matrices formed using the Lagrange multipliers. Similarly, there are two gradients. A combination is performed for the gradients, as well. The combined gradient and Hessian are used together to estimate the best approximate optimum point, which will be the next step of the iterative algorithm.

The required parameters of the constraint are taken into account by combining them with the cost function. The combined cost function is $f(q)+\lambda A(q)$, where $f$ is the cost function, $A(q)$ is the constraint, and $\lambda$ is the Lagrange multiplier. The Lagrange multiplier is dealt with as new dimension in the parameter space. The value of $\lambda$, which is used to combine the costs and constraints, also needs to be updated. The updating formula needs to be defined for the pair $(x, \lambda)$. For example, if x has three dimensions and one constraint is used, then the updating formula updates 4 dimensions. The new value of $\lambda$ is updated based on an updating formula similar to the equation which estimates the new location point in the decision space.

In an Interior Point algorithm, a penalty function is also used. In this case, the combined cost function is $f(q)+\lambda A(q)+p(A(q))$, where the penalty term is defined based on the function p. The function p is called the barrier function. The function p is a non-linear monotonically increasing function such as $x^2$ or $\log(x)$.

Stochastic Process for Global Optimization

Local optimization algorithms may not necessarily be able to find the global minima. Therefore, a stochastic process for the Lagrange method was included in LC-ALoA method to avoid this problem. In this process, one runs the optimization multiple times, each time from a random starting point.

The solution to the Lagrange method may not necessarily be unique. It means that there may be multiple local minima, one associated with each basin of attraction. If the costs of the multiple solutions are different, one wants the solution with least cost. If the solutions with least cost are not unique, one wants all of the solutions. For this reason, the optimization method was repeated using random starting points large enough to examine all basins of attraction and obtain all local minima. The resulting algorithm was a type of global optimization methods.

When random points were utilized based on uniform distribution over $q_i$, the search algorithm could not find some solutions of the Lagrange multipliers equations. Consequently, some C-ALoA combinations were missed by the LC-ALoA method. When the random choice of initial coordinates was used, according to a uniform distribution over $1/q_i$, where $1/q_i^0$~Uniform [0,1], the algorithm could find all solutions using a relatively lower number of repeats (less than 20). The reason $1/q_i$ was used is because both the cost function and the marginal distributions were defined in terms of $1/q_i$. The optimization with 25 random starting points was repeated. The next section explored the possibility of using Genetic Algorithm instead of the Stochastic Process.

Description of the LC-ALoA Design

Figure 35:
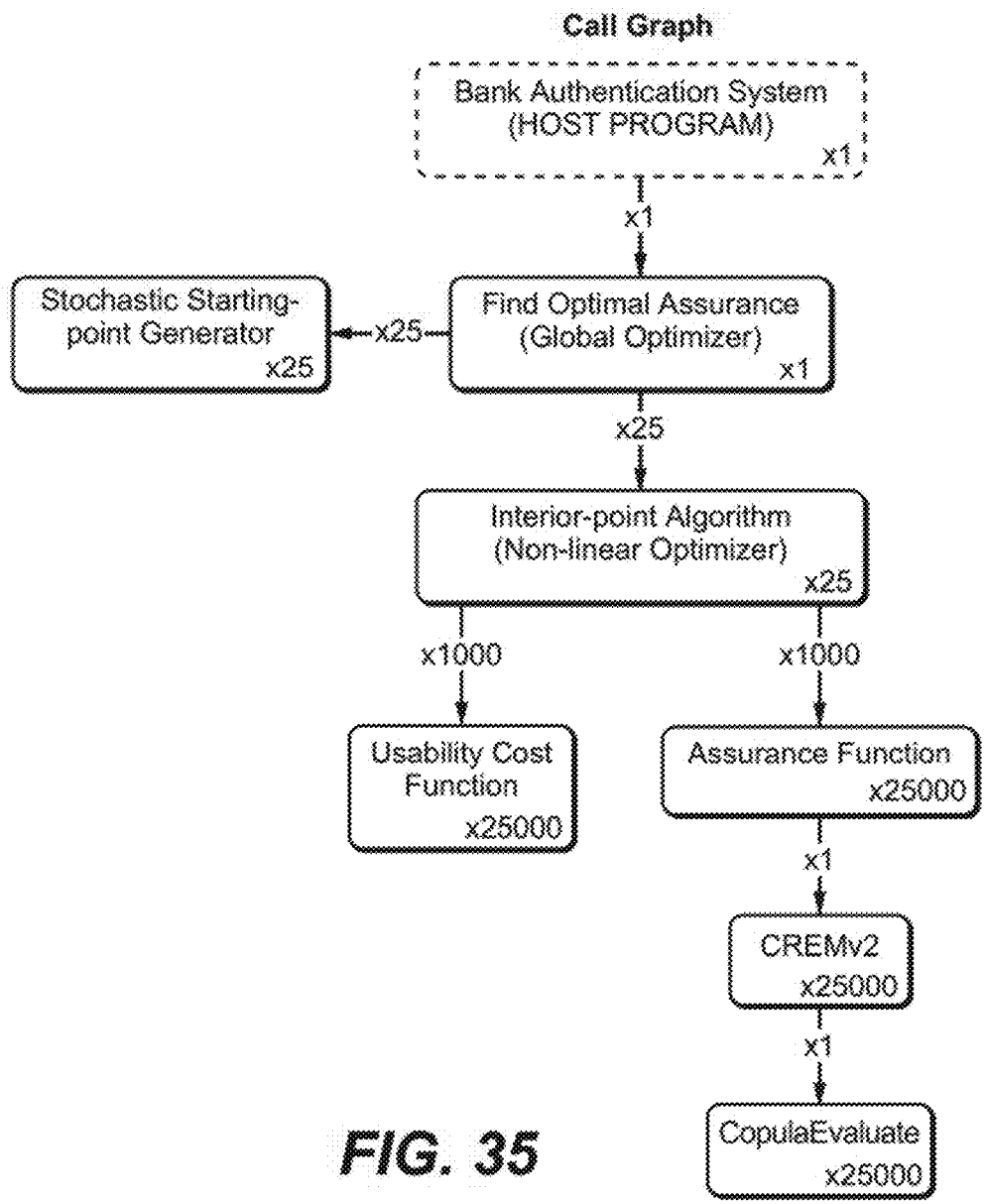
FIG. 35 is a call graph of the LC-ALoA implementation, according to the present invention.

The overall design is shown in FIG. 35, which shows the interaction of the different components through function calls. The call graph specifies the functions that are called within each function. The arrows indicate the direction of the function calls. The number on each arrow shows the "call multiplicity number", that is how many times the function call is performed each time the caller function is executed. Hence, the number of executions of the called number equals the number of executions of the caller functions times the "call multiplicity number". In FIG. 35, the total number of executions of each function is shown on a lower corner of each box. The component labelled as the InteriorPointAlgorithm function finds the optimal assurance configuration with two conditions: the assurance configuration has the minimal cost and the assurance is at least equal to the parameter desiredAssurance. The details of the authentication model and the cost model are specified by the two functions Usability Function and AssuranceFunction. Note that the InteriorPointAlgorithm function receives the two functions UsabilityFunction and AssuranceFunction as inputs of functional type (as in functional programming). The FindOptimalAssurance function calls the InteriorPointAlgorithm function multiple times (typically 25 times) and collects the best results. The InteriorPointAlgorithm function is a known local optimization algorithm based on Lagrange multipliers. The AssuranceFunction function calls the C-REM v2 which, in turn, calls the CopulaEvaluate function. The InteriorPointAlgorithm function uses the previous calls to the two functions to make the next optimal iteration and proceed with the next calls. Eventually, based on the function calls, it comes up with a local optimum point and returns it back to the FindOptimalAssurance which finds the global optimum assurance configuration based on the best outcomes of the local optimizations. Then, it returns the global optima configurations. Note that there may be more than one global optimum point which lead to the same costs. The present implementation returns all possible answers that are equivalent in terms of cost but are different combination of assurances.

The overall formulation is described below (Also see FIG. 35):

$$\text{optimal } \vec{q} = \underset{\vec{q}}{\mathrm{argmin}} f(\vec{q}) \quad (8.12)$$

$$\text{s.t. } A(\vec{q}) = 0$$

$$f(\vec{q}) = \sum_{i=1}^{N} w_i \times q_i, T_i = 1/q_i \quad (8.13)$$

$$A(\vec{q}) = \log(C\text{-}ALoA(\vec{q})) - \log(R) \quad (8.14)$$

$$C\text{-}ALoA(\vec{q}) = 1 - \widehat{Copula}_\rho \quad (8.15)$$

$$(1 - P_1(q_1), 1 - P_2(q_2), \ldots, 1 - P_N(q_N))$$

$$P_i(q) = \exp(-\alpha_i \times 1/q) \times (q \geq 0) \quad (8.16)$$

The inputs given for this will be $\rho$ (the assurance correlation matrix), R (the desired assurance), $w_i$ (the usability cost of each authentication, e.g., how long it takes to enter a password), and $\alpha_i$ (the time constant or the rate of attacks). The outcome of this computation is the optimal vector q. The variable $q_i$ is $1/T_i$, where $T_i$ is the expiry time for authentication i. This is calculated using a series of application of the Interior Point Algorithm on starting points $q_i^0 = 1/u_i$, where $u_i$~Uniform [0, 1].

LC-ALoA Using Genetic Algorithm

Description of the Genetic Algorithm

The simple form of the Genetic Algorithm is defined. Then, the Genetic Algorithm used to solve the constrained optimization problems is described. This information is based on Holland's thorough descriptions of Genetic Algorithm. See, J. H. Holland, "Adaptation in Natural and Artificial Systems". Ann Arbor, Mich.: University of Michigan Press, 1975.

Starting, the Genetic Algorithm is a global optimization method. The Genetic Algorithm generates a new population of points based on the previous population of points. It uses two operators to do this task. The two operators are the mutation operator and the cross-over operator. This algorithm is inspired by the mechanisms of the genes in biology. Here, the Genetic Algorithm is explained in terms of the mutation and cross-over operators.

The mutation operator acts on an individual chromosome. In the mutation operation, one bit of the chromosome is randomly chosen and is negated. The cross-over operation is applied to a pair of chromosomes to produce another pair of chromosomes. In the cross-over operation, two chromosomes are randomly picked from the population. After that, one element is chosen called a cross-over point. All the elements on the right side of the cross-over point are swapped between the two chromosomes.

Each chromosome represents a point in the N dimensional space $x_1, x_2, \ldots, x_N$. Each chromosome is an array of bits. The two operators change and combine the chromosomes in a population of chromosomes. In each iteration of the algorithm, a new population of chromosomes is generated based on the population from the previous iteration using the genetic operators. The consecutive populations are called generations.

The selection part of the algorithm selects which chromosomes in a population may survive. These survivors produce the next generation. The selection, or in other words, the probability of survival, is based on the fitness of each chromosome. In Genetic Algorithm optimization problems, the fitness is defined based on the evaluation of the cost function for each chromosome. As a result, the chromosomes that represent the points with a lower cost are more likely to survive in the next generation.

LC-ALoA Using Genetic Algorithm

The Genetic Algorithm was used to replace the stochastic process. In the present optimization problem, each chromosome is an array of bits that encodes a vector of N quantiles. For example, the bits 0-31 represent an LoA quantile $x_1$ formatted as single precision floating point numbers. Similarly, the bits 32-63 represent $x_2$ and the bits 64-95 represent $x_3$. For instance, if bit number 4 is mutated, only the $x_1$ is affected. The magnitude of the influence of the mutation on the quantile value depends on the exact position on the bits that is chosen during a mutation operation. If the bit position 4 is mutated, it has a weak effect on the value of $x_1$. But if the bit 30 is mutated, the value of $x_1$ may change to a very large number. If a cross-over is applied at position 40, all the contents of the quantile $x_1$ and 8 bits of the quantile $x_2$ will be swapped between the two chromosomes. The operators change the points to vary across almost all the variations possible in the optimization. This commonly used Genetic Algorithm does not take the constraints into account. It only uses the cost function as fitness.

There is a drawback of Genetic Algorithm. It only takes in account the combined cost function (including the Lagrange and penalty terms). But, it neither uses the gradient vector nor the Hessian matrix. It does not make a prediction about the next likely point. The next point is purely generated by the genetic operators.

The Augmented Lagrangian Genetic Algorithm ALGA method is a method that takes a constraint into account. This method uses the Lagrange multipliers and the penalty function to define a new combined (i.e., hybrid) cost function. The aim is to find the minimum of this newly-derived complex cost function. In the present optimization problem, the fitness is evaluated based on the combined cost function defined by Equation 8.18. The combined cost function takes into account the original (i.e., simple) cost function, the Lagrange multipliers, the constraint function, and the penalty factor. The combined cost function is defined as the following Equation:

$$\operatorname*{argmin}_{\vec{x}} f(\vec{x}) \quad (8.17)$$
$$\text{s.t. } c_1(\vec{x}) = 0.$$

The $c_i(x)$ represents the non-linear constraint (i=1). The combined cost function is defined by the following Equation:

$$\Theta(\vec{x}, \lambda, \rho) = f(x) + \lambda_1 \times c_1(x) + \rho \times \frac{1}{2} c_1(x)^2 \quad (8.18)$$

where the variable $\lambda_1$ is a non-negative variable known as Lagrange multiplier. $\rho$ is the positive penalty parameter. The equation combines the constraints and the objective function.

The steps of the algorithm are as follows. First, an initial value for the penalty parameters is chosen. Then the Genetic Algorithm optimization is performed using a set of values of $\lambda$. If the convergence happened and the constraint was met, the results are returned as the outcome of the optimization. Otherwise, the penalty factor ($\rho$) is increased by a constant factor, and the procedure is repeated.

A normal Genetic Algorithm is used to minimize this new complex cost function over the search parameters. The parameters that need to be found in this optimization are not only x but also $\lambda$. The answer that it returns is guaranteed to be a point where the constraint is met while the original cost function has its minimum value. This is mathematically guaranteed by proofs related to the Lagrange multipliers.

LC-ALoA Evaluation

Independence Scenario

Three types of authentication were used in the evaluations, N=3: HTTP cookies (i=1), SAML (i=2), and Kerberos (i=3). The optimal authentication parameters were first calculated in the case where the authentication assurance attributes were independent. The optimization method described above was utilized to obtain the authentication attributes that provided a level of assurance that compensated a given risk, while minimizing the transaction cost. The aggregated assurance should match the risk in each case. In each case, the algorithm was run to obtain the optimal attributes to yield the C-ALoA that balanced the given risk in each case. The attributes in this case are the expiration renewal rates for the three authentication methods described.

In some cases, some attributes were zero ($q_i=0$) i.e., the optimal rate of expiration/renewal was zero, which means the expiration time can be infinite. For this authentication type, one does not need to ask for authentication after first use (i.e., registering with the bank). This means that specific authentication is not required. In such cases, less than three authentication types are required and this is preferable, as it reduces the cost. This means that the present method could help avoid unnecessary authentications and, hence, would lead to lower costs for the customer or the bank.

Figure 36A:
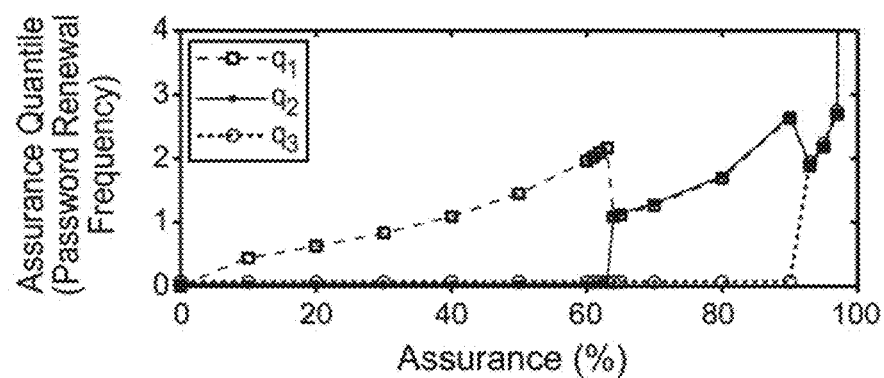
FIGS. 36A and 36B are graphical illustrations of optimal authentication attributes for a range of risk values, according to the present invention.
Figure 36B:
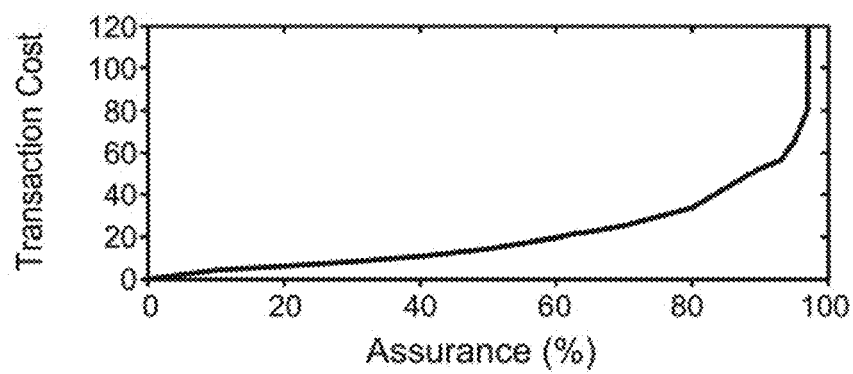

Optimization for different risk values was then run. The risk level was varied across the full range of risk values (R=0%-100%) to simulate a range of possible risk situations. At each risk level in this range, the three optimal marginal LoA quantiles values were calculated. As shown in FIGS. 36A and 36B, only one authentication was needed when the risk was below R=63%.

The simulations showed that when assurance is ≤63%, only one of the parameters was non-zero and two others were zeros. In this case, only one authentication method is necessary. In situations where the risk was larger than 63%, more than one authentication method was necessary. No other combination of authentication attributes could provide enough assurance to compensate this risk with a reasonable transaction cost. So the risk value larger than 63% is the critical point in which the optimal behavior switches from a single authentication to a double authentication. This means asking the customer to pass two authentication types.

In the region between 0% and 63%, the increase in risk increased the assurance quantiles. Larger levels of assurance were necessary for authentication. The optimal quantiles were monotonically increasing with respect to the increase in the risk.

The results showed that a second critical point was at 92%, at which the optimal authentication switched to a triple authentication policy. It means that when the risk was larger than 92%, the customer was asked to pass all the three types of authentication. Since in this evaluation, the parameters of the model (the cost $w_i$ and failure rates $\alpha_i$) were symmetric (if the order is changed) among the three authentications, there were multiple optimal answers with equal costs. Multiple solutions were calculated in each case, however for clarity only one of them is shown at each point of the graph.

Positive Dependence Scenario

Next, the case was examined where the levels of assurance are positively correlated. In such cases, the aggregated assurance is expected to be less than the aggregated assurance in the independent case. The results, as shown in FIGS. 37A-37D, confirmed this prediction. The assurance values were larger compared to the independent case. This means that greater levels of assurance were necessary to obtain the same total assurance when compared to the independent case.

When the correlation was increased, the critical point moved to the right (see FIG. 37B), (i.e., the first critical point occurred at larger risk values). Despite the use of higher LoAs, a single authentication was preferred over multi-factor authentication. The use of higher LoAs for multi-factor authentication may lead to unnecessary costs.

Figure 37A:
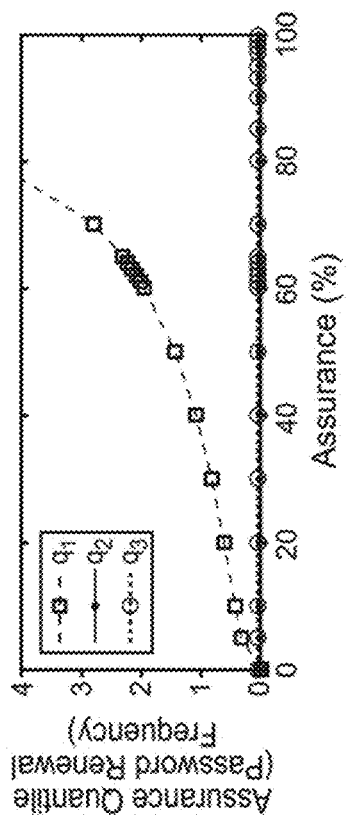
FIGS. 37A-37D are graphical illustrations of optimal authentication attributes for positively correlated assurances with strong dependencies, according to the present invention.
Figure 37B:
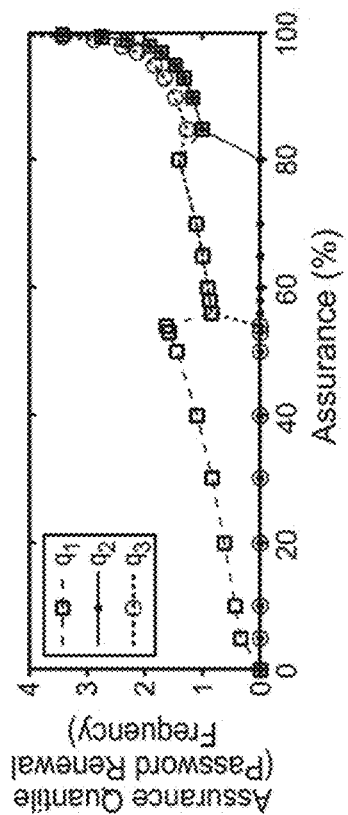

In particular, FIG. 37A illustrates the aggregated assurance for three assurance attributes/methods when used at various individual levels of assurance and where the assurance attributes are strongly positively dependent of each other. These experiments prove the prediction of the present invention.

To prove this point, the following example is given. If one takes a closer look at FIG. 37B, one can see that when q1 and q3 are both individually used at level near 1.5 (i.e. their sum would equal a total level of assurance at level 2.8) this equates to an aggregated assurance of 0.80 out of 1 (i.e. reasonably high assurance) given their independent relationship/interaction.

Now, when one looks FIG. 37A, when q1 is at an individual level of assurance near 2.8, the assurance is estimated at near 0.7 out of 1 when using a single authentication assurance attribute/method in the strongly positively dependent attributes/methods, while keeping in mind that the LC-ALoA has recommended a single authentication attribute/method to minimize the costs. However, this single attribute/method was recommended to be applied at level 2.8. It was clear in both scenarios, the level of assurance was equal to 2.8 (the summation operator when two-factor authentication was used so a total level of assurance can be obtained to enable one to think of it as a single method/attribute and to allow one to compare an apple to an apple). However, in the case of independence, the aggregated/estimated assurance was higher (i.e. at 0.8) than the case of strongly positively dependent (i.e. at near 0.70).

Figure 37C:
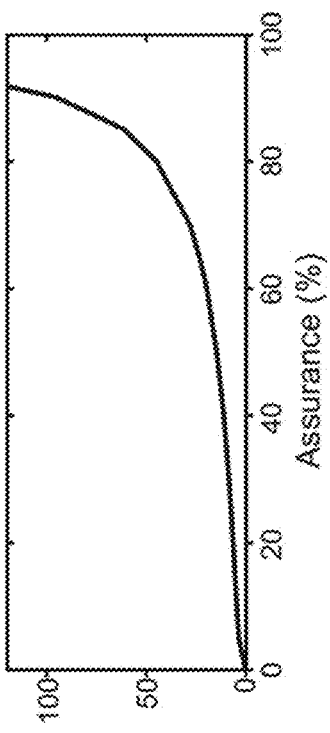
Figure 37D:
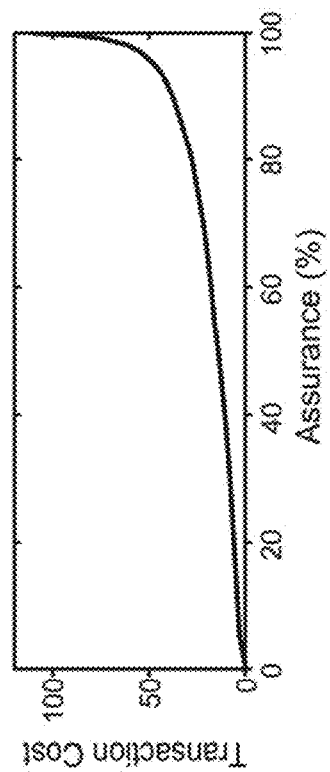

As another example, when the estimated assurance for the strongly positively dependent attributes/methods is at near 0.77 out of 1 in FIG. 37A, the LC-ALoA recommends a single authentication attribute/method (i.e. q1) and the required individual level of assurance to be used for q1 is larger than level 4 (i.e. even level 4 was not sufficient to grant an estimated/aggregated assurance of 0.77 out of 1.) In comparison, in the dependence scenario, to obtain an aggregated assurance of near 0.9 (i.e. very high aggregated assurance), q1, q2, and q3 were required to be used at individual levels of assurance at near 1.1, 1.1, and 1.4, where the summation of the three individual levels gives a total level of near 3.6. This means that the independence case resulted in an aggregated assurance of 0.9 with a total level of assurance of 3.6 while in the case of strongly dependent dependence, obtaining only 0.77 required an individual level of assurance of larger than level 4. This proves the prediction of the present invention that when the attributes/methods are independent they will give more aggregated assurance than when they are strongly dependent for a given certain set of individual levels of assurance. It is also clear that to achieve an aggregated/estimated assurance of 0.80 out of 1, the independence case incurs a cost of near 25 for a multi-factor authentication of two attributes/methods, while the strongly dependent case incurred a cost of near 45 for a single authentication attribute/method, as illustrated in FIG. 37D and FIG. 37C, respectively. This means that a set of independent attributes/method of assurance is much stronger and cost-effective to secure an electronic financial transaction than when they are strongly dependent of each other. In other words, higher diversification is gained which strengthens the aggregated assurance.

Figure 38A:
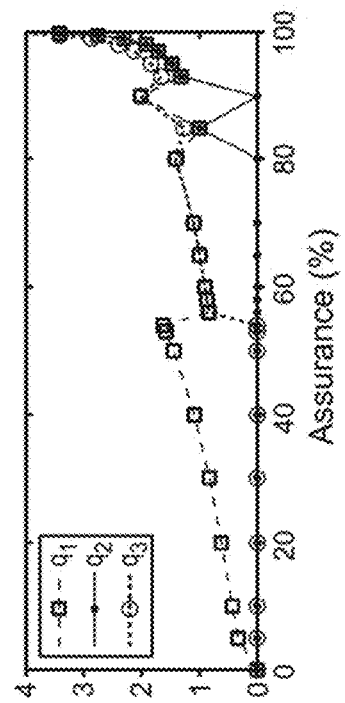
FIGS. 38A-38D are graphical illustrations of the optimal authentication attributes for negatively correlated assurances, according to the present invention.
Figure 38B:
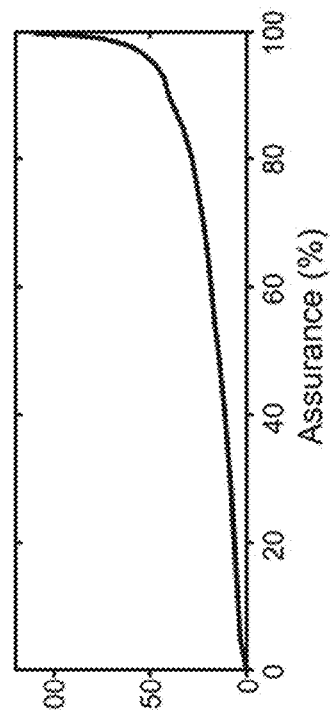

It is such an advantage for the financial institutions to request a set of multi-factor authentication methods/attributes which grants higher assurance and a lower cost than requesting just a single method/attribute. It is also evident in FIG. 38A that extremely negatively dependent methods/attributes were able to achieve an extremely high aggregated assurance of 100% with multi-factor authentication when none of the methods/attributes had to be used at an individual level of assurance larger than level 2 (i.e. individual levels of assurance were near and/or lower than level 2) in the strongly negatively dependent case. This is in comparison with the low negatively dependent case in FIG. 38B and the independent case in FIG. 37B, where the individual levels of assurance were always above level 2 and approaching level 4.

Figure 38C:
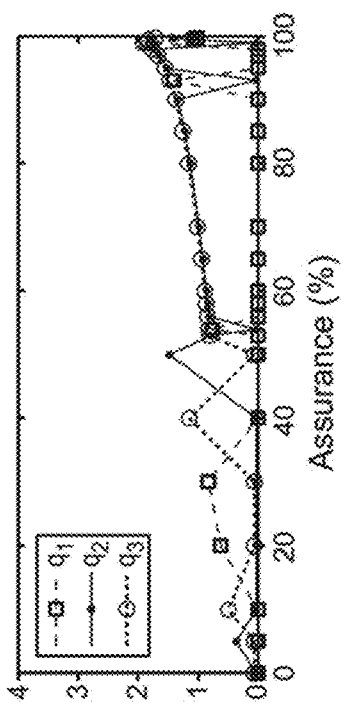
Figure 38D:
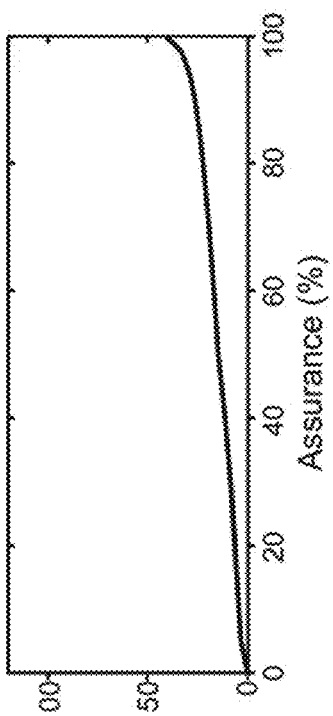
Figure 39A:
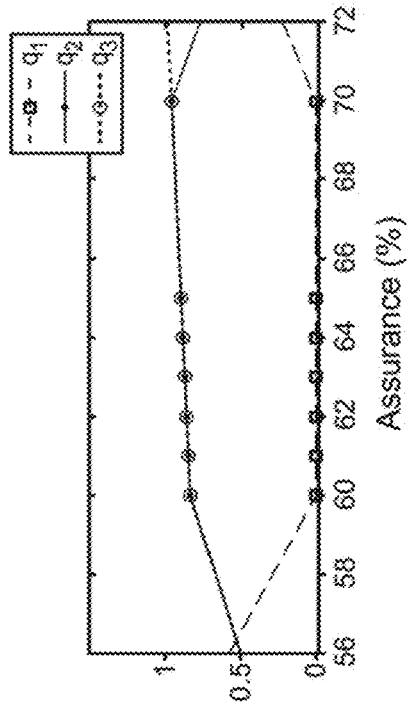
FIGS. 39A-39D are graphical illustrations showing how a Lagrange Algorithm outperformed a Genetic Algorithm using the same calculation time, according to the present invention.
Figure 39B:
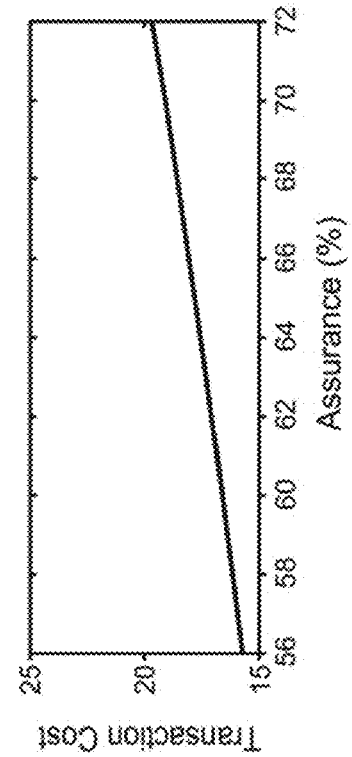
Figure 39C:
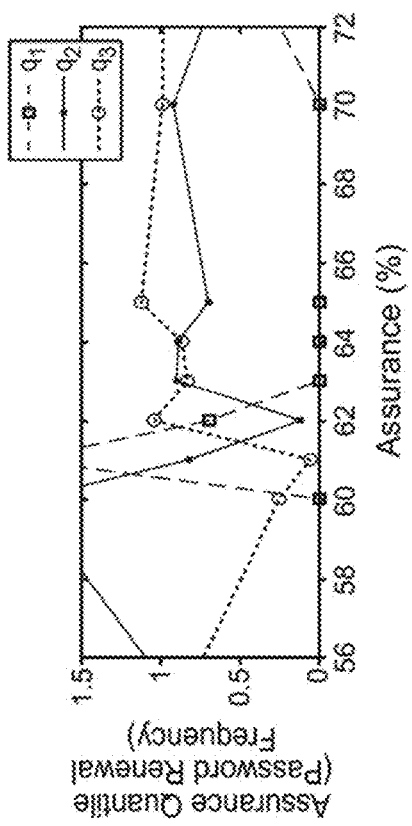
Figure 39D:
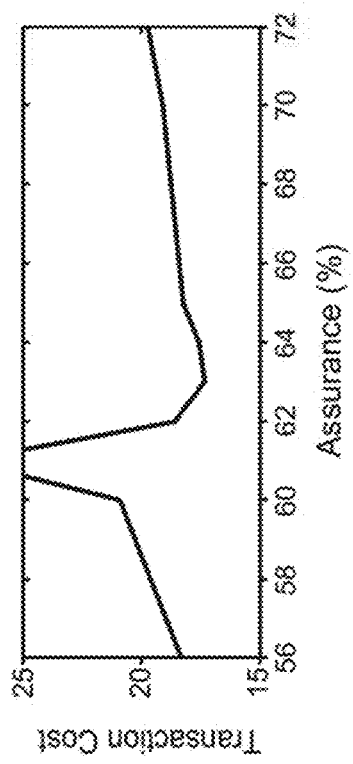

The cost in the strongly negative dependence case in FIG. 38C was also lower than the two cases of low negatively dependent case (FIG. 38D) and the independent case FIG. 37D as it incurred a cost of near 40 for the 100% assurance as compared with the other two which incurs costs of near 100. Clearly, it is definitely better than the cost of the strongly dependent case where the cost was exceeding 100 and growing exponentially, as in FIG. 37C.

At risk values up to 80%, it compared positively correlated assurance attributes with those in the independence case. Even though the required LoA was higher, the single authentication method was still preferred over combinations of two authentication methods. In the case of positive correlations, the benefit of using a second authentication method was very weak.

Similarly, at risk values larger than 80%, it compared comparing the assurances of the positively correlated assurances with the ones in the independence case. Even though LoA was larger and the cost was larger, using a single authentication was still preferred over combining two factors.

The reason is, in case of positive correlations, the benefit of using the second authentication was very weak in presence of a first authentication. When the correlations were very strong, as shown in the example evaluations in FIGS. 37A-37D, the critical points were never reached ($\rho_{i,j}=0$: 93,$i \neq j$).

It was concluded that if independence is wrongly assumed in cases where levels of assurances are positively correlated, the underestimated assurance level suggested by the independence-based method will be inadequate to compensate the risk. In such cases, more fraud will go undetected.

Negative Dependence Scenario

A situation was then examined in which there were negative correlations among assurances. In such cases, combining authentications increased the authentication beyond the independence case. In consequence, the marginal LoAs required lower values to achieve a required aggregated LoA (C-ALoA) than what the independence-based aggregated LoA required. Besides, the critical points of stepping up to two and three multi-factor authentication strategies occurred at lower risk value constraints.

That is, combining two authentications or three-factor authentications was beneficial even at relatively lower levels of required aggregated assurance compared to the independence, the low dependence and the positively correlated situations. Comparing FIGS. 38A-38D with FIGS. 36A and 36B, the value of the first critical point is decreased, and the optimal individual assurances between the first and second critical points are smaller in case of negative correlation.

Another important observation is that the third authentication was rarely needed by the LC-ALoA method in negatively correlated authentication types. It was required at high risk levels to increase protection, but sometimes three authentication methods were recommended in low risk levels, probably to achieve cost reduction. This means that two authentications were enough to cover the necessary aggregated assurance using C-ALoA at risk levels up to 100%. The simulations showed that different combinations of these two authentications were possible.

The other important observation was that, between the two critical points, the authentication type 3 was always chosen. The reason is that authentication type 3 has a negative correlation with both assurance types 1 and 2. The transaction cost was also smaller in case of negative correlations. It means that the inventive method was successful in effectively reducing the cost whenever it was possible to do so.

Stochastic Algorithm Vs. Genetic Algorithm

Since the present optimization using Lagrange was a local optimization method, it came up with answers that were locally optimized. Accordingly, it was necessary to add the stochastic step to search for other local optimum decisions. Since the Genetic Algorithm is a Global Optimization solver, it was a motivation to use it in the LC-ALoA method. The Genetic Algorithms were tried as an alternative to Lagrange multipliers to find the optimum decision. A built-in implementation of the Genetics Algorithm called the Augmented Lagrangian Genetic Algorithm (ALGA) was utilized since it can solve a non-linear optimization problem with non-linear constraints.

Another motivation for using the Genetic Algorithms was that it was used in literature as explained earlier with respect to network security context. However, to the best of the inventor's knowledge, there is no signs of any works other than this disclosure which uses ALGA to solve copula-based optimization problems in risk-linked authentication.

The function ga(.) in Matlab's Global Optimization Toolbox (R2012a 7.14.0.739) was employed and run. Matlab's implementation provides the use of non-linear constraints. So, one could use Genetic Algorithms to solve the present non-linear constrained optimization problem.

Optimization was run for the negative correlations using the same parameter, as discussed earlier, to evaluate and compare the performance. The results were compared in terms of the running time and accuracy (i.e. how well the optimal decisions were capable to reduce the cost function).

In the first evaluation, the genetic algorithm was employed using 10 Generation on 3 variables. The accuracy performance of the Genetic Algorithm was worse, i.e., it came up with a set of parameters in which the cost was worse. But it's running time was slightly faster than the Lagrange method. However, a further comparison was needed to compare the accuracies at a similar running time. In the second attempt, the number of iterations was increased in the Genetic Algorithm to see if it outperforms the Lagrange method when a similar calculation time is used. The number of repeats was increased to 30. The Genetic Algorithm took 700 Seconds and the Lagrange method took 616 Seconds. However, the performance of the Genetic Algorithm was still worse in terms of reducing cost even though it had more time to execute the calculations. It recommended a decision which incurred a higher cost than the Lagrange method. The results of the two methods are shown in FIGS. 39A-39D.

In summary, it was concluded that the accuracy-speed trade-off of the Genetic Algorithm is inclined toward lower performance than the Lagrange method. An explanation is that the Genetic Algorithm does not use the benefit of the continuity of the decision space (i.e., space of parameters). Since the decision space is continuous and smooth, the local information about the value and its slope can be useful in estimating the position of the local optimum point. This property is not utilized in the Genetic Algorithm.

Section Summary

In this Risk-link Authentication disclosure, a novel level of assurance aggregation method using copula called C-ALoA was proposed. The evaluations performed three different scenarios of correlation between the assurance attributes of the authentication methods used by the corp-m-banking system. The method takes into account the possible vulnerability attacks on the authentication method to model the individual assurance attribute distribution appropriately. The individual distributions are aggregated using the disclosed C-ALoA method to estimate the aggregated assurance value of the set of multi-factor authentication methods. It is similar to the accuracy performance results for the C-REDv1. Failure to consider correlations may lead to wrong estimates (i.e. under-estimation or over-estimation) of the level of security of a security method (here the focus was on authentication). This disclosure also proposed a novel optimization method to achieve a risk-linked security solution. In this regard, the present novel method utilizes a Lagrange Multiplier called LC-ALoA which successfully linked the C-REDv1 with the C-ALoA methods and the cost function. It uses Lagrange to find the optimum security decision with the least cost. It helps in the decision of multi-factor security, authentication for instance. It specifies when to require more or less number of multi-factor authentications. In the context of optimization of security solutions, except for the present disclosure, to the best knowledge of the inventor, no solutions have used the Lagrange for optimizing the security methods. The evaluations showed that the LC-ALoA with stochastic algorithm always performed better than the LC-ALoA with Genetic Algorithm.

The present inventive system and method achieved the following: 1) it minimized the authentication costs to the most efficient cost possible (i.e., global minimum) and provided the required assurance considering the estimated aggregated risk; 2) it computes the critical points when the number of authentications in a multi-factor authentication system must be increased to the next authentication factor (e.g., from two authentication factors to three factors etc.). The experiments showed the effectiveness of the method using different inter-dependence scenarios (independence, high-positive, high-negative, and low-negative dependence). It proved that the authentication system does not need to go to a second authentication factor in case of high positive dependence. This is because the authentication attributes are highly dependent on each other so it would be more beneficial to increase the level of assurance for the current authentication attribute to achieve the required authentication level of assurance while minimizing the cost. In the high-negative scenario, the multi-factor authentication system was able to move to the next and third authentication attribute because the L-ALoA recognizes that there would be a benefit to add the next authentication attribute without increasing the cost too much; and 3) it optimized the usability cost but other costs (e.g., the energy cost) can be used similarly in the method. It is fast enough that can be used in real-time at each transaction for each user. It is also faster than the non-linear Genetic Algorithm method. In an experiment, it took 616 seconds, compared with 700 seconds of the non-linear Genetic Algorithm. Furthermore, the cost level from the decision derived by the LC-ALoA was always less than the cost level derived by the non-linear Genetic Algorithm. In view of the foregoing, it can be concluded that this novel and unique method would be useful for financial institutions to reduce usability costs for their clients and to achieve the required authentication to match the estimated risk.

Conclusions

The main aim of the present invention was to take into account the inter-dependence in the risk aggregation to help achieving a more accurate risk value, to detect evasive fraud patterns, to make geometrical representation of the Genz numerical integration method, to parallelize the numerical integration on massively parallel architecture to achieve real-time risk computation, to quantify the authentication level of assurance, and to make wiser risk-linked authentication decisions for the security of mobile financial systems.

Gaps in the current state of the art were addressed as follows: Firstly, inter-dependence was ignored in estimating risk in mobile financial systems. Secondly, the geographical representation for the algorithm of the Genz method to compute copula did not exist. Thirdly, the computational time to integrate over a copula is long. Lengthy computation to estimate risk is unsuitable for real-time risk computation and fraud detection. Further, the long computational time makes it inappropriate for real-time estimation of the aggregated level of assurance. Fourthly, inter-dependence was also ignored in estimating an aggregated authentication level of assurance. Fifthly, the current works lacked an optimization method that derive the optimal authentication level of assurance for multi-factor authentication decision-making that keeps the authentication-related costs to their minima. The hypothesis was that by taking into account of the dependency relationships among the different risk factors, the overall risk value (i.e., the aggregated risk value) calculated may be more accurate. It was proven that this is important by showing the error caused when neglecting the correlations. This was investigated separately in cases of positive and negative correlations. It was also shown that the importance of correlations remains relevant when a large number of risk factors are aggregated. Then, as an additional benefit and application of the derived method, tools were developed to make the calculations highly efficient for a large number of risk factors by utilizing parallel computing (i.e., using a GPU) and utilizing analytical methods (i.e., using Survival Copula). The novel aggregation method was applied in fraud detection and authentication and measured how much improvement it provided in estimating the aggregated risk, in detecting fraud, and in estimating the aggregated level of assurance of multi-factor authentication and optimal risk-linked authentication decision.

By geometrically visualizing the Genz algorithm, it was beneficial in clearly understanding the complex mathematics of the Genz algorithm and it directed progress in identifying the processes of the algorithm that were causing the lengthy computational time. The design of software on a massive-parallel hardware, such as GPU, assisted us in the parallelization of these processes. The Genz algorithm was parallelized for evaluating the integral on copula which allowed the inventor to achieve real-time computation of integral on a copula. Furthermore, by utilizing a stochastic process to globalize a local optimization method, it allowed the inventor to determine the optimal authentication values for the required level of assurance on real-time during the mobile financial transaction. It also helped to determine the critical points as to when the authentication should add an additional authentication in a multi-factor authentication system for achieving the optimal decision (i.e., the required assurance and the lowest cost). The optimal authentication decision was more accurate in terms of cost reduction when globalizing a non-linear local optimization method such as the Lagrange method using a stochastic component than when using a non-linear global optimization method.

The results on the present invention were five main novel contributions. Firstly, the C-REDv1 and C-REDv2 methods provided the first aggregation methods for a union-based risk aggregation approach that account for inter-dependence. The C-REDv2 uniquely optimized the computation of C-REDv1 with an analytical formula. Second, a similar mathematical model for estimating the aggregated authentication level of assurance was proposed. Thirdly, a geometrical representation of the Genz method for integrating over a multi-dimensional elliptical distribution was visualized in both two-dimensional and in three-dimensional geometrical representations. Fourthly, an efficient parallel integration method for evaluating the t-copulas and Gaussian copulas on a GPU was proposed for GPUs. Fifthly, a proposal for automatically generating a globally optimal combination of authentication levels of assurance in a banking system was made.

The first unique contribution of the present invention is the risk aggregation method C-REDv1. The C-REDv1 method is based on the CFD method previously proposed by Alnajem and Zhang. The CFD method of risk aggregation proved to be 10% more accurate compared to the independence-based method in detecting evasive fraud patterns in a corporate m-banking context. The reason was that the latter method had 10% error. The C-REDv2 is an analytical optimization of the CFD method which simplified the C-REDv1 to reduce the running time it takes to compute the aggregated fraud risk values. These two methods proved to help detecting evasive fraud patterns more efficiently in an experiment using simulated and real-fraud data.

The integration of risk factors for up to three-dimensions was visualized based on the present invention's geometrical explanation of the Genz' non-linear transformation method for performing numerical integrations on multi-dimensional elliptical distributions. The non-linear transformation used in the Genz method makes it efficient to compute the integral on multi-dimensional elliptical distribution in minutes compared with weeks as in the exhaustive numerical integration methods.

The present invention discloses a novel parallel design of the C-REDv2 on a GPU. It reduced the aggregation of risk factors to one second or less. It was programmed in CUDA and Matlab. The aggregations, which used to take minutes with the Genz original algorithm, now can be done in real time. It was concluded that a massively parallel architecture on a GPU helps financial institutions to compute risk on real-time. It helps to achieve client's satisfaction by reducing the waiting time even when many risk factors have to be estimated simultaneously. The present invention also discloses a novel optimization method for risk-linked authentication method called LC-ALoA based on Lagrange multipliers and a stochastic component. This method links the existing risk with the required security level by deriving the optimal combination of levels of assurance for a multi-factor authentication system. This Lagrange-based optimization method performed better than a similar method that uses non-linear optimization with the Genetic Algorithm. In the evaluations, the experiment for this method showed a reduction in the cost to the most efficient level possible for a given desired level of assurance.

The solutions proposed in the present invention have the following impacts on the risk-linked security in mobile financial systems.
1. Banks can focus on the proposed risk factors and fraud patterns to analyze them individually before aggregation.
2. Banks can now be aware of the existence of evasive fraud patterns in financial systems such as corporate mobile banking and stock market trading systems. This helps to avoid fraudulent wire transfers and market manipulation of stock prices.
3. Banks can now estimate risk more accurately than when using the current methods in the literature.
4. Banks can now better decide on what level of security (i.e. authentication) to apply in a given electronic financial transaction.
5. Banks can achieve the lowest cost, in terms of burden on their clients and on their server-side costs, because the underestimation or overestimation errors are handled by the copula to derive more realistic risk estimates.
6. Banks can estimate extreme risk using C-REDv2 in real-time with massive parallel design and implementation of the GPU-C-REDv2 solution for a t-copula which can capture extreme risk.
7. Banks can retain their clients when enforcing the right level of security and increasing the level of security, when needed. Clients would feel more secure and have a good experience using the corporate mobile banking systems.
8. Banks can appropriately estimate the level of assurance for an individual assurance attribute of an authentication method and for an aggregated level of assurance by taking the vulnerability of the security solutions into account.
9. Banks would most likely face fewer successful attacks on their corporate mobile banking systems.

As shown above, the preferred system and method for evaluating risk in a given context by estimating an aggregated risk value from a set of risk factors, according to various embodiments of the present invention, offers the following advantages: firstly, inter-dependence was used in estimating risk in mobile financial systems; secondly, the geographical representation for the algorithm of the Genz method to compute copula was employed; thirdly, the computational time to integrate over a copula was reduced; fourthly, inter-dependence was also used in estimating an aggregated authentication level of assurance; fifthly, an optimization method was developed that derives the optimal authentication level of assurance for multi-factor authentication decision-making in order to keep the authentication-related costs to their minima; sixthly, the overall risk value (i.e., the aggregated risk value) calculated is more accurate because the dependency relationships among the different risk factors was taken into account; seventhly, tools were developed to make the calculations highly efficient for a large number of risk factors by utilizing parallel computing (i.e., using a GPU) and utilizing analytical methods (i.e., using Survival Copula); finally, the aggregation method was applied in fraud detection and authentication in estimating the aggregated risk, in detecting fraud, and in estimating the aggregated level of assurance of multi-factor authentication and optimal risk-linked authentication decision. In fact, these advantages are optimized to an extent that is considerably higher than heretofore achieved in prior, known systems and methods for evaluating risk.

Overview of the System for Evaluating Risk

Now that the unique and novel algorithm technology has been considered which makes such a risk authentication system 10 possible in the context of a fraud detection system 8, fraud detection system 8 will be described in greater detail.

Referring now to the drawings and more particularly to FIG. 40, there is illustrated the fraud detection system 8, which is constructed in accordance with the present invention. The fraud detection system 8 is configured for authenticating an end user who is attempting to conduct an e-Banking transaction. The fraud detection system 8 is further implemented for evaluating the risk of a fraudulent transaction in a given e-Banking transaction by estimating an aggregated risk value from a set of risk factors that are either dependent or independent of each other. The fraud detection system 8 is further implemented for evaluating the risk of a fraudulent transaction in a given e-Banking transaction as effectively and efficiently as possible.

Considering now the fraud detection system 8, fraud detection system 8 is constructed to have the following impacts on risk-linked security in mobile financial systems: 1.) banks can focus on the proposed risk factors and fraud patterns to analyze them individually before aggregation; 2.) Banks can now be aware of the existence of evasive fraud patterns in financial systems such as corporate mobile banking and stock market trading systems. This helps to avoid fraudulent wire transfers and market manipulation of stock prices; 3.) Banks can now estimate risk more accurately than when using the current methods in the literature; 4.) Banks can now better decide on what level of security (i.e. authentication) to apply in a given electronic financial transaction; 5.) Banks can achieve the lowest cost, in terms of burden on their clients and on their server-side costs, because the underestimation or overestimation errors are handled by the copula to derive more realistic risk estimates; 6.) Banks can estimate extreme risk using C-REDv2 in real-time with a massive parallel design and implementation of the GPU-C-REDv2 solution for a t-copula which can capture extreme risk; 7.) Banks can retain their clients when enforcing the right level of security and increasing the level of security, when needed. Clients would feel more secure and have a good experience using the corporate mobile banking systems; 8.) Banks can appropriately estimate the level of assurance for an individual assurance attribute of an authentication method and for an aggregated level of assurance by taking the vulnerability of the security solutions into account; and 9.) Banks would most likely face fewer successful attacks on their corporate mobile banking systems.

In order to accomplish the above-mentioned benefits, the fraud detection system 8 generally includes an end user machine 12, a transaction authentication device 30, and a risk authentication system 10, where the risk authentication system 10 is in remote electronic communication with the end user machine 12 using the Internet (a communication network) 250. In this regard, the end user machine 12 enables an end user (not shown) to generate e-Banking transaction or authentication requests from remote locations (i.e., locations where an automatic teller machine (ATM) and/or a financial institution is not readily available or accessible), while the risk authentication system 10 responds to such end user generated e-Banking authentication requests. In this configuration, the risk authentication system 10 presents or provides (1) that the end user is authorized to conduct the desired e-Banking transaction; and (2) a deterrent to fraudulent users who are not authorized to conduct the desired e-Banking transaction. The communication network 250 is a traditional network such as the Internet which allows these systems to communicate with each other and will not be discussed hereinafter in greater detail as its construction and how it interacts with other communication devices is well known in the state of the art.

The Fraud Detection Platform

Considering now the user machine 12 in greater detail with reference to FIG. 40, the user machine 12, which enables an end user to remotely communicate with the risk authentication system 10, generally includes a user input device 14 (e.g., a mouse 16 and/or a keyboard 18), a display device 20 (e.g., a computer display 22 or a wireless communication device 24 such as a cellular telephone or tablet having a global positioning system (GPS) 26 and an Internet browser 13) and an authentication device 30, which cooperate with one another to remotely send and receive communications between the user machine 12 and the risk authentication system 10 or, more specifically, the authentication server 62 via the communication network 250. It is to be understood that GPS 26 is an important aspect of the present invention in that GPS 26 provides information to risk authentication system 10 about the location of the end user. For example, if the end user has always conducted e-Banking in the past in one general location, namely the United States, and the current end user is attempting to conduct an e-Banking transaction in Europe, risk authentication system 10 may require the end user to further authenticate himself/herself through risk authentication system 10.

As an example of how user input device 12 interacts with risk authentication system 10, an end user logs onto, through the user input device 14, a desired website or portal of a financial institution that the end user desires to conduct a financial transaction which is displayed for example on display device 20. After the user has been optionally authenticated by GPS 26 and authentication device 30, the e-Banking transaction request is then sent to authentication server 62, which forms part of the risk authentication system 10, to facilitate authenticating the end user through the use of risk authentication system 10. Once the end user has been further authenticated by risk authentication system 10, the transaction request generated by the user is processed and completed.

As shown in FIG. 40, authentication device 30 can include, but is not limited to, a conventional hard token authentication device 32, a conventional face recognition device 34 and/or a conventional biometric (eye, fingerprint, etc.) scanning device 36.

Overview of the Risk Authentication System

Figure 40B:
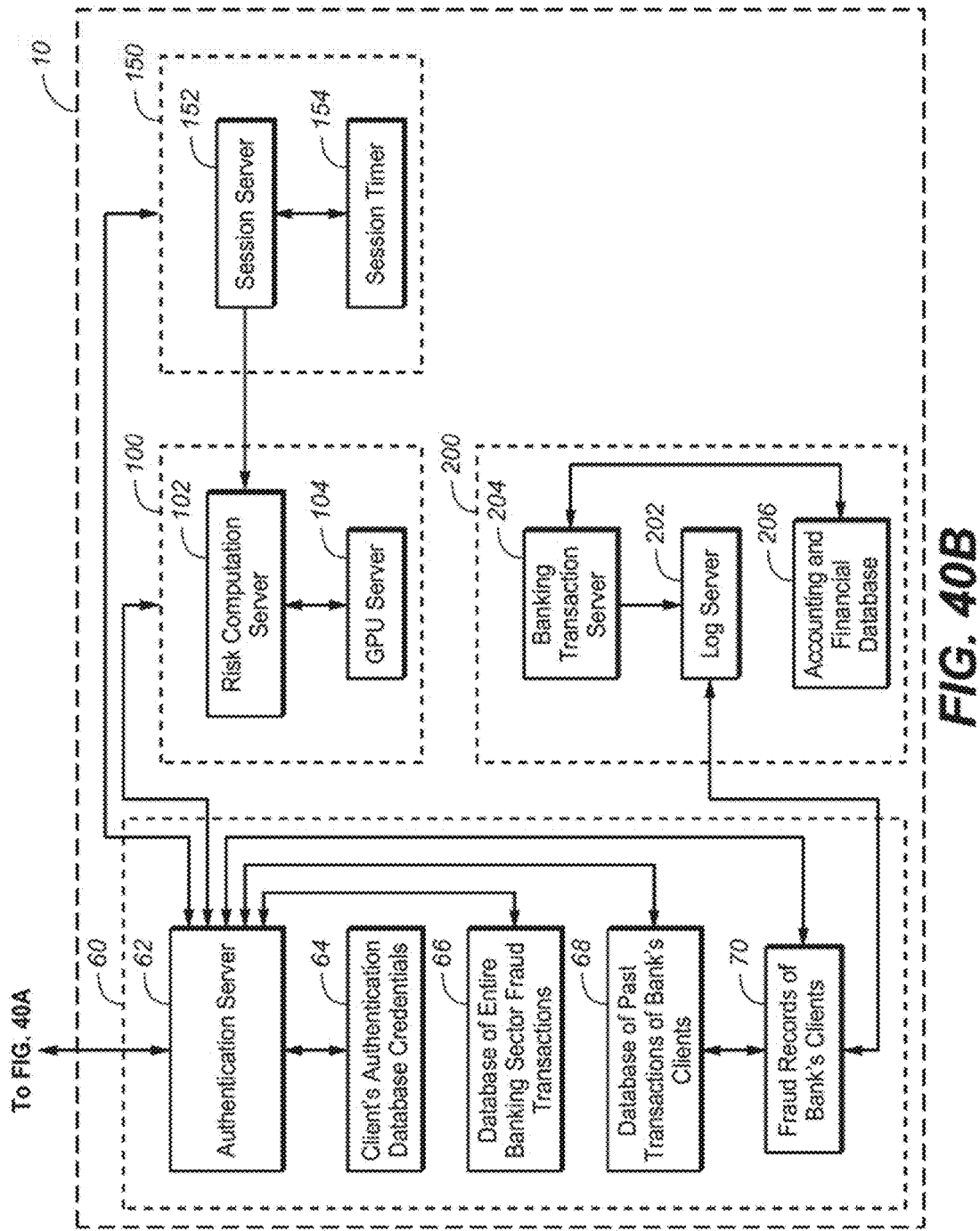

Considering now risk authentication system 10 in greater detail with reference to FIG. 40, and more specifically with reference to FIG. 40B, the risk authentication system 10 generally comprises, a plurality of sub-systems (60, 100, 150 and 200) which work together in various ways to deliver the overall functions and more specifically to authenticate that the end use is not a fraudster. A brief overview of each of these sub-systems will now be presented.

To begin, the risk authentication system 10 includes a financial institution authentication system 60 which is responsible for responding to end user queries issued from the user machine 12; a risk computation system 100; a transaction session system 150 which keeps track of the time that the particular transaction is taking in order to maintain an effective and efficient transaction session; and a financial institution transaction system 200 which records and stores the e-Banking transactions of the client/end user. The risk computation system 100 generally includes a risk computation server 102 for communicating in real time with the authentication server 62 forming part of the financial institution authentication system 60; and a GPU server 104, which is responsible for allowing the risk computation server 102 to provide an aggregated risk estimation value (that will be described hereinafter in greater detail) to the authentication server 62 in a highly effective and efficient manner, in real time.

As discussed above, the financial institution authentication system 60 is solely responsible for responding to end user queries issued from the user machine 12. The input device 14 and the optional authentication device 30, forming part of the user machine 12, facilitate the entering of the end user authentication into the risk authentication system 10. The e-Banking transaction requests are processed by the financial institution authentication system 60, the risk computation system 100, the transaction session system 150, and the financial institution transaction system 200, forming part of the risk authentication system 10, where e-Banking transaction authentication results are returned to the end user machine 12 and displayed via the display device 20.

The Financial Institution Authentication System

Considering now the financial institution authentication system 60 in greater detail, the financial institution authentication system 60, as noted earlier is responsible for sending authentication information to the end user machine 12. In this regard, the financial institution system 60 is comprised of the authentication server 62, a client authentication credentials data store 64, a banking sector fraudulent transaction data store 66, a financial institution clients' past transaction data store 68, and a financial institution clients' fraud record data store 70. The authentication server 62 is a conventional server that interacts with the end user machine 12, the risk computation system 100, the transaction session system 150 and financial transaction system 200 to return the e-Banking transaction authentication results to the end user machine 12 which are displayed via the display device 20.

Overview of the Client Authentication Credentials Storage

Considering now the client authentication credentials data store 64 in greater detail with reference to FIG. 40B, the client authentication credentials data store 64 is used to store the authentication credentials of the client. It is to be understood that the web browser or the mobile app sends the credentials entered by the bank's customer through a secured network. The credentials are received as the bank customer enters the authentication details on the mobile banking website or mobile app etc. The credentials are the answers to the authentication challenges requested by the banking system and answered by the bank's customer (hard token, code etc.) anytime from login to logout of the mobile banking session. Other authentication credentials might be generated by the mobile app (e.g. Kerberos Information) which will be logged and then sent to the database for prominent (i.e. persistent) storage. It is to be further understood that the kinds of credentials to be stored are data such as transaction amount, number of transactions, frequency of the transactions, the location of the mobile device, the destination to where the money is going to be wired etc.

As will be explained later in greater detail, client authentication credentials data store 64 cooperates with authentication server 62 and end user machine 12, particularly input device 14 and optional authentication device 30, in order to determine if the end user who is trying to conduct an e-Banking transaction is authentic and is allowed to conduct the transaction.

Overview of the Banking Sector Fraudulent Transaction Storage

The banking sector fraudulent transaction data store 66 is a database of stored past fraudulent transactions that have been detected by the banking industry, as a whole. It is to be understood that this type of data could be obtained from Government agencies such as the Financial Conduct Authority or Serious Fraud Office of the UK and the FBI or a specialized firm who has the right to gather and distribute this data.

The banking sector fraudulent transaction data store 66 provides a means of accessing the past fraudulent transactions that have been detected by the entire banking industry so that risk link authentication system 10 can determine if a fraudulent transaction is taking place. As will be explained later in greater detail, if the end user is a fraudulent end user, the end user may attempt to conduct an e-Banking transaction that, in the past, has been known to be fraudulent such as wiring money to a foreign bank account that is known to have ties to illegal activity. If, upon searching the fraudulent transactions that have been detected by the entire banking industry and stored in the banking sector fraudulent transaction data store 66, the risk link authentication system 10 determines that the end user transaction may be similar to past fraudulent transactions that have occurred elsewhere in the banking industry, the risk link authentication system 10 may require that the end user provide more authentication(s) in order for the transaction to proceed. In this manner, the client, the client's financial institution and the banking industry may be able to thwart a fraudulent transaction.

Overview of the Client's Past Transactions Storage

The financial institution clients' past transaction data store 68 is a database of stored past financial transactions of the clients of the financial institution. It is to be understood that the data should be stored in an SQL or non-SQL database. The database obtains the data from log files, directly from the client's mobile device, from the bank's analytics system, and/or from the bank's authentication system etc.

The financial institution clients' past transaction data store 68 provides a means of accessing the past financial transactions of all of the clients of the financial institution so that risk link authentication system 10 can determine if a fraudulent transaction is taking place. As will be explained later in greater detail, if the end user is a fraudulent end user and has obtained the authentication and banking information of a client of a financial institution, the end user may attempt to conduct a financial transaction that the financial institution's clients do not typically conduct. If, upon searching the financial institution clients' past transaction data store 68, the risk link authentication system 10 determines that the financial institution's clients have never conducted such a financial transaction in the past, risk link authentication system 10 may require that the end user provide more authentication(s) in order for the transaction to proceed. In this manner, the clients and the clients' financial institution may further be able to thwart a fraudulent transaction.

Overview of the Client's Fraud Record Storage

Considering now the financial institution clients' fraud record data store 70 in greater detail with reference to FIG. 40B, the financial institution clients' fraud record data store 70 provides a means for storing any fraudulent transactions that have been flagged by the clients'/end user's financial institution, in conjunction with the financial institution clients' past transaction data store 68. It is to be understood that the kinds of fraudulent transactions stored in a mobile banking context may be fraudulent wire transfers etc. and their associated information (frequency of the client's wire transfers, locations to and from where the transactions are wired etc.). In a stock market manipulation context, the fraudulent transaction could be manipulating the stock market prices by a group of manipulators. In the case of liquidity risk aggregation and stress testing context, it could be the bank's liquidity risk factors data (e.g. Bank's Intra-day Liquidity etc.) and Market Risk (e.g. investment portfolio in bonds etc.).

Overview of the Risk Computation System

Considering now the risk computation system 100 in greater detail with reference to FIG. 40B, the risk computation system 100 is comprised of a risk computation server 102 and a GPU server 104. The risk computation system 100 is responsible for enhancing the strength and agility of vulnerable corporate m-banking systems. Risk computation system 100 imposes authentication requirements in adaptation to the risk value of a financial transaction. This risk-linked authentication approach can balance the conflict between increasing security protection levels and reducing costs (in terms of performance and usability) by achieving a high level of security protection. As an example, one way to increase the level of protection is to increase an authentication assurance level (i.e., the level of assurance (LoA)). A stronger LoA can be achieved by using a stronger form of an authentication method or using higher authentication parameters or protocols. The use of multi-factor authentication protocols may lead to a higher aggregated LoA, when applied appropriately.

Overview of the Risk Computation Server

Considering now the risk computation server 102 in greater detail with reference to FIG. 40B, the risk computation server 102 is a conventional server that interacts with the end user machine 12, the financial institution authentication system 60, particularly authentication server 62 and the transaction session system 150 to return the e-Banking transaction authentication results to the end user machine 12 which are displayed via the display device 20. As will be discussed in great detail later, risk computation server 102 computes an overall (i.e. aggregated) authentication assurance level when a user is authenticated through the use of a multi-factor authentication method. The solution consists of two novel methods: (1) a Copula-based Aggregated Level of Assurance (C-ALoA) method that computes an aggregated LoA given multiple component LoA values, each from a separate authentication factor; and (2) the Lagrangian Copula-based Aggregated Level of Assurance (LC-ALoA)

method which makes a risk-linked authentication decision based on the Lagrange Multiplier theory. The LC-ALoA method is intended to give an estimate of a required authentication assurance level for a given level of risk and the usability cost for each of the multi-factor authentication methods to achieve the required aggregated authentication assurance for a given level of risk that would incur the lowest cost (e.g. usability costs and bank server's cost). The preset invention demonstrates that the problem is not a trivial one. It argues the effectiveness of the C-ALoA and LC-ALoA methods by evaluating several use-case scenarios.

The risk link authentication system 10 and more particularly the risk computation system 100, employ the risk linked authentication method described herein earlier to authenticate a user transaction. See paragraphs [00509-0607]. The reader is directed to review these paragraphs in detail to fully understand the risk-linked authentication process implemented by the risk computation system 100.

Overview of the GPU Server

Considering now GPU server 104 in greater detail with reference to FIG. 40B, GPU server 104 is a conventional server that interacts with risk computation server 102. As will be discussed in greater detail later, GPU server 104 applies a Genz non-linear integration method to the Lagrangian Copula-based Aggregated Level of Assurance (LC-ALoA) method (the GPU-C-REDv2 method), discussed above and transforms the GPU-C-REDv2 method into a novel and massively parallel processing design on a GPU. The details of the GPU architecture have been described herein earlier. In this regard, the reader is referred to paragraphs [00395 to 000498] for this detailed discussion.

Overview of the Transaction Session System

Considering now transaction session system 150 in greater detail with respect to FIG. 40B, transaction session system 150 is comprised of a session server 152 and a session timer 154. The session server 152 is a conventional server that interacts with authentication server 62, risk computation system 100 and session timer 154 to keep track of the length of time that a particular end user financial transaction session has taken. Session timer 154 is a conventional timer which is used to time the particular end user financial transaction session. For example, if authentication server 62 sends a request to the end user to enter a further authentication and the end user is a fraudulent end user who does not know the further authentication information that is needed, session server 152, in conjunction with session timer 154, will interact with authentication server 62 and risk computation system 100 to inform the end user (via the display device 20) that the time to enter the further authentication information has elapsed and the particular end user financial transaction session will be immediately terminated. Consequently, a fraudulent transaction may have been averted by system 10.

Overview of the Financial Institution Transaction System

Considering now financial institution transaction system 200 in greater detail with respect to FIG. 40B, financial institution transaction system 200 is comprised of a client's financial transaction log server 202, a client's financial institution transaction server 204, and a client's accounting and financial data store 206. The client's financial transaction log server 202 is a conventional server that interacts with financial institution clients' fraud record data store 70. As discussed above, financial institution clients' fraud record data store 70 provides a means for storing any fraudulent transactions that have been flagged by the banking industry, in conjunction with the financial institution clients' past transaction data store 68. In particular, client's financial transaction log server 202 interacts with financial institution clients' fraud record data store 70 and client's accounting and financial data store 206 to detect if the desired financial transaction that the end user is trying to conduct is a fraudulent transaction.

Overview of the Client's Financial Institution Transaction Server and Client's Accounting and Financial Data Storage Considering now the client's financial institution transaction server 204 in greater detail with reference to FIG. 40B, client's financial institution transaction server 204 interacts with log server 202 and client's accounting and financial data store 206. Client's accounting and financial data store 206 provides a means for storing the financial transactions that the end user has conducted in the past. It is to be understood that the data is stored in an SQL or NON-SQL database by sending a query to insert the accounting and financial entry. It is to be further understood that the accounting and financial system gets the data directly from the relevant systems (i.e., the loans system, the Trade Finance System etc.) and the entry is recorded immediately. In this manner, when the end user inputs the desired financial transaction into end user machine 12, client's financial institution transaction server 204 interacts with client's financial transaction log server 202 and client's accounting and financial data store 206 by comparing the financial transaction that the end user desires to conduct with those that the end user has conducted in the past to detect if the desired financial transaction that the end user is trying to conduct is a fraudulent transaction that has been previously flagged by the client's (end user's) financial institution.

Overall End User Authentication System Flow Process

Overview of the Initial End User Authentication Sub-Process

Figure 41A:
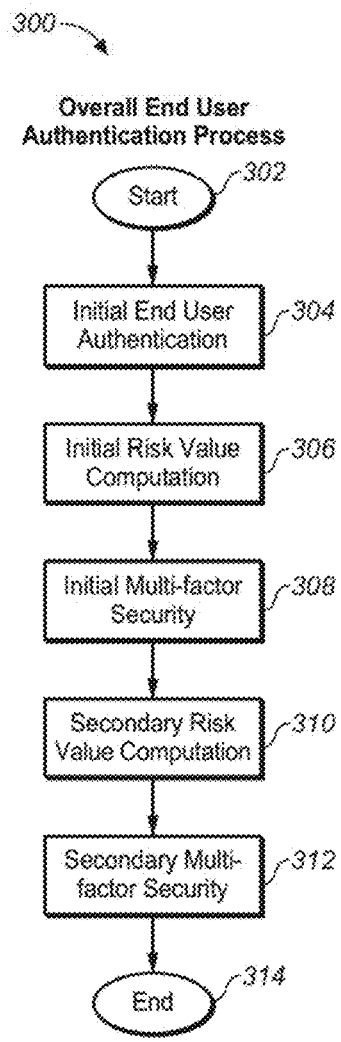
FIGS. 41A-41F are flowcharts illustrating the overall process flow of the risk-link authentication system of FIG. 40.
Figure 41B:
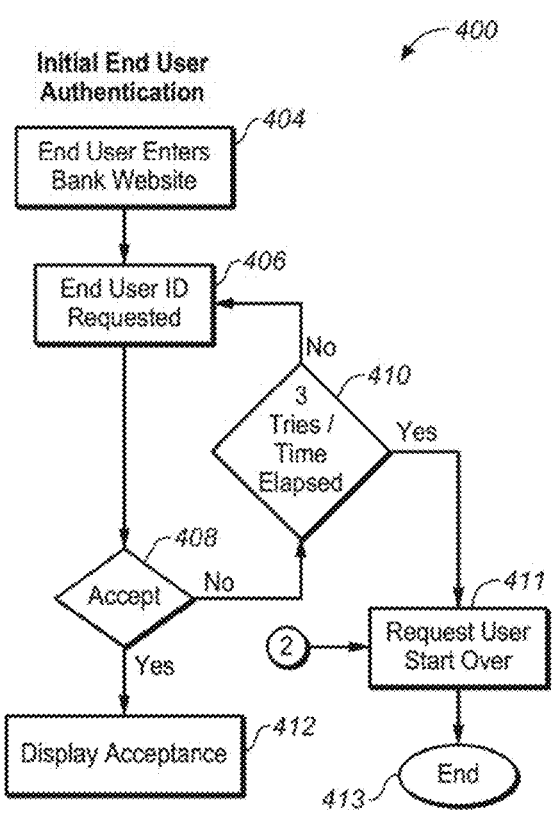

Considering now the overall end user authentication process 300 in greater detail with reference to FIG. 41A, the end user authentication process 300 begins at a start command 302. The start command 302 is initiated whenever an end user utilizes end user machine 12, particularly user input device 14 (FIG. 40A) to enter into or log onto a website or other similar portal of the end user's financial institution such as the end user's bank. Start command 302 calls the end user authentication sub-process 400 (FIG. 41B) by initiating a start command 404.

From the start command 404, the process advances to step 406 where the end user is requested to enter initial user identification such as a user name and/or a password. In this step, the authentication server 62 (FIG. 40B) interacts with the client authentication credentials data store 64 to determine if the end user has entered the proper user identification.

Figure 41C:
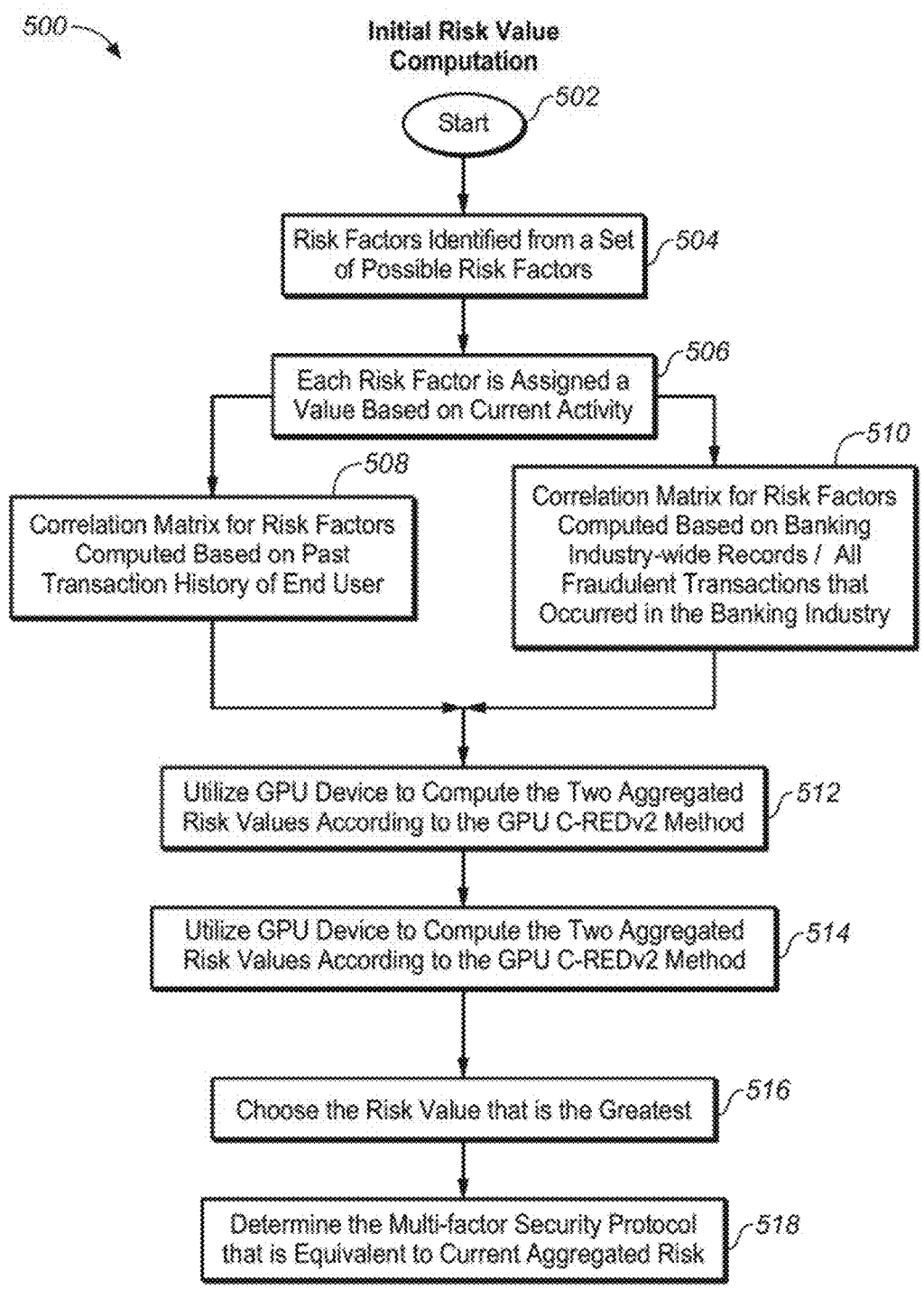

As shown in step 408, if the end user enters the correct initial authentication information, the sub-process advances to step 412, where the end user is informed by authentication server 62 that the initial authentication information is acceptable and this acceptance is displayed to the end user on display device 20. Once the end user has been notified of the acceptance of the initial authentication information by initial end user authentication sub-process 400, the overall end user authentication process 300 advances to a call command 306 which calls initial risk value computation sub-process routine 500, as best seen in FIG. 41C.

Also as shown at step 408, if the end user has not entered the proper user identification, the sub-process 400 advances to a determination step 410 where a determination is made if the user has exceeded the allotted time for completing the task of entering the correct user identification information or if the user has attempted three times to enter the correct identification information unsuccessfully. If time has not elapsed and if the end user has not made three unsuccessful attempts, the sub-process returns to step 406 and proceeds, as previously described. Stated otherwise, if the end user has not entered the proper user identification, the authentication server 62, in conjunction with end user machine 12, particularly display device 20 (FIG. 40A), will inform the end user of the website log on failure and request that the end user re-enter the correct initial authentication information through user input device 14.

From the request to re-enter the correct initial authentication information the sub-process again advances to step 408, and where the authentication server 62 (FIG. 40B) again interacts with the client authentication credentials data store 64 to determine if the end user has entered the proper user identification. The sub-process proceeds as previously described advancing to step 412 if the user identification information was correct, and to step 410 if the user information was still incorrect.

At step 410, if the end user has failed to enter the proper user identification after a pre-determined number of times, preferably three (3) times, or if the end user has failed to enter the proper user identification after a pre-determined period of time, the sub-process advances to step 411, where the authentication server 62, in conjunction with end user machine 12, particularly display device 20 (FIG. 40A), informs the end user that the end user must start the process over by logging back into the financial institution's website or portal (step 302). The sub-process then advances to an end step 413, that ends the overall end user authentication process 300.

It is to be understood that if the end user is a fraudulent end user and tries several times to log onto the bank's website but is not successful, the account may become deactivated. Also, it is to be understood that the financial institution may keep a record of these attempts made in the database of past transactions of bank's clients 68.

Overview of the Initial Risk Value Computation Sub-Process

The initial risk value computation sub-process routine 500 (FIG. 41A), in this case, begins at a start command 502. The start command 502 is initiated whenever an end user has entered the correct initial authentication information in order to access the end user's financial institution's website or portal.

From the start command 502, the process advances to step 504 where the initial risk factors are identified from a set of possible risk factors (e.g., location risk, timestamp risk, etc.) by the interaction of authentication server 62 and risk computation system 100, in particular risk computation server 102 (FIG. 40B). It is to be understood that in this step, while many possible initial risk factors might be relevant, other possible initial risk factors (such as the amount of the transaction) might not be relevant, at this time, because no transaction amount has been requested by the end user.

Once the initial risk factors have been identified by risk computation system 100, the sub-process advances to step 506 where each initial risk factor is assigned a value, as discussed above, by risk computation server 102 based upon the current activity of the end user. For example, if authentication server 62, in conjunction with GPS system 26 (FIG. 40A) and financial institution transaction system 200 (FIG. 40B), determine that the end user is attempting to log onto the end user's financial institution's website or portal from Europe and the end user has never attempted to log onto the end user's financial institution's website or portal from Europe, risk computation server 102 may assign a high value to this type of risk factor because it represents a location risk. Other current activities that may be of concern to risk computation server 102, at this time, are the frequency of logons by the end user, the times of day that the end user has attempted to log on, the days of the week that the end user has attempted to log on, and the like.

After the initial risk factors have been assigned a value by risk computation server 102 at step 506, the sub-process advances concurrently to steps 508 and 510. At step 508 a first correlation matrix, which includes the assigned values of the initial risk factors, is computed by risk computation server 102. As discussed above, in this step, risk computation server 102, in conjunction with financial institution clients' past transaction data store 68 and financial institution transaction system 200, review the past financial transactions of the client to help determine if a potential fraudulent transaction is taking place.

Concurrent with step 508, at step 510, a second correlation matrix, which includes information related to all of the fraudulent transactions that have been detected throughout the entire banking industry (as stored in banking sector fraudulent transaction data store 66 (FIG. 40A)) is computed by the risk computation server 102. It is to be understood that instead of using fraudulent transactions that have been detected throughout the entire banking industry, information related to all of the fraudulent transactions that have been detected by the end user's financial institution related to all of the clients of the financial institution (as stored in financial institution clients' past transaction data store 68 (FIG. 40A)) could also be used. In this step, risk computation server 102 is trying to compare the end user to fraudulent end users known to the entire banking industry or known to the end user's financial institution to help determine if a fraudulent transaction is taking place.

Once the two correlation matrices have been computed by risk computation server 102 in steps 508 and 510, the sub-process advances to step 512 where the two or more different risk values are computed by risk computation server 102, in conjunction with GPU server 104. As described above, the two correlation matrices are computed by risk computation server 102 using the GPU C-REDv2 method to compute the two different risk values where the two risk values computations may be performed sequentially on the same GPU server 104 or in parallel on two separate GPU devices located on GPU server 104.

From the risk values computation step 512, the sub-process advances to step 514 where the massively parallel architecture on GPU server 104 is used to further compute two or more aggregated risk values. As described above, the massively parallel architecture on GPU server 104 is used to compute two aggregated risk values by using the GPU-C-REDv2 method. It is to be understood that the two aggregated risk values, preferably, are an end user/client specific aggregated risk value and a sector-wide aggregated risk value such as a banking industry-wide aggregated risk value.

Once the two aggregated risk values have been computed in step 514, the sub-process advances to step 516 where risk computation server 102 selects the greater of the two aggregated risk values and forwards that greater aggregated risk value to authentication server 62. The greater of the two aggregated risk values is selected because the greater value represents the greater risk to the end user and/or the end user's financial institution that the end user's desired transaction may be fraudulent. For example, if the end user is attempting to log onto the financial institution's website or portal from a location (Europe) that is not typically where the end user usually logs onto the end user's financial institution's website (Pennsylvania, U.S.A.), the aggregated risk value associated with the client/end user specific risk value will be greater than the sector-wide risk value because it is not uncommon for other clients/end users of the banking industry, in general (or the client's financial institution, in particular) to attempt to log on the financial institution's website at a location that is not their typical log on location.

After the greater of the two aggregated risk values has been selected by the risk computation server 102 and forwarded to the authentication server 62, the sub-process advances to step 518 where an initial multi-factor security protocol is determined by the authentication server 62 based on the risk value obtained from the risk computation server 102. In this step, the authentication server 62/risk computation server 102 determine what kind of further end user initial authentication protocol should be entered in order to proceed with completing the end user's desired financial transaction. For example, if it is determined that due to the higher value of the client/end user specific aggregated risk value, that further authentication of the end user is necessary, authentication server 62 may request, through end user machine 12, particularly user input device 14 and authentication device 30 (FIG. 40), that the end user provide a face recognition and a secondary password through end user machine 12.

Overview of the Initial Multi-Factor Security Sub-Process

Figures 41D, 41F:
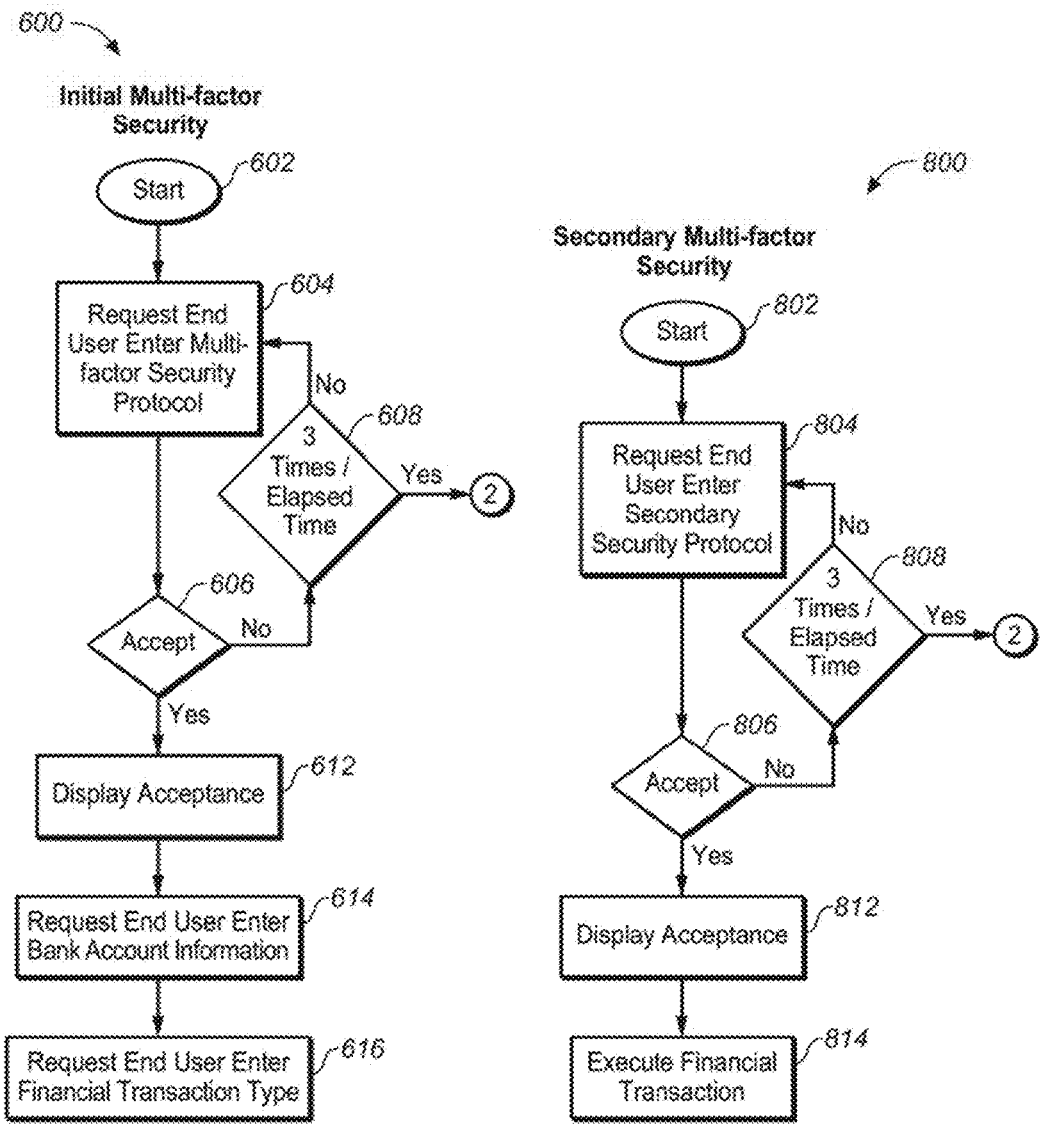

Once the initial multi-factor security protocol is determined by the initial risk value computation sub-process routine 500, the overall end user authentication process 300 (FIG. 41A) proceeds to a call command 308 which calls an initial multi-factor security protocol determination sub-process routine 600, as best seen in FIG. 41D.

From the start command 602, the sub-process advances to step 604 where the authentication server 62, in conjunction with end user machine 12, in particular display device 20, displays a request to the end user to enter an initial multi-factor security authentication protocol. For example, authentication server 62 may request that the end user enter a hard token (a physical device that an authorized user of computer services is given to prove one's identity electronically), enter another or secondary password (e.g., a secret phrase), and utilize the face recognition device 34.

Upon the receipt of the request for the initial multi-factor security authentication protocol displayed on user machine 12, the sub-process advances to a determination step 606 where the end user conventionally inserts the hard token (in the case of the hard token request) into user machine 12 and enters the requested other initial multi-factor security authentication information into user machine 12 through the use of the input device 14 (in the case of the secondary password) and performs the face recognition through the use of the face recognition device 34. Once the end user has entered the requested initial multi-factor security authentication protocol, authentication server 62 interacts with the client authentication credentials data store 64 to determine if the end user has entered the proper end user identification associated with the initial multi-factor security authentication protocol.

If the end user has not entered the proper end user identification associated with the initial multi-factor security authentication protocol, the sub-process advances to the determination step 608 to make a determination if the allotted time for complying with the request generated at step 604 has elapsed or whether the end user has made three unsuccessful attempts of complying with the request generated at step 604. If time has not elapsed and the end user has not made three unsuccessful attempts, the sub-process returns to step 604, where the authentication server 62, in conjunction with end user machine 12, particularly display device 20 (FIG. 40A), informs the end user of the initial multi-factor security authentication protocol failure and requests that the end user re-enter the correct initial multi-factor security authentication protocol through user machine 12.

From step 608, the process advances to step 411 where, upon a repeated failure (preferably three (3) failed attempts) by the end user to properly enter the requested end user identification associated with the initial multi-factor security authentication protocol, the authentication server 62, in conjunction with session system 150 and end user machine 12, particularly display device 20 (FIG. 40A), will inform the end user that the end user must return and re-initiate the authentication process. It is to be understood that the end user may also take too much time in order to properly enter the requested end user identification associated with the initial multi-factor security authentication protocol. In this case, authentication server 62, in conjunction with session system 150 and display device 20, will inform the end user that the transaction session has expired and return the end user to call command 302. In this step, the failure by the end user to property and/or timely enter the requested end user identification associated with the initial multi-factor security authentication protocol is a strong indication to authentication server 62 that the end user may be a fraudulent end user.

It is to be understood that if the end user is a fraudulent end user and tries several times to enter the requested end user identification associated with the initial multi-factor security authentication protocol but is not successful, it is recorded in the database of past transactions of bank's clients 68.

If the end user has entered the proper end user identification associated with the initial multi-factor security authentication protocol, the sub-process advances from step 606 to step 612 where the end user is informed by authentication server 62 that the initial multi-factor security authentication protocol that was entered by the end user has been accepted and this acceptance is displayed to the end user on display device 20.

Once the end user has been notified that the initial multi-factor security authentication protocol that was entered by the end user has been accepted by authentication server 62, the sub-process advances to step 614 where the end user is requested by the authentication server 62, in conjunction with the user machine 12, particularly display device 20, to provide information related to the bank account that the end user desires to utilize in order to conduct the desired financial transaction.

After the end user has been requested to enter the information related to the bank account that the end user desires to utilize in order to conduct the desired financial transaction, the sub-process advances to step 616, where the end user enters the type of financial transaction (check account balance, transfer funds, deposit funds, make a payment, etc.) that the end user desires to conduct through the use of user machine 12, in particular user input device 12.

Overview of the Secondary Risk Value Computation Sub-Process

Figure 41E:
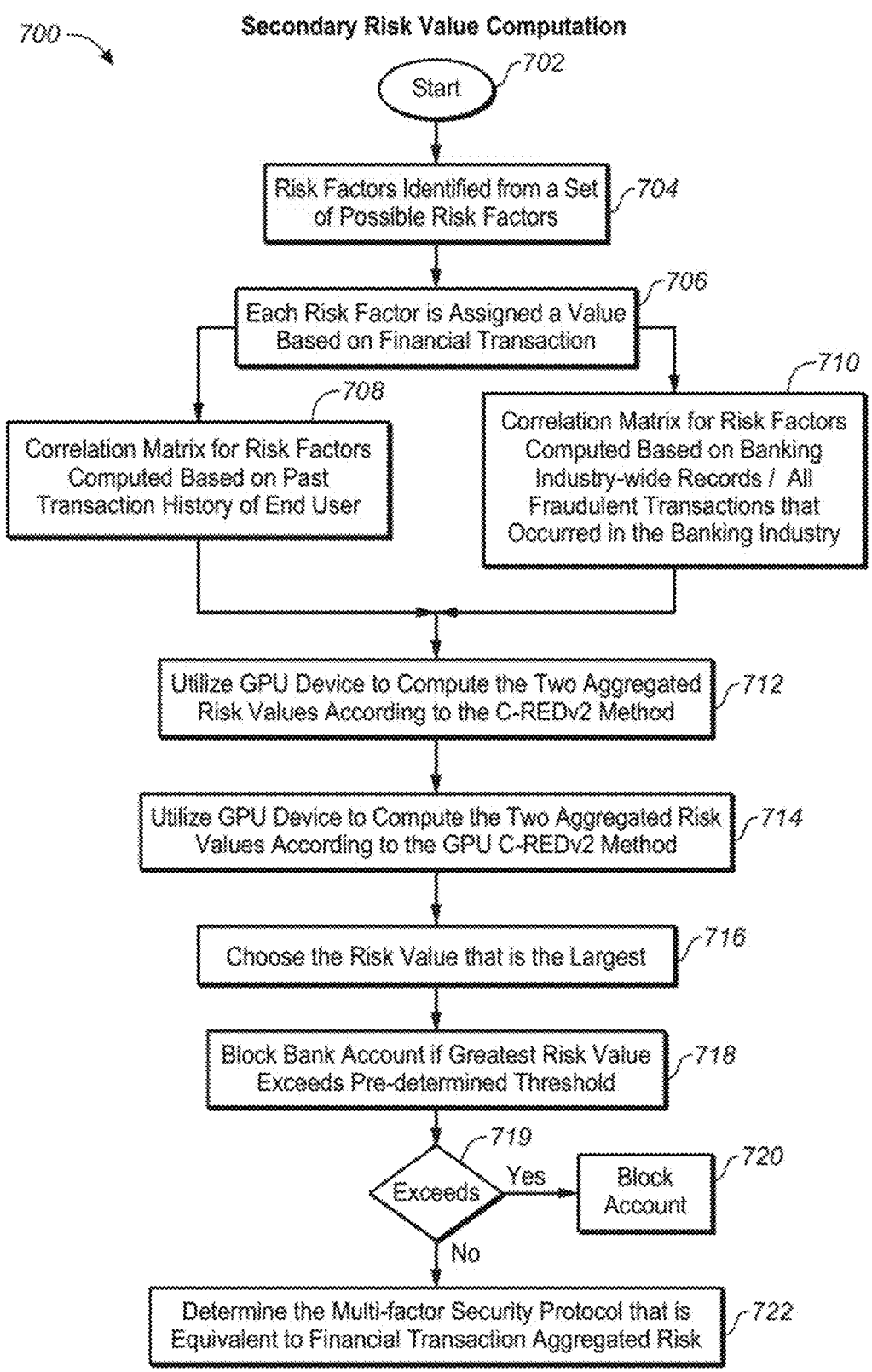

Once the end user enters the type of financial transaction that the end user desires to conduct through the initial multi-factor security protocol routine 600, the overall end user authentication process proceeds to a call command 310 which calls a secondary risk value computation sub-process routine 700, as best seen in FIG. 41E.

From the start step 702, the sub-process advances to step 704 where a secondary set of risk factors are identified from a set of possible risk factors (e.g., location risk, timestamp risk, value risk, account type risk, transaction value risk, etc.) by the interaction of authentication server 62 and risk computation system 100, in particular risk computation server 102 (FIG. 40B).

Once the secondary risk factors have been identified by risk computation system 100, the process advances to step 706 where each secondary risk factor is assigned a value, as discussed above, by risk computation server 102 based upon the type of financial transaction that the end user desires to conduct. For example, if authentication server 62, in conjunction with financial transaction system 200 (FIG. 40B), determines that the end user is attempting to transfer a very large sum of money but the end user has never attempted to transfer this amount of money before, risk computation server 102 may assign a high value to this type of risk factor (transaction value risk). Other secondary activities that may be of concern to risk computation server 102 are the frequency of logons by the end user, the number of times over a period of time that the end user has attempted to transfer money, the different types of transactions that the end user has attempted to conduct, and the like.

After the initial risk factors have been assigned a value by risk computation server 102, the sub-process advances concurrently to steps 708 and 710. At step 708, a first correlation matrix which includes the assigned values of the secondary risk factors is computed by risk computation server 102. As discussed above, in this step, risk computation server 102, in conjunction with financial institution clients' past transaction data store 68 and financial institution transaction system 200, review the past financial transactions of the client to help determine if a fraudulent transaction is taking place.

Concurrent with step 708, step 710 is also executed, where a second correlation matrix which includes information related to all of the fraudulent transactions that have been detected throughout the entire banking industry (as stored in banking sector fraudulent transaction data store 66 (FIG. 40B)) is computed by risk computation server 102. As discussed above, it is to be understood that instead of using fraudulent transactions that have been detected throughout the entire banking industry, information related to all of the fraudulent transactions that have been detected by the end user's financial institution related to all of the clients of the financial institution (as stored in financial institution clients' past transaction data store 68 (FIG. 40B)) could also be used. As discussed above, in this step, risk computation server 102 is trying to compare the end user to known fraudulent end users known to the entire banking industry (or the end user's financial institution) to help determine if a fraudulent transaction is taking place.

Once the two correlation matrices have been computed by risk computation server 102 in steps 708 and 710, the sub-process advances to step 712 where the two different secondary risk values are computed by risk computation server 102 in conjunction with GPU server 104. As described above, the two correlation matrices are computed by risk computation server 102 using the GPU C-REDv2 method to compute the two different secondary risk values where the two secondary risk values computations may be performed sequentially on the same GPU server 104 or in parallel on two separate GPU devices located on GPU server 104.

From the secondary risk values computation step 712, the sub-process advances to step 714 where the massively parallel architecture on GPU server 104 is used to further compute two aggregated secondary risk values. As described above, the massively parallel architecture on GPU server 104 is used to compute two secondary aggregated risk values by using the GPU-C-REDv.2 method. It is to be understood that the two aggregated secondary risk values, preferably, are an end user/client specific aggregated secondary risk value and a sector-wide aggregated secondary risk value such as a banking industry-wide aggregated secondary risk value.

Once the two aggregated secondary risk values have been computed in step 714, the sub-process advances to step 716 where risk computation server 102 selects the greater of the two aggregated secondary risk values and forwards that greater aggregated risk value to authentication server 62. As discussed above, the greater of the two aggregated secondary risk values is selected because the greater value represents the greater risk to the end user and/or the end user's financial institution that the end user's desired transaction may be fraudulent. As discussed above, if the end user is attempting to log onto the financial institution's website or portal from a location (Europe) that is not typically where the end user usually logs onto the end user's financial institution's website (Pennsylvania, U.S.A.), the aggregated secondary risk value associated with the client/end user specific risk value will be greater than the sector-wide risk value because it is not uncommon for other clients/end users of the banking industry, in general, (or the clients/end user of the client's financial institution, in particular) to attempt to log on the financial institution's website in location that is not their typical log on location.

After the greater of the two aggregated secondary risk values has been selected by the risk computation server 102 and forwarded to the authentication server 62, the sub-process advances to step 718 which triggers a determination step 719, where the authentication server 62 determines if the greater of the two aggregated secondary risk values exceeds a pre-determined value. For example, if the account that the end user desires to conduct the financial transaction upon has insufficient funds in order to conduct a transfer of funds to another account, the process advances to step 720 where the authentication server 62, in conjunction with financial institution system 200, notifies the end user, through display device 20, that the account has been blocked and the transaction session is terminated.

If the greater of the two aggregated secondary risk values does not exceed a pre-determined value, the sub-process advances from the determination step 719 to step 722 where a secondary multi-factor security protocol is determined by the LC-AloA which interacts with the risk computation server 102 to know what the risk value is currently and it also interacts with the authentication server 62 to know what are the associated costs for each cost factor (e.g. usability cost, server cost etc.). In this step, the authentication server 62/risk computation server 102 determine what kind of further or secondary end user authentication protocol should be entered in order to proceed with completing the end user's desired financial transaction. For example, if it is determined that due to the higher value of the client/end user specific aggregated risk value that an even further (tertiary) authentication of the end user is necessary, authentication server 62 may request through end user machine 12, particularly user input device 14 and authentication device 30 (FIG. 40), that the end user provide another hard token, a biometric recognition and/or a tertiary password.

Overview of the Secondary Multi-Factor Security Sub-Process

Once the secondary multi-factor security protocol is determined by secondary risk value computation routine 700, the overall end user authentication process 300 (FIG. 41A) proceeds to a call command 312 which calls a secondary multi-factor security protocol determination sub-process routine 800, as best seen in FIG. 41F.

From the start command 802, the secondary multi-factor security sub-process 800 advances to step 804 where the authentication server 62, in conjunction with end user machine 12, in particular display device 20, displays a request to the end user to enter a secondary multi-factor security authentication protocol. For example, authentication server 62 may request that the end user enter another hard token, a tertiary password (e.g., another secret phrase), and utilize the biometric recognition device 36.

Upon the receipt of the request for the secondary multi-factor security authentication protocol displayed on user machine 12, the sub-process advances to a determination step 806 where the end user inserts the hard token (in the case of the hard token request) and enters the requested other secondary multi-factor security authentication information into user machine 12 through the use of the input device 14 (in the case of the tertiary password) and performs the biometric recognition through the use of the biometric recognition device 36. Once the end user has entered the requested secondary multi-factor security authentication protocol, authentication server 62 interacts with the client authentication credentials data store 64 to determine if the end user has entered the proper end user identification associated with the secondary multi-factor security authentication protocol.

If the end user has not entered the proper end user identification associated with the secondary multi-factor security authentication protocol, the sub-process advances to a determination step 808 to make a determination if the allotted time for complying with the request generated at step 804 has elapsed or whether the end user has made three unsuccessful attempts to comply with the request generated at step 804. If time has not elapsed and the end user has not made three unsuccessful attempts, the sub-process returns to step 804, where the authentication server 62, in conjunction with end user machine 12, particularly display device 20 (FIG. 40), informs the end user of the secondary multi-factor security authentication protocol failure and requests that the end user re-enter the correct secondary multi-factor security authentication protocol through user machine 12.

From step 808, the process advances to step 411 where, upon a repeated failure (preferably three (3) failed attempts) by the end user to properly enter the requested end user identification associated with the secondary multi-factor security authentication protocol, the authentication server 62, in conjunction with end user machine 12, particularly display device 20 (FIG. 40), will inform the end user that the end user must return and re-initiate the authentication process. It is to be understood that the end user may also take too much time in order to properly enter the requested end user identification associated with the secondary multi-factor security authentication protocol. In this case, authentication server 62, in conjunction with session system 150 and display device 20, will inform the end user that the transaction session has expired. In this step 810, the failure by the end user to properly and/or timely enter the requested end user identification associated with the secondary multi-factor security authentication protocol is a strong indication to authentication server 62 that the end user may be a fraudulent end user.

It is to be understood that if the end user is a fraudulent end user and tries several times to enter the requested end user identification associated with the secondary multi-factor security authentication but is not successful, a record of these attempts made may be kept in the database of past transactions of bank's clients 68.

If the end user has entered the proper end user identification associated with the secondary multi-factor security authentication protocol, the sub-process advances to step 812 where the end user is informed that the secondary multi-factor security authentication protocol that was entered by the end user has been accepted. This acceptance is displayed to the end user on display device 20.

Once the end user has been notified that the secondary multi-factor security authentication protocol that was entered by the end user has been accepted, the sub-process advances to step 814 where the end user's desired financial transaction is executed.

The preceding merely illustrates the principles of the invention. It will thus be appreciated that those skilled in the art will be able to device various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, websites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, websites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Also, the present invention can be embodied in any non-transitory computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "non-transitory computer-readable medium" can be any means that can store, communicate, propagate or transport a program for use by or in connection with the instruction-execution system, apparatus or device. The non-transitory computer-readable medium can comprise any one of many physical media such as, for example, electronic, magnetic, optical, electromagnetic, infrared, or semiconductor media but exclude signals, carrier waves, or other transitory signals. More specific examples of a suitable computer-readable medium would include, but are not limited to, a portable magnetic computer diskette such as floppy diskettes or hard drives, a random access memory (RAM), a read-only memory (ROM), an erasable programmable read-only memory, a portable compact disc or removable flash memory. It is to be understood that the non-transitory computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiments of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies). In preferred embodiments, the present invention can be implemented in a combination of software and data executed and stored under the control of a computing device.

It will be well understood by one having ordinary skill in the art, after having become familiar with the teachings of the present invention, that software applications may be written in a number of programming languages now known or later developed.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein are a new and improved system and method for evaluating risk in a given context by estimating an aggregated risk value from a set of risk factors. The preferred system and method for evaluating risk in a given context by estimating an aggregated risk value from a set of risk factors, according to various embodiments of the present invention, offers the following advantages: firstly, inter-dependence was used in estimating risk in mobile financial systems; secondly, the geographical representation for the algorithm of the Genz method to compute copula was employed; thirdly, the computational time to integrate over a copula was reduced; fourthly, inter-dependence was also used in estimating an aggregated authentication level of assurance; fifthly, an optimization method was developed that derives the optimal authentication level of assurance for multi-factor authentication decision-making in order to keep the authentication-related costs to their minima; sixthly, the overall risk value (i.e., the aggregated risk value) calculated is more accurate because the dependency relationships among the different risk factors was taken into account; seventhly, tools were developed to make the calculations highly efficient for a large number of risk factors by utilizing parallel computing (i.e., using a GPU) and utilizing analytical methods (i.e., using Survival Copula); finally, the aggregation method was applied in fraud detection and authentication in estimating the aggregated risk, in detecting fraud, and in estimating the aggregated level of assurance of multi-factor authentication and optimal risk-linked authentication decision. In fact, these advantages are optimized to an extent that is considerably higher than heretofore achieved in prior, known systems and methods for evaluating risk.

I claim:

1. A method for evaluating risk in an electronic banking transaction by estimating an aggregated risk value from a set of risk factors, the method comprising, the steps of:

remotely performing an initial authentication of an end user;

performing an initial aggregated risk value analysis from a set of risk factors related to the user by imposing a parallel graphics processing unit architecture in response to authenticating that the end user is authorized to conduct a desired electronic transaction by deriving a first set of aggregated risk values in real time using a non-linear transformation and computation method for determining in real time evasive fraudulent financial transactions in on-line financial transactions to determine, based upon a greater one of the two aggregated risk values of the first set of aggregated risk values, if authentication information is fraudulent information in order to terminate the desired electronic banking transaction, wherein an aggregated risk value of the first set of aggregated risk values is based in part on a location of the end user;

requesting, from the user, that the user enters a secondary authentication, wherein the secondary authentication is a multi-factor authentication such that the number of factors in the multi-factor authentication is based upon the user;

receiving, from the user, a query concerning said electronic banking transaction that the user desires to conduct;

performing a further aggregated risk value analysis from a set of risk factors related to the electronic banking transaction that the user desires to conduct by imposing a parallel graphics processing unit architecture in response to authenticating that the end user s authorized to conduct the desired electronic transaction by deriving a second set of aggregated risk values in real time using a non-linear transformation and computation method for determining in real time evasive fraudulent financial transactions in on-line financial transactions to determine, based upon a greater one of the two aggregated risk values of the second set of aggregated risk values, if the authentication information is fraudulent information in order to terminate the desired electronic banking transaction;

requesting, from the user, that the user enters a tertiary authentication, wherein the tertiary authentication is another multi-factor authentication such that the number of factors in the another multi-factor authentication is based upon the electronic banking transaction that the user desires to conduct; and completing the desired transaction, if the user enters an acceptable tertiary authentication.

2. The method, as in claim 1, wherein the performing an initial authentication step further comprises the step of requesting an initial user identification from the user.

3. The method, as in claim 1, wherein the performing an initial aggregated risk value analysis from a set of risk factors related to the user step further comprises:

identifying relevant risk factors from the set of risk factors related to the user;

assigning a value to each relevant risk factor based upon the user;

computing correlation matrices based upon a past transaction history of the user and based upon fraudulent transactions of all of users of a financial institution and fraudulent transactions of all of users of a banking sector, wherein the correlation matrices are computed in parallel using two separate graphical processing units to determine the first set of aggregated risk values; and selecting the aggregated risk value that is the largest of the first set of aggregated risk values.

4. The method, as in claim 1, wherein the secondary authentication step is selected from a group of secondary authentication steps comprising: using a hard token authentication means; using a face recognition authentication means; or using a biometric authentication means.

5. The method, as in claim 1, wherein the performing a further aggregated risk value analysis step further comprises:
   identifying relevant risk factors from the set of risk factors related to the desired banking transaction by the user;
   assigning a value to each relevant risk factor based upon the desired banking transaction by the user;
   computing correlation matrices based upon a past transaction history of the user and based upon fraudulent transactions of all of users of the financial institution and fraudulent transactions of all of users of a banking sector, wherein the correlation matrices are computed in parallel using the two separate graphical processing units to determine the second set of aggregated risk values; and
   selecting the aggregated risk value that the largest of the second set of aggregated risk values.

6. The method, as in claim 1, wherein the requesting the tertiary authentication step further comprises the step of requesting a further user identification from the user.

7. At least one non-transitory computer-readable medium storing computer-readable instructions that, when executed by a computing device, cause the computing device to:
   remotely perform an initial authentication of an end user;
   perform an initial aggregated risk value analysis from a set of risk factors based upon the user by imposing a parallel graphics processing unit architecture in response to authenticating that the end user is authorized to conduct a desired electronic transaction by deriving a first set of aggregated risk values in real time using a non-linear transformation and computation method for determining in real time evasive fraudulent financial transactions in on-line financial transactions to determine, based upon a greater one of the two aggregated risk values of the first set of aggregated risk values, if authentication information is fraudulent information in order to terminate the desired electronic banking transaction, wherein the initial aggregated risk value analysis is based in part on a location of the end user;
   request, from the user, that the user enters a secondary authentication, wherein the secondary authentication is a multi-factor authentication such that the number of factors in the multi-factor authentication is based upon the user;
   receive, from the user, a query concerning an electronic banking transaction that the user desires to conduct;
   perform a further aggregated risk value analysis from a set of risk factors based upon the electronic banking transaction that, the user desires to conduct by imposing a parallel graphics processing unit architecture in response to authenticating that the end user is authorized to conduct the desired electronic transaction by deriving a second set of aggregated risk values in real time using a non-linear transformation and computation method for determining in real time evasive fraudulent financial transactions in on-line financial transactions to determine, based upon a greater one of the two aggregated risk values of the second set of aggregated risk values, if the authentication information is fraudulent information in order to terminate the desired electronic banking transaction;
   request, from the user, that the user enters a tertiary authentication, wherein the tertiary authentication is another multi-factor authentication such that the number of factors in the another multi-factor authentication is based upon a type of electronic banking transaction that the user desires to conduct; and
   complete the desired transaction, if the user enters an acceptable tertiary authentication.

8. The at least one non-transitory computer-readable medium, as in claim 7, wherein the performing an initial aggregated risk value analysis step further comprises:
   identify relevant risk factors from the set of risk factors related to the user;
   assign a value to each relevant risk factor based upon the user;
   compute correlation matrices based upon a past transaction history of the user and based upon fraudulent transactions of all of users of a financial institution and fraudulent transactions of all of users of a banking sector, wherein the correlation matrices are computed in parallel using two separate graphical processing units to determine the first set of aggregated risk values; and
   select the aggregated risk value that is the largest of the first set of aggregated risk values.

9. The at least one non-transitory computer-readable medium, as in claim 7, wherein the performing a further aggregated risk value analysis step further comprises:
   identify relevant risk factors from the set of risk factors related to the desired banking transaction by the user;
   assign a value to each relevant risk factor based upon the desired transaction by the user;
   compute correlation matrices based upon the past transaction history of the user and based upon the fraudulent transactions of all of users of the financial institution and fraudulent transactions of all of users of a banking sector, wherein the correlation matrices are computed in parallel using the two separate graphical processing units to determine the second set of aggregated risk values; and
   select the aggregated risk value that is the largest of the second set of aggregated risk values.

\* \* \* \* \*